(12) United States Patent
Mohanty

(10) Patent No.: US 12,001,813 B2
(45) Date of Patent: *Jun. 4, 2024

(54) SOFTWARE PLATFORM THAT FACILITATES DEFINITION, DESIGN, DEVELOPMENT, AND DEPLOYMENT OF SOFTWARE PRODUCTS

(71) Applicant: Calibo LLC, Miami, FL (US)

(72) Inventor: Shubhabrata Mohanty, Pune (IN)

(73) Assignee: Calibo LLC, Miami, FL (US)

( * ) Notice: Subject to any disclaimer, the term of this patent is extended or adjusted under 35 U.S.C. 154(b) by 136 days.

This patent is subject to a terminal disclaimer.

(21) Appl. No.: 17/823,402

(22) Filed: Aug. 30, 2022

(65) Prior Publication Data

US 2023/0065530 A1 Mar. 2, 2023

Related U.S. Application Data

(60) Provisional application No. 63/260,723, filed on Aug. 30, 2021.

(51) Int. Cl.
*G06F 8/10* (2018.01)
*G06F 8/20* (2018.01)
(Continued)

(52) U.S. Cl.
CPC .................. *G06F 8/10* (2013.01); *G06F 8/20* (2013.01); *G06F 8/311* (2013.01); *G06F 8/34* (2013.01);
(Continued)

(58) Field of Classification Search
CPC . G06F 8/10; G06F 9/451; G06F 8/311; G06F 8/34; G06F 8/447; G06F 8/51;
(Continued)

(56) References Cited

U.S. PATENT DOCUMENTS 8,108,234 B2 1/2012 Suenbuel et al.
10,866,793 B2 12/2020 Atkinson et al.
(Continued)

FOREIGN PATENT DOCUMENTS

JP 2004265278 A * 9/2004

OTHER PUBLICATIONS

Cingolani et al., "BigDataScript: a scripting language for data pipelines" (Year: 2015).*
(Continued)

*Primary Examiner* — Phillip H Nguyen
(74) *Attorney, Agent, or Firm* — CHIP Law Group

(57) ABSTRACT

Provided is an architecture to facilitate definition, design, development, or deployment of an application. A user action designer renders a user interface (UI) on a user device and records user actions performed on the UI. The user actions include selection of an operation and a technology for executing the operation. The user action designer stores metadata associated with the user actions. A user action script compiler generates, based on the metadata, a user action script. An orchestrator communicates the user action script to a gentech script generator associated with the technology. The gentech script generator converts the user action script to a gentech script indicative of the operation. The interpreter converts the gentech script to a technology-specific script for the technology and communicates the technology-specific script to the technology. The technology executes the operation based on the technology-specific script.

19 Claims, 58 Drawing Sheets

(51) Int. Cl.
   *G06F 8/30*    (2018.01)
   *G06F 8/34*    (2018.01)
   *G06F 8/41*    (2018.01)
   *G06F 8/51*    (2018.01)
   *G06F 8/60*    (2018.01)
   *G06F 8/77*    (2018.01)
   *G06F 9/451*   (2018.01)
   *G06F 11/36*   (2006.01)
   *H04L 41/082*  (2022.01)

(52) U.S. Cl.
   CPC ............. *G06F 8/447* (2013.01); *G06F 8/51* (2013.01); *G06F 8/60* (2013.01); *G06F 8/77* (2013.01); *G06F 9/451* (2018.02); *G06F 11/3608* (2013.01); *H04L 41/082* (2013.01)

(58) Field of Classification Search
   CPC .......... G06F 8/60; G06F 8/77; G06F 11/3608; G06F 8/20; H04L 41/082
   See application file for complete search history.

(56) References Cited

U.S. PATENT DOCUMENTS

| | | | |
|---|---|---|---|
| 11,144,314 | B2 | 10/2021 | Baldassarre et al. |
| 11,188,525 | B2 | 11/2021 | Athavale et al. |
| 11,586,423 | B2 | 2/2023 | Körner |
| 11,748,064 | B2 | 9/2023 | Mohanty et al. |
| 2005/0160104 | A1* | 7/2005 | Meera ................. G06F 8/36 |
| 2011/0225163 | A1 | 9/2011 | Lyon |
| 2013/0086116 | A1* | 4/2013 | Agarwal ............... G06F 16/211 |
| | | | 707/792 |
| 2014/0075411 | A1 | 3/2014 | Diep et al. |
| 2014/0096104 | A1 | 4/2014 | Novak et al. |
| 2014/0130036 | A1 | 5/2014 | Gurikar et al. |
| 2018/0046455 | A1 | 2/2018 | Walsh et al. |
| 2019/0227824 | A1 | 7/2019 | Kuchoor et al. |
| 2020/0026641 | A1 | 1/2020 | Rajagopalan et al. |
| 2020/0117427 | A1 | 4/2020 | Mcgloin et al. |
| 2020/0167215 | A1 | 5/2020 | Sidhu |
| 2020/0358757 | A1 | 11/2020 | Kulkarni et al. |
| 2020/0401379 | A1 | 12/2020 | Appel et al. |
| 2021/0117313 | A1* | 4/2021 | Geary ................. G06F 11/3495 |
| 2021/0216293 | A1* | 7/2021 | Siram .................. G06Q 10/06 |
| 2021/0286638 | A1 | 9/2021 | Fan et al. |
| 2021/0334146 | A1 | 10/2021 | Kulkarni et al. |
| 2022/0334950 | A1 | 10/2022 | Balan et al. |

OTHER PUBLICATIONS

E. Michael Maximilien, Ajith Harshana Ranabahu, Roy Engehausen, and Laura Challman Anderson, "Toward cloud-agnostic middlewares", Companion to the 24th Annual ACM SIGPLAN Conference on Object-Oriented Programming, Systems, Languages, and Applications, OOPSLA 2009, Oct. 25-29, 2009, pp. 619-626, Orlando, Florida, USA.

Notice of Allowance received in U.S. Appl. No. 17/027,163 on May 24, 2023.

Notice of Allowance, U.S. Appl. No. 17/899,387.

Non-final office action, U.S. Appl. No. 17/823,321.

\* cited by examiner

800A

New Business Requirement

Title  802

Would you like to document the Business Requirement using any of these tools?  814

| Documentation Technology 1 | Documentation Technology 2 | Documentation Technology 3 | Documentation Technology 4 | Documentation Technology 5 |
|---|---|---|---|---|
| 816a | 816b | 816c | 816d | 816e |

Basic Details    Links    Files  804

Description  806

Additional Attributes  808

Attribute Name    Value    810 ADD

Tags

812

Cancel    Create

| | Design | Develop | Deploy |
|---|---|---|---|

1900C

- General
- Define

Deployment Mode
Cloud Technologies
First Deployment Mode Configuration
Second Deployment Mode Configuration
Third Deployment Mode Configuration
Machine Configuration
Artifact Management
Continuous Integration
Code Quality Analysis
Pipeline Configuration
Deployment Stages

1902

| Type | Configuration | Allowed |
|---|---|---|
| Custom | 16 GB RAM 4vCPU | ● (on) |
| Large | 8 GB RAM 2vCPU | ● (on) |
| Medium | 4 GB RAM 2vCPU | ○ (off) |
| Small | 2 GB RAM 2vCPU | ○ (off) |

1906

2400A

New Policy

Policy Name

| Enforce Mandatory tags on Taggable Resources |

Policy Type

| Tagging ▼ |

Default Tags

Portfolio     ⬤
Project     ⬤
Release     ⬤
Workstream     ⬤
Environment     ⬤
Technology stack     ⬤    2402

Owner

Custom Tags

| Name | Value | 2404

| Add New | 2406

Enforce Mandatory tags on Taggable Resources

Policy Type: Tagging

Portfolio
Innovation Portfolio

Project
Project 2.5

Release
Maintenance Release 1.1

Workstream
Maintenance

Environment
DEV

Technology stack ID
React 17.0

Custom Tag Name

Custom Tag Value

FIG. 24B

SOFTWARE PLATFORM THAT FACILITATES DEFINITION, DESIGN, DEVELOPMENT, AND DEPLOYMENT OF SOFTWARE PRODUCTS

This Patent Application makes reference to, claims priority to, and claims the benefit of U.S. Provisional Application No. 63/260,723, filed Aug. 30, 2021, the contents of which are hereby incorporated herein by reference in its entirety.

FIELD

Various embodiments of the disclosure relate generally to software product development. More specifically, various embodiments of the disclosure relate to an architecture for a software platform that facilitates definition, design, development, and deployment of software products.

BACKGROUND

In the past few decades, the technological landscape has been radically transformed due to rapid proliferation of digital technology. Many new-age organizations (e.g., start-ups) that specialize in software products (e.g., e-commerce applications, e-learning applications, or ride-sharing applications) have been established and have gained prominence in recent times. Further, a large proportion of legacy organizations (e.g., businesses, governments, non-profit organizations, or the like) have undergone digital transformation to develop software products and/or software solutions for optimizing various operations (e.g., sales, marketing, customer relations, or inventory management).

For example, many brick-and-mortar business chains have taken their businesses online by creating software products (e.g., e-commerce applications) for their consumers. Similarly, companies in the automobile industry have created software products (e.g., software applications) that enable consumers to remotely track and/or control (e.g., remotely switch on an air-conditioner) their vehicles. Similarly, industrial companies have created software products for automating production lines and monitoring health of machinery in factories. Such software products or solutions may enable an organization to conduct desired operations with alacrity and optimal quality.

Development of the software products is often intensive in regard to time, effort, and resources. Life cycle of a software product may include various stages like a define stage, a design stage, a develop stage, and a deploy stage. Further, the software product may repeatedly undergo the various stages since the software may be continuously evolving and/or improving, as per advancements in technologies and change in requirements of the organization. Development of the software product begins with define stage. The define stage may involve establishment of requirements, analysis of feasibility, solicitation of ideas from various stakeholders, creation of prototypes or proof-of-concept, estimation of costs, evaluation of risks, or the like. The define stage calls for the various stakeholders (e.g., developers, management, business partners, clients, or the like) to co-ideate and brainstorm to define technology and business requirements with respect to the software product. Creation of proofs-of-concept, evaluation of risks, estimation of costs, or the like often requires extensive collaboration between the various stakeholders. However, establishing channels or platforms for enabling the stakeholders to collaborate in efficiently executing the define stage is neither easy nor always possible. Hence, the organization may end up expending a lot of valuable time in just creating requisite channels of communication or collaboration for executing the define stage. Further, even the establishment of these channels may not always guarantee effective or efficient implementation of the define stage.

During the design stage of the software product, designs or design mock-ups (e.g., user-experience design, user interface design, technical design, data organization design, or the like) for the software product may be prepared. Such designs may be prepared by various individuals or teams involved in the development of the software product. Therefore, synchronous progress in work, transparency, and collaboration among the individuals and/or teams is crucial in finalizing designs for the software product. However, in the organization such transparency and collaboration may not be always possible as different designs may be prepared using different tools or different design platforms. Further, there may exist constraints (e.g., time constraints, security constraints, policies, permissions, or the like) in sharing each design with concerned stakeholders. As a result, the design stage of the software product may turn out to be complicated and time-consuming.

Development of the software product may involve selection of a technology stack and writing code for developing the software product. Given today's competitive market, the organization may often need to adopt modern technologies (e.g., technologies for artificial intelligence, big data, data analytics, or DevOps) and modern practices (e.g., Agile) that enable the organization to optimize its operations and maintain an edge over competitors. To build or develop the software product (e.g., an e-commerce application, an e-learning application, or the like), the organization may need to select various point technologies (Hadoop, Apache Spark, or the like). The organization may be further required to build compatible point services on top of these point technologies. Business solutions (e.g., the software product) would need to be developed on top of the point services. These point services need to be configured, maintained, and/or operated to suit changing requirements of the software product and/or the organization.

In other words, the selected technology stack may also undergo frequent changes, requiring repeated teardowns or retirement of existing point services and building of new point services on top of existing or new point technologies. This configuration, maintenance, operation, discarding of old technologies or services, and/or building of new technologies or services requires expertise in the selected technology platforms and point technologies, causing the organization to expend significant time and resource in training existing staff or hiring new staff (e.g., developers or engineers). introducing delays and risks for the operations of the organization. Therefore, automation and orchestration of technology services (e.g., point technology services) is intensive in terms of time and resources.

Moreover, such transitioning between technology platforms (or point technologies) may not be scalable and therefore may not always be successful, creating serious ramifications for the organization. Therefore, the organization may be reluctant in adopting new technologies or software development practices. As a result, the organization may lack agility and may fail to find a competitive edge in the digital landscape.

In light of the foregoing, there exist areas of weakness that can prevent, delay, or compromise productization of the software product.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An architecture for definition, design, development, or deployment of an application is provided substantially as shown in, and described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIGS. 8A and 8B, collectively, illustrate UI screens rendered by the service application on the first user device for the implementation of the define stage, in accordance with an exemplary embodiment of the present disclosure;

FIGS. 11A-11J, collectively, illustrate UI screens rendered by the service application on the first user device for creation and management of data pipelines, in accordance with an exemplary embodiment of the present disclosure;

FIGS. 19A-19H, collectively, illustrate UI screens rendered by the service application on the first user device for configuration of policies and pipeline templates, in accordance with an exemplary embodiment of the present disclosure;

FIGS. 24A and 24B, collectively, illustrate UI screens rendered by the service application on the first user device for configuration of a tagging policy for provisioned infrastructure, in accordance with an exemplary embodiment of the present disclosure;

DETAILED DESCRIPTION

Figure 1:
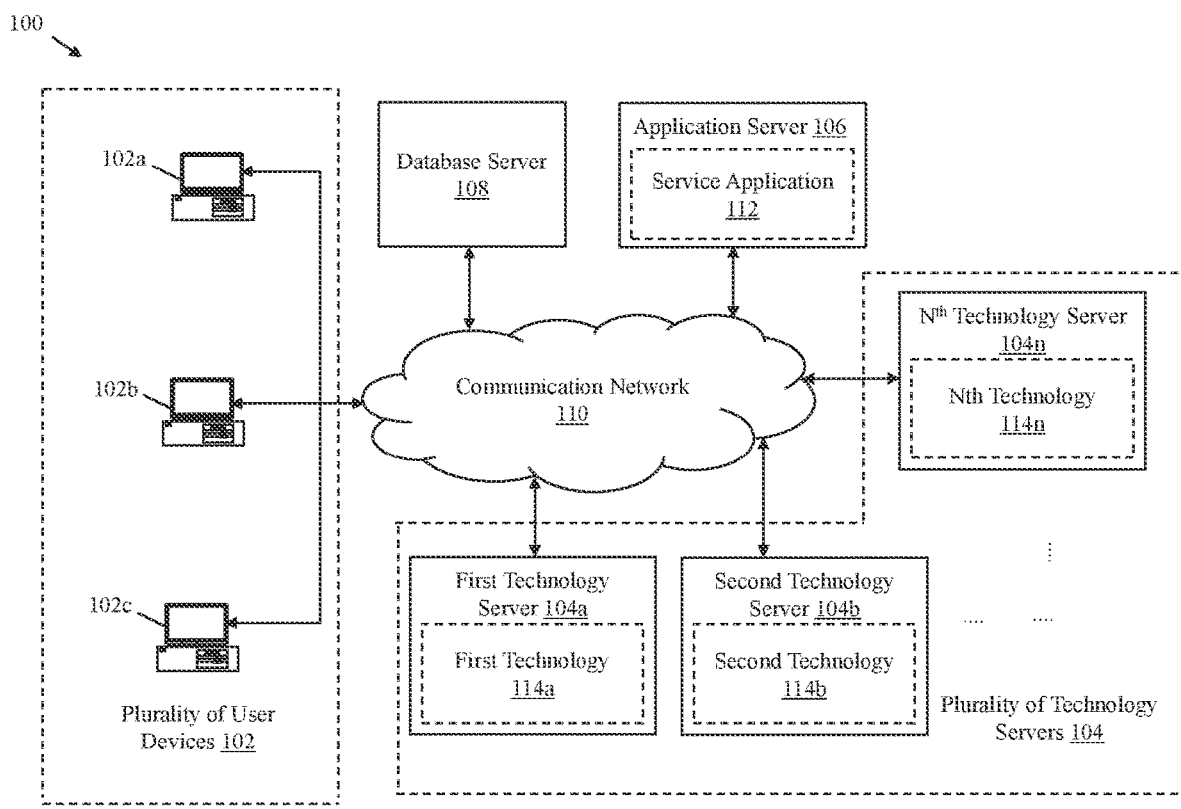
FIG. 1 is a block diagram that illustrates a system environment for managing technologies to facilitate definition, design, development and deployment of a software product, in accordance with an exemplary embodiment of the present disclosure.

In an embodiment of the present disclosure, a non-transitory computer-readable medium is provided. The non-transitory computer-readable medium stores, therein, computer executable instructions, which when executed by a computer, cause the computer to implement an architecture to facilitate definition, design, development, or deployment of an application. The architecture may include a user action designer, a user action script compiler, and a plurality of script generators. The user action designer may be configured to render, on a user device, a user interface (UI) that presents a first plurality of technologies and a plurality of operations available to facilitate the definition, the design, the development, or the deployment of the application. The user action designer may be further configured to present, on the UI, based on a selection of a first set of operations of the plurality of operations, a second plurality of technologies available for execution of the first set of operations. The first plurality of technologies may include the second plurality of technologies. The user action designer may be further configured to record a first plurality of user actions performed on the UI. The first plurality of user actions may be associated with the definition, the design, the development, or the deployment of the application. Further, the first plurality of user actions may include the selection of the first set of operations and a selection of a first technology from the second plurality of technologies for the execution of the first set of operations. The user action designer may be further configured to store, in a user action catalog, metadata associated with the first plurality of user actions. Further, the user action script compiler may be configured to generate, based on the metadata stored in the user action catalog, a first user action script. The first user action script may be indicative of the selection of the first technology and the first set of operations to be executed by the first technology. Further, each script generator of the plurality of script generators may be configured to generate gentech scripts for a set of technologies of the first plurality of technologies. The gentech scripts generated by each script generator is technology agnostic with respect to a corresponding set of technologies. A first script generator of the plurality of script generators may be configured to generate gentech scripts for the second plurality of technologies. The architecture may further include a plurality of technology-specific interpreters for the first plurality of technologies and an orchestrator. The plurality of technology-specific interpreters may include a first technology-specific interpreter for the first technology. Further, the orchestrator may be configured to communicate a first section of the first user action script to the first script generator. The first script generator may be configured to convert the first section of the first user action script to a first set of gentech scripts. The first set of gentech scripts is in a format that is technology agnostic with respect to the first technology. The first script generator may be further configured to communicate the first set of gentech scripts to the orchestrator. The orchestrator may be further configured to communicate, based on the first user action script, the first set of gentech scripts to the first technology-specific interpreter. The first technology-specific interpreter may be configured to convert the first set of gentech scripts to a first set of technology-specific scripts compatible with the first technology. The first technology-specific interpreter may be further configured to communicate the first set of technology-specific scripts to the first technology. The first technology may initiate execution of the first set of operations based on the first set of technology-specific scripts.

In some embodiments, the first technology-specific interpreter may be further configured to receive first progress data from the first technology, based on the initiation of the execution of the first set of operations. The first progress data may be indicative of a progress of execution of the first set of operations by the first technology. The first technology-specific interpreter may be further configured to generate a second set of gentech scripts based on the received first progress data. The second set of gentech scripts may be indicative of the first progress data and in a format that is technology agnostic with respect to the first technology. Further, the first technology-specific interpreter may be configured to communicate the second set of gentech scripts to the orchestrator. The orchestrator may be further configured to communicate the second set of gentech scripts to the first gentech script generator. Further, the first script generator may be configured to convert the second set of gentech scripts into a second user action script and communicate the second user action script to the orchestrator. The second user action script may be indicative of the first progress data.

In some embodiments, the architecture may further include a response converter for generation of user action responses. The response converter may be configured to receive the second user action script from the orchestrator and generate a first set of user action responses based on the second user action script. The first set of user action responses may be indicative of the first progress data received from the first technology. The user action designer may be further configured to receive the first set of user action responses from the response converter. The user action designer may be further configured to generate a first set of visual indicators indicative of the progress of the execution of the first set of operations based on the first set of user action responses and present the generated first set of visual indicators on the UI.

In some embodiments, the user action designer may be further configured to present, on the UI, based on a selection of a second set of operations of the plurality of operations, a third plurality of technologies available for execution of the second set of operations. The first plurality of technologies may include the third plurality of technologies. The first plurality of user actions may further include the selection of the second set of operations and a selection of a second technology from the third plurality of technologies for the execution of the second set of operations. The orchestrator may be further configured to communicate, to a second script generator, a second section of the first user action script. The second script generator may be configured to generate gentech scripts for the third plurality of technologies. The plurality of script generators may include the second script generator. The second script generator may be configured to convert the second section of the first user action script to a third set of gentech scripts. The third set of gentech scripts is in the format that is technology agnostic with respect to the second technology. The second script generator may be further configured to communicate the third set of gentech scripts to the orchestrator. The orchestrator may be further configured to communicate, based on the second section of the first user action script, the third set of gentech scripts to a second technology-specific interpreter. The second technology-specific interpreter may be configured to convert the third set of gentech scripts to a third set of technology-specific scripts compatible with the second technology and communicate the third set of technology-specific scripts to the second technology. The second technology may initiate execution of the second set of operations based on the third set of technology-specific scripts.

In some embodiments, the second technology-specific interpreter may be further configured to receive second progress data from the second technology, based on the initiation of the execution of the second set of operations. The second progress data may be indicative of a progress of execution of the second set of operations by the second technology. The second technology-specific interpreter may be further configured to generate a fourth set of gentech scripts based on the received second progress data and communicate the fourth set of gentech scripts to the orchestrator. The fourth set of gentech scripts is in a format that is technology agnostic with respect to the second technology. The orchestrator may be further configured to communicate the fourth set of gentech scripts to the second script generator. The second script generator may be further configured to convert the fourth set of gentech scripts into a third user action script that may be indicative of the second progress data and communicate the third user action script to the orchestrator.

In some embodiments, the response converter may be further configured to receive the third user action script from the orchestrator and generate a second set of user action responses based on the third user action script that may be indicative of the second progress data received from the second technology. The user action designer may be further configured to receive the second set of user action responses from the response converter. The user action designer may be further configured generate a second set of visual indicators that may be indicative of the progress of the execution of the second set of operations based on the second set of user action responses and present the generated second set of visual indicators on the UI.

In some embodiments, the user action designer may be further configured to record a second plurality of user actions performed on the UI. The second plurality of user actions may be associated with the definition, the design, the development, or the deployment of the application. The second plurality of user actions may include a selection of the first set of operations and change of the selection of the first technology to a second technology from the second plurality of technologies for the execution of the first set of operations. The user action designer may be further configured to update the metadata stored in the user action catalog based on the second plurality of user actions. The user action script compiler may be further configured to generate a third user action script based on the updated metadata. The third user action script may be indicative of the selection of the second technology for the execution of the first set of operations. The orchestrator may be further configured to communicate, based on the third user action script, the first set of gentech scripts to a second technology-specific interpreter of the plurality of technology-specific interpreters.

The second technology-specific interpreter may be configured to convert the first set of gentech scripts to a third set of technology-specific scripts compatible with the second technology. The orchestrator may be further configured to communicate the third set of technology-specific scripts to the second technology. The second technology may initiate execution of the first set of operations based on the third set of technology-specific scripts.

In some embodiments, the second technology-specific interpreter may be further configured to receive second progress data from the second technology, based on the initiation of the execution of the first set of operations. The second progress data may be indicative of a progress of execution of the first set of operations by the second technology. The second technology-specific interpreter may be further configured to generate a third set of gentech scripts based on the received second progress data and communicate the third set of gentech scripts to the orchestrator. The third set of gentech scripts may be indicative of the second progress data and in a format that is technology agnostic with respect to the second technology. The orchestrator may be further configured to communicate the third set of gentech scripts to the second script generator. The second script generator may be further configured to convert the third set of gentech scripts into a fourth user action script that may be indicative of the second progress data and communicate the fourth user action script to the orchestrator.

In some embodiments, the response converter may be further configured to receive the fourth user action script from the orchestrator and generate a second set of user action responses based on the fourth user action script. The second set of user action responses may be indicative of the second progress data. The user action designer may be further configured to receive the second set of user action responses from the response converter. The user action designer may be further configured to generate, based on the second set of user action responses, a second set of visual indicators that may be indicative of the progress of the execution of the first set of operations and present the generated second set of visual indicators on the UI.

In some embodiments, the first plurality of user actions may further include a selection of a second technology from the second plurality of technologies for the execution of the first set of operations.

The first user action script may be further indicative of the selection of the second technology and the first set of operations to be executed by the second technology. The plurality of technology-specific interpreters may further include a second technology-specific interpreter for the second technology. The first set of gentech scripts is in the format that is technology agnostic with respect to the second technology. The orchestrator may be further configured to communicate the first set of gentech scripts to the second technology-specific interpreter. The second technology-specific interpreter may be configured to convert the first set of gentech scripts to a third set of technology-specific scripts compatible with the second technology and communicate the third set of technology-specific scripts to the second technology. The second technology may initiate execution of the first set of operations based on the third set of technology-specific scripts.

In some embodiments, the second technology-specific interpreter may be further configured to receive second progress data from the second technology, based on the initiation of the execution of the first set of operations. The second progress data may be indicative of a progress of execution of the first set of operations by the second technology. The second technology-specific interpreter may be further configured to generate a third set of gentech scripts based on the received second progress data and communicate the third set of gentech scripts to the orchestrator. The third set of gentech scripts may be indicative of the second progress data and in a format that is technology agnostic with respect to the second technology. The orchestrator may be further configured to communicate the third set of gentech scripts to the second script generator. The second script generator may be further configured to convert the third set of gentech scripts into a third user action script that may be indicative of the second progress data and communicate the third user action script to the orchestrator.

In some embodiments, the response converter may be further configured to receive the third user action script from the orchestrator and generate a second set of user action responses based on the third user action script. The second set of user action responses may be indicative of the second progress data. The user action designer may be further configured to receive the second set of user action responses from the response converter. The user action designer may be further configured to generate a second set of visual indicators that may be indicative of the progress of the execution of the first set of operations based on the second set of user action responses and present the generated second set of visual indicators on the UI.

In some embodiments, the architecture may further include an activity watcher. The activity watcher may be configured to track the first plurality of user actions performed on the UI. The activity watcher may be further configured to record, based on the second user action script, the first progress data received from the first technology and an output of the first set of operations.

In some embodiments, the architecture may further include an activity filter and a value stream engine. The activity filter may be configured to classify each of the tracked first plurality of user actions as one of a value added activity and a non-value-added activity, based on the first progress data and the output of the first set of operations. The value stream engine may be configured to determine a value stream map based on the tracked first plurality of user actions, the recorded first progress data, and the classification of the first plurality of user actions. The value stream map may be indicative of an efficiency score and a leakage time period for the definition, the design, the development, or the deployment of the application.

In some embodiments, the architecture may further include a relationship matrix engine. The relationship matrix engine may be configured to generate a traceability map based on the tracked first plurality of user actions, the recorded first progress data, and the recorded output of the first set of operations. The traceability map may be indicative of a causal relationship among the first plurality of user actions, the recorded first progress data, and the output of the first set of operations.

In some embodiments, the orchestrator may be further configured to store a look-up table indicative of a mapping between the first plurality of technologies, the plurality of script generators, and the plurality of technology-specific interpreters. The look-up table may indicate that the first script generator is mapped to the second plurality of technology and the first technology-specific interpreter is mapped to the first technology. The orchestrator may be further configured to identify, based on the first user action script and the look-up table, the first script generator. The first section of the first user action script may be communicated to the first script generator based on the identification of the first script generator.

In some embodiments, the look-up table may be further indicative of a mapping between a plurality of programming languages and a set of script generators. The plurality of script generators may include the set of script generators.

In some embodiments, the first set of gentech scripts may be presented on the UI for modification by a user. Further, one or more gentech scripts of the first set of gentech scripts may be modified by the user. The conversion of the first set of gentech scripts may include the conversion of the one or more modified gentech scripts.

FIG. 1 is a block diagram that illustrates a system environment 100 for managing technologies to facilitate definition, design, development and deployment of a software product, in accordance with an exemplary embodiment of the present disclosure. The system environment 100 is shown to include a plurality of user devices 102 (e.g., first through third user devices 102a-102c) and a plurality of technology servers 104 (e.g., first through $n^{th}$ technology servers 104a-104n). The system environment 100 is further shown to include an application server 106, a database server 108, and a communication network 110. The plurality of user devices 102, the plurality of technology servers 104, the application server 106, and the database server 108 may communicate with each other by way of the communication network 110.

The first user device 102a may include suitable logic, circuitry, interfaces and/or code, executable by the circuitry, that may be configured to execute one or more instructions based on user input received from a corresponding user. The first user device 102a may be further configured to execute a service application 112 that is hosted by the application server 106. In one embodiment, the service application 112 may be a standalone application installed on the first user device 102a. In another embodiment, the service application 112 may be accessible by way of a web browser installed on the first user device 102a. Examples of the first user device 102a may include, but are not limited to, a personal computer, a laptop, a smartphone, a tablet, or the like. The second and third user devices 102b and 102c may be functionally similar to the first user device 102a.

In one embodiment, the plurality of user devices 102 may be operated by a corresponding plurality of users associated with an organization. Examples of the organization include, but are not limited to, businesses, governments, non-profit organizations or the like. In a non-limiting example, the organization may intend to develop a software product (e.g., a software application). The plurality of users may utilize the plurality of user devices 102 for definition, design, development, deployment, operation, monitoring, and/or maintenance of the software product. Examples of the software product may include software applications such as, but not limited to, e-commerce applications, video streaming applications, productivity applications, e-learning applications, or the like. It will be apparent to those of skill in the art that examples of the software product are not limited to those mentioned above. In an actual implementation, the software product may include any enterprise or consumer software application.

The first technology server 104a may include suitable logic, circuitry, interfaces and/or code, executable by the circuitry, that may be configured to host a first technology 114a. In one embodiment, the first technology 114a may be one of a plurality of technologies available for designing, developing, deploying, maintaining, or monitoring the software product. In other words, the first technology 114a may be a technology or tool that is available for the design, development, deployment, security, operation, maintenance, or monitoring of the software product. In another embodiment, the first technology 114a may be a technology or tool that facilitates various operation pertaining to data analysis such as, but not limited to, data sourcing, data ingestion, data storage, data analysis, or data visualization. The first technology 114a may correspond to one of a software-as-a-service (SaaS), a platform-as-a-service (PaaS), or an infrastructure-as-a-service (IaaS). The first technology 114a may correspond to any technology that may be required by the organization at any phase or stage during a software development lifecycle (SDLC) or a data analytics/data science life cycle (DALC/DSLC) of the software product. For the sake of brevity, the terms "DALC" and "DSLC" are interchangeably used throughout the disclosure. In other words, the first technology 114a may include any application required for facilitating definition, design, development, or deployment of the software product. For the sake of brevity, the terms "software product", "product", and "software application" are used interchangeably throughout the entire disclosure.

For example, the first technology 114a may include a technology for requirement analysis, a technology for planning or project management, a technology for software architectural design. The first technology 114a may further include a technology for software development, a technology for software testing, a technology for software deployment, a technology for software maintenance, or a technology for document management. The first technology 114a may further include a technology for data storage (e.g., cloud data storage), a technology for data sourcing, a technology for data analytics, a technology for data visualization, or the like.

Throughout the disclosure, the terms "technology", "technology service", "technology platform", or "tool" are used interchangeably. Technologies available for various stages or phases of the SDLC or the DALC of the software product may be well known to those of skill in the art. Examples of the first technology 114a may include, but are not limited to, Microsoft Azure®, Amazon web services (AWS®), Snowflake®, Jira®, or the like.

The first technology server 104a may be implemented by one or more processors, such as, but not limited to, an application-specific integrated circuit (ASIC) processor, a reduced instruction set computing (RISC) processor, a complex instruction set computing (CISC) processor, and a field-programmable gate array (FPGA) processor. The one or more processors may also correspond to central processing units (CPUs), graphics processing units (GPUs), network processing units (NPUs), digital signal processors (DSPs), or the like. It will be apparent to a person of ordinary skill in the art that the first technology server 104a may be compatible with multiple operating systems.

The second through $n^{th}$ technology servers 104b-104n may be functionally similar to the first technology server 104a. The second through $n^{th}$ technology servers 104b-104n may host the second through $n^{th}$ technologies 114b-114n, respectively. The second through $n^{th}$ technology servers 104b-104n may each correspond to any technology that is required for facilitating with the SDLC or the DALC of the software product. Hereinafter, for the sake of brevity, the first through $n^{th}$ technologies 114a-114n are designated and referred to as "first plurality of technologies 114".

The application server 106 may include suitable logic, circuitry, interfaces, and/or code, executable by the circuitry, that may be configured to host the service application 112. The service application 112 hosted by the application server 106 may be an open pro-code PaaS that enables end-to-end definition, design, development, deployment, operation, and maintenance of the software product. The application server 106 is configured to enable, for the plurality of user devices 102 associated with the plurality of users, access to features provided by the service application 112. The application server 106 is configured to provide a single platform to various stakeholders (e.g., business partners, developers, product designers, management, or the like) to collaborate at various stages of development of the software product. The open pro-code PaaS may enable the organization to select technologies (e.g., the first plurality of technologies 114) for the design, development, deployment, operation, and maintenance of the software product, based on requirements/choices of the organization. In other words, the application server 106 enables, by way of the service application 112, selection/creation of a technology stack required for the SDLC and/or the DALC of the software product. Upgrades and licenses for the selected technologies may be managed by the application server 106. Each of the first plurality of technologies 114 may be one of a third-party technology or a proprietary technology. In a non-limiting example, a proprietary technology may be a technology that is associated with an entity that manages or owns the application server 106 (e.g., the service application 112). In such a scenario, the proprietary technology (e.g., technology platform) may be hosted/executed by the application server 106 itself or by a different server (e.g., one of the plurality of technology servers 104).

A technology stack may refer to a set of programming languages (e.g., Java, Swift, Scala, or Python), frameworks (e.g., Ruby on Rails, Django, Databricks, Hadoop, MLFlow, or Bootstrap), and/or technologies (e.g., tools or technology platforms for development, continuous integration-continuous deployment, data analytics, or the like) that are required for the SDLC and/or the DALC of the software product. In a non-limiting example, the technology stack for the SDLC of the software product may include a client-side component (e.g., frontend) and a server-side component (e.g., backend). The client-side component may include a frontend framework (e.g., AngularJS, React, jQuery, or the like). The server-side component may include a backend framework (e.g., Ruby on Rails, Django, or .Net), operating systems (e.g., Linux, Android, or iOS), programming languages (e.g., Java, Ruby, Python), and/or infrastructure and load balancing tools (e.g., AWS, Microsoft Azure, Cloudflare, or Apache). The server-side component may further include data storage and querying tools (e.g., MongoDB, RedShift, Snowflake, or MySQL) and monitoring and performance tools (e.g., AppDynamics, Dynatrace, or Datadog).

The technology stack may further include tools or applications for business intelligence (BI), application programming interface (API) services, product analytics, or the like. Examples of the tools/applications for BI include, but are not limited to, SAP BusinessObjects, Tableau, Looker, Microsoft Power BI, or the like. Examples of the tools/applications for API services include, but are not limited to, Segment, Google Apigee, Zapier, or the like. Examples of the tools/applications for product analytics may include, but are not limited to, Heap, Countly, Mixpanel, or the like. The technology stack may further include other tools or applications for version control (e.g., GitHub, Gitlab, or AWS CodeCommit), continuous integration/continuous deployment (e.g., Jenkins, Bamboo, or Codeship), testing (e.g., Selenium, TestingWhiz, or TestComplete), or the like. Selection of the technology stack is well known to those of skill in the art.

The application server 106 enables integration and orchestration of services provided by the various technologies (e.g., the first plurality of technologies 114) of the technology stack. The technology stack may include PaaS, SaaS, IaaS technologies/applications provided by various technologies such as, AWS, Microsoft Azure, Snowflake, Jira, R studio, DataBricks, GitHub, or the like. Examples of the application server 106 may include a cloud-based server, a local server, a group of centralized servers, a group of distributed servers, or the like.

The application server 106 may facilitate, for the plurality of user devices 102, access to various technologies (e.g., technology platforms) by way of the service application 112. In an example, the organization may use DataBricks for ingesting data from a data source, and Snowflake for storage of the ingested data. Similarly, the application server 106 may enable configuration of DataBricks and Snowflake via the service application 112. Details of one or more services provided by the service application 112 hosted by the application server 106 are described later in the disclosure.

In an embodiment, the application server 106 may communicate with the plurality of technology servers 104 associated with corresponding technologies to enable each user device, of the plurality of user devices 102, to access one or more services provided by said technologies. In another embodiment, multiple technologies may be hosted on a single platform server (e.g., the first technology server 104a). In such a scenario, the application server 106 may communicate with the first technology server 104a to enable each of the plurality of user devices 102 to access one or more services provided by said technologies.

The application server 106 may be implemented by one or more processors, such as, but not limited to, an ASIC processor, a RISC processor, a CISC processor, and an FPGA processor. The one or more processors may also correspond to CPUs, GPUs, NPUs, DSPs, or the like. It will be apparent to a person of ordinary skill in the art that the application server 106 may be compatible with multiple operating systems.

The database server 108 may include suitable logic, circuitry, interfaces, and/or code, executable by the circuitry, that may be configured to store data and perform one or more database operations associated with the stored data. Examples of the database operations may include, but are not limited to, receiving, storing, processing, and transmitting data pertaining to a use of the service application 112 by the plurality of users. The database server 108 may further receive, store, process, and transmit data associated with the plurality of users. In an embodiment, the database server 108 may be further configured to receive, store, process, and transmit data associated with usage of the plurality of user devices 102 by the plurality of users. The database server 108 may include a database such as, but not limited to, Hadoop®, MongoDB®, MySQL®, NoSQL®, and Oracle®, or the like.

Examples of the database server 108 may include, but are not limited to, a personal computer, a laptop, a mini-computer, a mainframe computer, a cloud-based server, a network of computer systems, or a non-transient and tangible machine executing a machine-readable code. For the sake of brevity, the application server 106 and the database server 108 have been shown as separate systems. However, in some embodiments, the database server 108 may be integrated within the application server 106. In such scenarios, functions performed by the database server 108 may be performed by the application server 106 without deviating from the scope of the disclosure.

The communication network 110 may include suitable logic, circuitry, interfaces, and/or code, executable by the circuitry, that is configured to facilitate communication among various entities (such as the plurality of user devices 102, the plurality of technology servers 104, the application server 106, and the database server 108) described in FIG. 1. Examples of the communication network 110 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof. Various entities (such as the plurality of user devices 102, the plurality of technology servers 104, the application server 106, and the database server 108) in the system environment 100 may be communicatively coupled to the communication network 110 in accordance with various wired and wireless communication protocols, such as Transmission Control Protocol and Internet Protocol (TCP/IP), User Datagram Protocol (UDP), Long Term Evolution (LTE) communication protocols, or any combination thereof.

It will be apparent to a person skilled in the art that the system environment 100 described in conjunction with FIG. 1 is exemplary and does not limit the scope of the disclosure. In other embodiments, the system environment 100 may include different or additional components configured to perform similar or additional operations.

Figure 2:
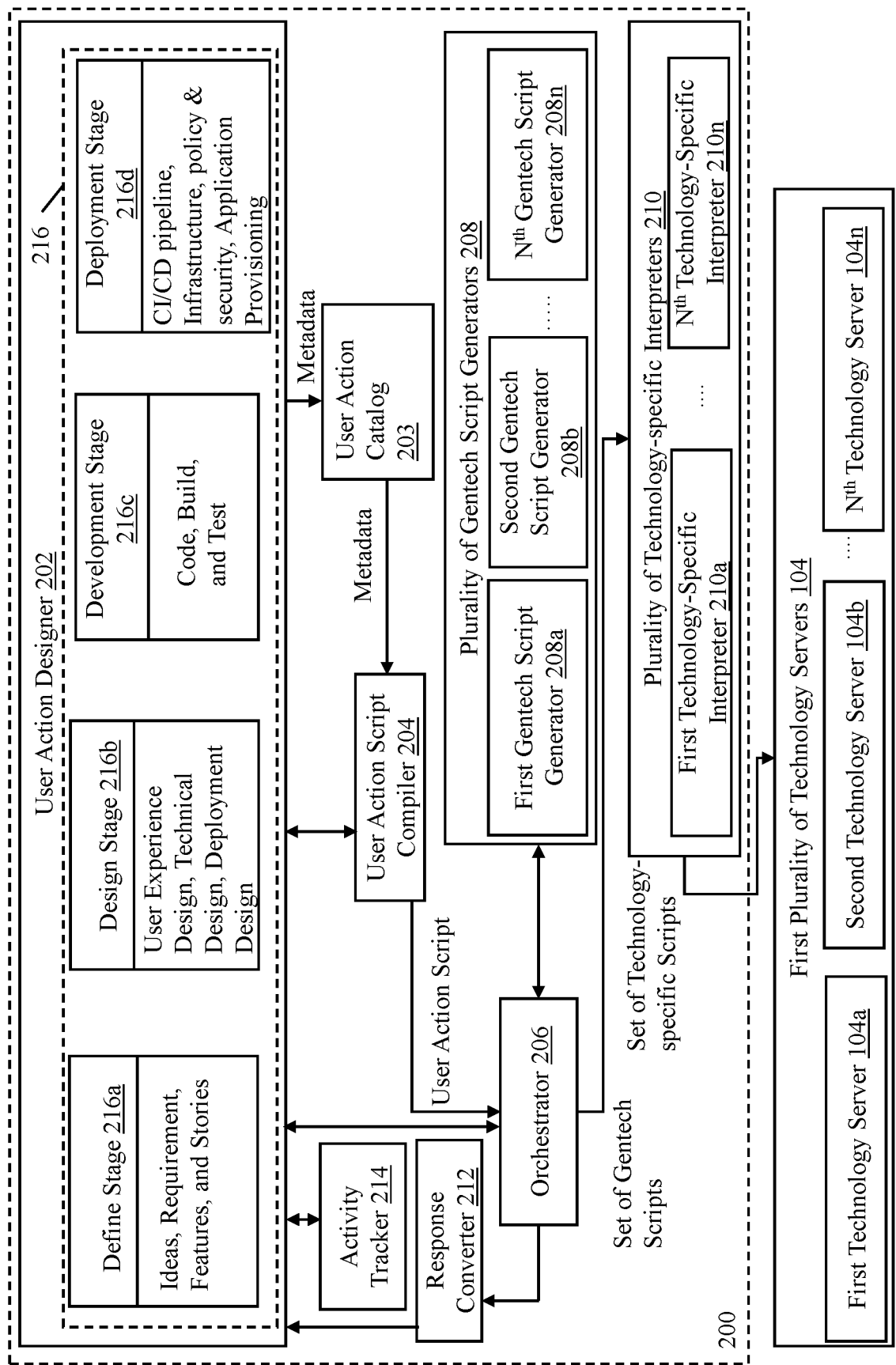
FIG. 2 is a block diagram that illustrates a primary architecture of a service application of FIG. 1, in accordance with an exemplary embodiment of the present disclosure.
Figure 3:
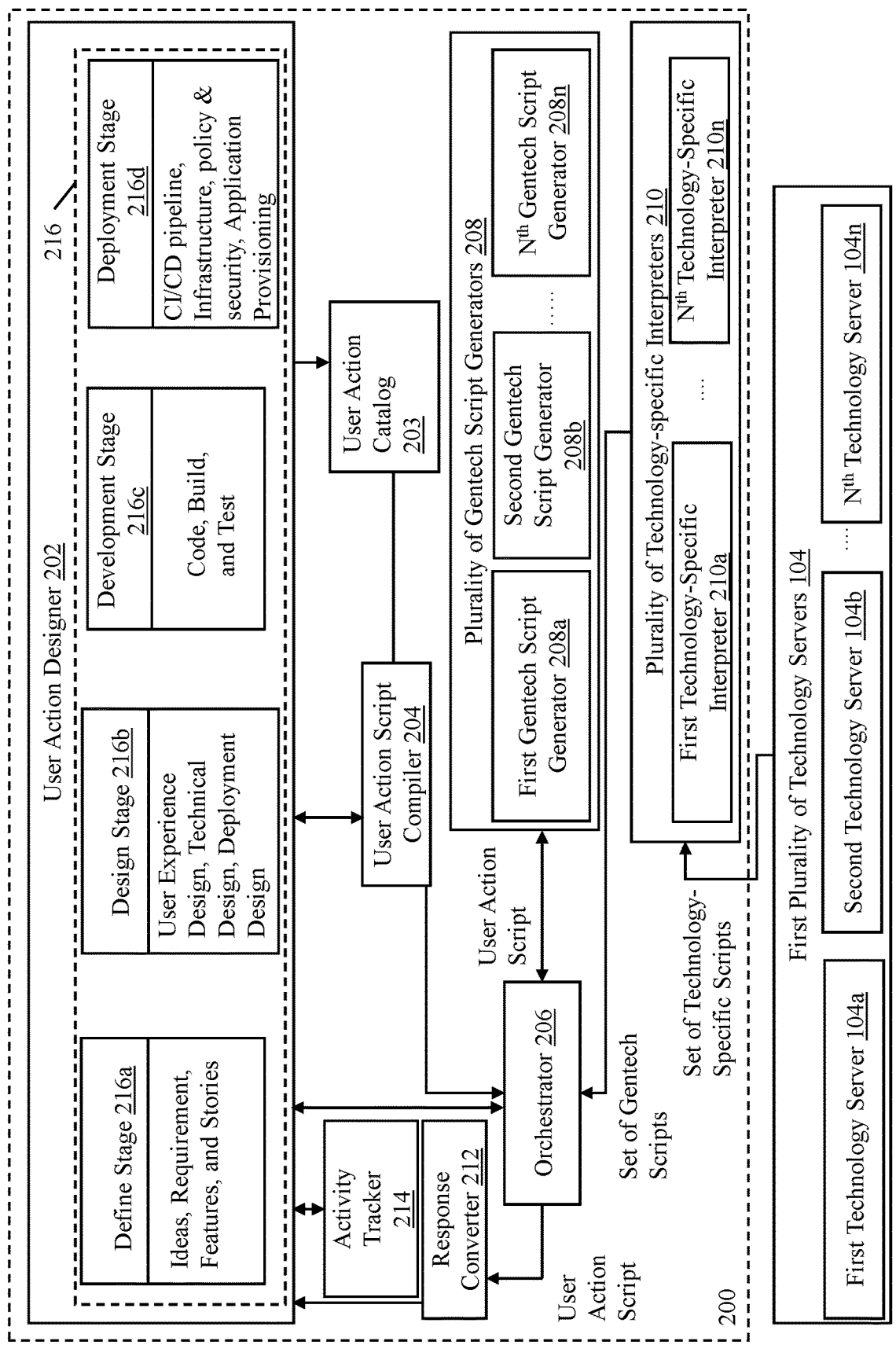
FIG. 3 is a block diagram that illustrates the primary architecture of the service application, in accordance with another exemplary embodiment of the present disclosure.

FIG. 2 is a block diagram that illustrates a primary architecture 200 of the service application 112, in accordance with an exemplary embodiment of the present disclosure. FIG. 3 is a block diagram that illustrates the primary architecture 200 of the service application 112, in accordance with another exemplary embodiment of the present disclosure. For the sake of brevity, the primary architecture 200 of the service application 112 is simply referred to as "architecture 200" throughout the disclosure. FIG. 2 illustrates a flow of information or data between components of the architecture 200 of the service application 112 during forward-channel communication, while FIG. 3 illustrates a flow of information or data between the components of the architecture 200 of the service application 112 during reverse-channel communication. Forward channel communication refers to communication (e.g., messages) initiated by the service application 112 and received by the first plurality of technologies 114 (e.g., the first plurality of technology servers 104). In one example, the forward-channel communicated may be initiated by the service application 112 based on one or more user actions of the user (e.g., the plurality of users) on the service application 112 to prompt one or more technologies of the first plurality of technologies 114 to execute a set of operations. Reverse channel communication may refer to communication received by the service application 112 from the first plurality of technologies 114. In one example, the reverse channel communication may refer to handling, by the service application 112, of communication (e.g., messages) received from the one or more technologies in response to the forward-channel communication.

The architecture 200 is shown to include a user action designer 202, a user action catalog 203, a user action script compiler 204, an orchestrator 206, first through $n^{th}$ gentech script generators 208a-208n, first through $n^{th}$ technology-specific interpreters 210a-210n, and a response converter 212. The first through $n^{th}$ gentech script generators 208a-208n are collectively designated and referred to as "plurality of gentech script generators 208", and the first through n<sup>th</sup> technology-specific interpreters 210a-210n are referred to as "plurality of technology-specific interpreters 210". The architecture 200 of the service application 112 is further shown to include an activity tracker 214. The architecture 200 of the service application 112 may further include a product orchestration designer (shown in FIG. 4). However, the product orchestration designer is not shown in FIGS. 2 and 3 in order to not obscure the disclosure. The service application 112 enables implementation of the various stages of product development for the software product. The various stages of product development may include, but are not limited, a define stage, a design stage, a development stage, and a deployment stage (shown in FIG. 4). The various stages of product development of the software product are explained in conjunction with FIG. 4.

Figure 4:
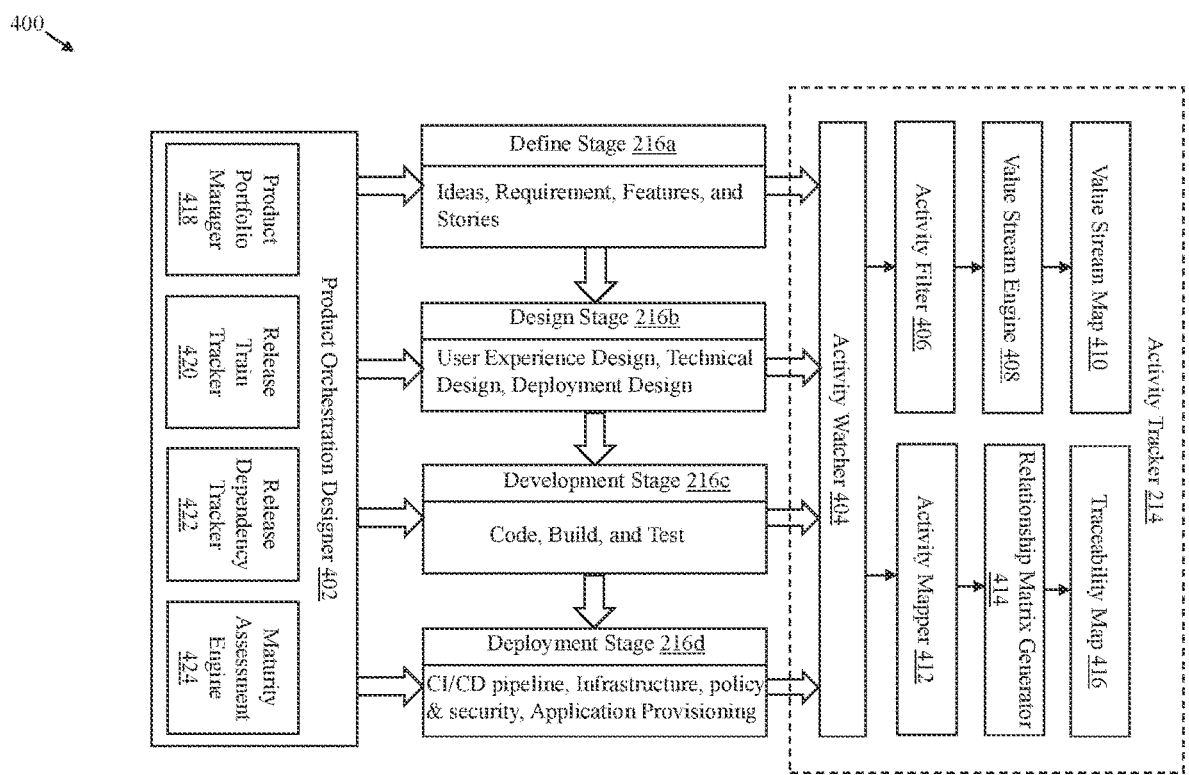
FIG. 4 is a block diagram that illustrates an activity tracker of FIGS. 2 and 3 and a product orchestration designer, in accordance with an exemplary embodiment of the present disclosure.

FIG. 4 is a block diagram 400 that illustrates the activity tracker 214 and the product orchestration designer, in accordance with an exemplary embodiment of the present disclosure. Hereinafter, the product orchestration designer is designated and referred to as the "product orchestration designer 402". FIG. 4 also illustrates the various stages of product development for the software product—the define stage (hereinafter, designated and referred to as "the define stage 216a"), the design stage (hereinafter, designated and referred to as "the design stage 216b"), the development stage (hereinafter, designated and referred to as "the development stage 216c"), and the deployment stage the development stage (hereinafter, designated and referred to as "the deployment stage 216d"). For the sake of brevity, the various stages of product development of the software product are collectively designated and referred to as "plurality of stages 216". The define stage 216a, the design stage 216b, the development stage 216c, and the deployment stage 216d are collectively referred to as "D4". For the sake of brevity, D4 is explained with respect to the software product.

During the define stage 216a, business or technology ideas, requirements, feasibility, risks, cost, or the like associated with the yet-to-be-developed software product may be analyzed and defined. Further, during the define stage 216a, roles for users (e.g., the plurality of users) in the development of the software product may be defined. In other words, the define stage 216a may be a stage associated with an ideation and/or (corresponding) pre-design analysis of the software product. An ideation process may include sourcing of ideas (e.g., brainstorming) from various stakeholders (e.g., users associated technology-oriented roles such as developers, users associated business-oriented roles such as managers or executives in the organization, or the like) for developing new software products or adding features in existing software products. The ideation process may further include evaluation of these ideas by the stakeholders, filtering of these ideas, and/or refinement of these ideas. In one embodiment, the ideation process may further include creation of a prototype of the software product (e.g., the software application or a proof-of-concept of the software product). In one embodiment, the ideation process may further include evaluation or analysis (e.g., by the stakeholders) of requirements, risks, and/or costs associated with the development of the software product.

Such analysis and ideation ensure mitigation or avoidance of various issues that may be faced during subsequent stages of the SDLC of the software product. In one embodiment, the define stage 216a may also include creation of a plan (e.g., a project plan) for design, development, and deployment of the software product. Such ideation for the software product may require interaction and collaboration among the stakeholders. The application server 106 may provide a single platform that enables the various stakeholders to collaborate and perform various actions (e.g., conduct discussions, conduct presentations, perform research, perform analysis, or the like) to facilitate the ideation process. In an example, the stakeholders may collaborate with each other by way of one or more collaboration tools (e.g., Microsoft Teams®, Zoom®, Google Meet®, Slack®, or the like) supported by the service application 112. The stakeholders may have discussions, exchange of ideas, information, data, files, or the like, by way of such collaboration tools supported by the service application 112. Beneficially, such collaboration among the stakeholders facilitates seamless and efficient ideation for the software product.

Further, during the define stage 216a, a documentation process for the SDLC and/or the DALC of the software product may be initiated. The documentation process may include generation of documents to document various inputs and outputs of the ideation process. The generated documents may include, but are not limited to, the ideas sourced from the stakeholders, results of the evaluation of the ideas, a set of finalized ideas, the proof-of-concept of the software product, a result of the evaluation of the risks, details of the prototype or the proof-of-concept of the software product, and the cost associated with the development of the software product. The generated documents may further include a workflow associated with a working of the software product, a design of the software product, a project plan for the development of the software product, and/or a set of access permissions associated with the SDLC and/or DALC of the software product. In an embodiment, the service application 112 may enable the plurality of users to select one or more technologies (e.g., Confluence®, Google Docs®, Sharepoint®, or the like) for documentation of the various inputs and outputs associated with the define stage 216a, and to store various files, links, attributes, tags, or the like associated with the software product.

In an embodiment, the service application 112 may enable the plurality of users to implement the define stage 216a, for the software product, by way of one or more pre-defined templates. In another embodiment, the service application 112 may allow the plurality of users to manually implement the define stage 216a by creating, files, sketches, presentations, or the like associated with the ideation for the software product. The define stage 216a may be followed by the design stage 216b.

During the design stage 216b, an architecture and technical design of the software product may be created or prepared. Based on the ideas, requirements, or the like that are defined at the define stage 216a, one or more tools, technologies, and/or design philosophies may be adopted (e.g., by the plurality of users) for developing the software product. In one embodiment, the design stage 216b may include creation of user interface (UI) designs (e.g., UI design mock-ups), user experience (UX) designs, technical designs, or the like associated with the software product. The UI design may provide an estimate of a layout and architecture of one or more UIs of the software product. The UX design for the software product may yield an estimation of an experience that may be encountered by users while interacting with the one or more UIs of the software product. The technical designs may refer to an estimation of programming languages and technologies and corresponding configurations to be used for facilitating the SDLC of the product. The data organization design may include schemas and subschema, metadata management plan, or the like associated with data used or generated during lifecycle of the software product. The design stage 216*b* of the software product may also involve creating or preparing designs (e.g., UI design, UX design, and/or technical design) for different versions of the software product.

Further, the design stage 216*b* allows for a mapping of the ideas and requirements associated with the define stage 216*a* with various designs (e.g., UI design, UX design, technical design, or the like) generated during the design stage 216*b*. Further, the design stage 216*b* ensures a readiness of the plurality of users as well as the service application 112, in terms of ideas, requirements, and technical clarity for proceeding with subsequent stages (the development stage 216*c* and the deployment stage 216*d*) associated with SDLC of the software product. The service application 112 may support integration or usage of various tools and/or technologies (e.g., Figma®, Sketch®, Invision®, Confluence®, Miro®, Google Docs®, or the like) that may be required for implementing the design stage 216*b*. The design stage 216*b* is followed by the development stage 216*c* of the SDLC of the software product.

During the development stage 216*c*, the technology stack for developing the software product may be selected. Further, during the development stage 216*c*, the software product (e.g., the software application) may be built (e.g., created or developed) using the selected technology stack. The service application 112 ensures detailed and organized implementation of the define stage 216*a* and the design stage 216*b* which allows for a hassle-free development of the software product. For example, the set of programming languages may be made available to the plurality of users (e.g., developers) for the development of the software product. Further, one or more technologies for version control or source code management (e.g., GitHub, Gitlab, or the like) may be used for storage of code, libraries, files, or the like associated with the software product. Further, the development stage 216*c* also enables users (e.g., the plurality of users) to commit, execute, and test the code for the software product. The development stage 216*c* may be followed by the deployment stage 216*d*.

In an embodiment, the development stage 216*c* may further include a testing sub-stage. During the testing sub-stage, code committed to a repository (e.g., one or more code repositories) may be tested using various one or more unit testing tools. Examples of the one or more unit testing tools include, but are not limited to, Nunit®, JUnit®, TestNG®, or the like. The detected bugs, anomalies, and/or errors may be reported (e.g., to a user who committed the Java code snippet and/or the plurality of users) on the service application 112. In one embodiment, the detected bugs, anomalies, errors, or the like may be debugged or removed automatically by way of one or more features provided by the service application 112, various technologies, or a manual input provided via the plurality of the user devices 102. In other words, the service application 112 allows for testing of the software product to find defects therein. Further, the service application 112 enables the plurality of users to verify whether the developed product behaves as expected and according to definitions and requirements ideated and defined during the define stage 216*a*.

The deployment stage 216*d* refers to deployment or release of the software product in various deployment environments (e.g., a development environment, a quality analysis environment, a pre-production environment, a production environment, or the like). The deployment stage 216*d* may include management of operations to deploy the software product. The deployment of the software product could be manual, scheduled, or automated. In one embodiment, the deployment stage 216*d* may facilitate implementation of a continuous integration/continuous deployment (CI/CD) pipeline that enables automated deployment and/or delivery of the software product. The service application 112 allows for use of one or more CI/CD technologies or CI/CD automation tools (e.g., Jenkins, Circle CI, or the like) for implementation of the CI/CD pipelines. Various other tools, services, and/or technologies may be used for implementing various stages in the CI/CD pipeline, in conjunction with the one or more CI/CD automation tools.

Examples of the various stages in the CI/CD pipeline may include, but are not limited to, version control, static application security testing (SAST), building, unit testing, integration testing, virtual machine provisioning, dynamic application security testing (DAST), application provisioning, or the like. Examples of tools and technologies for version control include, but are not limited to, Gitlab, GitHub, or the like. Examples of tools and technologies for SAST include, but are not limited to, SonarQube®, Veracode static analysis®, Codacy®, or the like. The service application 112 further allows the software product to be deployed in a cloud agnostic and technology agnostic manner. The technology agnostic nature of the software product allows the software product to be generalized so that it could be deployed across a plurality of platforms simultaneously. The cloud agnostic nature of the software product ensures that the software product may be deployed in any cloud environment towards use of cloud-based platforms. Being cloud agnostic, the software product may be deployed on any cloud-based platform and may use corresponding cloud services and may take advantage of different features and price structures offered by different cloud-based platforms. In one embodiment, the deployment stage 216*d* may include a maintenance sub-stage.

In an embodiment, the deployment stage 216*d* may enable integration with tools, services, or technologies for employing concepts of policy as code (PaC), Infrastructure as code (IaC), and Security as code (SaC).

The product may be tested before it is deployed in a production environment. Various tools, services, and/or technologies may be accessed and used, by way of the service application 112, to measure a performance, a reliability, and/or a robustness of the software product. The service application 112 allows for integration of technologies or tools that enable automation of decision-making in regard to a performance of the software product, a robustness of the software product, a reliability of the software product, or the like by enabling the plurality of users to implement concepts of PaC, allowing codification of policy decisions for the software product. PaC allows for automated decision-making, giving the plurality of users the independence to manage feature defining work without sacrificing compliance of the software product with respect to its requirements. PaC may involve writing the code in a high-level language to manage and automate policies associated with the software product. Policies may refer to coded logic that model a decision-making process associated with the software product. In an example, PaC may be implemented, in the software product, during a developer operations (DevOps) stage to implement fine-tuned access control measures for the software product.

Further, the service application 112 enables the plurality of users to manage provisioning of infrastructure associated with deployment of the software product by way of tools or technologies that implement concepts of IaC. IaC refers to automated management and provisioning of infrastructure (e.g., cloud infrastructure) for the deployment of the software product. IaC enables creation (e.g., by the plurality of users) of configuration files including specifications of the infrastructure associated with the software product. Such use of configuration files allows for seamless modification and distribution of configurations among different deployment environments. Implementation of IaC ensures provisioning of identical environment for the software product at each deployment environment. Further, codification and documentation of the configuration significantly reduces probability of undocumented and temporary changes in configuration.

The service application 112 enables integration of tools or technologies that allow for management of security for the software product at every stage of the SDLC of the software product. SaC may be integrated with the software product by analyzing and mapping a current process of making modifications in the infrastructure, and identifying vulnerabilities that may be minimized by code. Gates, security checks, tests, or the like may be coded into infrastructure (e.g., cloud infrastructure) at the identified vulnerable points. Beneficially, such implementation of SaC allows for development of the software product without any delay in implementing security separately. Further, implementation of SaC allows the plurality of users to create fixes corresponding to one or more issues as and when the issues occur. In an example, SaC may be implemented by way of automating feedback loops, automating scans and security testing, executing script tests, implementing monitoring functions, performing routing security policy checks, or the like.

The maintenance stage may refer to continuous and/or periodic monitoring of an operation of the software product. The service application 112 may enable integration with various tools or technologies (e.g., AppDynamics®, Dynatrace®, or the like) for monitoring the operation of the software product. In one embodiment, the operation of the software product may be monitored based on application logs generated by the software product or the various tools or technologies. The application logs for the software product may be indicative of errors, events, or warnings that correspond to the operation of the software product. In one embodiment, the monitoring of the operation of the software product may include monitoring of a security posture of the software product, monitoring of deployment infrastructure for the software product, generation of application insights, or the like. The security posture of the software product may be a measure of a level of security of the software product against cyberthreats. Monitoring of the security posture of the software product may include, but is not limited to, conducting cybersecurity assessment of the software product, identification of risks to the software product, tracking security metrics, or the like.

Infrastructure monitoring may refer to monitoring of infrastructure (e.g., virtual machines, containers, data stores, processors, servers, or the like) associated with the deployed software product. Infrastructure monitoring for the software product may include, but is not limited to, measurement of metrics (e.g., uptime, downtime, or the like) pertaining to the infrastructure deployed for the software product, analysis of problems in the infrastructure, or the like. Application insights for the software product may refer to measurement of various metrics (e.g., a number of received requests, response times for requests, failure rate, performance, or the like) associated with the software product. In other words, the application insights may refer to information or data generated based on analysis of requirement, usage, and/or performance of with the software product. The service application 112 may be configured to generate insights, predictions, alerts, recommendations, or the like, based on the continuous and/or periodic monitoring of the operation of the software product.

For the sake of brevity, the SDLC of the software product is assumed to include only above-mentioned stages. It will be apparent to those of skill in the art that the SDLC of the software product may include other stages without deviating from the scope of the disclosure. Stages included in the DALC of the software product will be explained in conjunction with later figures.

It will be apparent to a person skilled in the art that the overview of the service application 112 shown with respect to FIG. 2 is exemplary. In other embodiments, the service application 112 may facilitate additional or different stages of SDLC of the software product while supporting various additional or different features.

Referring back to FIG. 2, the user action designer 202 renders, on a user device (e.g., the first user device 102a), a UI that presents the first plurality of technologies 114 available for facilitating (e.g., implementing or executing) the plurality of stages 216 of the product development of the software product. Examples of the plurality of technologies may include, but are not limited to, technologies for project management, technology for version control or repository management (e.g., code commits), technologies for SAST, or technologies for DAST. Examples of the first plurality of technologies 114 may further include technologies for CI/CD pipeline automation (e.g., orchestration), technologies for infrastructure provisioning, technologies for cloud deployment, or technologies for monitoring of the software product after deployment of the software product.

Examples of the first plurality of technologies 114 may further include technologies for data ingestion, technologies for data warehousing or data storage, technologies for data analytics, or technologies for data visualization. In other words, the UI rendered by the user action designer 202 presents multiple technologies (e.g., tens, hundreds, or thousands of technologies) available for performing various sets of operations (e.g., code commit, continuous integration, project management, data analytics, or the like) associated with the plurality of stages 216. The first plurality of technologies 114 are available for performing a first plurality of operations associated with the plurality of stages 216. The first plurality of operations may include any operation associated with the define stage 216a, the design stage 216b, the development stage 216c, or the deployment stage 216d. Further, the first plurality of operations may include any operation that is required for the product development, the maintenance, or the operation of the software product.

Each of the first plurality of technologies 114 may be available for performing one or more operations of the first plurality of operations. For example, a first technology of the first plurality of technologies 114 may be available for performing or facilitating project management (e.g., agile project management) for the product development of the software product. In other words, the first technology of the first plurality of technologies 114 may be available for implementing the define stage 216a for the product development of the software product. In another example, a second technology of the first plurality of technologies 114 may be available for implementing multiple stages (e.g., performing multiple operations) in a data pipeline associated with the software product. Each of the first plurality of operations may be associated with multiple technologies available for performing a corresponding operation. For example, a first operation (e.g., repository management) may be executed by a second plurality of technologies included in the first plurality of technologies 114. In other words, the second plurality of technologies that are available for executing (e.g., performing) the first operation are a subset of the first plurality of technologies 114. Similarly, a second operation (e.g., cloud deployment) may be associated with a third plurality of technologies included in the first plurality of technologies 114.

The UI rendered on the first user device 102a may be indicative of the first plurality of technologies 114 and the first plurality of operations available for facilitating the plurality of stages 216. In one embodiment, a first technology for performing an operation associated with the plurality of stages 216 may be selected by the user by way of the rendered UI. In other embodiment, one or more operations required for implementing one or more stages of the plurality of stages 216 may be selected by the user by way of the rendered UI. For the sake of brevity, it is assumed that a first set of operations of the first plurality of operations is selected by the user. In a non-limiting example, the first set of operations includes one or more operations associated with a single workflow (e.g., data ingestion, data visualization, definition of a sprint for agile product development, or the like). The workflow may include various operations or sub-operations that are to be executed for completion of an execution of the first set of operations. The user action designer 202 may determine, based on the selection of the first set of operations and the first plurality of technologies 114, a second plurality of technologies available for executing the first set of operations. The second plurality of technologies is a subset of the first plurality of technologies. In other words, the first plurality of technologies include the second plurality of technologies. In an exemplary scenario, if the first set of operations corresponds to data ingestion (e.g., a single workflow), the second plurality of technologies may include technologies, of the first plurality of technologies, that are available for performing the first set of operations. In some embodiment, the second plurality of technologies may include various technologies, each of which is available for executing one or more operations (or sub-operations) included in a workflow for data ingestion. For example, the second plurality of technologies may include technologies for execution of a data extraction operation, a data transformation operation, and a data loading operation that may be present in the workflow for data ingestion.

The determination of the second plurality of technologies may be based on a look-up table (e.g., a first look-up table; shown in FIG. 5A) stored in the user action designer 202 or in a memory associated therewith. The first look-up table may be indicative of a mapping between the first plurality of operations and the first plurality of technologies 114. In other words, the first look-up table may be indicative of operations that may be performed by each technology of the first plurality of technologies 114. Similarly, the first look-up table may be indicative of technologies, of the first plurality of technologies 114, available for performing each of the first plurality of operations.

Figure 5A:
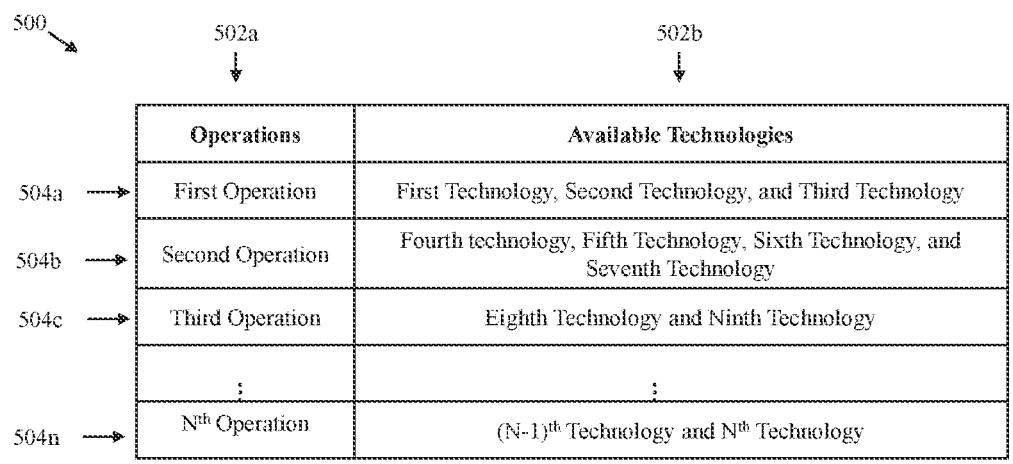
FIG. 5A is a table that illustrates a first look-up table, in accordance with an exemplary embodiment of the present disclosure.

FIG. 5A is a table 500 that illustrates the first look-up table, in accordance with an exemplary embodiment of the present disclosure. Hereinafter, the first look-up table is designated and referred to as "the first look-up table 500". The first look-up table 500 includes first and second columns 502a and 502b and first through $n^{th}$ rows 504a-504n. The first column 502a is indicative of the first plurality of operations. The second column 502b is indicative of a set of technologies, of the first plurality of technologies 114, available for executing a corresponding operation. Examples of the first plurality of operations have been described in foregoing descriptions of FIGS. 1 and 4.

The first row 502a indicates that first through third technologies 114a-114c are available for executing the first operation of the first plurality of operations. The second row 502b indicates that fourth through seventh technologies 114d-114g are available for executing a second operation of the first plurality of operations. The third row 502c indicates that an eighth technology 114h and a ninth technology 114i are available for executing a third operation of the first plurality of operations. The $n^{th}$ row 504n indicates that an $n^{th}$ technology 114n and $(n-1)^{th}$ technology, of the first plurality of technologies 114, are available for executing a $n^{th}$ operation of the first plurality of operations.

It will be apparent to those of skill in the art that the first look-up table 500 shown in FIG. 5A is merely exemplary and does not limit the scope of the disclosure. In a non-limiting example, it is assumed that technologies available for execution of an operation (e.g., the first operation) of the plurality of operations are different from technologies available for execution of another operation (e.g., the second operation) of the first plurality of operations. However, in an actual implementation, the technologies available for execution of various operations, of the first plurality of operations, may not be mutually exclusive. In other words, a single technology (e.g., the first technology 114a) of the first plurality of technologies may be available to execute multiple operations of the of the first plurality of operations without deviating from the scope of the disclosure.

Referring back to FIG. 2, based on the determination of the second plurality of technologies, the user action designer 202 may present the second plurality of technologies on the UI rendered on the first user device 102a. One or more technologies of the second plurality of technologies may be selected by the user for the execution of the first set of operations. In a non-limiting example, it is assumed that a first technology of the second plurality of technologies is selected by the user for the execution of the first set of operations.

The user action designer 202 records (e.g., captures) a first plurality of user actions performed by the user on the UI. The first plurality of user actions include various user actions associated with the plurality of stages 216 (e.g., one of the plurality of stages 216) and performed by the user on the UI rendered on the first user device 102a. The user action designer 202 may generate, based on the recorded first plurality of user actions, metadata associated with the first plurality of user actions. The generated metadata may include, but is not limited to, the selection of the first set of operations, the selection of the first technology 114a of the second plurality of technologies, a set of execution parameters for the execution of the first set of operations, or the like. The set of execution parameters may refer to one or more parameters/parameter values provided (e.g., entered) by the user (e.g., the plurality of users) for the execution of the first set of operations. Examples of execution parameters are provided in later figures. The first plurality of user actions may include the selection of the first set of operations and the first technology 114a. Further, the first plurality of user actions may include any other action performed by the user for the execution of the first set of operations. For example, the first plurality of user actions may include entry of time schedule (e.g., a start time and/or stop time) for the execution of the first set of operations. The first plurality of user actions may further include (e.g., may be indicative of) one or more parameters (or parameter values) for the execution of the first set of operations. For example, if the first set of operations corresponds to data ingestion, the first plurality of user actions may include one or more user actions associated with a definition of data source from which data is to be extracted, one or more user actions associated with data transformation to be performed the extracted data, or the like. Similarly, if the first set of operations corresponds to repository management or code commits, the first plurality of user actions may include one or more user actions associated with an entry of an identifier of a repository to which code is to be committed.

For example, the user may select a data source (e.g., a comma separated values or CSV file) and a data ingestion technology (e.g., DataBricks®, Hadoop®, or the like) for developing or implementing a data pipeline for the software product. In such a scenario, the generated metadata may be indicative of the selection of the data source (e.g., CSV file) and the data ingestion technology (e.g., DataBricks®, Hadoop®, or the like) for the development of the data pipeline for the software product by the user (e.g., the plurality of users). In another example, the user may select a deployment mode (e.g., Docker®, Kubernetes®, OpenShift®, or Terraform®) and a cloud deployment technology (e.g., Microsoft Azure®, Amazon AWS®, or Google Cloud Platform®) for deploying the software product. In such a scenario, the generated metadata may be indicative of the selection of the cloud deployment service and the deployment mode (e.g., Docker®, Kubernetes®, or Terraform®) selected by the user for the deployment of the software product.

The user action designer 202 stores, in the user action catalog 203, the metadata associated with the first plurality of user actions. The user action catalog 203 provides the metadata as input to the user action script compiler 204.

The user action script compiler 204 may generate, based on the metadata, a first set of user action scripts. The generated first set of user action scripts may include data, application program interfaces (APIs), code, database scripts, configuration files, or the like that correspond to the metadata. In one example, the first set of user action scripts may be indicative of defined ideas, features, and/or business requirements for documentation of the define stage 216a of the product development of the software product. In another example, the first set of user action scripts may be indicative of one or more UI design mock-ups for designing different facets of the software product. In another example, the first set of user action scripts may be indicative of the selection of a data source (e.g., a CSV file) and a data ingestion technology (e.g., Databricks®) for an implementation of the data pipeline. The first set of user action scripts may correspond to a format or a programming language (e.g., a proprietary language, an open-source language, or the like) natively supported by the service application 112.

For the sake of brevity, it is assumed that the first set of user action scripts includes a single user action script (e.g., a first user action script). However, in another embodiment the set of user action scripts may include multiple user action scripts. The first user action script is indicative of the selection of the first technology 114a and the selection of the first set of operations to be executed by the first technology 114a.

The first user action script may include multiple sections (e.g., a plurality of sections). A first section of the first user action script may correspond to the selected first technology 114a and may be indicative of the selection of the first technology 114a and the first set of operations to be executed by the first technology 114a. The first section of the first user action script may further be indicative of the execution parameters for the execution of the first set of operations.

The plurality of gentech script generators 208 include the first through $n^{th}$ gentech script generators 208a-208n. Each gentech script generator, of the plurality of gentech script generators 208, is configured to generate, scripts that are in a technology-agnostic format. For the sake of brevity, scripts that are in a technology-agnostic format are interchangeably referred to as "gentech scripts" throughout the disclosure. Gentech scripts may be generated by the plurality of gentech script generators 208 based on user action scripts (e.g., the first set of user action scripts, the first user action script, or the like) or on sections of user action scripts (e.g., the first section of the first user action script). Each gentech script generator, of the plurality of gentech script generators 208, may be associated with an operation of the first plurality of operations. In other words, each gentech script generator, of the plurality of gentech script generators 208, is configured to generate gentech scripts for technology-specific interpreters associated with technologies (e.g., the second plurality of technologies) available for execution of a corresponding set of operations (e.g., data ingestion). For example, the first gentech script generator 208a may be associated with data ingestion (e.g., the first set of operation) and may be configured to generate gentech scripts for a plurality of technology-specific interpreters associated with the second plurality of technologies. The gentech scripts generated by the first gentech script generator 208a may be technology-agnostic (e.g., in a technology-agnostic format) with respect to the plurality of technology-specific interpreters associated with the second plurality of technologies. Therefore, each gentech script generator, of the plurality of gentech script generators 208, is configured to cater to a class of technologies (e.g., the second plurality of technologies) that are available to execute a similar or same set of operations (e.g., the first set of operations). In a non-limiting example, it is assumed that a single gentech script generator caters to all technologies (e.g., technology platforms) that are included within a corresponding class of technologies. However, in another embodiment, there may be multiple gentech script generators, each configured to cater to one or more sub-classes of technologies within the class of technologies.

The plurality of technology-specific interpreters 210 include first through $n^{th}$ technology-specific interpreters 210a-210n for the first plurality of technologies 114. Each of the first through $n^{th}$ technology-specific interpreters 210a-210n may be configured to generate technology-specific scripts for a corresponding technology of the first plurality of technologies 114. Each of the first through $n^{th}$ technology-specific interpreters 210a-210n may be configured to generate technology-specific scripts based on a set of gentech scripts received from a gentech script generator of the plurality of gentech script generators 208. In other words, each of the first through $n^{th}$ technology-specific interpreters 210a-210n may be configured to convert gentech scripts received from a corresponding gentech script generator to a technology-specific script that is compatible with a corresponding technology. For example, the first technology-specific interpreter 210a that is associated with the first technology 114a may be configured to convert gentech scripts received from the first gentech script generator 208a into corresponding technology-specific scripts. Similarly, the second technology-specific interpreter 210b that is associated with the second technology 114b may be configured to convert gentech scripts received from the first gentech script generator 208a into corresponding technology-specific scripts.

It is assumed that each of the first plurality of technologies 114 is associated with a technology-specific interpreter of the plurality of technology-specific interpreters 210. In other words, each technology communicates with a corresponding technology-specific interpreter of the plurality of technology-specific interpreters 210. However, in another embodiment, the architecture 200 of the service application 112 may include a single technology-specific interpreter, in lieu of the plurality of technology-specific interpreters 210. In such a scenario, the single technology-specific interpreter (not shown) may communicate with the first plurality of technologies 114.

The user action script compiler 204 may communicate the first user action script (e.g., the first set of user action scripts) to the orchestrator 206. The orchestrator 206 is configured to manage the plurality of gentech script generators 208 and the plurality of technology-specific interpreters 210. The orchestrator 206, based on a received user action script (e.g., the first set of user action scripts), communicates sections of the received user action script to respective gentech script generators of the plurality of gentech script generators 208. In other words, the orchestrator 206 determines which of the plurality of gentech script generators 208, receives which sections of the received user action script. The orchestrator 206 is further configured to receive gentech scripts from the plurality of gentech script generators 208. Based on the user action script, the orchestrator 206 may communicate the received gentech scripts to respective technology-specific interpreters of the plurality of technology-specific interpreters 210. In some embodiments, the orchestrator 206 may further facilitate communication between the technology-specific interpreters of the plurality of technology-specific interpreters 210 when there is a dependency between technologies, of the plurality of technologies 114, for executing the first set of operations.

Figure 5B:
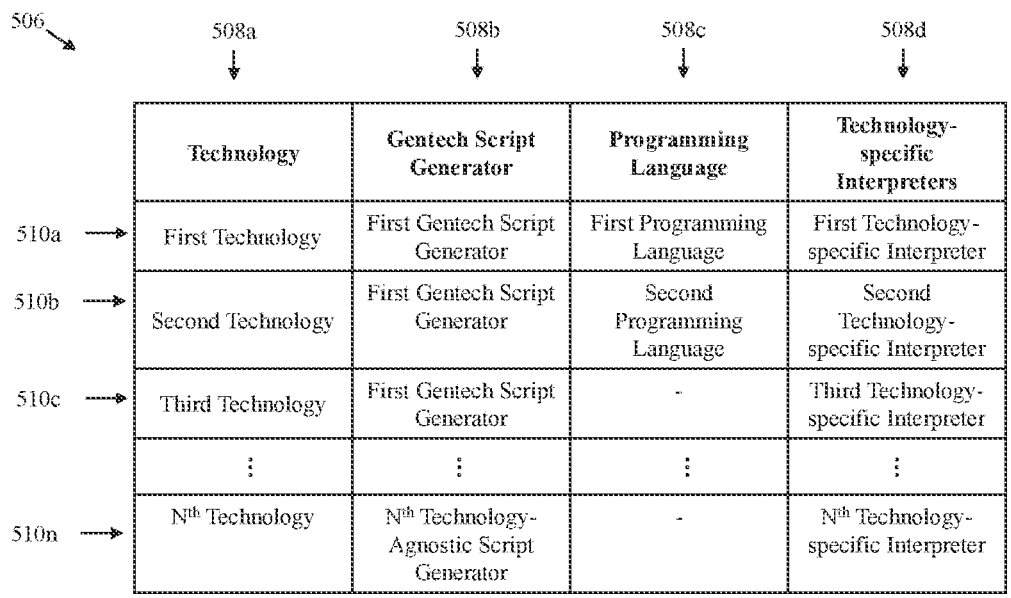
FIG. 5B is a table that illustrates a second look-up table, in accordance with an exemplary embodiment of the present disclosure.

The orchestrator 206 may store, therein, or in a memory associated therewith a second look-up table (shown in FIG. 5B). The second look-up table may be indicative of a mapping between the first plurality of technologies, the plurality of gentech script generators 208, and the plurality of technology-specific interpreters 210.

FIG. 5B is a table 506 that illustrates the second look-up table, in accordance with an exemplary embodiment of the present disclosure. Hereinafter, the second look-up table is designated and referred to as "the second look-up table 506". The second look-up table 506 includes first through fourth columns 508a-508d and first through $n^{th}$ rows 510a-510n. The first column 508a is indicative of the first plurality of technologies 114. The second column 508b is indicative of a gentech script generator, of the plurality of gentech script generators 208, that is associated with a corresponding technology. The third column 508c is indicative of a programming language associated with the corresponding technologies. It is not necessary that each of the first plurality of technologies 114 or each of the plurality of gentech script generators 208 is associated with a programming language. The fourth column 508d is indicative of a technology-specific interpreter, of the plurality of technology-specific interpreters 210, that is associated with a corresponding technology.

The first row 510a indicates that the first gentech script generator 208a and the first technology-specific interpreter 210a are mapped to or associated with the first technology 114a. The row 510a further indicates that first technology 114a is associated with a first programming language (e.g., a high-level open programming language).

The second row 510b indicates that the first gentech script generator 208a and the second technology-specific interpreter 210b are mapped to or associated with the second technology 114b. The row 510b further indicates that second technology 114b is associated with a second programming language (e.g., a high-level open programming language).

The row 510c indicates that the first gentech script generator 208a and the third technology-specific interpreter 210c are mapped to or associated with the third technology 114c. The row 510b further indicates that third technology 114c is not associated with any programming language.

The third row 510n indicates that the $n^{th}$ gentech script generator 208n and the third technology-specific interpreter 210c are mapped to or associated with the $n^{th}$ technology 114n. The row 510n further indicates that $n^{th}$ technology 114n is not associated with an $n^{th}$ programming language.

It will be apparent to those of skill in the art that the second look-up table 506 shown in FIG. 5B is merely exemplary and does not limit the scope of the disclosure.

Referring back to FIG. 2, based on the first user action script and information stored in the second look-up table 506, the orchestrator 206 may identify the first gentech script generator 208a and communicate the first section of the first user action script to the first gentech script generator 208a. The first gentech script generator 208a may receive the first section of the first user action script and convert the first section of the first user action script to a first set of gentech scripts. The first set of gentech scripts is in a format (e.g., pseudocode, Javascript object notion/JSON, extended markup language/XML, yet another markup language/YAML, or the like) that is technology-agnostic with respect to the first through third technologies 114a-114c and corresponding first through third technology-specific interpreters 210a-210c. In one embodiment, the first set of gentech scripts may not conform to/correspond to any high-level open programming language. However, in another embodiment, the first set of gentech scripts may conform to a high-level open programming language that is associated with a corresponding technology that is to be run or executed for executing the first set of operations. In an embodiment, the first set of gentech scripts may correspond to a format or a language (e.g., Python, Scala, Java, or the like) that is compatible with or supported by the corresponding technology that is to be run or executed for executing the first set of operations. For example, if the first set of gentech scripts indicates that the data is to be extracted, transformed, and/or loaded using a selected data ingestion technology (e.g., Databricks, Hadoop, Snowflake, or the like), the first set of gentech scripts may be compatible with an open/high-level programming language that is associated with a corresponding data ingestion technology.

The orchestrator 206 may store the first set of gentech scripts in the memory of the application server 106. The orchestrator 206 may store a mapping between the first set of gentech scripts and the first plurality of user actions in the memory of the application server 106. The orchestrator 206 may also store the first user action script associated with the first set of gentech scripts in the memory of the application server 106. The first gentech script generator 208a may communicate the first set of gentech scripts to the orchestrator 206. Based on the first user action script and the information stored in the second look-up table 506, the orchestrator 206 may communicate the first set of gentech scripts to the first technology-specific interpreter 210a. The first technology-specific interpreter 210a may generate a first set of technology-specific scripts, based on the first set of gentech scripts. The first set of technology-specific scripts is compatible with the first technology 114a. In other words, the first set of technology-specific scripts is specific to the first technology 114a. The first technology-specific interpreter 210a may communicate the first set of technology-specific scripts to the first technology server 104a that hosts the first technology 114a. The first technology server 104a may execute the first set of technology-specific scripts received from the first technology-specific interpreter 210a, thereby, executing the first set of operations.

In another embodiment, the orchestrator 206 may communicate the first set of gentech scripts to the user action designer 202. The orchestrator 206 may communicate the first set of gentech scripts to the user action designer 202 if one or more scripts of the first set of gentech scripts correspond to a programming language (e.g., a high-level open program language such as Python, Scala, Spark, Java, or the like). Consequently, the user action designer 202 may display the first set of gentech scripts on the UI for modification by the user. One or more scripts of the first set of gentech scripts may be modified by the user. In other words, the first set of gentech scripts may be partially or completely modified by the user. The modified first set of gentech scripts may be communicated by the user action designer 202 to the orchestrator 206. The orchestrator 206 may communicate the modified first set of gentech scripts to the first technology-specific interpreter 210a. In such a scenario, the conversion, by the first technology-specific interpreter 210a, of the first set of gentech scripts includes conversion of the one or more modified scripts of the first set of gentech scripts. A remaining process for the execution of the first set of operations remains the same. The orchestrator 206 stores, in the memory of the application server 106, a mapping between the first plurality of actions and the modified first set of gentech scripts.

FIG. 3 is explained in conjunction in FIG. 2. For the sake of brevity, it is assumed that the execution, by the first technology 114a, of the first set of operations is in progress or complete.

Referring now to FIG. 3, based on the execution (e.g., the initiation of the execution) of the first set of operations by the first technology 114a, the first technology server 104a may communicate first progress data to the first technology-specific interpreter 210a. The first progress data may include, but is not limited to, data indicative of a level of completion of execution (e.g., progress of execution) of the first set of operations and/or one or more outputs of the execution of the first set of operations. The first progress data may further include a set of logs generated by the first technology 114a during the execution of the first set of operations, a set of alerts generated by the first technology 114a during the execution of the first set of operations, and/or a set of errors generated by the first technology 114a during the execution of the first set of operations. The first progress data may be received, by the first technology-specific interpreter 210a, in a format (e.g., technology-specific scripts) that is specific to the first technology 114a.

The first through $n^{th}$ technology-specific interpreters 210a-210n may be further configured to generate gentech scripts based on progress data received from corresponding technologies or technology servers that host the corresponding technologies. In other words, the first through $n^{th}$ technology-specific interpreters 210a-210n are configured to convert the progress data into the gentech scripts. In the current embodiment, the first technology-specific interpreter 210a may generate a second set of gentech scripts based on the first progress data from the first technology server 104a (e.g., the first technology 114a). Consequently, the first technology-specific interpreter 210a may communicate the second set of gentech scripts to the orchestrator 206. Based on the reception of the second set of gentech scripts from the first technology-specific interpreter 210a and the information stored in the second look-up table 506, the orchestrator 206 may determine that the first gentech script generator 208a is mapped to the first technology-specific interpreter 210a. In other words, the orchestrator 206 identifies that the first gentech script generator 208a is mapped to the first technology-specific interpreter 210a.

Based on the determination or identification that the first gentech script generator 208a is mapped to the first technology-specific interpreter 210a, the orchestrator 206 may communicate the second set of gentech scripts to the first gentech script generator 208a.

Each of the plurality of gentech script generators 208 may be further configured to generate user action scripts based on gentech scripts received from the plurality of technology-specific interpreters 210. In other words, each of the plurality of gentech script generators 208 may be further configured to convert the received gentech scripts into user action scripts. Based on the received second set of gentech scripts, the first gentech script generator 208a may generate a second set of user action scripts. The second set of user action scripts is indicative of the first progress data received from the first technology 114a. The first gentech script generator 208a may communicate the second user action script to the orchestrator 206. The orchestrator 206 may communicate the second user action script to the response converter 212.

The response converter 212 receives the second user action script from the orchestrator 206, and may generate, based on the second user action script, a first set of user action responses. The first set of user action responses may include metadata indicative of the first progress data. The user action designer 202 may receive the first set of user action response. Based on the first set of user action responses, the user action designer 202 may generate a first set of visual indicators and present the first set of visual indicators on the UI rendered on the first user device 102a. The first set of visual indicators may include, but is not limited to, text, numbers, or diagrams (e.g., diagrammatic elements) indicative of the first progress data. For example, the first set of visual indicators may include the generated set of documents or a link to the generated set of documents, alert messages (e.g., text) or logs (e.g., text) indicative of the progress of the execution of the first set of operations. Similarly, the first set of visual indicators may further include the level of completion (e.g., numbers) of the execution of the first set of operations. Similarly, the first set of visual indicators may further include diagrammatic representations (e.g., graphs, charts, scatter plots, tables, or the like) indicative of the first progress data.

Referring back to FIG. 4, the activity tracker 214 includes an activity watcher 404 that monitors the various stages (e.g., the plurality of stages 216) of the product development of the software product. The activity watcher 404 may be configured to track and monitor user input and actions performed using the service application 112 at each stage (e.g., the define stage 216a, the design stage 216b, the development stage 216c, and deployment stage 216d) of the plurality of stages 216. In one embodiment, the activity watcher 404 may be triggered to monitor usage of the service application 112 whenever a user (e.g., the plurality of users) accesses the service application 112. In another embodiment, the activity watcher 404 may continuously monitor the service application 112 for user input or user action. Further, the activity watcher 404 may also monitor operations (e.g., code commit, build, testing, modification, deletion, or the like) associated with the plurality of stages 216 of the product development of the software product. The activity watcher 404 may further observe performance and health of infrastructure associated with the software product. Further, the activity watcher 404 may also monitor the software product to detect one or more cyberthreats that may affect the software product or associated infrastructure.

Data generated (e.g., by way observation or monitoring) by the activity watcher 404 may be communicated to an activity filter 406. Based on the data received from the activity watcher 404 and pre-defined logic, the activity filter 406 may classify each activity monitored by the activity watcher 404 as one of a value-added activity or non-value added activity. Data indicative of classified activities may be provided to the value stream engine 408 as input by the activity filter 406. Release dependency graphs for each release of the software product may be provided to the value stream engine 408. Release dependency graphs indicate dependency of a release on one or more other releases associated with the software product. In one embodiment, an activity associated with a productive usage of time or a productive output may be categorized by the value stream engine 408 as a value-added activity. An activity associated with a non-productive use of time or non-productive output may be categorized by the value stream engine 408 as a non-value added activity. Further, the value stream engine 408 may categorize the activities into a plurality of sub-categories (e.g., leakages, waiting time, wasted time, risk mitigation, or the like).

Further, the value stream engine 408 may be configured to generate a value stream map 410 for development of the software product. The value stream map 410 may be indicative of end-to-end (e.g., from ideation to deployment) process visibility for the development of the software product. For each stage (e.g., the define stage 216a, the design stage 216b, the development stage 216c, or the deployment stage 216d) of the plurality of stages 216, the value stream map 410 may be indicative of a lead time for completion of a corresponding stage. The value stream map 410 may be further indicative of time spent waiting (e.g., waiting for approvals) at each stage. Creation of the value stream map 410 may involve automated collection of data from various sources (e.g., the plurality of user devices 102, the application server 106, or the like) and creation of a unified data model for analysis of the data collected from the various sources. For each stage, the value stream map 410 may indicate key-performance indicators (e.g., bottlenecks, wasted time, wasteful activities, or the like). The value stream map 410 may enable definition of customized metrics. Consequently, the value stream map 410 may include values and/or trends for these customized metrics. The value stream map 410 may include data that corresponds to each stage of the plurality of stages 216 at a workstream level, release level (based on data corresponding to all workstreams in a single release), and/or a product level (based on data corresponding to all releases and corresponding workstreams).

The value stream map 410 may be further indicative of efficiency of the plurality of users at the plurality of stages 216 of the product development of the software product. In an embodiment, the value stream map 410 may enable each user, of the plurality of users, to view a corresponding productivity report and receive suggestions to improve his/her productivity. The value stream map 410 significantly eliminates requirement of manual logging of activities performed by the plurality of users during the product development of the software product.

The data generated (e.g., by way observation or monitoring) by the activity watcher 404 may be further communicated to an activity mapper 412. The activity mapper 412 may be configured to map each activity performed by a user (e.g., the plurality of users) on the service application 112. For example, whenever the user commits code to a repository (e.g., version control tool or technology for source code management), the activity mapper 412 may identify a status of DevOps pipeline of the software product, determining a relationship between the committed code and a workstream, release, or business requirement. Data (e.g., the determined relationship) may be provided as input to the relationship matrix generator 414.

The relationship matrix generator 414 may be configured to map each activity performed by the plurality of users with corresponding cause(s) as well as immediate and delayed effect(s) on the software product. Based on the mapping of the activities of the plurality of users with corresponding cause(s) as well as immediate and delayed effect(s), the relationship matrix generator 414 may generate a relationship matrix that represents causal and/or consequential relationship between activities, operations, and effects.

Further, the relationship matrix generator 414 may be configured to generate a traceability map 416 for the software product. The traceability map 416 provides a complete causal map that enables tracking of changes made at each stage and a consequence of each of the changes. The traceability map 416 may provide the plurality of users with a capability to trace each operation (e.g., creation, initiation, modification, deletion, or the like) that has been performed during the plurality of stages 216 associated with the product development of the software product. The traceability map 416 may be configured to perform a mapping among the product, releases or versions of the software product, workstreams associated with the software product, requirements, designs, artifacts, user feedback, code commits, pipelines, test cases, or the like. The traceability map 416 enables mapping of user stories (e.g., epics, stories, or features) with test cases. The traceability map 416 further maps integration and deployment pipeline for any code with a corresponding code commit. The traceability map 416 further provides a visual representation of one or more issues associated with the software product to one or more versions or changes in the software product that may have resulted in any issue. In a non-limiting example, the traceability map 416 may indicate that a change in CI/CD pipeline for the software product may have caused deployment infrastructure (e.g., a virtual machine) to crash frequently. Therefore, the traceability map 416 allows for a seamless detection and analysis of bugs, errors, and issues associated with the product in significantly less time.

The service application 112 further allows for orchestration at the plurality of stages 216 (e.g., the define stage 216a, the design stage 216b, the development stage 216c, and the deployment stage 216d). Orchestration at the various stages of the SDLC of the software product allows for automated configuration, integration, deployment, and management of the software product. Such orchestration of the software product is facilitated by a product orchestration designer 402 of the service application 112.

The product orchestration designer 402 may be configured to execute one or more instructions for automated configuration, integration, deployment, and management of the software product. The product orchestration designer 402 facilitates one or more interfaces for automating and orchestrating various stages and sub-stages of the SDLC of the software product. In an embodiment, the product orchestration designer 402 provides one or more tools for defining and configuring the various stages of the SDLC of the software product.

In an embodiment, the product orchestration designer 402 enables release orchestration of one or more software products or one or more features of a single software product (e.g., the software product). The product orchestration designer 402 enables coordination of all activities involved at various stages in the SDLC of the software product in a pipeline that facilitates various releases of the software product. The product orchestration designer 402 enables tracking of the development of the software product in regard to a timeline for release (e.g., release timeline) associated with the software product. Moreover, the product orchestration designer 402 ensures maintenance of a log of various commits, milestones, issues, or the like associated with the software product. In an embodiment, such logs may be used for generation of the value stream map 410 and/or the traceability map 416.

In an embodiment, the product orchestration designer 402 may facilitate release orchestration associated with a plurality of releases associated with the software product and/or other software products. The product orchestration designer 402 may further provide one or more tools for configuring the plurality of releases. The product orchestration designer 402 may provide a release orchestration view (e.g., a release train) associated with the plurality of releases. Further, the product orchestration designer 402 may provide a single pane view of a release calendar of the plurality of releases associated with the software product and/or other software products. The release calendar may include a timeline and corresponding progress or milestone for each release and corresponding workstreams. The single pane view allows the plurality of users to monitor, observe, and co-ordinate progress associated with the plurality of releases using only the service application 112. This enables the plurality of users to maintain a suitable progress across all the releases associated with the software product. Further, the product orchestration designer 402 may provide a release dependency view (e.g., release dependency map) of the plurality of releases associated with the software product. The release dependency view of the plurality of releases provides a representation of dependencies among the plurality of releases within the software product or within different software products in a product portfolio of the organization. The release dependency view may also enable addition or definition of a type of dependency and/or an extent of dependency between any two releases of the plurality of releases. In a non-limiting example, a type of dependency between first and second releases, of the plurality of releases of the software product, may be one of low, moderate, or high. A type of dependency of the second release on the first release may affect (e.g., delay) its timeline. For example, a delay in the first release may delay the second release, since the second release is dependent on the first release.

As shown in FIG. 4, the product orchestration designer 402 includes a product portfolio manager 418, a release train tracker 420, a release dependency tracker 422, and a maturity assessment engine 424. The product portfolio manager 418 facilitates automated configuration, coordination, and management of a product portfolio of the organization. The product portfolio of the organization may refer to a collection of one or more products and/or services provided by the organization to target users/clients. The product portfolio may include each software product and/or service that the organisation has launched during a tenure of its operation. The product portfolio manager 418 may enable management of individual products, product lines, as well as portfolios of products. Such management of the product portfolio may help the organization attain its overall business objectives and plan future operations (regarding development, launch, halt, update, or the like of software products) associated with the organization. In an embodiment, the product portfolio manager 418 may be configured to organize the products of the organization based on a domain associated with each product. For example, one or more products pertaining to a video game application may be included in a category of products associated with gaming domain. In another embodiment, the product portfolio manager 418 may be configured to organize the software products of the organization based on target users/market associated with the software products. For example, one or more products pertaining to stock market applications may be included in a category associated with corresponding target users "business men", "stock brokers", "stock market experts", or the like. Beneficially, the product portfolio manager 418 allows for a single pane view of each product and/or services provided by the organization. Therefore, the product portfolio manager 418 provides an estimate of organization's involvement in different domains and with different types of target users/clients.

The release train tracker 420 may be configured to monitor and maintain a track of one or more releases associated with one or more software products, features associated with each software product, or the like. The release train tracker 420 may maintain a release timeline of the one or more releases that may have to be performed by the organisation during a first time-interval (e.g., one month, two months, six months, a year, or the like). The release train tracker 420 may provide the release timeline based on product timeline of the one or more products or one or more features associated with the one or more products. Further, the release train tracker 420 may provide a summary of releases that the organization may have planned for a threshold time-interval.

The release dependency tracker 422 may be configured to track dependency among a plurality of releases associated with the one or more software products or one or more features of each of the one or more software products. In a non-limiting example, release dependency among two or more releases may be one of low, medium, or high. In an embodiment, the software product may have a first release and a second release. In an example, the first release and the second release may be associated with different features of the software product and may be independent of each other. In such an example, release dependency between the first release and the second release may be low. In another example, the first and second releases may be associated with two interdependent features of the software product. In such an example, the release dependency between the first and second releases may be high. In another example, the first release may be associated with a feature of the software product and the second release may be associated with a maintenance/fix/patch associated with the feature of the first release. In such an example, the release dependency between the first and second releases may be medium. Beneficially, the release dependency tracker 422 allows the plurality of users to maintain an optimal pace of progress while working towards the plurality of releases associated with the one or more products or one or more features of the one or more software products.

The maturity assessment engine 424 may be configured to assess a current state of a development of the software product against a set of benchmarks to determine a readiness of a feature or the software product for productization (to be used in real-time environment). The maturity assessment model may assess each feature or product against the set of benchmarks established by a maturity model (e.g., a capability maturity model or CMM). The maturity assessment engine 424 may enable for planning, engineering, and management of the software product. Further, the maturity assessment engine 424 may enable the plurality of users to assess, further develop, and improve the software product.

Figure 6A:
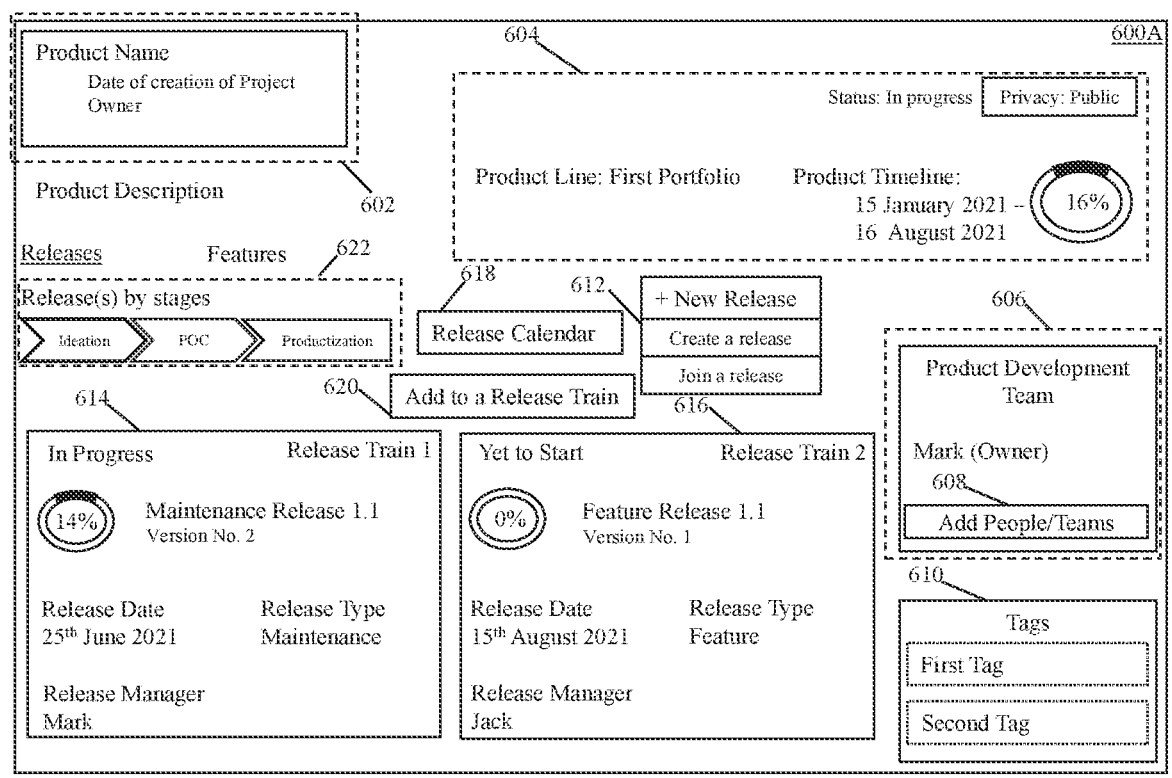
FIGS. 6A-6C, collectively, illustrate UI screens rendered by the service application on a first user device of FIG. 1 for release orchestration, in accordance with an exemplary embodiment of the present disclosure.
Figure 6B:
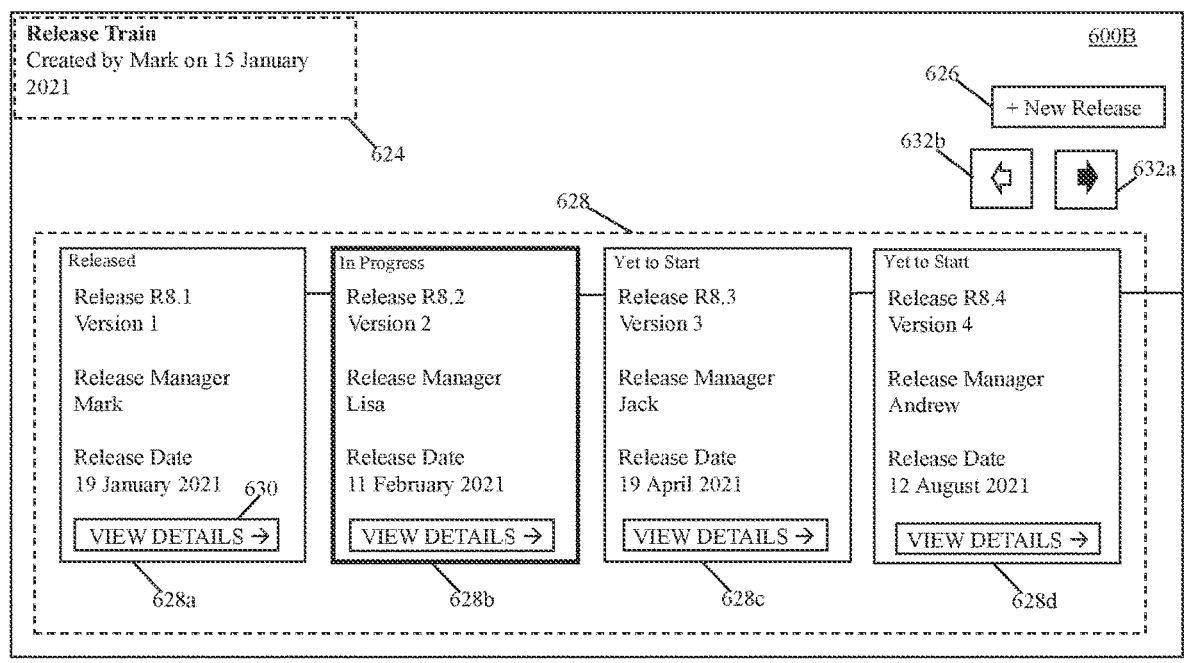
Figure 6C:
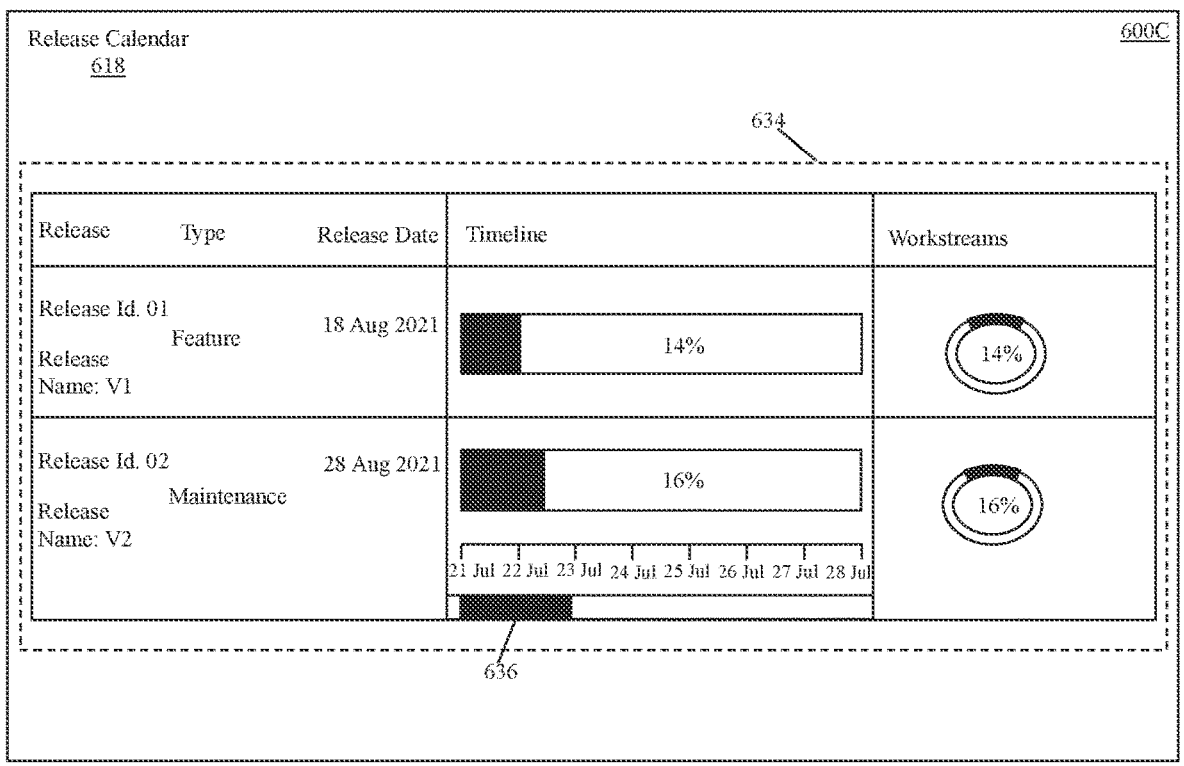

FIGS. 6A-6C, collectively, illustrate UI screens 600A-600C rendered by the service application 112 on the first user device 102a for release orchestration, in accordance with an exemplary embodiment of the present disclosure.

Referring now to FIG. 6A, the UI screen 600A corresponds to a release management or release orchestration function/functionality offered by the service application 112. The UI screen 600A may be rendered, by the user action designer 202, on a user device (e.g., the plurality of user devices 102) that accesses the service application 112. As shown by a first section 602, the UI screen 600A is shown to present a name of the software product (e.g., product), a date of creation of the software product (e.g., date of creation of a project for the development of software product), and a creator (e.g., an owner or a manager of the software product). The UI screen 600A is further shown to present, in a second section 604, a current status of the software product (e.g., the product), a set privacy level associated with the software product (e.g., the product), a product portfolio (e.g., Innovation Portfolio) associated with the software product, a product timeline associated with the software product, and a current level of completion associated with the software product. In a non-limiting example, it is assumed that the current status of the software product may correspond to one of three statuses (e.g., "not started", "in progress", and "completed"). The set privacy level may be indicative of a level of access that is available to users (e.g., the plurality of users) with respect to the project. In one embodiment, the set privacy level may correspond to one of two privacy levels (e.g., "private" or "public"). In a non-limiting example, when the privacy level is set to "public", the UI screen 600A may be accessible, for viewing, to various users (e.g., the plurality of users) or teams associated with the development of the software product (e.g., the product).

In another non-limiting example, when the privacy level is set to "private", the UI screen 600A may be accessible, for viewing and/or editing, to only the creator or the owner of the software product (e.g., the product). Further, the product portfolio associated with the software product may be indicative of a business vertical (e.g., of the organization) or a domain associated with the software product. In a non-limiting example, the product portfolio associated with the software product is "First Portfolio". The product timeline associated with the software product may be indicative of various milestone dates associated with the software product (e.g., the product). Examples of milestone dates include, but are not limited to, a date of creation (e.g., 15 Jan. 2021) of the project, a target date (e.g., 16 Aug. 2021) for deployment of the software product in a production environment, or the like. The current level of completion associated with the software product may represent level of progress (e.g., "16%") of the product or an amount of work completed in regard to the product. In a non-limiting example, the current level of completion associated with the software product may be quantified based on various factors such as, but not limited to, a total number of milestones set for the product, a number of milestones reached, an importance or a weight associated with each milestone, or the like.

The UI screen 600A is further shown to include or indicate one or more users, individuals, and/or teams associated with the product (e.g., the development or management of the software product). The UI screen 600A may further indicate a role, capacity, or designation of each user or individual associated with the project. In a non-limiting example, a third section 606 indicates that an individual (e.g., Mark) is the owner of the project (e.g., the software product). The UI screen 600A is further shown to include a first user-selectable option 608 that enables addition of individuals, users, or teams for involvement in the project. The UI screen 600A may further include one or more options that enable configuration of a level of access to the project available to each user or individual involved in the project. The UI screen 600A is further shown to include, in a fourth section 610, one or more tags (e.g., first and second tags) associated with the software product. The one or more tags may refer to keywords associated with one or more attributes or features (e.g., a technology, requirements, or the like) of the software product.

The UI screen 600A is further shown to include a second user-selectable option 612 (e.g., "+New Release") that enables creation of a new release (e.g., release plan) for the software product. As shown, the new release may be created separately by the users (e.g., the plurality of users) or the new release may be created by joining an existing release (e.g., release train) associated with the software product. Each release may be associated with a different purpose or goal (e.g., introduction of a new feature for the software product, bug fixes for a previously released version of the software product, removal of one or more features from a previously released version of the software product, or the like). The second user-selectable option 612 enables creation of one or more new (e.g., future) release plans for the software product. Each release plan (e.g., new release plan) may have various attributes such as a release identifier (i.e., release ID) that uniquely identifies a corresponding release or release plan, a release name associated with the corresponding release or release plan, a timeline for the corresponding release, a description of the corresponding release, a team involved with corresponding release, or the like. The various attributes may further include a level of impact (e.g., low, medium, or high) of the corresponding release, a level of risk (e.g., low, medium, or high) associated with the corresponding release, a type (e.g., maintenance, feature addition, bug fix, security patch, or the like) of the corresponding release, or the like. For each release, the level of risk, the level of impact, the release ID, the timeline, the type of release, and/or the description of the release may be set or defined by one or more users (e.g., the plurality of users, an owner of the release, or the like) associated with the corresponding release.

In a non-limiting example, the UI screen 600A is shown to indicate or include the plurality of releases associated with the software product. In an example, the UI screen 600A indicates a first release 614 associated with the software product. In a non-limiting example, the first release 614 may be associated with a release type "Maintenance Release", a version No. "2", a release name "Maintenance Release 1.1", and a release train "Release Train 1". "Mark" is shown to be a release manager of the first release 614. As shown, the UI screen 600A may also present a release type "Maintenance" of the first release 614. The UI screen 600A further indicates that the first release 614 is "14%" complete. Additionally, the UI screen 600A is shown to include or indicate a due date or release date or target completion date (e.g., "25 Jun. 2021") for the first release 614. In an embodiment, the UI screen 600A may present that the first release 614 may have a "Low" level of risk and a "high" level of impact associated therewith.

The UI screen 600A is further shown to include or indicate a second release 616 associated with the software product. In a non-limiting example, the second release 614 may be associated with a release type "Feature Release", a version No. "1", a release name "Feature Release 1.1", and a release train "Release Train 2". "Jack" is shown to be a release manager of the second release 616. The UI screen 600A further indicates that the second release 616 is "0%" complete, implying that the second release is not yet initiated. The second release 616 may have a due date (e.g., release date, completion date) of "15 Aug. 2021". The UI screen 600A is shown to include a third user-selectable option 618 that enables users (e.g., the plurality of users) to view a release calendar for the plurality of releases (e.g., the first and second releases 614 and 616) associated with the software product. The UI screen 600A is further shown to include a fourth user-selectable option 620 that enables the users to add the releases to a release train. In an embodiment, the second release 616 may have a "High" level of risk and a "low" level of impact associated therewith.

Further, in a fifth section 622 of the UI screen 600A, shown are user-selectable options associated with a plurality of stages (e.g., Ideation, POC, Productization) of the product. In a non-limiting example, the UI screen 600A may present three stages (e.g., Ideation, POC, Productization) associated with the product. A first stage (e.g., Ideation), upon selection by the plurality of users, is shown to have two releases for example, the first release 614 and the second release 616. In another non-limiting example, upon selection of a second stage (e.g., POC), the UI screen 600A may present one or more releases associated with the selected second stage.

Referring now to FIG. 6B, the UI screen 600B corresponds to a release train view rendered by the user action designer 202. In other words, the UI screen 600B includes a release train for plurality of releases associated with the software product. As shown, a first section 624 of the UI screen 600B represents a title (e.g., "Release Train") of the release train, a creator of the release train, and a date of creation of the release train. In a non-limiting example, the title of the release train may be "Release Train", the creator of the release train may be "Mark", and the date of creation of the release train may be "15 Jan. 2021". Further, the UI screen 600B represents a fifth user-selectable option 626 to create a new release to be added to the release train presented by the UI screen 600B. Further, within a second section 628 of the UI screen 600B, the release train for the plurality of releases associated with the software product is presented. As shown, the release train may include a chronological sequence of releases, such that each release of the plurality of releases is represented by way of a corresponding sub-section of the release train. In a non-limiting example, a first sub-section 628a of the release train may be associated with a first release of the software product. The first sub-section 628a may present a status "Released", a title "Release R8.1", a version "Version 1", a release manager "Mark", a release date "19 Jan. 2021", of the first release. Further, the sub-section 628a presents a user-selectable option 630 that when selected presets a detailed view (including workstreams, users) associated with the first release. Similarly, the second section 628 presents a second sub-section 628b, a third sub-section 628c, and a fourth sub-section 628d of the release train. Each sub-section 628b-628d may be functionally similar to the first sub-section 628a. Further, the UI screen 600B presents a forward user-selectable option 632a and a backward user-selectable option 632b that may be used by the plurality of users to scroll through the release train.

Referring now to FIG. 6C, the UI screen 600C corresponds to a release calendar viewing function that is offered by the service application 112. In other words, the UI screen 600C includes the release calendar 634 for the plurality of releases associated with the software product. The UI screen 600C includes a third section 634 that presents the release calendar 634. The third section 634 is indicative of the various attributes of each release or release plan associated with the software product. For each release (e.g., the first and second release 614 and 616) associated with the software product, the release calendar 634 may indicate a type of a corresponding release, a due date or release date of a corresponding release, a timeline of a corresponding release, a level of progress of a corresponding release, or one or more workstreams associated with each release. For example, the release calendar 634 may indicate, corresponding to a first release associated with the software product, a release ID "01", a release name "V1", a release type "Feature", and a release date (or due date) "18 Aug. 2021". Similarly, the release calendar 634 may indicate, corresponding to a second release associated with the software product, a release ID "02", a release name "V2", a release type "Maintenance", and a release date (or due date) "28 Aug. 2021". The release calendar 634 may further present, corresponding to the second release, the timeline indicating progression of work. In a non-limiting example, the timeline of the second release is shown with respect a time series.

The time series may range from a date of creation of the software product (e.g., 21 Jul. 2020) to the release date (e.g., 28 Aug. 2020) of the software product. The time series may be viewed by the plurality of users by scrolling a slide bar 636 corresponding to the time series. Further, the release calendar 634 may further present workstreams and corresponding progress bar (e.g., showing the progress of 16%) associated with the second release. Upon clicking or expanding the progress bar, the release orchestration view (e.g., the UI screen 600B) may present one or more workstreams (for defining, designing, developing, and deploying) associated with the first release. Similarly, the release calendar 634 presents similar details associated with the second release.

It will be apparent to a person of ordinary skill in the art that the UI screens 600A, 600B, and 600C illustrated in FIGS. 6A, 6B, and 6C are merely exemplary and are not intended to limit the scope of the disclosure. In other embodiments, the UI screens 600A, 600B, and 600C may include additional options (e.g., additional functions), additional information, different presentation or layout, without deviating from the scope of the disclosure.

Figure 7:
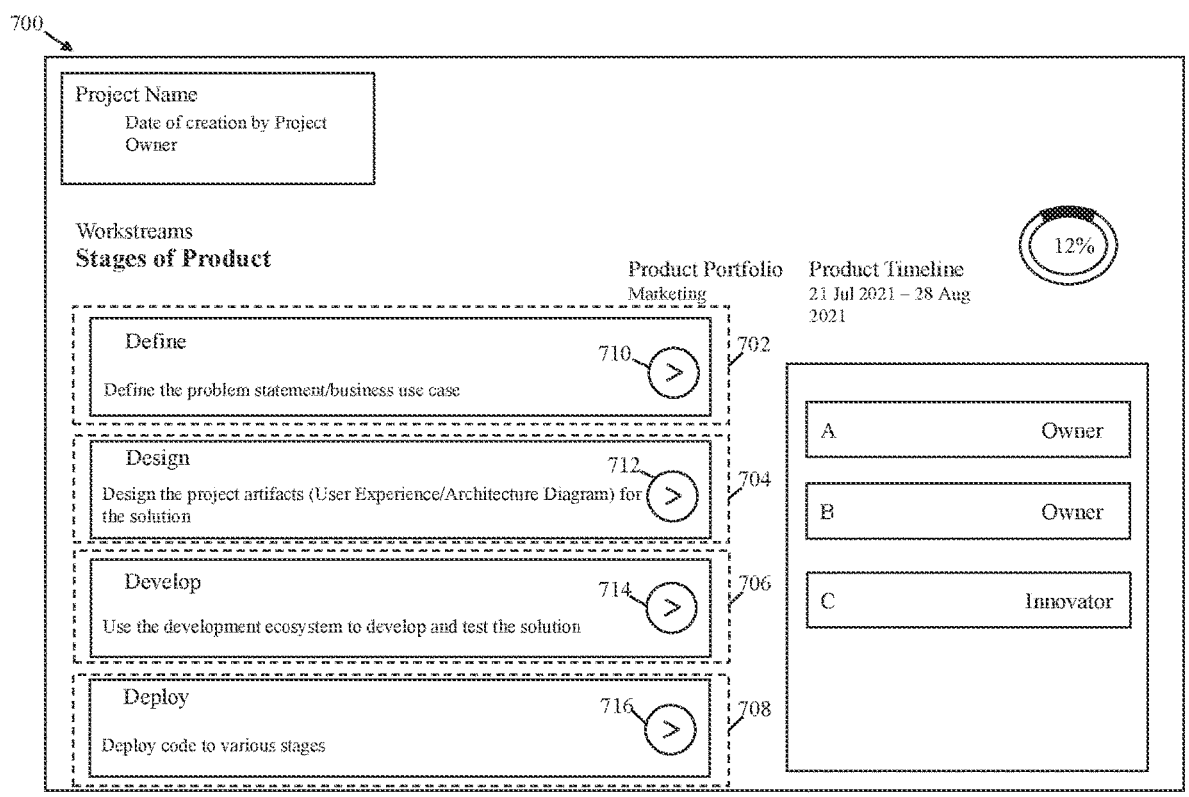
FIG. 7 illustrates a UI screen rendered by the service application on the first user device for implementation of a define stage, a design stage, a development stage, and a deployment stage, in accordance with an exemplary embodiment of the present disclosure.

FIG. 7 illustrates a UI screen 700 rendered by the service application 112 on the first user device 102a for implementation of the define stage 216a, the design stage 216b, the development stage 216c, and the deployment stage 216d, in accordance with an exemplary embodiment of the present disclosure.

The UI screen 700 is shown to present an interface that enables the plurality of users to configure and/or implement the various stages of the SDLC of the software product. The UI screen 700 is shown to include the name of the software product, the date of creation of the software product, the product portfolio associated with the software product, the timeline associated with the software product, and the progress associated with the software product. The UI screen 700 is further shown to include identifiers of one or more owners, innovators, developers, or the like associated with the software product. The UI screen 700 is further shown to include the first through fourth sections 702-708 (e.g., dotted boxes 702-708), each indicative of a stage of the SDLC of the software product. The first section 702 is indicative of the define stage 216a for the software product. The second section 704 is indicative of the design stage 216b for the software product. The third section 706 is indicative of the development stage 216c for the software product. A fourth section 708 is indicative of the deployment stage 216d for the software product.

The first section 702, when expanded, by the plurality of users, by selecting a first user-selectable option 710, presents a graphical UI (GUI) for the define stage 216a. The GUI for the define stage 216a may present one or more functions that enables the plurality of users to implement operations associated with the define stage 216a of the software product. During the define stage 216a, the product orchestration designer 402 may present, by way of the GUI for the define stage 216a, one or more features to define a requirement, generate a description, generate tags, create epics/stories/features, or the like associated with the software product.

The second section 704, when expanded, by the plurality of users using a second user-selectable option 712, presents a GUI for the design stage 216b. The GUI for the design stage 216b may present a plurality of functions available for implementing the design stage 216b of the software product. During the design stage 216b, the users (e.g., the plurality of users) may create a plurality of designs associated with different facets of the software product. For example, the plurality of designs may include, but are not limited to, a UX design, system design, high level technical design, system architecture, technical architecture, or the like.

The third section 706, when expanded, by the plurality of users using a third user-selectable option 714, presents a GUI for the development stage 216c. The GUI for the development stage 216c presents one or more functions available for implementing the development stage 216c of the software product. The GUI for the development stage 216c enables the plurality of users to select a technology stack for the software product and perform various user actions for the development of the software product.

The fourth section 708, when expanded, by the plurality of users, a fourth user-selectable option 716, presents a GUI for the deployment stage 216d. The GUI for the deployment stage 216d presents one or more functions available for implementing the deployment stage 216d of the software product. The GUI for the deployment stage 216d may enable the plurality of users to, for example, select a deployment technology or deployment mode (e.g., Docker container, Kubernetes, Terraform, or the like), create a CI/CD pipeline for the deployment of the software product (or technologies used to develop the software product), or the like. Further, the GUI for the deployment stage 216d may present a real-time progress tracking of a status of the deployment of the software product.

Figure 8B:
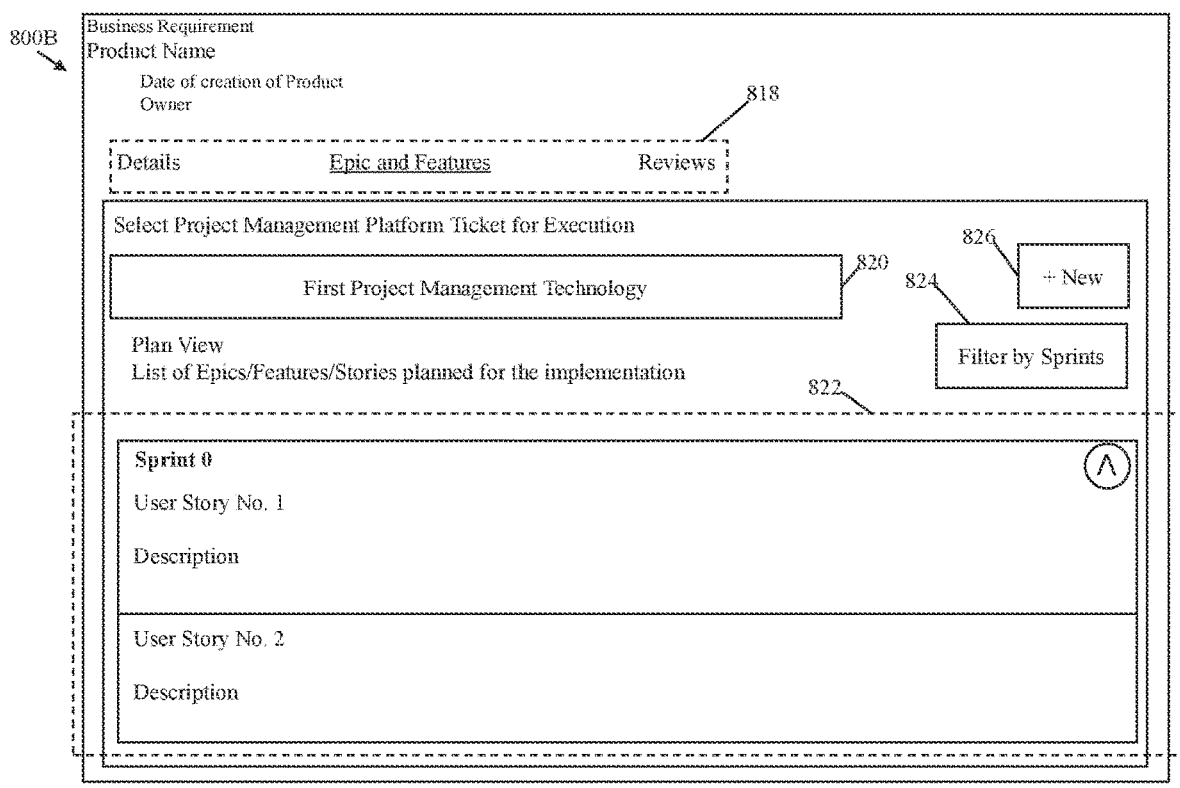

FIGS. 8A and 8B, collectively, illustrate UI screens 800A and 800B rendered by the service application 112 on the first user device 102a for the implementation of the define stage 216a, in accordance with an exemplary embodiment of the present disclosure. Referring to the UI screen 800A, depicted is a define stage view for the implementing the define stage 216a. As shown, in one embodiment, the UI screen 800A enables the plurality of users to define one or more requirements (e.g., business requirements) for the software product. In a non-limiting example, the first set of operations includes a single operation—definition of a new business requirement for the software product for documentation purposes.

Referring to FIG. 8A, the UI screen 800A is shown to include a first text box 802 that enables a user (e.g., the plurality of users) to provide a title for a new business requirement or feature. The UI screen 800A is further shown to include a first plurality of user-selectable options 804. The first plurality of user-selectable options 804 includes first through third user-selectable options (e.g., "Basic Details", "Links", "Files"; not numbered). The first plurality of user-selectable options 804 enable users (e.g., the plurality of users) to provide basic details (e.g., text), link(s), file(s), or the like for the definition of the new business requirement. Based on a selection of the first user-selectable option (e.g., "Basic Details") of the first plurality of user-selectable options 804, the UI screen 800A may display a second text box 806.

Basic details for the new business requirement may be entered by the user (e.g., the plurality of users) in the second text box 806. Similarly, links and files may be uploaded using corresponding user-selectable options (e.g., "Links" and "Files") of the first plurality of user-selectable options 804. Further, the UI screen 800A is further shown to include a set of text boxes 808 that enables the user to enter attribute names and values for the new business requirement. The UI screen 800A is further shown to include a fourth user-selectable option 810 (e.g., "Add"). Selection of the fourth user-selectable option 810, by the user, may generate additional text boxes on the UI screen 800A to enable the user to enter additional attribute names or values. The UI screen 800A is further shown to include a third text box 812 that enables the user (e.g., the plurality of users) to enter one or more tags or keywords that are to be associated with the new business requirement for the software product. The UI screen 800A is further shown to include a fifth user-selectable option 814 (e.g., a toggle button) that enables the user to decide whether an external tool or technology (e.g., cloud-based technologies) is to be used for the documentation of the new business requirement or the software product. In a non-limiting example, the user may select the fifth user-selectable option 814 for using an external tool or technology for the documentation. For the sake of brevity, technologies. Tools, and/or services for technologies that may be used for documentation purposes are interchangeably referred to as "documentation technologies". Examples of the documentation technologies may include, but are not limited to, Confluence, Google Docs, Sharepoint, or the like.

The UI screen 800A is further shown to include a second set of user-selectable options 816. Each of the second set of user-selectable options 816 is indicative of a documentation technology available for the documentation process. In a non-limiting example, the second set of user-selectable options 816 includes sixth through tenth user-selectable options 816a-816e that are indicative of first through fifth documentation technologies, respectively. One of the sixth through tenth user-selectable options 816a-816e may be selected by a user (e.g., the plurality of users) to select a corresponding documentation technology for implementing the documentation process. In a non-limiting example, it is assumed that the sixth user-selectable option 816a (e.g., the first documentation technology or "Documentation technology 1") is selected by the user. In one embodiment, a link to the set of documents generated at the selected first documentation technology (e.g., the "Documentation Technology 1") may be presented to the plurality of users on the service application 112. The plurality of users may access and modify the set of documents using the presented link.

In the current embodiment, the recorded first plurality of user actions may include, but are not limited to, the selection of the first set of operations, the provision of the title of the business requirement (e.g., the new business requirement), the selection of the first documentation technology, the uploading of the links and/or the files, the entry of the attributes, or the like. The title of the business requirement, the uploaded links and/or files, the attributes names and values for the business requirement, or the like may correspond to or constitute a first set of execution parameters for the execution of the first operation by the first documentation technology.

Each of the first plurality of user actions performed by the user (e.g., the plurality of users) on the UI screen 800A (e.g., on the service application 112) triggers the user action designer 202 to generate corresponding metadata. In other words, the user action designer 202 generates the metadata that is associated with each of the first plurality of user actions. The generated metadata captures each interaction of the user with the UI screen 800A (e.g., the define stage view on the service application 112). The generated metadata is associated with the selection of the first set of operations (e.g., the definition of the new business requirement), the selection of the first documentation technology for executing the first set of operations, and the first set of execution parameters for the execution of the first set of operations.

The user action designer 202 may store the generated metadata that is associated with the first plurality of user actions in the user action catalog 203.

Subsequently, the user action script compiler 204 may receive the stored metadata. In one embodiment, the metadata received by the user action script compiler 204 may include metadata indicative of the selection of the first documentation technology ("Documentation Technology 1") for documentation. Based on the stored metadata, the user action script compiler 204 may generate a first user action script that includes or is indicative of the selection of the first set of operations, the selection of the first documentation technology for executing the first set of operations, and the first set of execution parameters for the execution of the first set of operations. The first user action script may conform to/correspond the format or language (e.g., the proprietary) that is compatible with the service application 112.

The orchestrator 206 may receive the first user action script from the user action script compiler 204. The orchestrator 206 may analyze the first user action script to identify or determine operations associated with the first user action script. In a non-limiting example, the orchestrator 206 may determine that the first user action script is associated with the first set of operations. In other words, the orchestrator 206 may determine, based on the analysis of the first user action script, that the first set of operations includes a single operation (e.g., the definition of the new business requirement). Further, the orchestrator 206 may identify or determine, based on the first user action script and information stored in a look-up table (e.g., the first look-up table 500), that the first operation is to be executed by the first documentation technology. Further, the orchestrator 206 may identify or determine a gentech script generator, of the plurality of gentech script generators 208, that is mapped to that the first documentation technology. In other words, the orchestrator 206 may identify a gentech script generator that corresponds to or is associated with the first operation. In a non-limiting example, the orchestrator 206 may identify that the first gentech script generator 208a is mapped to the first documentation technology, based on the first user action script and information stored in a look-up table (e.g., the second look-up table 506). Based on the identification of the first gentech script generator 208a, the orchestrator 206 may communicate a first section of the first user action script to the first gentech script generator 208a. The first section of the first user action script may be indicative of the first set of operations to be executed and the first set of execution parameters. In a non-limiting example, the first section may not be indicative of the selection (e.g., may exclude any indication of the selection) of the first documentation technology. However, in another embodiment, the first section may be indicative of the selection of the first documentation technology.

The first gentech script generator 208a may receive the first section of the first user action script. The first gentech script generator 208a may convert the first section of the first user action script into a first set of gentech scripts. The first set of gentech scripts may correspond to a format and/or a language that is technology-agnostic with respect to the first through fifth documentation technologies. In a non-limiting example, gentech scripts (e.g., the first set of gentech scripts) generated by the plurality of gentech script generators 208 may correspond to pseudocode, XML, YAML, JSON, or the like. In another embodiment, the gentech scripts generated by the plurality of gentech script generators 208 may correspond to an open programming language (e.g., Scala, Python, Java, or the like). The first set of gentech scripts may be indicative of the first set of operations to be executed and the first set of execution parameters for the execution of the first set of operations. The first gentech script generator 208a may communicate the first set of gentech scripts to the orchestrator 206.

The orchestrator 206 may identify or determine a technology-specific interpreter, of the plurality of technology-specific interpreters 210, that is mapped to the first documentation technology. In a non-limiting example, the orchestrator 206 may identify, based on the user action script and information stored in a look-up table (e.g., the second look-up table 506) that the first technology-specific interpreter 210a is mapped to the first documentation technology. Based on the identification of the first technology-specific interpreter 210a, the orchestrator 206 may communicate the first set of gentech scripts to the first technology-specific interpreter 210a.

The first technology-specific interpreter 210a may convert the first set of gentech scripts into a first set of technology-specific scripts that is compatible with the selected technology (e.g., the first documentation technology; "Documentation Technology 1"). The first set of technology-specific scripts is in a format that is specific to the first documentation technology. The first set of technology-specific scripts may be indicative of the first set of operations to be executed and the first set of execution parameters. The first technology-specific interpreter 210a may communicate the first set of technology-specific scripts to a technology server (e.g., the first technology server 104a) that hosts the first documentation technology (e.g., the first technology 114a).

For example, based on the first set of technology-specific scripts, the first technology-specific interpreter 210a may generate/perform one or more API calls (e.g., "documentation technology 1"-specific API calls) to communicate the first set of technology-specific scripts to the first documentation technology. The first documentation technology may initiate execution of the first set of operations for generation of a first set of documents (e.g., the generation of the definition of the new business requirement). The generated first set of documents may be indicative of the title of the new business requirement, the basic details of the new business requirement, the tags associated with the new business requirement, or the like. The generated first set of documents may further include content that is included or present in the uploaded links or files. The generated first set of documents may be further indicative a release ID associated with the new business requirement, a portfolio ID of a portfolio associated with the new business requirement, or the like The first documentation technology (e.g., the technology server, of the plurality of technology servers 104, that hosts the first documentation technology) may, based on the execution of the first set of operations/the initiation of the execution of first set of operations, communicate first progress data to the first technology-specific interpreter 210a. The first progress data may include, but is not limited to, an indication of a level of completion (e.g., progress of execution; "10%", "20%", "95%", "100%", or the like) of the execution of the first set of operations by the first documentation technology, an output (e.g., the generated first set of documents) of the execution of the first set of operations, or the like. The first progress data may further include a set of logs generated by the first documentation technology (e.g., the first technology 114a) during the execution of the first set of operations, a set of alerts generated by the first documentation technology during the execution of the first set of operations, and/or a set of errors generated by the first documentation technology during the execution of the first set of operations.

The first progress data may be received, by the first technology-specific interpreter 210a, in the format (e.g., technology-specific scripts) that is specific to the first documentation technology. In a non-limiting example, the first technology-specific interpreter 210a receives a second set of technology-specific scripts that is indicative of the first progress data. The first technology-specific interpreter 210a may convert the second set of technology-specific scripts to a second set of gentech scripts. The second set of gentech scripts may be technology-agnostic with respect to the first through fifth documentation technologies. The second set of gentech scripts may be indicative of the first progress data. The first technology-specific interpreter 210a may communicate the second set of gentech scripts to the orchestrator 206. The orchestrator 206 may communicate the second set of gentech scripts to the first gentech script generator 208a of the plurality of gentech script generators 208. The first gentech script generator 208a may convert the received second set of gentech scripts into a second user action script. The second user action script is indicative of the first progress data and is in the format or language that is compatible with the service application 112. The first gentech script generator 208a may communicate the second user action script to the orchestrator 206.

The orchestrator 206 may communicate the second user action script to the response converter 212. In other words, the response converter 212 may receive the second user action script from the orchestrator 206. The response converter 212 may convert the received second user action script into a first set of user action responses. The first set of user action responses is indicative of the first progress data. The response converter 212 may communicate the first set of user action responses to the user action designer 202. Based on the received first set of user action responses, the user action designer 202 may generate a first set of visual indicators. As described in the foregoing description of FIG. 3, the first set of visual indicators may include, but is not limited to, the generated first set of documents, links to the generated first set of documents, text, numbers, or diagrams (e.g., diagrammatic elements) indicative of the first progress data. For example, the first set of visual indicators may include the alert messages (e.g., text) or logs (e.g., text) indicative of the progress of the execution of the first set of operations. Similarly, the first set of visual indicators may further include the level of completion (e.g., numbers) of the execution of the first set of operations. Similarly, the first set of visual indicators may further include diagrammatic representations (e.g., graphs, charts, scatter plots, tables, or the like) indicative of the first progress data. The first set of visual indicators may be presented on the UI screen rendered by the service application 112 on the first user device 102a (e.g., the plurality of user devices 102).

The user (e.g., the plurality of users) may view the first set of visual indicators to view the progress of the execution of the first set of operations or an output of the first set of operations. The first set of visual indicators may be updated whenever new progress data is received by the first technology-specific interpreter 210a from the first documentation technology (e.g., the first technology 114a). In other words, the first set of visual indicators may be updated whenever new progress data is received by the first technology-specific interpreter 210a from the technology server (e.g., the first technology server 104a) that hosts the first documentation technology.

In the current embodiment, it is assumed that a single technology (e.g., the first documentation technology), of the second plurality of technologies (e.g., the first through fifth documentation technologies) is selected by the user (e.g., the plurality of users) for the execution of the first set of operations. However, in another embodiment, another technology (e.g., the second documentation technology), of the second plurality of technologies (e.g., the first through fifth documentation technologies) may also be selected by the user for the execution of the first set of operations. In a non-limiting example, it is assumed that the second documentation technology is selected (e.g., by the user), in addition to the documentation technology, for the execution of the first set of operations.

In such a scenario, the first plurality of user actions recorded by the user action designer 202 may further include the selection of the second documentation technology (e.g., the second technology 114b) for the execution of the first set of operations. Further, the metadata stored in the user action catalog 203 may include metadata associated with the selection of the second documentation technology. Consequently, the first user action script may also indicate the selection of the second documentation technology.

Further, the orchestrator 206 may determine, based on the first user action script, that the first operation is to be executed by the second documentation technology (e.g., the first technology 114a), in addition to the first documentation technology (e.g., the first technology 114a). Further, the orchestrator 206 may identify, based on the first user action script and information in a look-up table (e.g., the second look-up table 506), that the first gentech script generator 208a is mapped to the second documentation technology. The first documentation technology and the second documentation technology are available to execute same/similar operations (e.g., the first set of operations). Therefore, the first gentech script generator 208a is also mapped to the second documentation technology. In a non-limiting example, the first section may not be indicative of the selection of the second documentation technology or the selection of the second documentation technology.

Following the reception of the first set of gentech scripts from the first gentech script generator 208a, the orchestrator 206 may identify or determine a technology-specific interpreter, of the plurality of technology-specific interpreters 210, that is mapped to the second documentation technology. In a non-limiting example, the orchestrator 206 may identify that the second technology-specific interpreter 210b is mapped to the second documentation technology. Based on the identification of the second technology-specific interpreter 210b, the orchestrator 206 may communicate the first set of gentech scripts to the second technology-specific interpreter 210b.

The second technology-specific interpreter 210b may convert the first set of gentech scripts to a second set of technology-specific scripts that is compatible with the second documentation technology ("Documentation Technology 2"). The second set of technology-specific scripts is in a format that is specific to the second documentation technology. The second set of technology-specific scripts may be indicative of the first set of operations to be executed and the first set of execution parameters. The second technology-specific interpreter 210b may communicate the second set of technology-specific scripts to a technology server (e.g., the second technology server 104b) that hosts the second documentation technology (e.g., the second technology 114b). For example, based on the second set of technology-specific scripts, second technology-specific interpreter 210b may generate/perform one or more API calls (e.g., "Documentation Technology 2"-specific API calls) to communicate the second set of technology-specific scripts to the second documentation technology. The second documentation technology may initiate execution of the first set of operations for generation of a second set of documents (e.g., the generation of the definition of the new business requirement). The generated second set of documents may be indicative of the title of the new business requirement, the basic details of the new business requirement, the tags associated with the new business requirement, or the like. The generated second set of documents may further include content that is included or present in the uploaded links or files. The generated second set of documents may be further indicative of the release ID of the release, the portfolio ID of the portfolio, or the like.

The second documentation technology (e.g., the technology server that hosts the second documentation technology) may, based on the execution of the first set of operations/the initiation of the execution of the first set of operations, communicate second progress data to the second technology-specific interpreter 210b. The second progress data may include, but is not limited to, an indication of a level of completion (e.g., "10%", "20%", "95%", "100%", or the like) of the execution of the first set of operations by the second documentation technology, an output (e.g., the generated second set of documents) of the execution of the first set of operations, or the like. The second progress data may further include a set of logs generated by the second documentation technology (e.g., the second technology 114b) during the execution of the first set of operations, a set of alerts generated by the second documentation technology during the execution of the first set of operations, and/or a set of errors generated by the second documentation technology during the execution of the first set of operations.

The second progress data may be received, by the second technology-specific interpreter 210b, in a format (e.g., technology-specific scripts) that is specific to the second documentation technology. In a non-limiting example, the second technology-specific interpreter 210b receives a third set of technology-specific scripts that is indicative of the second progress data. The second technology-specific interpreter 210b may convert the third set of technology-specific scripts into a third set of gentech scripts. The third set of gentech scripts may be in the format that is technology-agnostic with respect to the first through fifth documentation technologies. The third set of gentech scripts may be indicative of the second progress data. The second technology-specific interpreter 210b may communicate the third set of gentech scripts to the orchestrator 206. The orchestrator 206 may communicate the third set of gentech scripts to the first gentech script generator 208a of the plurality of gentech script generators 208. The first gentech script generator 208a may convert the received third set of gentech scripts into a third user action script. The third user action script is indicative of the second progress data and is in the format that is compatible with the service application 112. The first gentech script generator 208a may communicate the third user action script to the orchestrator 206.

The orchestrator 206 may communicate the third user action script to the response converter 212. In other words, the response converter 212 may receive the third user action script from the orchestrator 206. The response converter 212 may convert the received third user action script into a second set of user action responses. The second set of user action responses is indicative of the second progress data. The response converter 212 may communicate the second set of user action responses to the user action designer 202. Based on the received second set of user action responses, the user action designer 202 may generate a second set of visual indicators. In a non-limiting example, it is assumed that the second set of visual indicators is similar to the first set of visual indicators. However, in another embodiment, the second set of visual indicators may be different from the first set of visual indicators. The second set of visual indicators may be updated whenever new progress data is received by the second technology-specific interpreter 210b from the technology server (e.g., the second technology server 104b) that hosts the second documentation technology.

The application server 106 may store, in a memory thereof, the new business requirement, the first set of documents, and the second set of documents. The application server may further store therein the first set of visual indicators and the second set of visual indicators.

Referring now to FIG. 8B, it is assumed that, following the execution of the first set of operations, a second set of operations (e.g., agile project management) is to be performed by the user (e.g., the plurality of users). It is assumed that the second set of operations, of the plurality operations, was selected by the user (e.g., the plurality of users). Based on the selection of the second set of operations, the UI screen 800B may be rendered by the user action designer 202 on the first user device 102a (e.g., the plurality of user devices 102). In a non-limiting example, the second set of operations may include searching for epics, stories, or sprints on a project management technology already being used for agile development of the software product (e.g., the software application). The second set of operations may be available for execution by a third plurality of technologies of the first plurality of technologies 114. In a non-limiting example, it is assumed that there is no technology common between the second plurality of technologies and the third plurality of technologies. However, in another embodiment, one or more technologies may be common to the second plurality of technologies and the third plurality of technologies. In other words, the second plurality of technologies and the third plurality of technologies may not be mutually exclusive. In another embodiment, the second plurality of technologies and the third plurality of technologies may be the same.

Examples of the third plurality of technologies include, but are not limited to, Jira®, Trello®, Asana®, or the like. For the sake of brevity, it is assumed that the third plurality of technologies include first through third project management technologies (e.g., the fourth through sixth technologies 114d-114f).

The UI screen 800B presents an interface (e.g., UI) offered by the service application 112 for managing different releases, workstreams, processes, or the like associated with the software product. The UI screen 800B presents a third set of user-selectable options 818 (e.g., "Details", "Epic and Features", "Reviews"; not numbered). When one of the third set of user-selectable options 818 is selected by the user (e.g., plurality of users), one or more corresponding options may be presented on the UI screen 800B. In a non-limiting example, the user may have selected the user-selectable option "Epic and Features" from the third set of user-selectable options 818. In such an example, the UI screen 800B may present a fourth text box 820 for receiving a user input to search for user stories, epics, or features, or the like on a project management technology. Further, UI screen 800B may present a set of user-selectable options (not shown), enabling the user to select one of the third plurality of technologies for executing the second set of operations.

In other words, the user action designer 202 may present on the UI rendered by the service application 112 on the first user device 102a, the third plurality of technologies available for the execution of the second set of operations. In a non-limiting example, it is assumed that the first project management technology (e.g., the fourth technology 114d) The user action designer 202 may record a second plurality of user actions performed on the UI rendered by the service application 112 (e.g., the UI rendered by the user action designer 202). In a non-limiting example, the second plurality of user actions may include, but are not limited to, the selection of the second set of operations, the selection of the first project management technology (e.g., the fourth technology 114d), and a second set of execution parameters for the execution of the second set of operations. The second set of execution parameters may include, but is not limited to, the selection of "Epics and Features", the user input to search for user stories, epics, or features, or the like.

Each of the second plurality of user actions performed by the user (e.g., the plurality of users) on the UI screen 800B (e.g., on the service application 112) triggers the user action designer 202 to generate corresponding metadata (e.g., new metadata). The generated new metadata may be associated with the selection of the first project management technology, and the second set of execution parameters for the execution of the first set of operations.

The user action designer 202 may update the stored metadata to include the new metadata. Subsequently, the user action script compiler 204 may receive the stored, updated metadata (simply referred to as "the metadata"). Based on the metadata, the user action script compiler 204 may generate a fourth user action script that includes or is indicative of the selection of the second set of operations, the selection of the first project management technology for executing the second set of operations, and the second set of execution parameters for the execution of the second set of operations. The fourth user action script may conform to a format or language (e.g., the proprietary) that is compatible with the service application 112.

The orchestrator 206 may receive the fourth user action script from the user action script compiler 204. The orchestrator 206 may analyze the fourth user action script to identify or determine operations associated with the fourth user action script. In a non-limiting example, the orchestrator 206 may determine that the fourth user action script is associated with the second set of operations. In other words, the orchestrator 206 may determine, based on the analysis of the fourth user action script, that the second set of operations includes a single operation (e.g., searching for epics, stories, and features). Further, the orchestrator 206 may determine based on the fourth user action script, that the second set of operations is to be executed by the first project management technology (e.g., the fourth technology 114d).

Further, the orchestrator 206 may identify or determine a gentech script generator, of the plurality of gentech script generators 208, that is mapped to that the first project management technology (e.g., mapped to third plurality of technologies that include the first through third project management technologies). In a non-limiting example, the orchestrator 206 may identify that the second gentech script generator 208b is mapped to the first project management technology. Based on the identification of the second gentech script generator 208b, the orchestrator 206 may communicate a first section of the fourth user action script to the second gentech script generator 208b. The first section of the fourth user action script may be indicative of the second set of operations to be executed and the second set of execution parameters. In a non-limiting example, the first section may not be indicative of the selection of the first project management technology. However, in another embodiment, the first section may be indicative of the selection of the first project management technology.

The second gentech script generator 208b may receive the first section of the fourth user action script. The second gentech script generator 208b may convert the first section of the fourth user action script into a fourth set of gentech scripts. The fourth set of gentech scripts may correspond to the format and/or the language that is technology-agnostic with respect to the first project management technology. The fourth set of gentech scripts is technology-agnostic with respect to the first through third project management technology (e.g., the third plurality of technologies). The fourth set of gentech scripts may be indicative of the second set of operations to be executed and the second set of execution parameters for the execution of the second set of operations. The second gentech script generator 208b may communicate the fourth set of gentech scripts to the orchestrator 206.

The orchestrator 206 may identify or determine a technology-specific interpreter, of the plurality of technology-specific interpreters 210, that is mapped to the first project management technology. In a non-limiting example, the orchestrator 206 may identify that the fourth technology-specific interpreter 210d is mapped to the first project management technology. Based on the identification of the fourth technology-specific interpreter 210d, the orchestrator 206 may communicate the fourth set of gentech scripts to the fourth technology-specific interpreter 210d.

The fourth technology-specific interpreter 210d may convert the fourth set of gentech scripts to a fourth set of technology-specific scripts that is compatible with the first project management technology. The fourth set of technology-specific scripts is in a format that is specific to the first project management technology. The fourth set of technology-specific scripts may be indicative of the second set of operations to be executed and the second set of execution parameters. The fourth technology-specific interpreter 210d may communicate the fourth set of technology-specific scripts to a technology server (e.g., the fourth technology server 104d) that hosts the first project management technology (e.g., the first technology 114a). The first project management technology may initiate execution of the second set of operations to search for the epics, stories, or features. In other words, the first project management technology may search for the epics, stories, and/or features based on the fourth set of technology-specific scripts.

The first project management technology may, based on the execution of the second set of operations/the initiation of the execution of second set of operations, communicate third progress data to the fourth technology-specific interpreter 210d. The third progress data may include or may be indicative of the epics, the stories, and/or the features retrieved by the first project management technology, based on the execution of the second set of operations. A set of visual indicators (e.g., a fourth set of visual indicators) that is indicative of the fourth third progress data may be generated by the user action designer 202 and presented on the UI rendered on the first user device 102a. Process of generation of the fourth set of visual indicators may be similar to the process of generation of the first set of visual indicators, based on the first progress data (as described in the foregoing description of FIG. 8A).

The UI screen 800B further presents a second section 822 that may display user stories (e.g., the fourth set of visual indicators) associated with the development of the software product. In a non-limiting example, the second section 822 displays two user stories (e.g., "User story 1" and "User story 2") and corresponding descriptions that are part of a single sprint (e.g., "Sprint 0") associated with the development of the software product. Each sprint associated with the software may refer to an increment, release or the like of the software product. The UI screen 800B presents an eleventh user-selectable option 824 to filter the user stories presented via the UI screen 800B based on sprints or sprint ID (e.g., sprint 0). Therefore, the UI screen 800B enables the plurality of users to manage the product and associated features, epics, or the like that are to be implemented along with the product. The UI screen 800B presents a 'New' option 826 to add new entries.

Figure 9A:
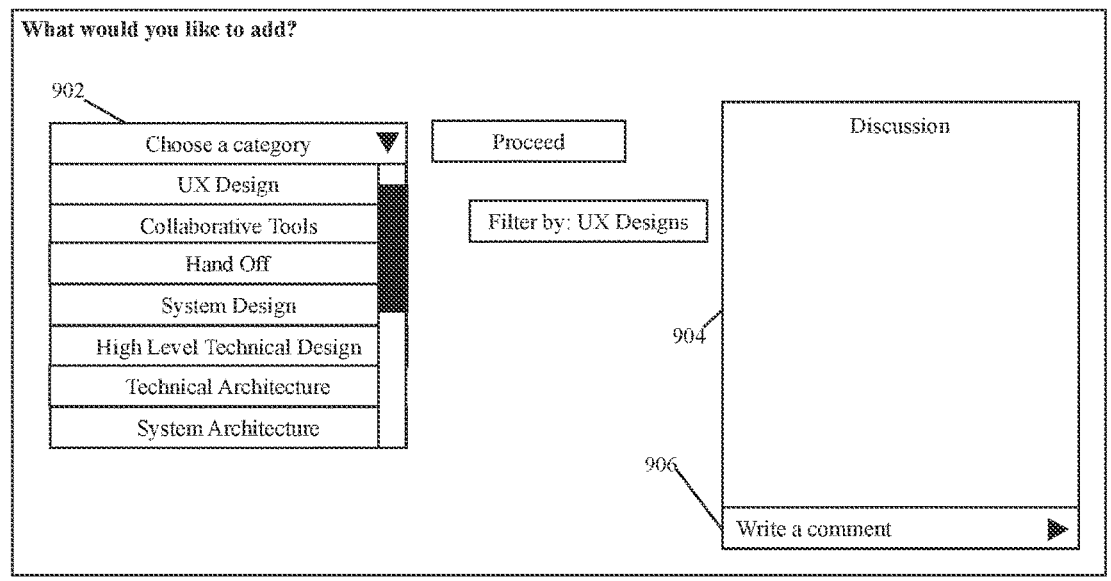
FIGS. 9A-9C, collectively, illustrate UI screens rendered by the service application on the first user device for the implementation of the design stage, in accordance with an exemplary embodiment of the present disclosure.
Figure 9B:
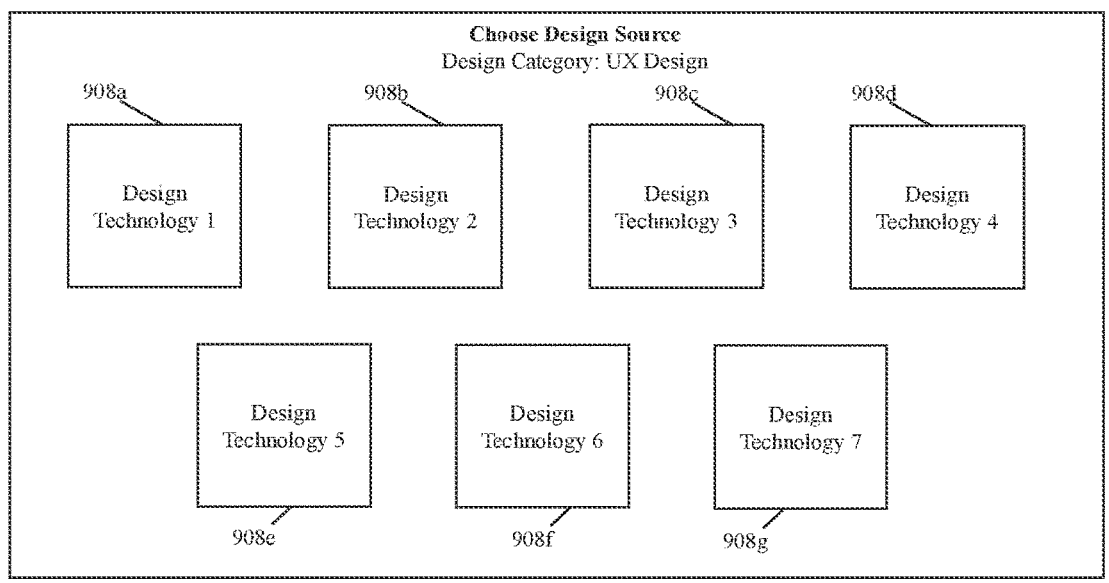
Figure 9C:
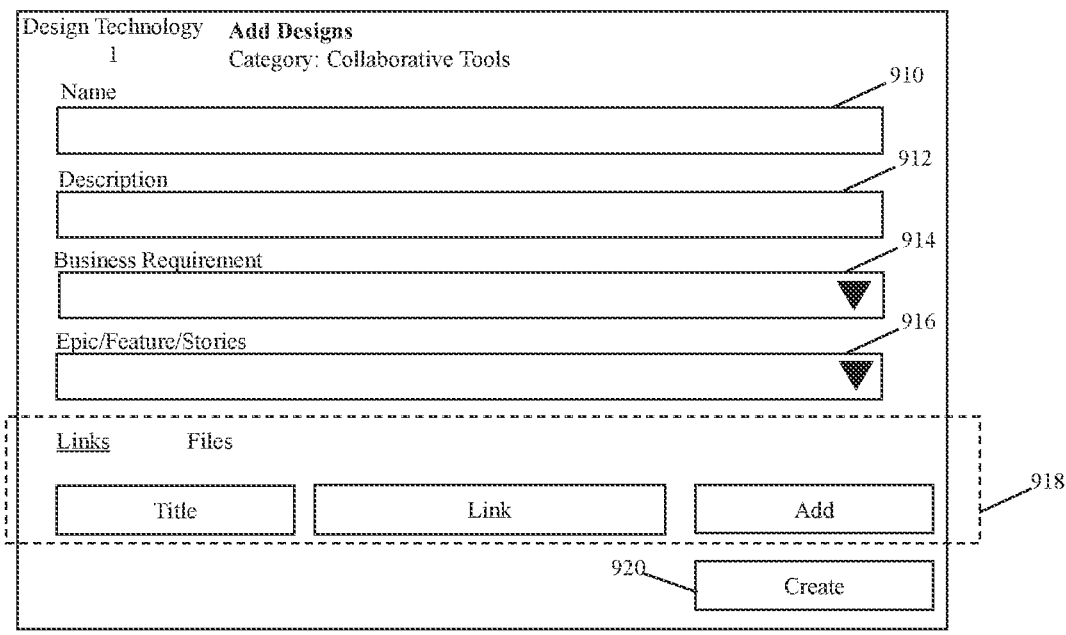

FIGS. 9A-9C, collectively, illustrate UI screens 900A-900C rendered by the service application 112 on the first user device 102a for the implementation of the design stage 216b, in accordance with an exemplary embodiment of the present disclosure. The UI screens 900A-900C depict the design stage view (e.g., the GUI for the implementation of the design stage 216b). The design stage view enables the user to create designs or design mockups for the software product. The design stage view may rendered by the service application 112 (e.g., the user action designer 202), based on a selection of a user-selectable option (not shown) by the user to implement the design stage 216b for the product development of the software product. In the current embodiment, it is assumed that the first set of operations corresponds to the creation of designs or design mockups for the implementing the design stage 216b. In a non-limiting example, a second plurality of technologies, of the first plurality of technologies 114, are available for the execution of the first set of operations.

Referring now to FIG. 9A, the UI screen 900A is shown to include a first user-selectable menu 902 (e.g., a drop-down menu). The first user-selectable menu 902 is shown to include a plurality of user-selectable options that enable the user (e.g., the plurality of users) to create, upload, or link designs (or documents) for a plurality of categories associated with the design stage 216b. The plurality of categories (e.g., the plurality of user-selectable options) may include, but are not limited to, UI design, UX design, collaborative tools, technical design, technical architecture, system architecture, deployment architecture, functional approach, low level design, information architecture, wireframing and prototyping, sitemap, UI tools, user research documents, or the like. The first user-selectable menu 902 (e.g., the plurality of user-selectable options) enables the user to select a category (e.g., a design category) for each design that is to be created, linked, or uploaded. In one embodiment, the software product may be associated with various business requirements or features, various workstreams, or the like. Each business requirement, feature, or workstream may be associated with a corresponding set of designs. The UI screen 900A may include options (not shown) to link, with a business requirement (e.g., the new business requirement), a feature, or a workstream, each design that is to be created, linked, or uploaded. Further, the UI screen 900A is shown to include a collaboration zone 904 that enables the plurality of users to collaborate in the implementation of the design stage 216b of the SDLC of the software product. The collaboration zone 904 is shown to include a first text box 906 that enables the plurality of users to post comments for display in the collaboration zone 904. The first plurality of user actions may include, but are not limited to, an entry in the first text box 906, the selection of the category for each design, selection of the options link the set of designs with a business requirement/workstream/feature, or the like.

Referring to FIG. 9B, the UI screen 900B is shown to include a plurality of user-selectable options (e.g., the first through seventh user-selectable options 908a-908g). Each of the plurality of user-selectable options is indicative of a technology, service, and/or tool available to the user (e.g., of the plurality of users) for the implementation of the design stage 216b. In a non-limiting example, the plurality of user-selectable options (e.g., the first through seventh user-selectable options 908a-908g) may correspond to a first design technology "Design Technology 1", a second design technology "Design Technology 2", a third design technology "Design Technology 3", a fourth design technology "Design Technology 4", a fifth design technology "Design Technology 5", a sixth design technology "Design Technology 6", and a seventh design technology "Design Technology 7". In a non-limiting example, the second plurality of technologies available for the execution of the design stage 216b include the first through seventh design technologies (e.g., the first technology through seventh technologies 114a-114g). Examples of design technologies, may include, but are not limited to, Figma®, Sketch®, Invision®, Confluence®, Miro®, Google Docs®, or the like. One or more options (e.g., one or more technologies), of the plurality of user-selectable options, may be selected by the user. However, in a non-limiting example, the first design technology ("Design Technology 1") may be selected by the user for UX design. Upon selection of the design technology, control may be redirected to the UI screen 900C. The first plurality of user actions may further include the selection of the design technology.

Referring to FIG. 9C, the UI screen 900C is shown to include a plurality of fields to enable the user to enter details of a set of designs that is to be created using the first design technology. The UI screen 900C is shown to include a second text box 910 that enables the user to enter a name or title for the set of designs and a third text box 912 that enables the user to enter a description for the set of designs. The UI screen 900C is further shown to include a second user-selectable menu 914 that enables user to select a business requirement for the set of designs. The second user-selectable menu 914 (e.g., a drop-down menu) may include one or more user-selectable options, such that each user-selectable option is indicative of a previously defined business requirement (e.g., the new business requirement described in the foregoing description of FIG. 8A). Selection of one of the one or more user-selectable options may imply that the set of designs is to be mapped to a corresponding business requirement (e.g., the new business requirement in the foregoing description of FIG. 8A).

The UI screen 900C is further shown to include a third user-selectable menu 916 (e.g., a drop-down menu) that enables user to select an epic, a story, or a feature for the set of designs. The third user-selectable menu 916 may include one or more user-selectable options, such that each user-selectable option is indicative of a previously defined epic, story, or feature. Selection of one of the one or more user-selectable options may imply that the set of designs is to be mapped to a corresponding epic, story, or feature.

The UI screen 900C is further shown to include a user-input field 918 that enables the user to upload one or more design files or links. The UI screen 900C is further shown to include an eighth user-selectable option 920 for the creation of the set of design documents. The first plurality of user actions may further include the name or the title entered in the second text box 910, the description for the set of designs entered in the third text box 912, the selection of a previously defined business requirement, the selection of a previously defined epic/story/feature, or the like. In other words, the first plurality of user actions may include the selection of the first set of operations, the selection of the first design technology for the execution of the first set of operations (e.g., the creation of designs or design mockups), and a first set of execution parameters for the execution of the first set of operations. The first set of execution parameters may include, but is not limited to, the name/the title, the description for the set of designs, the selection of the previously defined business requirement, the selection of the previously defined epic/story/feature, the text entered in the first text box 906, or the like.

The user action designer 202 records the first plurality of user actions. The user action designer 202 stores, in the user action catalog 203, metadata associated with the first plurality of user actions. In other words, the metadata stored in the user action catalog 203 corresponds to the first plurality of user actions. The user action script compiler 204 may receive the stored metadata from the user action catalog 203. The user action script compiler 204 may, based on the metadata, generate a first user action script that is indicative of the selection of the first set of operations, the selection of the first design technology (e.g., the first technology 114a), and the first set of execution parameters. Based on the first user action script, a first set of gentech scripts and, consequently, a first set of technology-specific scripts are generated. Process of generation of the first set of gentech script and the first set of technology-specific scripts may be similar to the process described in the foregoing descriptions of FIGS. 8A and 8B.

A technology-specific interpreter (e.g., the first technology-specific interpreter 210a), of the plurality of technology-specific interpreters 210, for the first design technology may communicate the first set of technology-specific scripts to the first design technology (e.g., the first technology 114a). In other words, the first technology-specific interpreter 210a communicates the first set of technology-specific scripts to a technology server (e.g., the first technology server 104a) that hosts the first design technology. The first design technology may execute the first set of operations based on the first set of technology-specific scripts. In a non-limiting example, the set of designs may be uploaded to the first design technology, based on the execution of the first set of operations. Based on the first set of execution parameters, the set of designs uploaded to the first design technology may be associated with the selected business requirement, the selected epic/story/feature, or the like.

The first design technology may communicate progress data (e.g., first progress data) to the first technology-specific interpreter 210a for the first design technology (e.g., the first technology 114a). The first progress data may be indicative of a progress of the execution of the first set of operations by the first design technology. In other words, the technology server (e.g., the first technology server 104a) that hosts the first design technology may communicate the first progress data to the first technology-specific interpreter 210a. Based on the first progress data, a first set of visual indicators indicative of a progress of an execution of the first set of operations may be generated and presented on the UI on the first user device 102a (e.g., the plurality of user devices 102). Process of generation of the first set of visual indicators, based on the first progress data, is similar to that described in the foregoing description of FIG. 8A.

In a non-limiting example, the first set of visual indicators may indicate the first set of operations is successfully executed by the first design technology (e.g., the first technology 114a). In other words, the first set of visual indicators may indicate that the set of designs is uploaded successfully to the first design technology. The first set of visual indicators may further indicate that the first set of the operations is executed based on the first set of execution parameters. The first set of visual indicators indicate that the selected business requirement and the selected epic/story/feature are associated with/linked to the set of designs.

FIGS. 10A-10D, collectively, illustrate UI screens 1000A-1000D rendered by the service application 112 on the first user device 102a for selection of a technology stack for the development stage 216c, in accordance with an exemplary embodiment of the present disclosure. The UI screens 1000A-1000D depict the development stage view (e.g., the GUI for the implementation of the development stage 216c). UI screens (e.g., the UI screens 1000A-1000D) enable the user to select various technologies to implement various aspects or facets (e.g., a front end, a back end, a database, a data pipeline, or the like) for the development of the software product. A data pipeline refers to a series of data processing steps for processing data from a data source. The data pipeline may include various pipeline stages. Each pipeline stage may be indicative of a set of operations that is performed in a corresponding stage. Examples of the pipeline stages include, but are not limited to, a data ingestion/data integration stage, a data storage stage (e.g., data lake), a data analytics stage, a data transformation stage, a data visualization stage, a data monitoring stage, or the like. Data pipelines and stages that may be included in data pipelines are well known to those of skill in the art.

The UI screen 1000A is shown to include a first plurality of options (e.g., first through eighth user-selectable options 1002a-1002h). Each of the first through eighth user-selectable options 1002a-1002h (i.e., the first plurality of options) enables the user to select a category or technical facet (e.g., "Backend Development", "Frontend Development", "Database", "Data Ingestion", "Data Analytics", "Data Visualization", "Metadata management", "Data processing", or the like) that is to be implemented in the software product. In other words, each of the first through eight user-selectable options 1002a-1002h corresponds to an operations or a set of operations of the plurality of operations. It will be apparent to those of skill in the art that the first through eighth user-selectable options 1002a-1002h are merely exemplary. Other user-selectable options, representative of other categories or facets to be implemented in the software product, may be presented without deviating from the scope of the disclosure. Selection of one of the first through eighth user-selectable options 1002a-1002h corresponds to selection of an operation, of the plurality of operations, for execution. For example, if a database for the software product is to be implemented, the third user-selectable option 1002c may be selected by a user (e.g., the plurality of users). In another example, if a data ingestion service for operation of the software product is to be implemented, the fourth user-selectable option 1002d may be selected by the user. If the third user-selectable option 1002c is selected by the user, control is redirected to the UI screen 1000B.

Figure 10A:
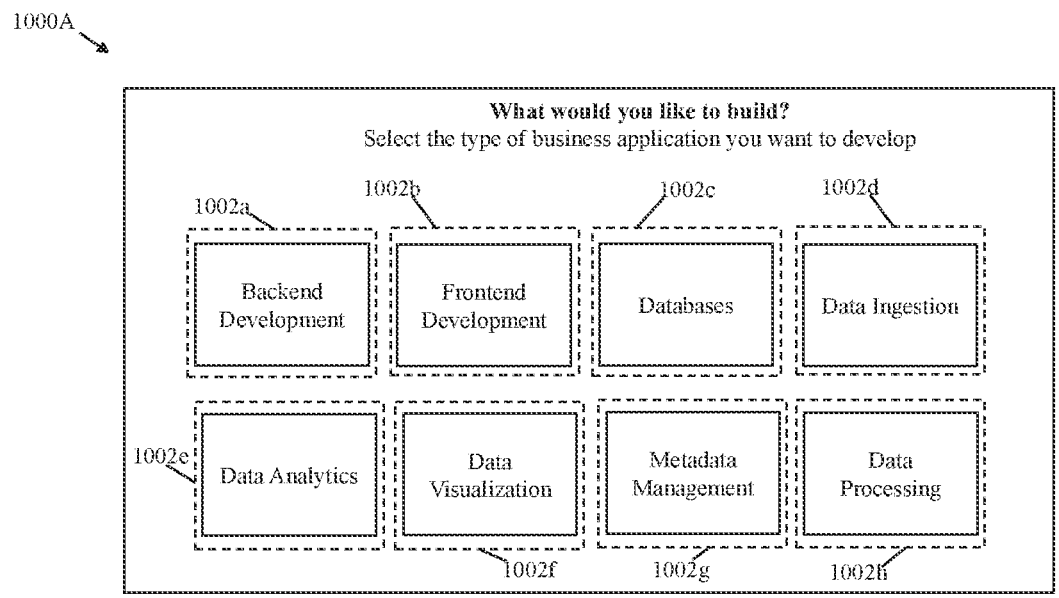
FIGS. 10A-10D, collectively, illustrate UI screens rendered by the service application on the first user device for selection of a technology stack for the development stage, in accordance with an exemplary embodiment of the present disclosure.
Figure 10B:
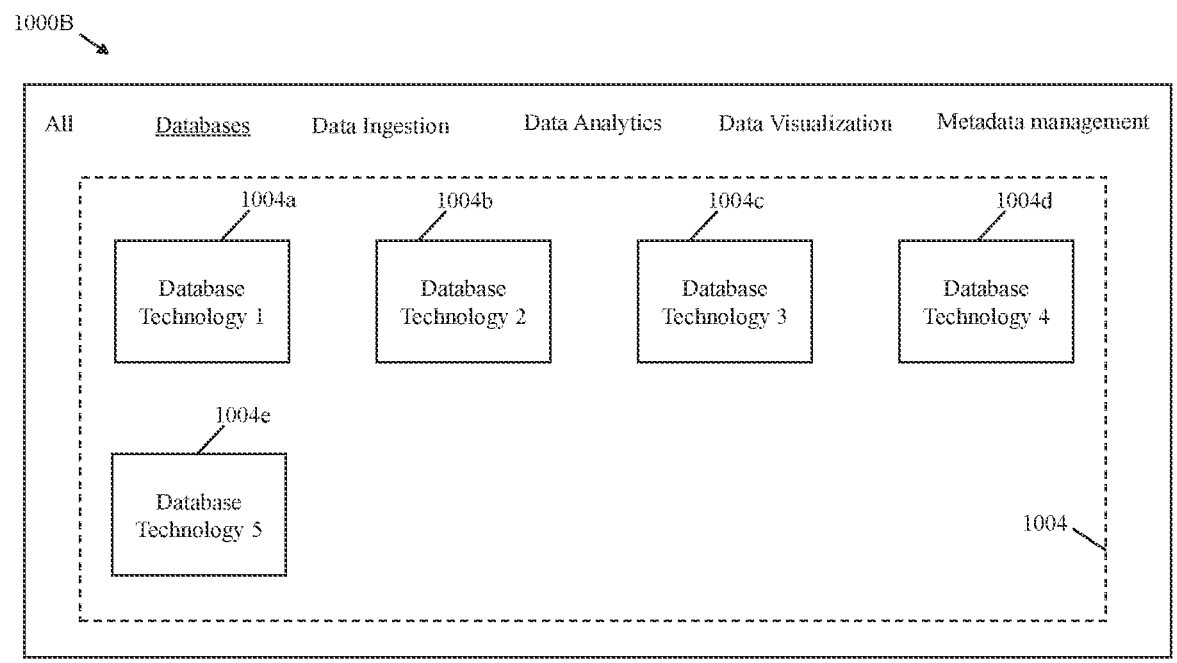

Referring now to FIG. 10B, the UI screen 1000B is shown to present a first section 1004 that includes a second plurality of user-selectable options (e.g., ninth through thirteenth user-selectable options 1004a-1004e). Each of the second plurality of user-selectable options may be indicative of a database technology available for implementing the database for the software product. The second plurality of user-selectable options may include the ninth through thirteenth user-selectable options 1004a-1004e. In a non-limiting example, the second plurality of user-selectable options may be indicative of first through fifth database technologies (e.g., "Database Technology 1", "Database Technology 2", "Database Technology 3", "Database Technology 4", and "Database Technology 5"), respectively. Each of the second plurality of user-selectable options (e.g., the ninth through thirteenth user-selectable options 1004a-1004e) is indicative of a corresponding database technology (e.g., CSV, MySQL or the like) available for implementing a data source service for the software product. In other words, a plurality of technologies (e.g., the first through fifth database technologies; a plurality of database technologies), of the first plurality of technologies 114, are available for execution of a first set of operations (e.g., database operations) of the plurality of operations.

One or more user-selectable options, of the second plurality of user-selectable options, may be selected by the user (e.g., the plurality of users) for selecting corresponding one or more database technologies (of the first through fifth database technologies) for implementation of the database for the software product. In other words, the selected one or more of the first through fifth database technologies (e.g., the plurality of database technologies) may be selected by the user (e.g., the plurality of users) to be made available for the execution of the database operations.

Referring back to FIG. 10A, if the fourth user-selectable option 1002d is selected by the user, control is redirected to the UI screen 1000C.

Figure 10C:
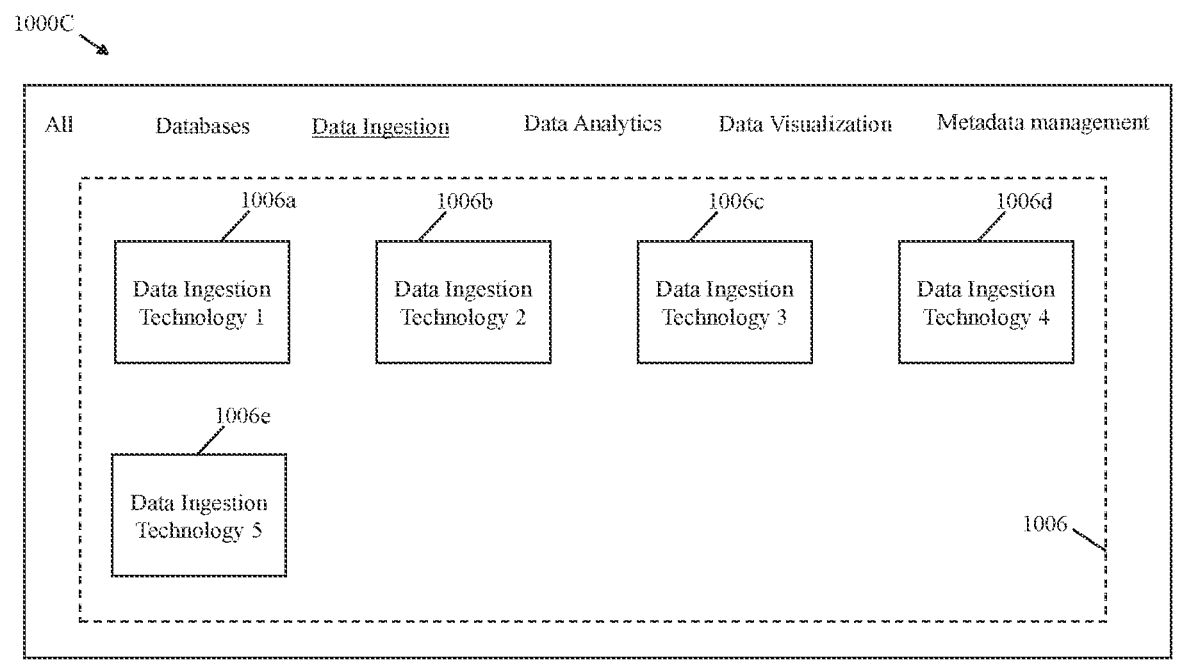

Referring now to FIG. 10C, the UI screen 1000C is shown to present a second section 1006 that includes a third plurality of user-selectable options (e.g., fourteenth through eighteenth user-selectable options 1006a-1006e). Each of the third plurality of user-selectable options may be indicative of a data ingestion technology available for implementing a data integration or data ingestion stage (e.g., data ingestion operations) in the data pipeline for the software product. In a non-limiting example, the fourteenth through eighteenth user-selectable options 1006a-1006e correspond to first through fifth data ingestion technologies (e.g., "Data Ingestion Technology 1", "Data Ingestion Technology 2", "Data Ingestion Technology 3", "Data Ingestion Technology 4" and "Data Ingestion Technology 5"), respectively, available for implementing the data integration or the data ingestion feature. In other words, the fourteenth through eighteenth user-selectable options 1006a-1006e are indicative of a plurality of data ingestion technologies (e.g., first through fifth data ingestion technologies) available for the execution of a set of operations (e.g., data ingestion/data integration operations) for data ingestion.

One or more user-selectable options, of the third plurality of user-selectable options, may be selected by the user (e.g., the plurality of users). Data ingestion technologies that correspond to the one or more user-selectable options may be available for implementation of the data ingestion feature for the software product. In other words, one or more of the first through fifth data ingestion technologies (e.g., the second plurality of technologies) may be selected by the user (e.g., the plurality of users) for the execution of the data ingestion operations in the data pipeline.

Referring back to FIG. 10A, if the fifth user-selectable option 1002e is selected by the user, control is redirected to the UI screen 1000D.

Figure 10D:
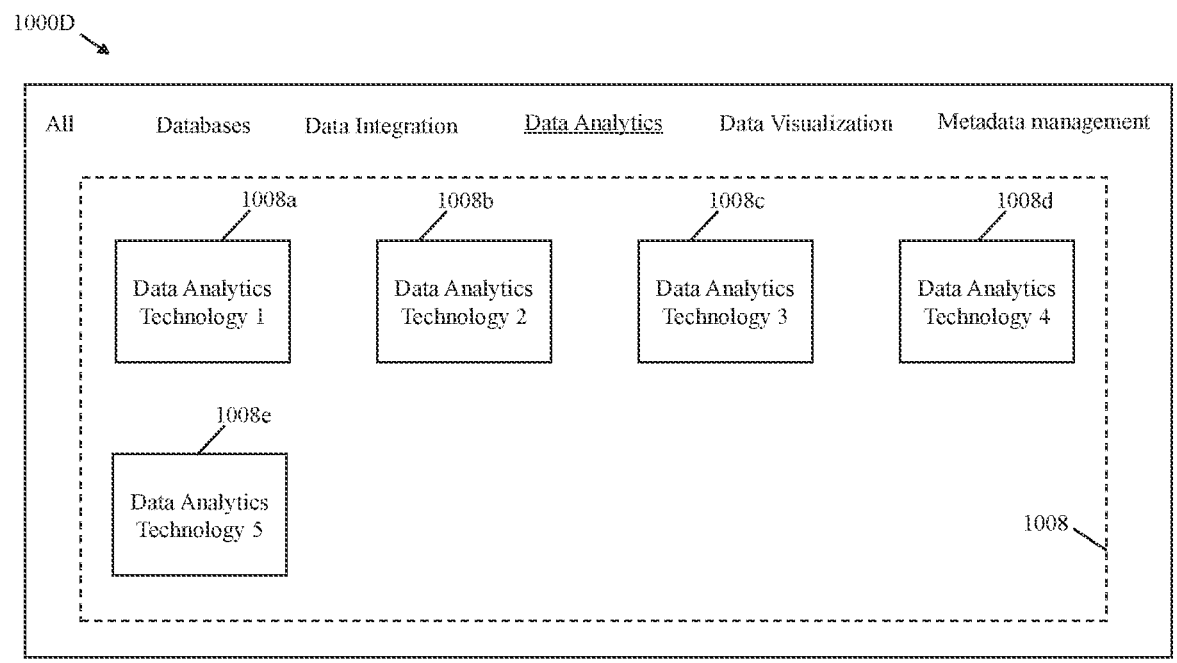

Referring now to FIG. 10D, the UI screen 1000D is shown to include a third section 1008. The third section 1008 is shown to include a fourth plurality of user-selectable options (e.g., nineteenth through twenty-third user-selectable options 1008a-1008e). Each of the fourth plurality of user-selectable options is indicative of a corresponding data analytics technology available for implementing a data analysis feature in the data pipeline for the software product. One or more of the nineteenth through twenty-third user-selectable options 1008a-1008e (e.g., "Data Analytics Technology 1", "Data Analytics Technology 2", "Data Analytics Technology 3", "Data Analytics Technology 4" and "Data Analytics Technology 5") may be selected by the user for implementing the data analysis feature in the data pipeline (e.g., execution of data analysis/data analytics operations in the data pipeline) for the software product.

In a non-limiting example, all of the nineteenth through twenty-third user-selectable options 1008a-1008e may be selected by the user, indicating that corresponding technologies for data analysis are to be included in a technology stack to be used for implementing data analysis feature of the software product.

In a similar fashion, technologies corresponding to other categories (e.g., data visualization, metadata management, or the like) or other technologies for above-mentioned categories may be selected by the user (e.g., the plurality of users).

For the sake of brevity, a technology, tool, or service available for data integration or ingestion is interchangeably referred to as "data ingestion technology" or "data integration technology" throughout the disclosure. Similarly, a technology, tool, or service available for implementation of a data lake is interchangeably referred to as "data lake technology" throughout the disclosure. Similarly, a technology, tool, or service selected for implementing ML design or ML operations (MLOps) is interchangeably referred to as "ML technology" or "ML operations technology" throughout the disclosure. Similarly, a technology, tool, or service selected for implementing functions pertaining to data analytics is interchangeably referred to as "data analytics technology" throughout the disclosure. Similarly, a technology, tool, or service selected for implementing functions pertaining to data visualization is interchangeably referred to as "data visualization technology" throughout the disclosure.

FIGS. 11A-11J, collectively, illustrate UI screens 1100A-1100J rendered by the service application 112 on the first user device 102a for creation and management of data pipelines, in accordance with an exemplary embodiment of the present disclosure. The UI screens 1100A-1100J depict the development stage view (e.g., a GUI for a data intelligence studio) for creation and management of data pipelines. The development stage view corresponds to the data intelligence studio, provided by the service application 112, that allows for implementation of one or more data pipelines for the software product. The data intelligence studio view enables the user (e.g., the plurality of users) to create/design custom data pipelines, using simple actions (e.g., drag and drop actions, selection of options, or the like). Pipeline stages included in each data pipeline and technologies selected for execution of the pipeline stages may be chosen by the user. The data intelligence studio further enables the user to configure a technology selected for execution of each pipeline stage included in each data pipeline. The service application 112 orchestrates each data pipeline based on the pipeline stages and technologies included in a corresponding data pipeline and the configuration of each technology in the corresponding data pipeline.

Figure 11A:
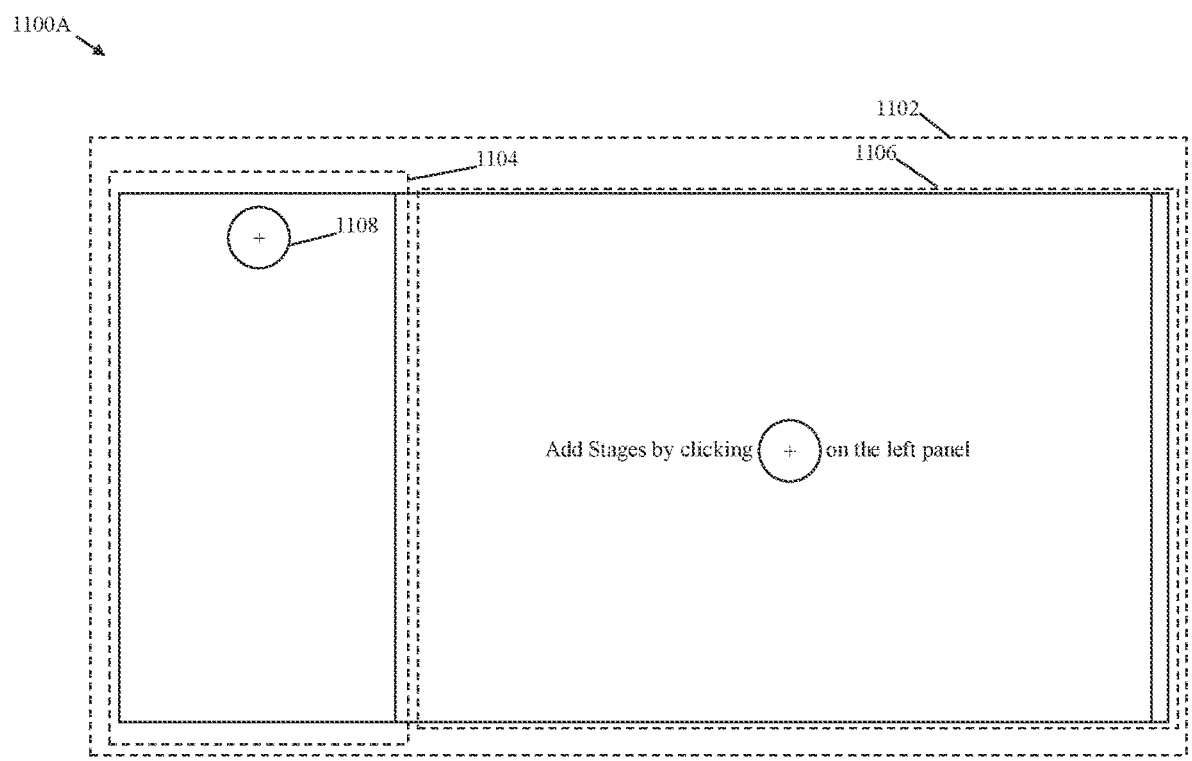

Referring now to FIG. 11A, the UI screen 1100A presents a first section 1102. The first section 1102 presents a workspace for creation (e.g., design) and management of a data pipeline (e.g., a data pipeline for the software product). The first section 1102 includes first and second sub-sections 1104 and 1106. The first sub-section 1104 enables users (e.g., the plurality of users) to add one or more pipeline stages to the data pipeline. For the sake of brevity, the terms "pipeline stage" and "stage" are used interchangeably throughout the disclosure. As described in the foregoing, examples of the one or more stages may include a data ingestion/data integration stage, a data transformation stage, a data storage stage (e.g., a data lake or data warehouse), a data analytics/data processing stage, a post-analysis data storage stage (e.g., an analytical data store), a data monitoring stage, a data visualization stage, or the like.

However, it will be apparent to those of skill in the art that the one or more stages are not limited to the above-mentioned stages. In an actual implementation, the data pipeline may include other stages without deviating from the scope of the disclosure. Stages that may be included in the data pipeline are known to those of skill in the art. The first sub-section 1104 is shown to include a first user-selectable option 1108. Selection of the first user-selectable option 1108 (e.g., by the users) may enable addition of data sources and/or new stages in the data pipeline. Each stage is associated with a set of pipeline operations to be executed in a corresponding stage. In other words, an addition of a new stage in the data pipeline corresponds to addition of a set of pipeline operations (e.g., the selection of the set of operations) to be executed, at that stage, in the data pipeline for execution of that stage. For the sake of brevity, the terms "operations" and "pipeline operations" are used interchangeably throughout the disclosure. When the user (e.g., the plurality of users) selects the first user-selectable option 1108, control is redirected to the UI screen 1100B. A data source is a store or source of data used to perform various sets of operations (e.g., data ingestion, data transformation, data storage, data analytics, data visualization, or the like) associated with the data pipeline. A data source is also interchangeably referred to as "data object" throughout the disclosure.

Types of the plurality of data sources may include, but are not limited to, relational databases, non-relational databases, file transfer protocol (FTP) servers, representational state transfer (REST) API, or comma-separated values (CSV) files. The data sources may further include a data store in a data warehouse, a data source in a data lake, or the like. Various types of data may be stored in a data source, for example, payroll data associated with employees of a company, transaction data associated with transaction performed at an automated teller machine (ATM), sales data associated with sale of a product by a company, or the like.

Figure 11B:
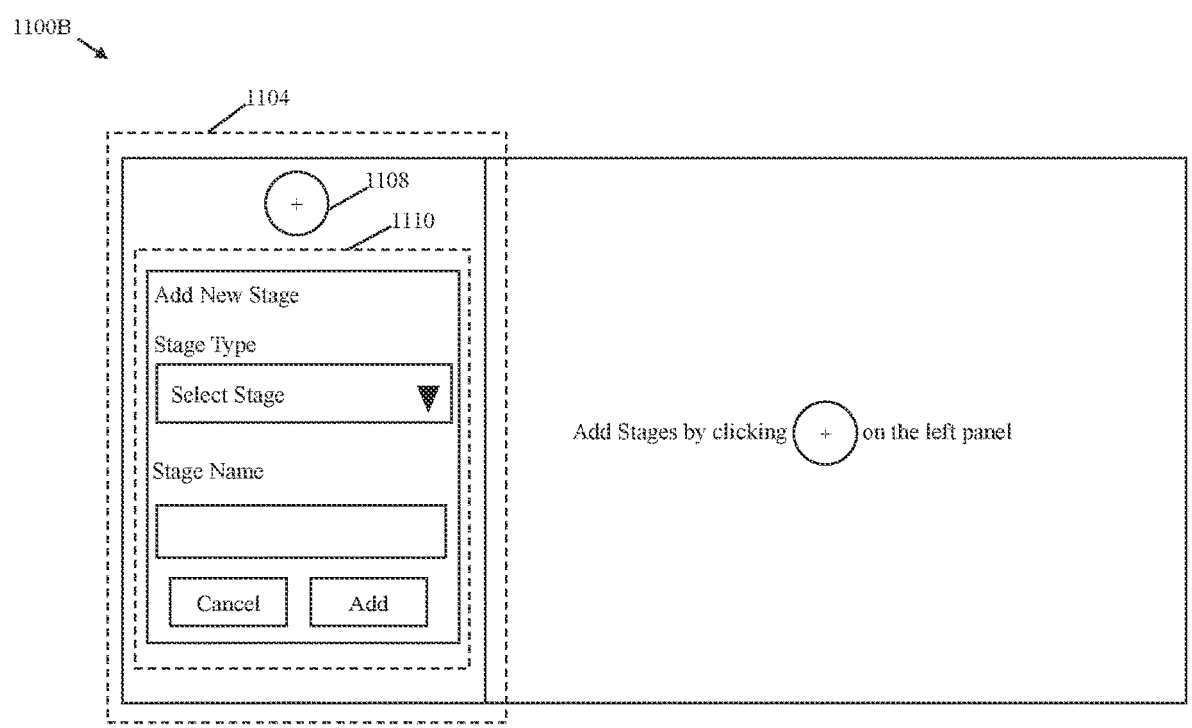

Referring now to FIG. 11B, the UI screen 1100B is shown to include a stage addition menu 1110. The stage addition menu 1110 may present, on the UI, a plurality of pipeline stages available for inclusion in the data pipeline. Examples of the plurality of pipeline stages may include, but are not limited to, the data ingestion/data integration stage, the data storage stage, the data analytics stage, the data processing stage, the data transformation stage, the data monitoring stage, the data visualization stage, or the like. A set of stages, of the plurality of stages, may be selected for inclusion in the data pipeline.

The stage addition menu 1110 may include one or more fields (e.g., "Select stage type", "Stage name", or the like) to enable the users (e.g., the plurality of users) to add (e.g., select) the set of stages and enter a set of attributes for each of the set of stages that is to be added. For example, a stage type (e.g., "data ingestion", "data processing", "data transformation", "data analytics", or the like) and a stage name of each of the set of stages, which is to be added, may be inputted (e.g., provided or entered) by the users. Each of the selected set of stages may be included in or added to the data pipeline when the users define or provide the stage type and the stage name for a corresponding stage. The set of attributes (e.g., the stage type) for each of the selected set of stages corresponds to a set of operations to be executed at a corresponding stage for execution of the corresponding stage. A stage type and/or a stage name of each of the various stages is indicative of a set of operations to be executed at a corresponding stage. Each stage, of the selected set of stages, is associated with a set of operations that is to be performed in a corresponding stage, based on the corresponding set of attributes. The stage addition menu 1110 further enables the user (e.g., the plurality of users) to select/add data sources to the data pipeline. Based on the addition of the various stages, control is redirected to the UI screen 1100C.

Figure 11C:
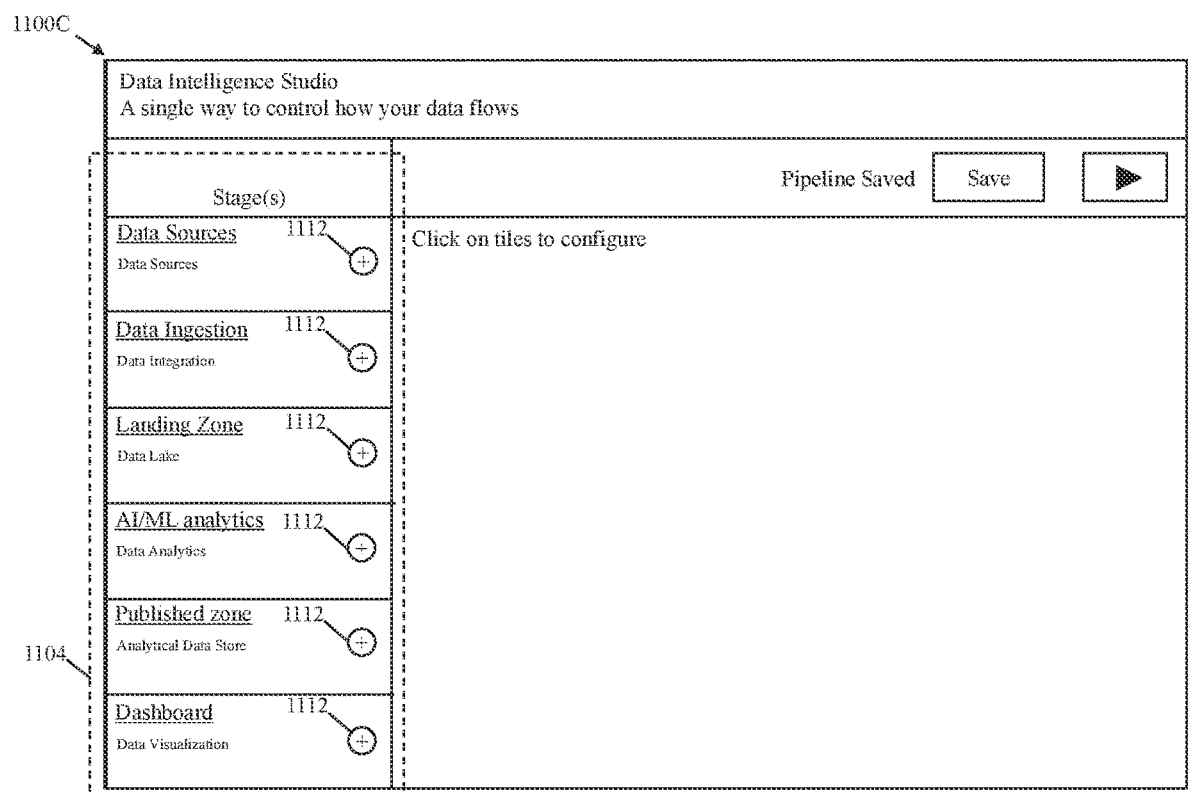

Referring now to FIG. 11C, the UI screen 1100C is shown to include the first sub-section 1104. The first sub-section 1104 indicates that the data pipeline includes the selected set of stages and a set of data sources. For the sake of brevity, "data sources" is not considered a separate stage of the data pipeline. However, in another embodiment, the data source may be considered as a stage in the data pipeline, and may be implemented like any other stage in the data pipeline. Each stage, of the data pipeline, is represented by a corresponding block (e.g., tile or node) which displays a stage type and a stage name of a corresponding stage. In a non-limiting example, the set of stages includes first through fifth stages. However, the selected set of stages may include additional stages or fewer stages, in the data pipeline, without deviating from the scope of the disclosure.

The first through fifth stages of the data pipeline are associated with first through fifth sets of operations, respectively. In a current embodiment, the data pipeline is shown to include a set of data sources ("Data Sources"). The first stage has a stage name "Data Ingestion" and a stage type "Data Integration". This indicates that a first set of operations (data integration) is associated with and is to be executed at the first stage. For the sake of brevity, the terms "data ingestion" and "data integration" are used interchangeably throughout the disclosure. The second stage has a stage name "Landing Zone" and a stage type "Data Lake". This indicates that a second set of operations (e.g., data storage) is associated with and is to be executed at the second stage. The third stage has a stage name "AI/ML analytics" and a stage type "Data analytics". This indicates that a third set of operations (e.g., Data analytics) is associated with and is to be executed at the third stage. The fourth stage has a stage name "Published zone" and a stage type "Analytical data Store". This indicates that a fourth set of operations (e.g., storage of results of data analytics) is associated with and executed at the fourth stage. The fifth stage has a stage name "Dashboard" and a stage type "Data visualization". This indicates that a fifth set of operations (e.g., data visualization) is associated with the fifth stage and is to be executed at the fifth stage. The addition (e.g., by the plurality of users) of the first through fifth stages of the data pipeline and addition or selection (e.g., by the plurality of users) of the stage type and the stage name for each of the first through fifth stages constitutes a selection, by a user (e.g., the plurality of users), of the first through fifth sets of operations to be performed at the first through fifth stages, respectively.

It will be apparent to those of skill in the art that the first through fifth stages presented on the UI screen 1100C are merely exemplary. In an actual implementation, the data pipeline may include any number of stages and any type of stage without deviating from the scope of the disclosure. For example, the data pipeline may further include a data transformation stage, a data monitoring stage, a data filtering stage, additional data ingestion stages, additional data storage stages, or the like.

The UI screen 1100C is further shown to include a second user-selectable option 1112 that enables a user (e.g., the plurality of users) to add (e.g., select) one or more technologies (e.g., tools) for executing each stage (e.g., the first through fifth stages) of the data pipeline. For each of the first through fifth stages of the data pipeline, the second user-selectable option 1112 enables a user to select one or more technologies, from a plurality of technologies available for executing a set of operations (e.g., the first through fifth sets of operations) associated with a corresponding stage. The second user-selectable option 1112 further enables the user (e.g., the plurality of users) to add data sources (e.g., data sources of various types) to the data pipeline.

A plurality of technologies, of the first plurality of technologies 114, may be available for execution of each of the plurality of stages available for inclusion in the data pipeline. A plurality of technologies, of the first plurality of technologies 114, may be available for the execution of each of the selected set of stages. For example, a second plurality of technologies, of the first plurality of technologies 114, may be available for the execution of the first stage (data ingestion stage). The second plurality of technologies may include various technologies available for executing the first set of operations associated with the first stage. In other words, the second plurality of technologies may include various technologies available for performing data ingestion. Similarly, a third plurality of technologies, of the first plurality of technologies 114, may be available for the execution of the second set of operations associated with the second stage.

The second plurality of technologies may include various technologies (e.g., data warehousing technologies, data lake technologies, data storage technologies, or the like) available for implementation of a data storage for data retrieved from a data source. Similarly, a fourth plurality of technologies, of the first plurality of technologies 114, may be available for the execution of the third set of operations associated with the third stage. The fourth plurality of technologies may include various technologies (e.g., analytics technologies or ML technologies) available for data analytics and/or implementation of ML models. Similarly, a fifth plurality of technologies, of the first plurality of technologies 114, may be available for the execution of the fourth set of operations associated with the fourth stage. For example, the fifth plurality of technologies may include various technologies available for storage of results of data analytics (e.g., results of the execution of the third set of operations). Similarly, a sixth plurality of technologies, of the first plurality of technologies 114, may be available for the execution of the fifth set of operations associated with the fifth stage. For example, the sixth plurality of technologies may include various technologies available for data visualization.

When the second user-selectable option 1112 is selected for any of the selected set of stages or is selected by the user, the plurality of technologies available for the execution of a corresponding stage (e.g., the execution of the set of operations associated with the corresponding stage) are presented. Similarly, when the second user-selectable option 1112 is selected for data source, a plurality of data sources (or data source types) may be presented for selection.

Figure 11D:
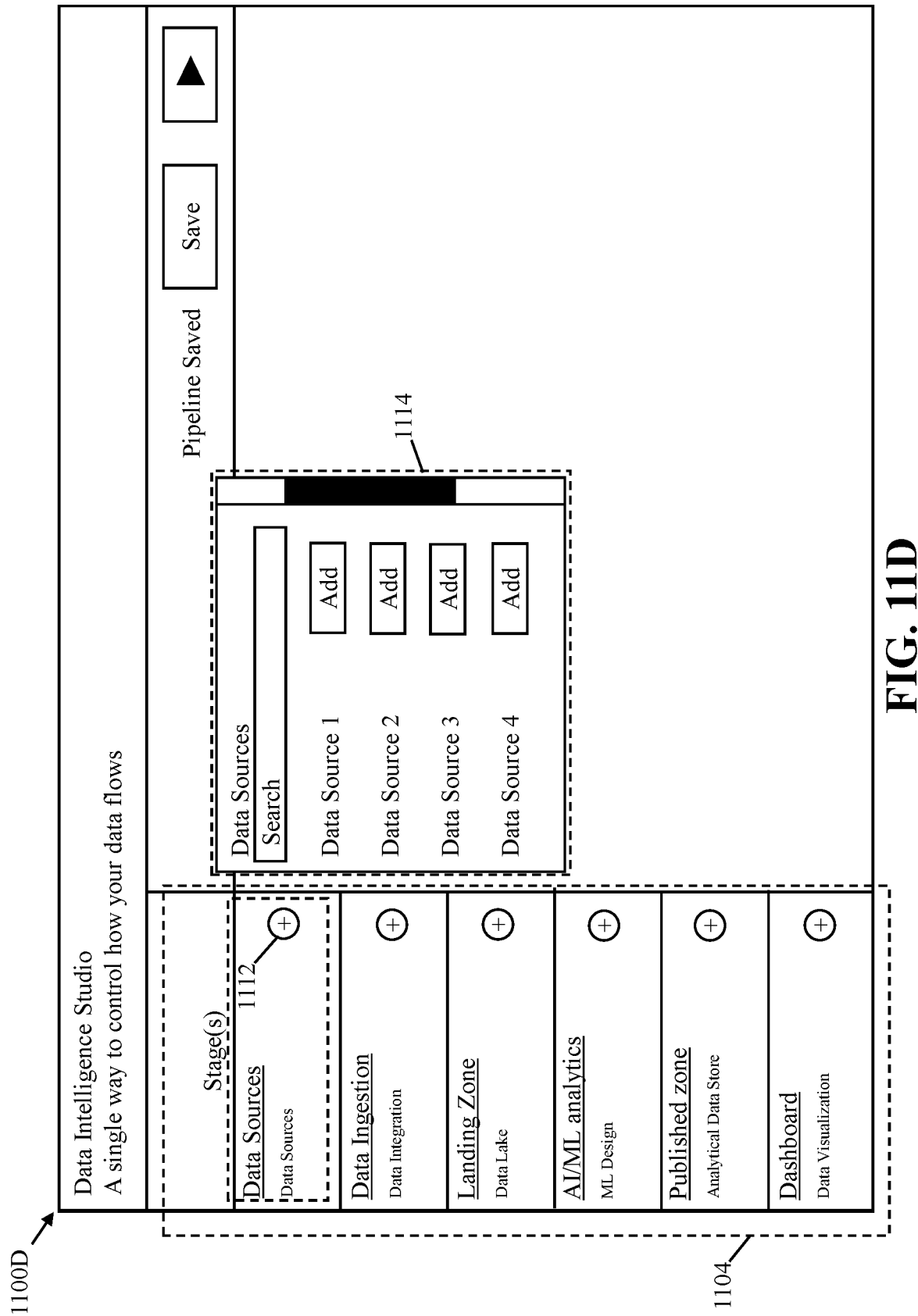

Referring now to the FIG. 11D, the UI screen 1100D is shown to include a first menu 1114 (e.g., a drop-down menu). The first menu 1114 may present a plurality of data sources (e.g., various types of data sources; "Data Source 1", "Data Source 2", "Data Source 3", and "Data Source 4") available for selection for the data pipeline. In a non-limiting example, the presented plurality of data sources may correspond to various types of data sources that were previously added or selected (e.g., by the user). However, the UI screen 1100D or the first menu 1114 may present one or more options (not shown) that enable addition of new types of data sources without deviating from the scope of the disclosure.

One or more data sources, of the plurality of data sources, may be selected (e.g., by the user) for addition to the data pipeline. In a non-limiting example, it is assumed that a first data source (e.g., "Data Source 1") is selected, from the plurality of data sources, by the user (e.g., the plurality of users) for the data pipeline. However, in another embodiment, multiple data sources (e.g., both "Data Source 1" and "Data Source 2"), from the plurality of data sources, may be selected for the data pipeline, without deviating from the scope of the disclosure. In other words, data for the data pipeline may be received from a single data source (e.g., the first data source) or multiple data sources. When multiple data sources are added/selected, each of the multiple data sources may correspond to different types (e.g., different types of data sources) or a same type without deviating from the scope of the disclosure.

Similarly, another menu (not shown) may display or present the second plurality of technologies, of the first plurality of technologies 114 (or the selected technology stack), available for implementation or execution of the first stage of the data pipeline. For the sake of brevity, the terms "implement", "execute", "implementation", and "execution" are used interchangeably throughout the disclosure. In one embodiment, the presented second plurality of technologies may be included in the selected technology stack. One or more technologies (e.g., a set of technologies) of the second plurality of technologies may be selected by the user for implementing the first stage of the data pipeline. In a non-limiting example, a first technology (e.g., the first technology 114a; a first data ingestion technology; "Data Ingestion Technology 1") may be selected (e.g., by the plurality of users) for implementing the first stage of the data pipeline. In other words, a single technology (e.g., the first data ingestion technology), of the second plurality of technologies, is selected for the implementing the first stage of the data pipeline. Multiple technologies may be selected, from the second plurality of technologies, for the execution of the first stage of the data pipeline. Similarly, one or more tools or technologies may be selected for each stage (e.g., the second through fifth stages) of the data pipeline, from the plurality of technologies available for the execution of a corresponding stage of the data pipeline. Based on the selections of tools or technologies for implementation of each of the first through fifth stages, the UI screen 1100E is rendered or displayed.

A first plurality of user actions, performed on the development stage view (e.g., the UI corresponding to the development stage view) for the creation and/or management of the data pipeline, include the selection (e.g., addition) of the first through fifth stages to be included in the data pipeline and the entry of the one or more attributes (e.g., stage name, stage type, or the like) for each of the first through fifth stages of the data pipeline. The first plurality of user actions may further include the addition/selection of the first data source for the data pipeline. The user action designer 202 may, based on the first plurality of user actions (performed on the UI corresponding to the development stage view), present the plurality of technologies available for implementation of each stage (e.g., available of execution of the set of operations associated with each stage of the data pipeline).

For example, the user action designer 202 may present the second plurality of technologies, of the first plurality of technologies 114, available for the execution of the first set of operations (e.g., data ingestion) that is associated with the first stage of the data pipeline. Similarly, the user action designer 202 may present the third plurality of technologies, of the first plurality of technologies 114, available for the execution of the second set of operations (e.g., data storage in a data lake) that is associated with the second stage of the data pipeline. Similarly, the user action designer 202 may present the fourth plurality of technologies, of the first plurality of technologies 114, available for the execution of the third set of operations (e.g., data analytics operations) that is associated with the third stage of the data pipeline.

Similarly, the user action designer 202 may present the fifth plurality of technologies, of the first plurality of technologies 114, available for the execution of the fourth set of operations (e.g., data analysis or data analytics) that is associated with the fourth stage of the data pipeline. Similarly, the user action designer 202 may present the sixth plurality of technologies, of the first plurality of technologies 114, available for the execution of the fifth set of operations (e.g., data visualization) that is associated with the fifth stage of the data pipeline. Therefore, the second through sixth pluralities of technologies are presented by the user action designer 202 for the execution of the first through fifth sets of operations, respectively. Each of the second through sixth pluralities of technologies may include two or more technologies that are available for execution of a respective set of operations of the first through fifth sets of operations.

In a non-limiting example, it is assumed that the first technology (e.g., the first technology 114a; "Data ingestion Technology 1"), of the second plurality of technologies, is selected (e.g., by the plurality of users) for the execution of the first set of operations. Similarly, a second technology (e.g., the second technology 114b; the first data lake technology "Data Lake Technology 1"), of the third plurality of technologies 114, is selected (e.g., by the plurality of users) for the execution of the second set of operations.

Similarly, a third technology (e.g., the third technology 114c; a first data analytics technology "Data Analytics Technology 1"), of the fourth plurality of technologies, is selected (e.g., by the plurality of users) for the execution of the third set of operations. A fourth technology (e.g., the fourth technology 114d; a first analytics data store technology "Analytics Data Store Technology 1"), of the fifth plurality of technologies, is selected (e.g., by the plurality of users) for the execution of the fourth set of operations. A fifth technology (e.g., the fifth technology 114e; a first data visualization technology "Data Visualization Technology 1"), of the sixth plurality of technologies, is selected (e.g., by the plurality of users) for the execution of the fifth set of operations.

The first plurality of user actions, recorded by the user action designer 202, may further include the selection of the first through fifth technologies 114a-114e selected by the user (e.g., the plurality of users) for the execution of the first through fifth sets of operations, respectively. The user action designer 202 may record the first plurality of user actions performed on UI screens that correspond to the development stage view (e.g., the UI screens 1100A-1100J). Therefore, the first plurality of user actions are indicative of the selection of the first through fifth stages to be included in the data pipeline, the selection of the first through fifth technologies 114a-114e for the execution of the first through fifth stages, the selection of the first data source for the data pipeline, and the input (e.g., the entry) of the set of properties of the first data source.

The user action designer 202 may, based on the first plurality of user actions, generate a pipeline definition for the data pipeline. The pipeline definition may be indicative of the first through fifth stages, the technology selected for the execution of each of the first through fifth stages (e.g., the first through fifth technologies), the first data source, and the set of properties of the first data source.

Figure 11E:
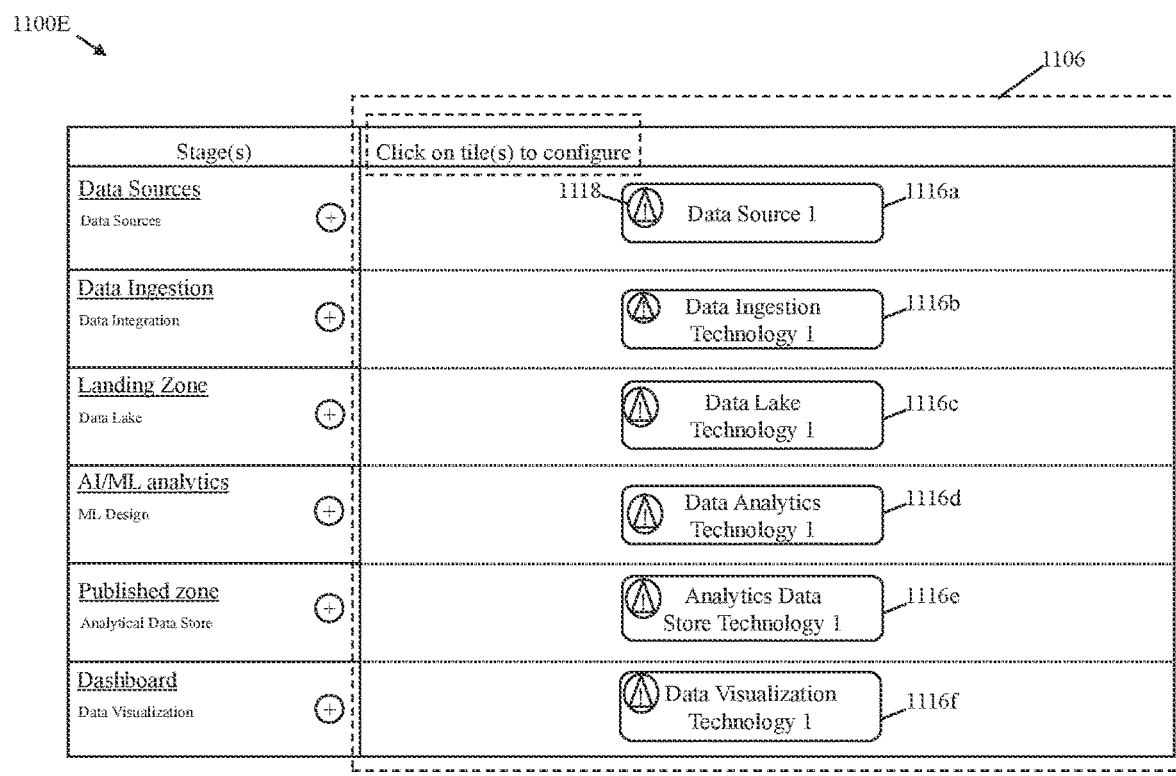

Referring now to FIG. 11E, the UI screen 1100E is shown to present or display a plurality of tiles in the second sub-section 1106. The plurality of tiles are indicative of the first data source and the set of technologies (e.g., the first through fifth technologies 114a-114e) selected by the user (e.g., the plurality of users) for the execution of the first through fifth stages of the data pipeline (e.g., for the execution of the first through sixth sets of operations), respectively. Each of the selected first data source and the selected first through fifth technologies 114a-114e is represented as a tile. For the sake of brevity, the terms "tile" and "node" are used interchangeably throughout the disclosure.

In the current embodiment, based on the selection of the first data source (e.g., "Data Source 1"), a first tile 1116a is presented (e.g., by the user action designer 202) in the second sub-section 1106. Examples of the first data source include, but are not limited to, CSV files, a relational database (e.g., MySql, Oracle Database, or the like), a non-relational database (e.g., MongoDB, Apache Cassandra, Redis, or the like), an FTP server, a REST API or the like. Similarly, second through sixth tiles 1116b-1116f are presented (e.g., by the user action designer 202) in the second sub-section 1106. For example, the second tile 1116b indicates that the first technology 114a (e.g., the first data ingestion technology "Data Ingestion Technology 1") is selected for executing the first stage of the data pipeline. Examples of the first data ingestion technology may include, but are not limited to, Hadoop, Databricks, Nifi, or the like. Similarly, the third tile 1116c indicates that the second technology 114b (e.g., the first data lake technology "Data Lake Technology 1") is selected for executing the second stage of the data pipeline. Examples of the first data lake technology ("Data Lake Technology 1") may include, but are not limited to, Snowflake, AWS, Microsoft Azure, Google Cloud, or the like.

Similarly, the fourth tile 1116d indicates that the third technology 114c (e.g., the first data analytics technology "Data Analytics Technology 1") is selected for executing the third stage of the data pipeline. Examples of the first data analytics technology may include, but are not limited to, Jupyter Lab, R Studio, or the like. Similarly, the fifth tile 1116e indicates that the fourth technology 114d (e.g., the first analytics data store technology "Analytics Technology Data Store Technology 1") is selected for executing the fourth stage of the data pipeline. Examples of the first analytics data store technology may include, but are not limited to, R Studio, JupyterLab, or the like. Similarly, the sixth tile 1116f indicates that the fifth technology 114e (e.g., the first data visualization technology "Data Visualization Technology 1") is selected for implementing the fifth stage of the data pipeline. Examples of the first data visualization technology may include, but are not limited to, Metabase, Tableau, Microsoft Power BI, or the like.

In some embodiments, each of the first through fifth stages may include one or more substages. Each substage may be representative of one or more operations to be selected at a corresponding substage. For example, a stage in the data pipeline (e.g., the data ingestion stage or the first stage) may include a plurality of substages. In a non-limiting example, the plurality of substages may include a first substage (e.g., an extraction substage), a second substage (e.g., an transformation substage), and a third substage (e.g., a loading substage). In such a scenario, each of the first through third substages corresponds one or more operations of a set of operations that corresponds to the respective stage (e.g., the second stage) of the data pipeline. In a non-limiting example, the second set of operations (e.g., data ingestion) may include a first operation (e.g., extraction), a second operation (e.g., transformation), and a third operation. (e.g., loading). In such a scenario, the first through third substages may correspond to the first through third operations, respectively, of the second set of operations. Each of the first through third substages may be added to the data pipeline through the first user-selectable option 1108 or a different user-selectable option (not shown). Addition of a new substage, selection of a stage type for a corresponding substage, and selection of a stage name for the corresponding substage may be similar to process described in the foregoing for addition of a new stage, selection of a stage name and a stage type for the new stage. Each substage may be treated as a separate stage that corresponds to a separate set of operations. Therefore, a technology, tool, and/or service may be selected (e.g., by the plurality of users) for each stage for execution of a corresponding set of operations. In one embodiment, a single technology may be selected for each substage. In another embodiment, a different technology, of the plurality of technologies 114, may be selected for each of the plurality of substages for execution of a corresponding operation/set of operations. Therefore, process of addition of a substage and selection of a technology for execution of a set of operations that corresponds to the substage is similar to/same as that for addition of a stage and selection of a technology for execution of a set of operations that corresponds to the stage.

In order to avoid obscuring the disclosure, it has been assumed that each of the first through fifth stages of the data pipeline is executed by a single technology. In a scenario, where any of the first through fifth stages includes a set of substages, one or more technologies may be selected for execution of operations that correspond to the set of substages without deviating from the scope of the disclosure. Therefore, each substage may be treated as a separate stage.

Each of the first through sixth tiles 1116a-1116f is currently shown to include a corresponding warning/attention symbol 1118 to indicate a requirement to configure a corresponding data source, tool, or technology. For example, the warning/attention symbol 1118 included in the first tile 1116a may indicate that a path and/or permission to access required data in the first data source is yet to be configured. In one embodiment, clicking on any of the first through sixth tiles 1116a-1116f may trigger an opening of a menu that allows for configuration (e.g., input or entry of execution parameters) of a corresponding data source, tool, and/or technology. Upon configuration (e.g., entry of execution parameters) or deployment of a technology for a stage, the warning/attention symbol displayed on a corresponding tile may disappear indicating a correct configuration or deployment of the technology. For the sake of brevity, the terms "execution parameters" and the "configuration parameter"" are used interchangeably throughout the disclosure.

Deployment of the first through fifth technologies 114a-114e for implementation of the first through fifth stages is explained in conjunction with FIGS. 13A-13C. For the sake of brevity, it is assumed in the current embodiment, that the first through fifth technologies 114a-114e, selected for executing the first through sixth sets of operations, that correspond to the first through fifth stages of the data pipeline are already deployed.

The user action designer 202 may enable the user (e.g., the plurality of users) to access a configuration menu to configure the first data source and each of the first through fifth technologies 114a-114e for the execution of the first through fifth sets of operations. In other words, the user action designer 202 enables the user to provide or input a set of configuration parameters for each of the first through fifth technologies 114a-114e for the execution of the first through fifth sets operations, respectively.

Configuration parameters may refer to a set of inputs or parameters to be provided to a technology (e.g., the first data ingestion technology) for execution of a corresponding set of operations (e.g., data ingestion parameters) by the technology.

For example, the user action designer 202 may enable the user to input (e.g., enter or provide), by way of the UI for the development stage 216c, a first set of configuration parameters for the first technology (e.g., to configure the first technology 114a to execute the first set of operations). The first set of configuration parameters may be provided by the user by way of the UI for the development stage 216c. Similarly, the user action designer 202 may enable the user to input, by way of the UI for the development stage 216c, second through fifth sets of configuration parameters for configuration of the second through fifth technologies 114a-

114*e* for the execution of the second through fifth sets of operations, respectively. The first plurality of user actions, recorded by the user action designer 202, may further include the input (e.g., the provision) of the first through fifth sets of configuration parameters for the execution of the first through fifth sets of operations by the first through fifth technologies 114*a*-114*e*.

Figure 11F:
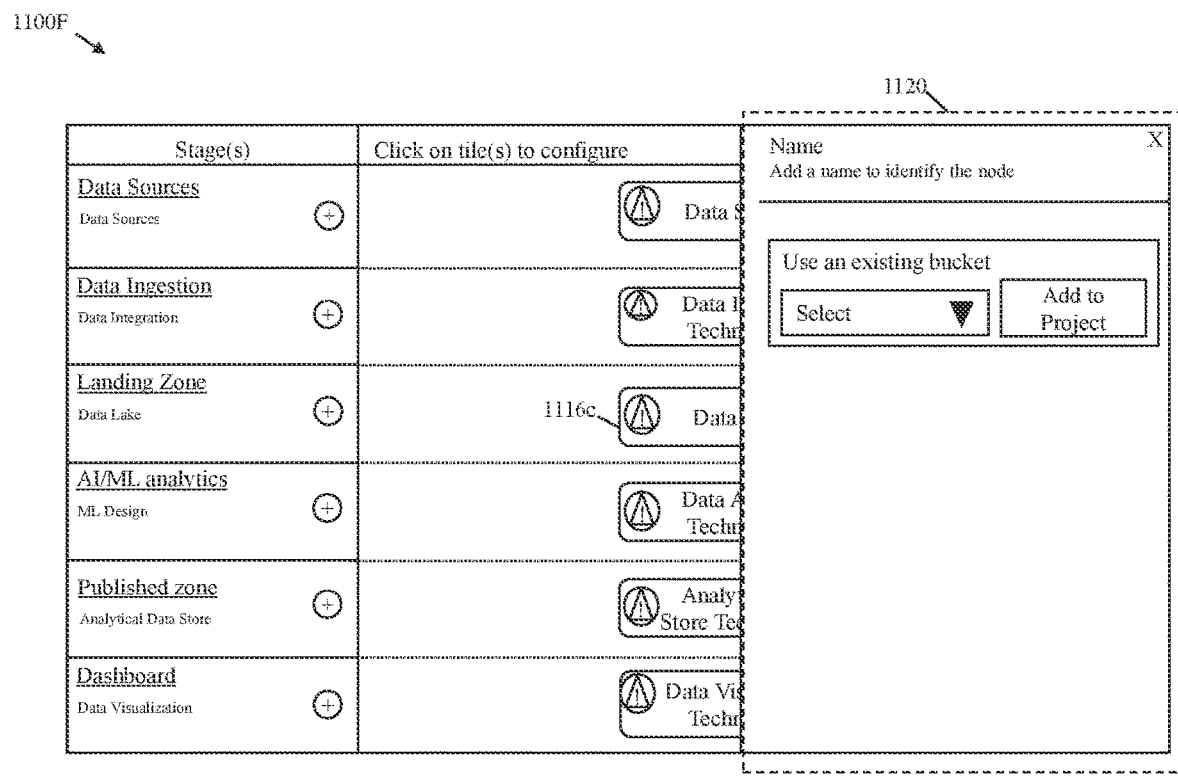

Referring now to FIG. 11F, the UI screen 1100F is shown to present (e.g., display) a first configuration menu 1120 for configuring a technology that is selected for one of the selected set of stages for the data pipeline. In a non-limiting example, the first configuration menu 1120 may correspond to (e.g., may enable) configuration of the second technology 114*b* (e.g., the first data lake technology "Data Lake technology 1") that is selected for the second stage of the data pipeline. The first configuration menu 1120 may enable the user to configure the first data lake technology as required for the execution of the second set of operations associated with the second stage of the data pipeline. In other words, the first configuration menu 1120 may enable the user to provide the second set of configuration parameters for the configuration of the first data lake technology (e.g., configuration of the first data lake technology for storage).

For the sake of brevity, the first configuration menu 1120 is shown to include an option to select an existing bucket (e.g., a target storage location) for storing data at the second technology 114*b* (e.g., the first data lake technology "Data Lake technology 1"). In one embodiment, an existing bucket at the second technology 114*b* may be selected for storing data. In a non-limiting example, the data to be stored may correspond to data received from a previous stage (e.g., the first data ingestion technology "Data Ingestion Technology 1" that corresponds to the first stage) of the data pipeline. Therefore, the second set of configuration parameters for the execution of the second set of operations (e.g., data storage) may be provided by selecting the existing bucket at the second technology 114*b*. In other words, the second set of configuration parameters may include various attributes or properties of the existing bucket (e.g., a bucket ID of the existing bucket, a URL associated with the existing bucket, or the like).

In another embodiment, the first configuration menu 1120 may further include one or more options to create a new bucket at the second technology 114*b* (e.g., the first data lake technology "Data Lake technology 1"). In such a scenario, the first set of configuration parameters may include attributes or properties of the new bucket that is to be created. Examples of the attributes or the properties of the new bucket may include, but are not limited to, a schema associated with the new bucket, an amount of space to be allocated by the second technology 114*b* for the new bucket, or the like.

Figure 11G:
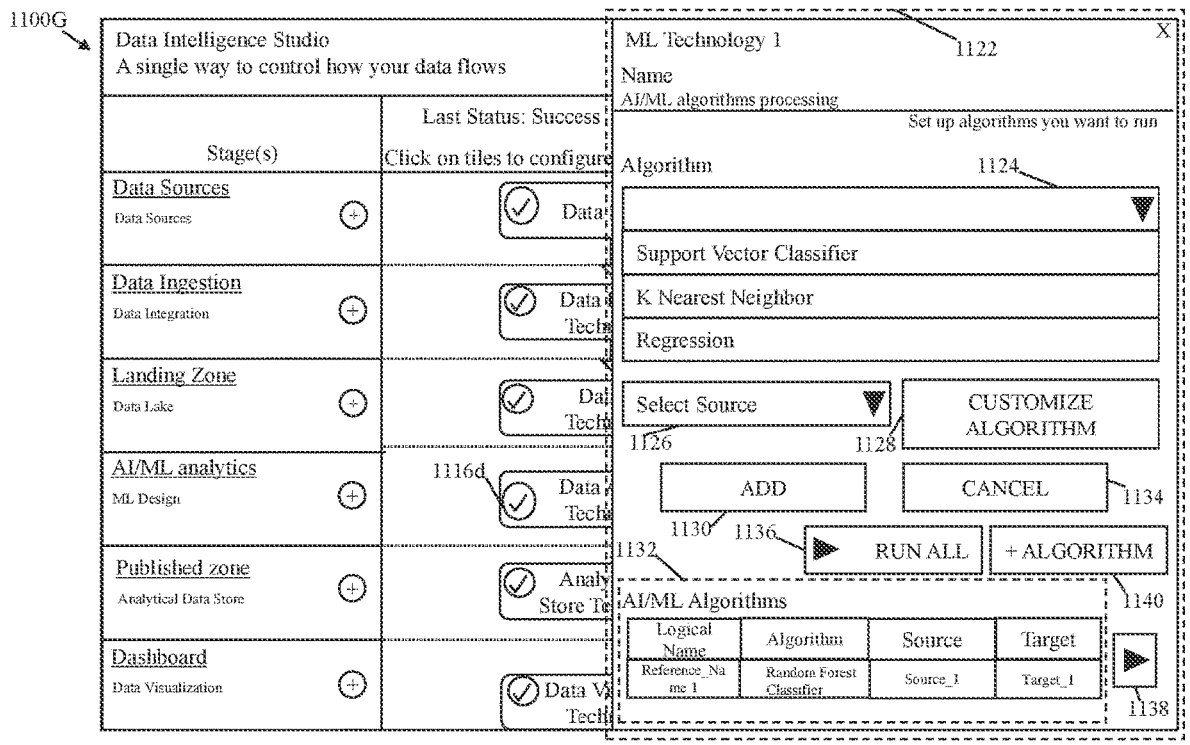

Referring now to FIG. 11G, the UI screen 1100G is shown to present a second configuration menu 1122. The second configuration menu 1122 may be presented when the fourth tile 1116*d* is selected by the user to configure the third technology 114*c* (e.g., the first data analytics technology "Data Analytics Technology 1"), which corresponds to the third stage, to execute the third set of operations. In a non-limiting example, the second configuration menu 1122 includes one or more options to input (e.g., select or specify) an ML algorithm (e.g., out-of-the-box ML algorithms or custom ML algorithms) to be used for training a machine learning model to analyze data stored at the target storage location at the first data lake technology. In a non-limiting example, an ML algorithm may be selected by the plurality of users from a second drop-down menu 1124 that includes multiple user-selectable options such that each user-selectable option is indicative of an ML algorithm (e.g., "Support Vector Classifier", "K Nearest Neighbor", "Regression", or the like) available for selection. The second configuration menu 1122 further enables selection of a source (e.g., the target storage location) of data which is to be analyzed, by way of a third drop-down menu 1126.

The second configuration menu 1122 further presents a third user-selectable option 1128 (e.g., "CUSTOMIZE ALGORITHM") that enables the plurality of users to customize a selected ML algorithm selected by way of the second drop-down menu 1124. The second configuration menu 1122 further presents a fourth user-selectable option 1130 (e.g., "ADD") to add the selected ML algorithm to a list 1132 that includes a set of ML algorithms to be incorporated in the data pipeline. The second configuration menu 1122 further presents a fifth user-selectable option 1134 (e.g., "CANCEL") to discard user inputs received by way of the second configuration menu 1122. The second configuration menu 1122 further presents a fifth user-selectable option 1136 (e.g., "RUN ALL") to execute each ML algorithm included in the list 1132. The second configuration menu 1122 may further include a "play" button, corresponding to each ML algorithm included in the list 1132, for execution thereof. For example, the play button 1138 is shown corresponding to the list 1132 that includes selected ML algorithm "Random Forest Classifier".

The second configuration menu 1122 further includes a sixth user-selectable option 1140 for adding a new ML algorithm to the list 1132. The third set of execution parameters may be provided (e.g., by the plurality of users) by way of the second configuration menu 1122 (e.g., by selection of options included in the second configuration menu 1122). The third set of execution parameters for the execution of the third set of operations by the third technology 114*c* may include each ML algorithm to be executed in the data pipeline, a set of customization parameters provided by the plurality of users for customization of each ML algorithm, or the like. In other words, selection of any option (e.g., user-selectable option) in the second configuration menu 1122 generates one or more execution parameters, of the third set of execution parameters, for the execution of the third set of operations by the third technology 114*c*.

Figure 11H:
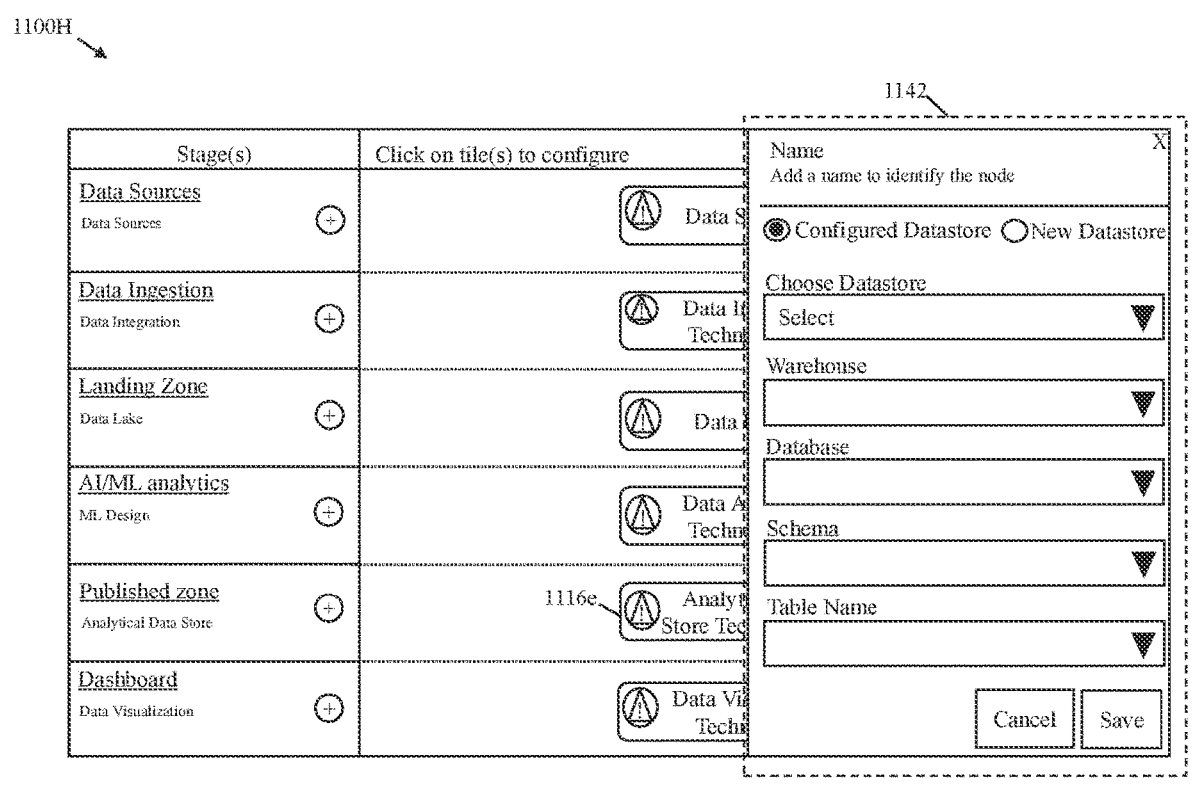

Referring now to FIG. 11H, the UI screen 1100H is shown to present a third configuration menu 1142. The third configuration menu 1142 may be displayed when the fifth tile 1116*e* is selected by the user to configure the fourth technology 114*d* (e.g., the first analytics data store technology "Analytics Data Store Technology 1") for the execution of the fourth set of operations that is associate with the fourth stage of the data pipeline. As described in the foregoing, the fourth stage of the data pipeline corresponds to a publishing stage for storing results of analytics (e.g., results of the third set of operations; a set of key-performance indicators or KPIs derived based on the analytics) executed in the third stage of the data pipeline. The third configuration menu 1142 includes options to select an already-configured datastore (e.g., existing datastore) or create a new datastore for storing the results of the analytics. In a non-limiting example, based on a selection by the user to use an already-configured datastore, the third configuration menu 1142 provides options to enable selection of a datastore (e.g., a first data store from a plurality data stores associated with the service application 112 at the fourth technology), selection of a data warehouse, selection of a database, selection of a schema for storing the results, input of a name for a table for storing the results, or the like.

The fourth set of configuration parameters for the configuration of the fourth technology 114*d* for the execution of the fourth set of may include various attributes (e.g., a datastore name, a data warehouse ID of a data warehouse associated with the datastore, a database ID of a database associated with the datastore, a schema of a table for storing the results of the analytics, or the like) of the already-configured datastore. In a scenario, where the option to create the new datastore is selected, a similar set of configuration parameters may be provided by the user. In other words, selection of any option (e.g., user-selectable option) or entry of any data in the third configuration menu 1142 corresponds to input of one or more configuration parameters of the fourth set of configuration parameters.

It will be apparent to those of skill in the art that similar configuration menus may be presented for configuration of each technology (e.g., the first technology 114*a*, the fifth technology 114*e*, or the like) selected for the execution of other stages (e.g., the first stage, the fifth stage, or the like) included in the data pipeline. For example, another configuration menu for the configuration of the first data ingestion technology (e.g., the first technology 114*a*) selected for the execution of the first stage of the data pipeline. Similarly, another configuration menu for the configuration of the first data visualization technology (e.g., the fifth technology 114*e*) selected for the execution of the fifth stage of the data pipeline. The configuration menu for the configuration of the first data visualization technology may enable the user to input the fifth set of configuration parameters. For example, the fifth set of configuration parameters may include (e.g., may be indicative) details of a set of dashboards (e.g., graphs, pie charts, scatter plots, or the like) to be generated, dimensions for the generation of the set of dashboards, or the like.

It will be apparent to those of skill in the art that options shown to be included in the first, second, and third configuration menus 1120, 1122, and 1142 are merely exemplary. Numerous options may be included in a configuration menu for each tile (e.g., the first through sixth tiles 1116*a*-1116*f*), based on a stage associated with a corresponding tile and a technology selected for a corresponding stage.

Another menu may be presented to the user to enable the user to input a set of properties of each data source. For example, a menu (not shown) may be presented to the user for enabling the user to input the set of properties of the first data source. Examples of the set of properties of the first data source may include (e.g., is indicative of), but are not limited to, a type of the first data source, the location of the first data source, a set of credentials for accessing the first data source, or the like. The type of the first data source may be indicative of a format associated with the first data source. For example, the type of the first data source may correspond to a relational database, a non-relational database, CSV files, an FTP server, a REST endpoint, or the like. In a non-limiting example, it is assumed that the first data source is a relational database (e.g., a MySQL database). However, in another embodiment, the type of the first data source may vary without deviating from the scope of the disclosure.

The location of the first data source may include an address associated with the first data source. For example, the location of the first data source may include an IP address of a server that stores the first data source, a file location of the first database server within the server, or the like. In other words, the location of the first data source may include various details (e.g., a URL) that uniquely identifies an address of the first data source. In one embodiment, access to data sources (e.g., the first data source) may be restricted.

For example, the first data source may be password-protected, requiring any user or any technology (e.g., the first data ingestion technology) to provide a password to access a corresponding data source. The credentials for accessing the first data source may include a set of usernames and/or passwords required for accessing the first data source. The set of properties of the first data source, for the data pipeline, may include (e.g., may be indicative of) other properties without deviating from the scope of the disclosure. For example, the set of properties of the first data source, inputted by the user on the UI that corresponds to the development stage view, may further include details of a proxy server associated with the first data source, or the like.

The UI (e.g., the UI screens 1100A-1100J) that corresponds to the development stage view enables the user to define a data flow logic for the data pipeline. In other words, a sequence in which operations (e.g., the first through fifth sets of operations) associated with various stages of the pipeline are to be executed may be defined/selected. In a non-limiting example, a flow of data (e.g., the data flow logic) between tiles (e.g., between technologies; the first through fifth technologies 114*a*-114*e*) included in different stages (e.g., the first through fifth stages) of the data pipeline may be configured by drawing arrows between the tiles (e.g., the first through fifth tiles 1116*a*-1116*f*). For example, an arrow may be drawn from the first tile 1116*a* to the second tile 1116*b*, and indicating that data is to flow from the first data source to the first data ingestion technology. In other words, the arrow indicates that the data included in the first data source is to be ingested by the first data ingestion technology. Similarly, another arrow may be drawn from the second tile 1116*b* to the third tile 1116*c*, indicating that data is to flow from the first data ingestion technology that corresponds to the first stage of the data pipeline to the first data lake technology that corresponds to the second stage of the data pipeline.

Such association between the second tile 1116*b* and the third tile 1116*c* may be indicative of flow of a result (e.g., output) of the first set of operations performed at the first stage as an input to the second set of operations to be performed at the second stage. In other words, direction of arrows between tiles (e.g., the first through sixth tiles 1116*a*-1116*f*) indicates a direction of flow of data (e.g., the data flow logic). In a non-limiting example, it is assumed that the data flow logic for the data pipeline indicates that the first through fifth sets of operations are to be executed in this sequence. In other words, the data flow logic for the data pipeline may indicate that the first set of operations is executed based on the data included in the first data source, and that the second set of operations is to be executed after the first set of operations, Similarly, the third set of operations is to be executed after the second set of operations. Similarly, the fourth set of operations is to be executed after the third set of operations. Similarly, fifth set of operations is to be executed after the fourth set of operations.

In a current embodiment, it is assumed that connections (e.g., arrows) are manually drawn, by the user, between the tiles (e.g., the first through sixth tiles 1116*a*-1116*e*) to define the data flow logic for the data pipeline. However, other methods may be used for defining the data flow logic without deviating from the scope of the disclosure. For example, one or more options (e.g., user-selectable options; not shown) may be presented to the user on the UI to enable the user to define the data flow logic.

The first plurality of user actions recorded by the user action designer 202, for the creation of the data pipeline, may further include user actions (e.g., the drawing of arrows between the first through sixth tiles 1116a-1116f) performed in the UI for the definition of the data flow logic.

Figure 11I:
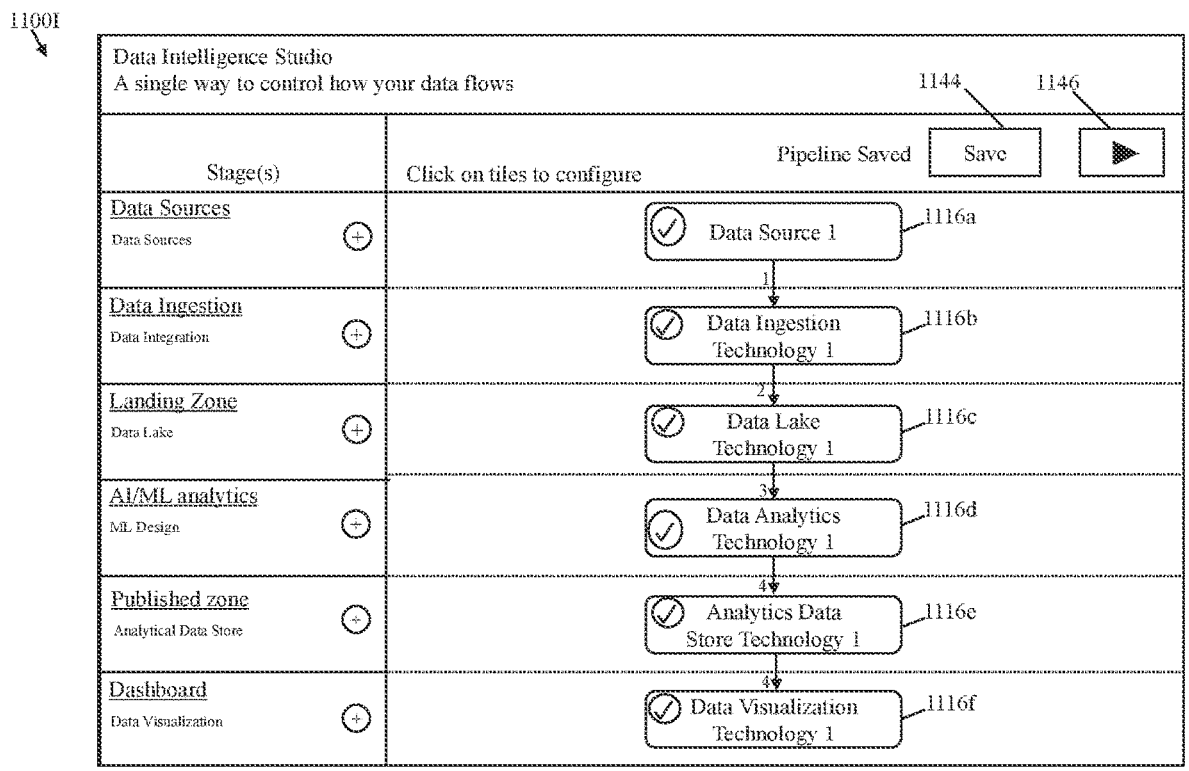

Referring now to FIG. 11I, the UI screen 1100I is shown to include the direction of flow of data between the first through sixth stages (e.g., between the first through sixth tiles 1116a-1116f).

The user action designer 202 may generate a pipeline definition for the data pipeline. The pipeline definition may be generated based on metadata associated with the first plurality of user actions.

Each of the first plurality of user actions performed by the user on the UI (e.g., the UI screens 1100A-1100I) triggers generation of corresponding metadata (e.g., first metadata) by the user action designer 202. In other words, the user action designer 202 generates first metadata, based on the first plurality of user actions. The generated first metadata may capture each interaction of the user with the UI screens 1100A-1100I (e.g., the development stage view on the service application 112). The generated first metadata is associated with (e.g., corresponds to) the selection of the first data source, the selection (e.g., the addition) of the set of stages (e.g., the first through fifth stages) for the data pipeline, and the selection of the first through fifth technologies 114a-114e for the execution of the first through fifth sets of operations associated with the first through fifth stages. The generated first metadata is further associated with the input of the first through fifth sets of configuration parameters (e.g., the input of the first through fifth sets of configuration parameters), the input of the set of properties of the first data source, or the like.

The user action designer 202 may generate the pipeline definition for the data pipeline based on the first metadata. The first metadata is indicative of the pipeline definition. The pipeline definition for the data pipeline may be indicative of the selected set of stages, the set of operations (e.g., the first through fifth sets of operations) associated with each of the selected set of stages, the one or more technologies (e.g., the first through fifth technologies 114a-114e) selected for the execution of each of the selected set of stages, or the set of configuration/execution parameters (e.g., the first through fifth sets of configuration parameters) for each selected technology. The pipeline definition may further be indicative of data sources (e.g., the first data source) for the data pipeline, the data flow logic for the data pipeline, the set of operations (e.g., the first through fifth sets of operations) associated with each of the selected with the set of stages, or the like. The pipeline definition may include a plurality of parameters (e.g., information) that completely define the data pipeline designed/created by the user using the UI (e.g., the UI screens 1100I-1100I) that corresponds to the development stage view. The user action designer 202 may store, in the user action catalog 203, the first metadata associated with the pipeline definition.

Any action (e.g., the first plurality of user actions) performed on the UI (e.g., the UI screens) may cause the user action designer 202 to update the pipeline definition for the data pipeline. For example, the user action designer 202 may generate the pipeline definition based on the selection of the set of stages (e.g., the first through fifth stages) for the data pipeline. The user action designer 202 may update the pipeline definition based on the selection of the one or more technologies (e.g., the first through fifth technologies 114a-114e) for each of the selected set of stages. In other words, the first metadata associated with the pipeline definition may be updated, by the user action designer 202, based on the selection of the one or more technologies for each of the selected set of stages. The updated metadata may be indicative of the selection of the one or more technologies for each of the selected set of stages. Similarly, the first metadata may be further updated, by the user action designer 202, based on the selection of the first data source and the input of the set of properties of the first data source. Similarly, the first metadata may be further updated, by the user action designer 202, based on the first through fifth sets of configuration parameters inputted or provided by the user. Similarly, the first metadata may be further updated, by the user action designer 202, based on the data flow logic defined by the user.

It will be apparent to those of skill in the art that the first metadata and, thereby, the pipeline definition for the data pipeline are dynamically updated by the user action designer 202 based on user actions performed by the user. Any or every action performed by the user for design, re-designing, configuring, and/or re-configuring the data pipeline may be reflected in the pipeline definition and corresponding second metadata associated with the pipeline definition.

Figure 12:
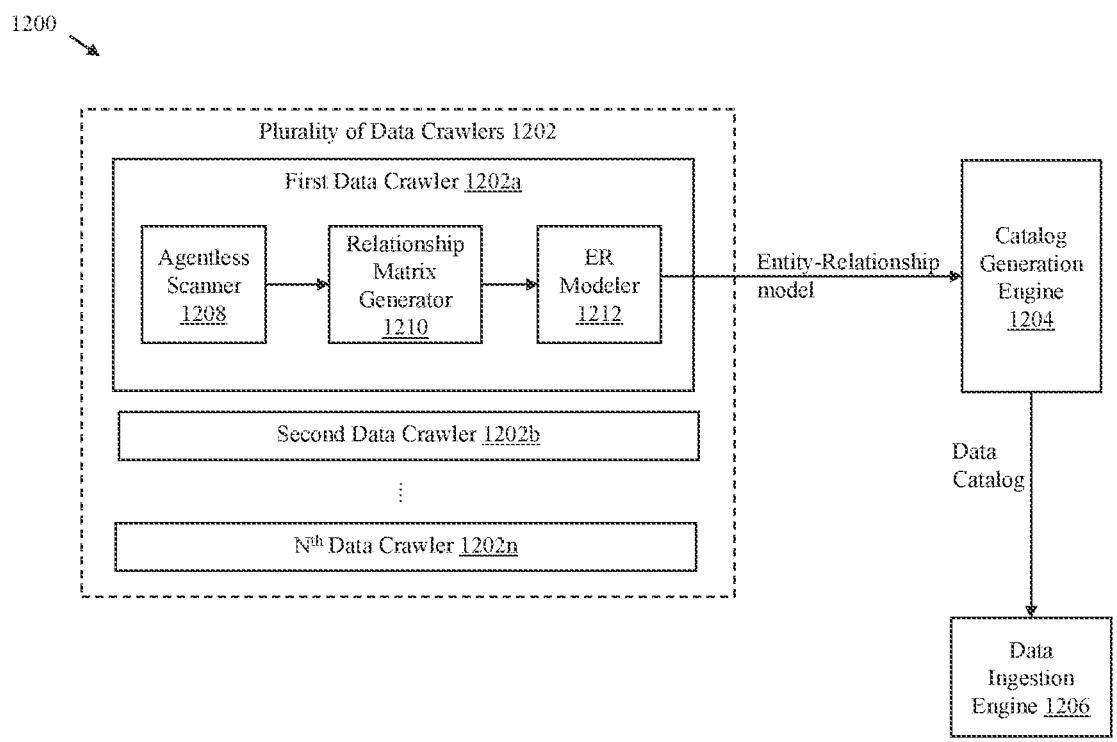
FIG. 12 is a block diagram that illustrates generation of data catalogs and usage of data catalogs in a data pipeline, in accordance with an exemplary embodiment of the present disclosure.

FIG. 12 is a block diagram 1200 that illustrates generation of data catalogs and usage of data catalogs in the data pipeline, in accordance with an exemplary embodiment of the present disclosure. FIG. 12 is an extension of the architecture 200, of the service application 112, shown in FIGS. 2A and 2B. The architecture 200 of the service application 112 may further include first through $n^{th}$ data crawlers 1202a-1202n, a catalog generation engine 1204, and a data ingestion engine 1206. The first through $n^{th}$ data crawlers 1202a-1202n are collectively designated and referred to as "plurality of data crawlers 1202". The plurality of data crawlers 1202, the catalog generation engine 1204, and the data ingestion engine 1206 may be communicably coupled to the user action designer 202, the user action catalog 203, the user action script compiler 204, and the orchestrator 206.

The plurality of data crawlers 1202 include various data crawlers that are configured to crawl various types of data sources. For example, the plurality of data crawlers 1202 may include data crawlers for crawling relational databases, non-relational databases, data associated with FTP servers, data associated with REST endpoints, CSV files, or the like. In a non-limiting example, it is assumed that each of the plurality of data crawlers 1202 is suited for crawling a specific type of data source. For example, the first data crawler 1202a of the plurality of data crawlers 1202 may be configured to crawl relational databases (e.g., MySQL, Oracle Database, or the like). Similarly, the second data crawler 1202b may be configured to crawl non-relational databases (e.g., Couchbase, MongoDB, Apache Cassandra, or the like). However, in another embodiment, a single data crawler may exist in lieu of multiple data crawlers (e.g., the plurality of data crawlers 1202). In such a scenario, the data crawler (e.g., the single data crawler) may be configured to crawl all types of data sources.

Based on a selection of a data source (e.g., the first data source) for the data pipeline, one of the plurality of data crawlers 1202, may be selected for crawling the data source. In a non-limiting example, the user action designer 202 may select a data crawler, of the plurality of data crawlers 1202, for crawling the selected data source (e.g., the first data source). The user action designer 202 may select the data crawler, based on the first metadata that is indicative of the type (e.g., relational database) of the selected data source. For example, the user action designer 202 may select, from the plurality of data crawlers 1202, the first data crawler 1202a for crawling the first data source. The user action designer 202 may select the first data crawler 1202 for crawling the first data source, based on the first metadata that is indicative of the type of the first data source. In a non-limiting example, the user action designer 202 may determine that the first metadata that is indicative of the set of properties of the first data source indicates that the first data source is a relational database (e.g., a MySQL database). Consequently, the user action designer 202 may select the first data crawler 1202a, from the plurality of data crawlers 1202, for crawling the first data source. The user action designer 202 may provide, to the selected first data crawler 1202a, the location of the first data source and the set of credentials for accessing the first data source. The first data crawler 1202a may access the first data source, based on the set of credentials and the location of the first data source.

The first data crawler 1202a is shown to include an agentless scanner 1208, a relationship matrix generator 1210, and an entity-relationship (ER) modeler 1212. The agentless scanner 1208 is configured to scan a data source (e.g., the first data source) accessed by the first data crawler 1202a. For example, upon access of the first data source by the first data crawler 1202a, the agentless scanner 1208 may scan data included in/associated with the first data source. Based on the scanning by the agentless scanner 1208 of the data included in the first data source, the relationship matrix generator 1210 may determine (e.g., discover) various entities and various attributes included in the scanned data. For example, the relationship matrix generator 1210 may determine that the data included in the first data source includes a first plurality of entities and a first plurality of attributes. In a non-limiting example, each entity, of the first plurality of entities, may refer to a separate (e.g., standalone) dataset such as a table in MySQL, a sheet in a CSV file, or the like.

Each entity may include a plurality of attributes and plurality of attribute values for the plurality of attributes. An attribute may refer to a feature, characteristic, or a property associated with a corresponding entity. Each attribute in an entity may be associated with various attribute values for the entity. For example, if the data included in the first data source is a table that stores various datasets of a company. For example, a first entity in the first data source may correspond to a first table that stores employee data of employees of the company. A second entity in the first data source may correspond to a second table that stores payroll data for employees of the company. The first entity may include a plurality of attributes such as, but not limited to, a first name of each employee, a last name of each employee, an address of each employee, or the like. The plurality of attributes included in the first entity may each include a plurality of attribute values. Similarly, the second entity may include a plurality of attributes such as, but not limited to, the first name of each employee, the last name of each employee, a designation of each employee, a fixed salary component for each employee, a variable salary component for each employee, or the like. The plurality of attributes included in the second entity may each include a plurality of attribute values. Entities, attributes, and attribute values are well known to those of skill in the art and are not described in detail to avoid obscuring the disclosure.

In some embodiments, a data source (e.g., the first data source) may include or may be associated with an underlying metadata management system. The underlying metadata management system may store, therein or in a memory associated therewith, metadata associated with the data (e.g., the first plurality of entities and the first plurality of attributes) stored in the data source. The metadata may be indicative of a schema of the data stored in the data source.

In such a scenario, the relationship matrix generator 1210 may integrate with the metadata management of the data source for determining or inferring the schema associated with the data source.

However, in another embodiment, a data source may not include or may not be associated with an underlying metadata management system. In such a scenario, the relationship matrix generator 1210 may determine or infer the schema associated with the data source, based on scanning of the data source by the agentless scanner 1208. The relationship matrix generator 1210 may discover or determine the first plurality of entities and the first plurality of attributes included in the first data source. The relationship matrix generator 1210 may further discover or determine a first plurality of relationships between the first plurality of entities and a plurality of attributes included in each of the first plurality of entities. The relationship matrix generator 1210 may further determine or infer a first schema associated with the first data source. Based on the determined first plurality of entities, the first plurality of attributes, the first plurality of relationships, and the first schema, the ER modeler 1212 may generate a first ER model.

The ER modeler 1212 may be indicative of the first plurality of entities, the first plurality of attributes, the first plurality of relationships, and the first schema. The ER modeler 1212 may communicate the first ER model to the user action designer 202. In other words, the ER modeler 1212 may communicate third metadata, associated with the first ER model, to the user action designer 202. The user action designer 202 may present the first ER model on the UI (not shown). ER models are well known to those of ordinary skill in the art, and detailed explanation of the first ER model is avoided for the sake of brevity.

The plurality of data crawlers 1202 may be architecturally and functionally similar. It will be apparent to those of skill in the art that an architecture and a functionality of each of the second through $n^{th}$ data crawlers 1202b-1202n may be similar to that of the first data crawler 1202a.

Following the presentation of the first ER model, a second plurality of user actions may be performed on the UI by the user (e.g., the plurality of users) for selection of entities of interest and/or attributes of interest from the first ER model for the data pipeline. The second plurality of user actions may be performed for selection of a second plurality of entities from the first plurality of entities and selection of a second plurality of attributes from the first plurality of attributes. For example, if the first ER model indicates that the first data source includes "100" entities, the second plurality of user actions may be performed on the UI for selection of, for example, "50" entities from the "100" entities.

The second plurality of user actions may indicate that the second plurality of entities and the second plurality of attributes, of the first plurality of entities and the first plurality of attributes included in the first data source, are to be used for the data pipeline. In a non-limiting example, it is assumed that the second plurality of entities and the second plurality of attributes are selected as entities of interest and attributes of interest, respectively, However, in another embodiment, all entities and/or attributes included in the first data source (e.g., the first plurality of entities and the first plurality of attributes) may be selected by way of the second plurality of user actions, without deviating from the scope of the disclosure. In such a scenario, an entirety of data included in the first data source may be used for the data pipeline.

The user action designer 202 may record the second plurality of user actions that are indicative of the selection of the second plurality of data entities and the second plurality of attributes from the first ER model. The user action designer 202 may communicate, to the catalog generation engine 1204, the second metadata associated with the first ER model and third metadata associated with the second plurality of user actions. Based on the second metadata and the third metadata, catalog generation engine 1204 may generate a first data catalog. The first data catalog may correspond to a snapshot of the data included in the first data source. The first data catalog may include (e.g., may be indicative of) the second plurality of entities and the second plurality of attributes that are to be used for the data pipeline. The first data catalog may further include the attributes values for the second plurality of entities, a second schema associated with the first data catalog, a data type (e.g., string, Boolean, character, number, or the like) associated with each of the second plurality of attributes, or the like. In a non-limiting example, the first data catalog may not include entities or attributes that are not part of the selected second plurality of entities or the second plurality of attributes.

The first data catalog is indicative of a portion of the data, included in the first data source, that is to be used for executing operations (e.g., the first set of operations) in the data pipeline. The first data catalog may include all or a portion of the data included in the first data source. In the current embodiment, the first data catalog includes a portion (e.g., the second plurality of entities and the second plurality of attributes) of the data included in the first data source.

The catalog generation engine 1204 may communicate fourth metadata associated with the first data catalog to the data ingestion engine 1206. The fourth metadata may be indicative of the second plurality of entities included in the first data catalog, the second plurality of attributes included in the first data catalog, and a second plurality of relationships between the second plurality of entities. The fourth metadata may be further indicative of the attribute values for the second plurality of attributes, the second schema of the first data catalog, or the like.

The data ingestion engine 1206 may, based on the first metadata associated with the pipeline definition of the data pipeline, identify a schema at the target storage location at the second technology 114b (e.g., the first data lake technology "Data Lake Technology 1"). If the first metadata, which is indicative of the second set of configuration parameters, indicates that a new data bucket is to be created at the target storage location, the data ingestion engine 1206 may identify/determine a schema to be created at the target storage location. The identification (or determination) of the schema that is to be created at the target storage location may be based on the second set of configuration parameters indicated by the first metadata.

If the first metadata indicates that an existing data bucket at the target storage location is to be used for the data pipeline, the data ingestion engine 1206 may communicate a query to a corresponding technology (e.g., the first data lake technology) to identify/determine the schema at the target storage location. The identification of the schema at the target storage location may be based on a query response from the corresponding technology. For the sake of brevity, hereinafter the schema at the target storage location is designated and referred to as "third schema".

The data ingestion engine 1206 may determine whether the second schema of the first data catalog matches the third schema. In other words, the data ingestion engine 1206 may determine whether the second schema is same as the third schema or is different from the third schema. If the data ingestion engine 1206 determines that the second schema and the third schema do not match, the data ingestion engine 1206 may determine a set of data transformations that need to be performed on the data (e.g., the second plurality of entities and the second plurality of attributes), from the first data catalog, prior to storage in the target storage location. If the data ingestion engine 1206 determines that the first schema and the second schema match (e.g., the second schema is same as the third schema), the data ingestion engine 1206 may determine that no data transformations are needed to be performed on the data included in the first data catalog prior to the storage in the target storage location.

The data ingestion engine 1206 may further assess or determine a quality of the data included in the first data catalog. In other words, the data ingestion engine 1206 may determine, whether the data in the first data catalog meets a set of predetermined quality standards. For example, the data ingestion engine 1206 may determine whether any data values (e.g., the attribute values for the second plurality of attributes) are missing or corrupt. An attribute value for an attribute (e.g., the second plurality of attributes) may be determined to be corrupt if, for example, the attribute value exceeds falls out of a data range, a data format of the attribute value is different from a data format associated with the attribute, or the like. For example, if an attribute (e.g., first name of employee) associated with a string-type data format has an attribute value that is a number, the data ingestion engine 1206 may determine that the attribute value for the attribute is corrupt. Similarly, if an attribute (e.g., fixed salary component of employee) associated with a data range (e.g., "30,000$" to "1,000,000$") has an attribute value (e.g., "$200") that is outside of the data range, the data ingestion engine 1206 may determine that the attribute value is corrupt. It will be apparent to those of skill in the art that above-mentioned examples are not exhaustive. In an actual implementation, other criteria may be used for determining whether data values (e.g., attribute values) are corrupt without deviating from the scope of the disclosure.

In a non-limiting example, an attribute value for an attribute (e.g., of the second plurality of attributes) may be determined to be missing if the attribute value is empty or nonexistent. For example, if a value (attribute value) of fixed salary component (e.g., attribute) is blank or missing for an employee, the data ingestion engine 1206 may determine that there are missing attribute values or data values in the first data catalog. For the sake of brevity, the terms "data values" and "attribute values" are used interchangeably throughout the disclosure.

Based on the determined quality of data included in the first data catalog (e.g., based on a quality of the second plurality of attributes), the data ingestion engine 1206 may determine whether the determined quality is less than a predetermined threshold. The predetermined threshold may be one of a predetermined threshold count or a predetermined threshold ratio. For example, the data ingestion engine 1206 may determine whether a count of missing or corrupted data values in the first data catalog is less than a predetermined threshold count (e.g., "200"). Alternatively, the data ingestion engine 1206 may determine whether a ratio of "the count of missing or corrupted data values in the first data catalog" to "a total count of data values in the first data catalog" is less than a predetermined threshold ratio. In a non-limiting example, the predetermined threshold ratio may be equal to "0.05". In such a scenario, the data ingestion engine 1206 may determine whether the ratio (e.g., ""10"" ""10.00""=""0.0"") of the count of the missing or the corrupted data values in the first data catalog (e.g., "100") to the total count of the data values in the first data catalog (e.g., "10,000") is less than the predetermined threshold ratio (e.g., "0.05"). In other words, the data ingestion engine 1206 may determine that the determined quality is greater than the predetermined threshold.

If the data ingestion engine 1206 determines that the ratio (e.g., ""0.0"") of the count of the missing or the corrupted data values in the first data catalog to the total count of the data values in the first data catalog is less than the predetermined threshold ratio (e.g., "0.05"), the data ingestion engine 1206 may modify the first data catalog. In other words, if the data ingestion engine 1206 determines that the determined quality is greater than the predetermined threshold, the data ingestion engine 1206 may modify the first data catalog. The data ingestion 1206 modifies the first data catalog based on the determination that the quality (e.g. the quality of the second plurality of attributes is greater than the predetermined threshold). The modification of the first data catalog may be based on a set of modification rules (e.g., predetermined set of modification rules). In a non-limiting example, the set of modification rules may be indicative of a set of default attribute values that may be used for replacement of missing or corrupt data values. Based on the set of modification rules, attribute values that are determined to be missing or corrupt may be corrected (e.g., fixed) or rejected from the first data catalog.

In a non-limiting example, it is assumed that the determined quality of the set of attributes is greater than the predetermined threshold quality. Further, it is assumed for the sake of brevity that there are no missing or corrupt data values in the first data catalog. The data ingestion engine 1206 may communicate the fifth metadata to the user action designer 202. The fifth metadata may be indicative of the set of data transformations to be performed or executed, by the first data ingestion technology, on the data in the first data catalog prior to storage at the target storage location in the first data lake technology that is selected for the execution of the second stage of the data pipeline.

The user action designer 202 may update the pipeline definition for the data pipeline based on the fourth metadata associated with the first data catalog and the fifth metadata associated with the determined set of data transformations. In other words, the first metadata associated with the pipeline definition may be updated to indicate the second plurality of entities and the second plurality of attributes that are to be used for the data pipeline, the second plurality of relationships between the second plurality of entities and/or the second plurality of attributes, the second schema, the determined set of data transformations, or the like.

Further, the user action catalog 203 may store, therein, the first metadata associated with the first plurality of user actions, the second metadata associated with the pipeline definition, the third metadata associated with the ER model, the fourth metadata associated with the second plurality of user actions, the fifth metadata associated with the first data catalog, the sixth metadata associated with the determined set of data transformations, or the like.

Figure 13:
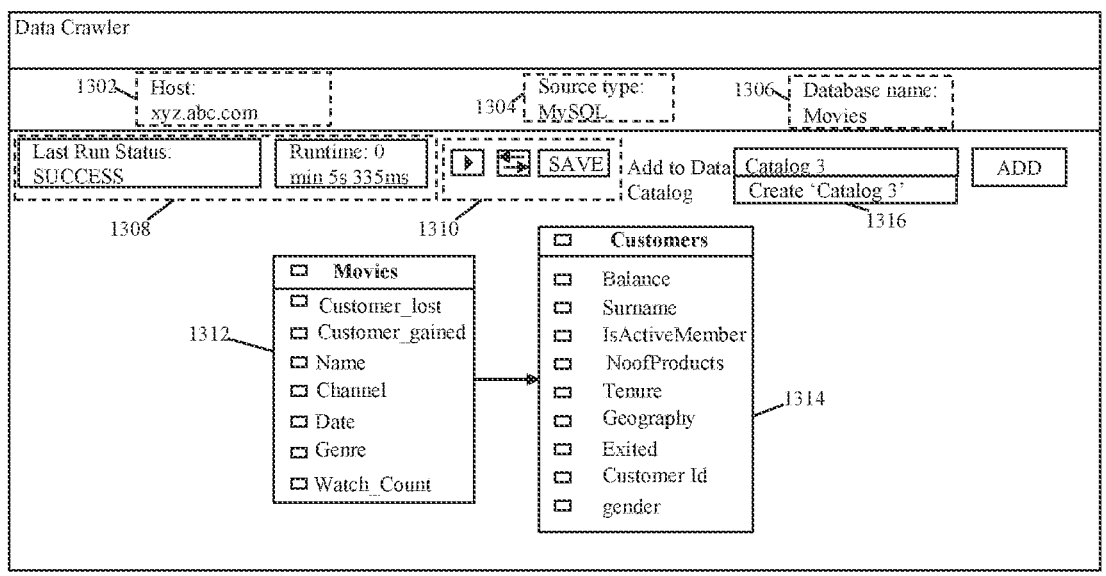
FIG. 13 illustrates a UI screen rendered by the service application on the first user device to present an output of a data crawler of FIG. 12, in accordance with an exemplary embodiment of the present disclosure.

FIG. 13 illustrates a UI screen 1300 rendered by the service application 112 on the first user device 102a to present an output of a data crawler, in accordance with an exemplary embodiment of the present disclosure. The data crawler may correspond to the first data crawler 1202a. The UI screen 1300 may be present based on (e.g., following) the generation of the first data catalog.

The UI screen 1300 presents a graphical representation of the first ER model. The first ER model shown in FIG. 13 is merely exemplary. In actual implementation, the first ER model may vary without deviating from the scope of the disclosure. The UI screen 1300 is shown to include a first section 1302 that presents the location of the first data source (e.g., "xyz.abc.com") that is crawled by the first data crawler 1202a. Further, the UI screen 1300 is shown to include a second section 1304 that presents the type (e.g., "MySQL") of the first data source. The UI screen 1300 is further shown to include a third section 1306 that presents a database name of a database (e.g., "Movies") included in the data source. The UI screen 1300 is further shown to include a fourth section 1308 that presents details associated with an operation of the first data crawler 1202a while crawling the data source. The details associated with the operation may include, but are not limited to, a status of the operation (e.g., "Last run status" or a timestamp associated with a time-instance when the first data source was last crawled), an execution time (e.g., "Runtime" or a duration for which the first data source was crawled) of the operation, or the like. The status of operation may indicate whether the first data source is successfully crawled, whether the crawling of the first data source is in progress, whether the crawling of the first data source has failed, or the like.

The UI screen 1300 is further shown to include a fifth section 1310 that presents a set of user-selectable options. The set of user-selectable options may enable the plurality of users to pause the operation of the first data crawler 1202a, resume the operation of the first data crawler 1202a, save an output of the first data crawler 1202a, or apply a set of filters (not shown) to the data crawled by the first data crawler 1202a. The UI screen 1300 is shown to present the first ER model that includes the first plurality of entities and the first plurality of attributes. In a non-limiting example, the first plurality of entities are shown to include only two entities (e.g., "Movies" 1312 and "Customers" 1314) to avoid obscuring the drawings. However, in an actual implementation the first plurality of entities may include a larger number of entities (e.g., tens of entities, hundreds of entities, thousands of entities, or the like) without deviating from the scope of the disclosure. Each entity may include a plurality of attributes. For example, a first entity (e.g., "Movies" 1312) of the first plurality of entities may include various attributes (e.g., "Customer_lost", "Cutomer_gained", "Name", "Channel", "Date", "Genre", "Watch_Count", or the like). Similarly, a second entity (e.g., "Customers" 1314) of the first plurality of entities may include various attributes (e.g., "Balance", "Surname", "Geography", "Gender", or the like). The various attributes that are included in the first entity and the second entity may collectively constitute the first plurality of entities.

Entities and attributes of interest (e.g., the second plurality of entities and the second plurality of attributes) may be selected from the first plurality of entities and the first plurality of attributes presented on the UI screen 1300. In a non-limiting example, both the first entity and the second entity may be selected as entities of interest and all attributes included in the first plurality of attributes may be selected as attributes of interest (e.g., the second plurality of attributes). However, in an actual implementation, it is not necessary that each entity included in the first plurality of entities is selected as an entity of interest. Similarly, it is not necessary that each attribute included in the first plurality of attributes is selected by the user as an attribute of interest.

The UI screen 1300 is further shown to include a drop-down menu 1316. The drop-down menu 1316 may include, therein, a plurality of user-selectable options (e.g., "Create Catalog", "Add to existing catalog", or the like) that enable the plurality of users to add the selected one selected second plurality of entities and the selected second plurality of attributes to a new data catalog (e.g., the first data catalog) or an existing data catalog. In a non-limiting example, based on the selection by the user to add the second plurality of entities and the second plurality of attributes to a new data catalog, the first data catalog may be generated.

Referring back to FIG. 11I, the UI screen 1100I is further shown to include seventh and eighth user-selectable options 1144 (e.g., "Save") and 1146 (e.g., Play button) that enable saving of the pipeline definition and execution of the data pipeline, respectively. In some embodiments, technologies selected for the execution of the set of stages in the data pipeline (e.g., each technology included in the data pipeline) may be deployed prior to execution. Deployment of technologies or microservices is explained in conjunction with FIGS. 17, 18, 19A-19H, 20, 21A-21B, 22, 23, and 24A-24B. To initiate execution of the data pipeline, the eighth user-selectable option 1146 may be selected by the user.

The execution of the data pipeline is explained in conjunction with FIG. 12.

The user action script compiler 204 may generate one or more user action scripts (e.g., a set of user action scripts). In a non-limiting example, it is assumed that a single user action script (e.g., a first user action script) is generated by the user action script compiler 204. The first user action script may be generated based on the second metadata that is stored in the user action catalog 203 and indicative of the pipeline definition. Therefore, the generated first user action script may be indicative of the pipeline definition for the data pipeline. The first user action script may be indicative of the selected set of stages (e.g., the first through fifth stages) included in the data pipeline, the set of operations (e.g., the first through fifth sets of operations) associated with each of the selected set of stages, the technology (e.g., the first through fifth technologies 114a-114e) selected for the execution of the selected set of stages, and the set of configuration parameters (e.g., the first through fifth sets of configuration parameters) for each technology.

The first user action script may be generated further based on the fourth metadata associated with the first data catalog and the fifth metadata associated with the set of data transformations. Therefore, the generated first user action script may further be indicative of the second pluralities of entities, the second pluralities of attributes, and the attribute values for the second plurality of attributes that need to be used for the data pipeline (e.g., the first stage of the data pipeline). The first user action script may further be indicative of the first set of data transformations that need to be performed on the data, ingested from the first data catalog, prior to storage at the target storage location. The first user action script may conform to a format or a language (e.g., the proprietary language) that is compatible with the service application 112.

The orchestrator 206 may receive the first user action script from the user action script compiler 204. The orchestrator 206 may analyze the first user action script to determine stages included in the data pipeline, the set of operations associated with each stage in the data pipeline, the sequence of the execution of the first through fifth sets of operations, and the set of configuration parameters for each selected technology for execution of a corresponding stage. In a non-limiting example, the orchestrator 206 may determine that the first user action script indicates that the first through fifth sets of operations are to be performed at the first through fifth stages by the selected first through fifth technologies 114a-114e based on the first through fifth sets of configuration parameters, respectively.

Further, the orchestrator 206 may identify or determine a gentech script generator, of the plurality of gentech script generators 208, mapped to each of the first through fifth technologies 114a-114e. In a non-limiting example, the orchestrator 206 may identify that the first through fifth gentech script generators 208a-208e are mapped to the first through fifth technologies 114a-114e, respectively. Based on the identification of the first gentech script generator 208a that is mapped to the first technology 114a, the orchestrator 206 may communicate a first section of the first user action script to the first gentech script generator 208a. The first section of the first user action script may be indicative of the first set of operations to be executed and the first set of configuration parameters for the execution of the first set of operations. The first section of the first user action script may be further indicative of the set of properties of the first data source, the sixth metadata associated with first data catalog, and the set of data transformations.

The first gentech script generator 208a may receive the first section of the first user action script. The first gentech script generator 208a may convert the first section of the first user action script into a first set of gentech scripts. In other words, the first gentech script generator 208a may generate the first set of gentech scripts based on the first section of the first user action script. The first set of gentech scripts may correspond to a format and/or a language that is technology-agnostic with respect to the first plurality of technologies available for the execution of the first stage (e.g., the first of operations) of the data pipeline. The first set of gentech scripts may be indicative of the first set of operations to be executed at the first stage, the first set of configuration parameters, the fifth metadata associated with the first data catalog, the set of properties of the first data source, and the set of data transformations. The first gentech script generator 208a may communicate the first set of gentech scripts to the orchestrator 206.

The orchestrator 206 may identify or determine a technology-specific interpreter, of the plurality of technology-specific interpreters 210, that is mapped to the first technology 114a (e.g., the first data ingestion technology). In a non-limiting example, the orchestrator 206 may identify that the first technology-specific interpreter 210a is mapped to the first technology 114a. Based on the identification of the first technology-specific interpreter 210a, the orchestrator 206 may communicate the first set of gentech scripts to the first technology-specific interpreter 210a.

The first technology-specific interpreter 210a may convert the first set of gentech scripts into a first set of technology-specific scripts that is compatible with the first data ingestion technology. In other words, the first technology-specific interpreter 210a may, based on the first set of gentech scripts, generate the first set of technology-specific scripts that is in a format that is compatible with and specific to the first data ingestion technology (e.g., the first technology 114a). The first set of technology-specific scripts may be indicative of the first set of operations to be executed, the first set of configuration parameters, the set of properties of the first data source, and the set of data transformations.

The first technology-specific interpreter 210a may communicate the first set of technology-specific scripts to the first technology 114a (e.g., the first technology server 104a that hosts the first technology 114a). For example, based on the first set of technology-specific scripts, the first technology-specific interpreter 210a may generate/perform one or more API calls (e.g., "Data Ingestion Technology 1"-specific API calls) for fetching data from the first data source ("Data Source 1") and providing the fetched data to the second technology 114b. The first technology 114a (e.g., the first data ingestion technology "Data Ingestion Technology 1") may initiate the execution of the first set of operations to transfer data, included in the first data catalog, from the first data source to the target storage location. Based on the first set of technology-specific scripts, the first technology 114a may perform or execute the set of data transformations on the data included in the first data catalog and stores the transformed data at the target storage location to execute the first set of pipeline operations.

The first technology 114a (e.g., the first technology server 104a) may, based on the initiation of the execution of the first set of operations/the initiation of the execution of the first set of operations, communicate first progress data to the first technology-specific interpreter 210a. The first progress data may include, but is not limited to, an indication of a level of completion (e.g., "10%", "20%", "95%", "100%", or the like) of the execution of the first set of operations by the first technology 114a, an output of the execution of the first set of operations, or the like. The first progress data may further include a set of logs generated by the first technology 114a (e.g., the first data ingestion technology "First Data Ingestion Technology 1") during the execution of the first set of operations, a set of alerts generated by the first technology 114a during the execution of the first set of operations, and/or a set of errors generated by the first technology 114a during the execution of the first set of operations.

The first progress data may be received, by the first technology-specific interpreter 210a, in a format (e.g., technology-specific scripts) that is specific to the first technology 114a (e.g., the first data ingestion technology "Data Ingestion Technology 1"). In a non-limiting example, the first technology-specific interpreter 210a receives a second set of technology-specific scripts that is indicative of the first progress data. The first technology-specific interpreter 210a may convert the second set of technology-specific scripts to a second set of gentech scripts. The second set of gentech scripts may be technology-agnostic with respect to the second plurality of technologies (e.g., the second plurality of technologies available for the execution of the first set of operations). The second set of gentech scripts may be indicative of the first progress data. The first technology-specific interpreter 210a may communicate the second set of gentech scripts to the orchestrator 206. The orchestrator 206 may communicate the second set of gentech scripts to the first gentech script generator 208a of the plurality of gentech script generators 208. The first gentech script generator 208a may convert the received second set of gentech scripts into a second user action script. The second user action script is indicative of the first progress data and is in a format or language that is compatible with the service application 112. The first gentech script generator 208a may communicate the second user action script to the orchestrator 206.

In a non-limiting example, the first progress data indicated by the second user action script may indicate a successful and complete execution (e.g., "100%" completion) of the first set of operations by the selected first technology 114a (e.g., the first data ingestion technology). In such a scenario, the orchestrator 206 may communicate the second section of the first user action script to the second gentech script generator 208b that is mapped to (e.g., corresponds to) the selected second stage (e.g., the landing zone or the data lake) and the third plurality of technologies of the first plurality of technologies. Therefore, the second gentech script generator 208b may receive the second section of the first user action script. The second section of the first user action script may be indicative of the second set of operations and the second set of configuration parameters.

The second gentech script generator 208b may convert the second section of the second user action script into a third set of gentech scripts. In other words, the third gentech script generator 208c may generate the third set of gentech scripts based on the second section of the first user action script. The third set of gentech scripts may correspond to a format and/or a language that is technology-agnostic with respect to the third plurality of technologies available for the execution of the second stage (e.g., the second set of operations) of the data pipeline. The third set of gentech scripts may be indicative of the second set of operations to be executed at the second stage and the second set of configuration parameters. The second gentech script generator 208b may communicate the third set of gentech scripts to the orchestrator 206.

The orchestrator 206 may identify or determine a technology-specific interpreter, of the plurality of technology-specific interpreters 210, that is mapped to the second technology 114b (e.g., the first data lake technology). In a non-limiting example, the orchestrator 206 may identify that the second technology-specific interpreter 210b is mapped to the second technology 114b. Based on the identification of the second technology-specific interpreter 210b, the orchestrator 206 may communicate the third set of gentech scripts to the second technology-specific interpreter 210b.

The second technology-specific interpreter 210b may convert the third set of gentech scripts to a third set of technology-specific scripts that is compatible with the first data lake technology. In other words, the second technology-specific interpreter 210b may, based on the third set of gentech scripts, generate the third set of technology-specific scripts that is in a format that is compatible with and specific to the first data lake technology (e.g., the second technology 114b). The third set of technology-specific scripts may be indicative of the second set of operations to be executed and the second set of configuration parameters.

The second technology-specific interpreter 210b may communicate the third set of technology-specific scripts to the second technology 114b (e.g., the second technology server 104b that hosts the second technology 114b). For example, based on the third set of technology-specific scripts, the second technology-specific interpreter 210b may generate/perform one or more API calls (e.g., "Data Lake Technology 1"-specific API calls) for storing the data received from the first data ingestion technology. The second technology 114b (e.g., the first data lake technology "Data Lake Technology 1") may initiate the execution of the second set of operations for the storing of the data received from the first data ingestion technology, based on the third set of technology-specific scripts (e.g., the second set of configuration parameters indicated by the third set of technology-specific scripts). For example, the second technology 114b may store the received data at the target storage area, create a new bucket for storing the data, expand a size of an existing bucket for storing the data, or the like, based on the third set of technology-specific scripts.

The second technology 114b (e.g., the second technology server 104b) may, based on the execution of the second set of operations/the initiation of the execution of the second set of operations, communicate second progress data to the second technology-specific interpreter 210b. The second progress data may include, but is not limited to, an indication of a level of completion of the execution of the second set of operations by the second technology 114b, an output of the execution of the second set of operations, or the like. The second progress data may further include a set of logs generated by the second technology 114b (e.g., the first data lake technology "Data Lake Technology 1") during the execution of the second set of operations, a set of alerts generated by the second technology 114b during the execution of the second set of operations, and/or a set of errors generated by the second technology 114b during the execution of the second set of operations.

The second progress data may be received, by the second technology-specific interpreter 210b, in a format (e.g., technology-specific scripts) that is specific to the second technology 114b (e.g., the first data lake technology "Data Lake Technology 1"). In a non-limiting example, the second technology-specific interpreter 210b receives a fourth set of technology-specific scripts that is indicative of the second progress data. The first technology-specific interpreter 210a may convert the fourth set of technology-specific scripts to a fourth set of gentech scripts. The fourth set of gentech scripts may be technology-agnostic with respect to the third plurality of technologies (e.g., the third plurality of technologies available for the execution of the second set of operations). The fourth set of gentech scripts may be indicative of the second progress data. The second technology-specific interpreter 210b may communicate the fourth set of gentech scripts to the orchestrator 206. The orchestrator 206 may communicate the fourth set of gentech scripts to the second gentech script generator 208b of the plurality of gentech script generators 208. The second gentech script generator 208b may convert the received fourth set of gentech scripts into a third user action script. The third user action script is indicative of the second progress data and is in a format or language that is compatible with the service application 112. The first gentech script generator 208a may communicate the third user action script to the orchestrator 206.

Based on the second progress data indicated by the third user action script, the orchestrator 206 may communicate the third section of the first user action script to a gentech script generator (e.g., the third gentech script generator 208c) of the plurality of gentech script generators 208. It will be apparent to those of skill in the art that a set of gentech scripts (e.g., fifth set of gentech scripts) and a set of technology-specific scripts (e.g., a fifth set of technology-specific scripts) for the third technology 114c may be generated in a similar manner. The fifth set of gentech scripts and the fifth set of technology-specific scripts may be indicative of the third set of operations and the third set of configuration parameters. The fifth set of technology-specific scripts may be communicated to the third technology 114c (e.g., the first data analytics technology). The third technology 114c (e.g., the third technology server 104c that hosts the third technology 114c) may initiate the execution of the third set of operations based on the fifth set of technology-specific scripts. For example, the third technology 114c may generate a set of KPIs based on the analysis of the data stored in the target storage area. The third technology 114c may communicate the third progress data to the third technology-specific interpreter 210c. A fourth user action script may be generated based on the third progress data. Process of the generation of the fourth user action script may be similar to the process of the generation of the second and third user action scripts. Repetition of steps has been avoided to prevent obscuring of the disclosure. The fourth and fifth stages of the data pipeline may be executed by the fourth and fifth technologies 114d and 114e in a similar manner. The execution of the fourth through fifth sets of operations has not been described in order to avoid unnecessary repetition.

Figure 11J:
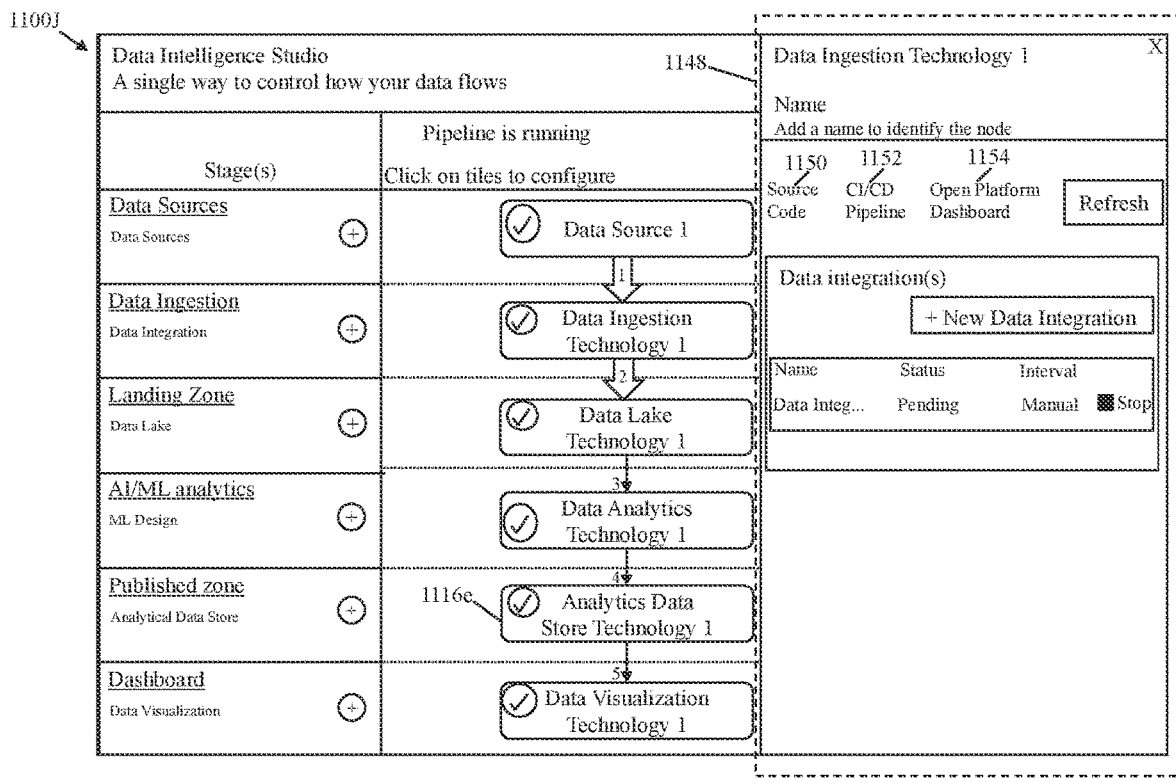

Referring now to FIG. 11J, the UI screen 1100) represents an in-execution state of the data pipeline (e.g., post-deployment execution). The UI screen 1100) is shown to include or present a fourth configuration menu 1148 that enables a user (e.g., the plurality of users) to view execution details of a technology, tool, or service that is included in the data pipeline. In a non-limiting example, the fourth configuration menu 1148 may correspond to the technology "Data Analytics Technology 1" that corresponds to the fifth tile 1116e and the fifth stage. The fourth configuration menu 1148 is shown to include ninth through eleventh user-selectable options 1150-1154 (e.g., "Source Code", "CI/CD Pipeline", and "Open Platform dashboard"). The ninth user-selectable option 1150 enables the user (e.g., the plurality of users) to view a source code (e.g., a repository that includes the source code) that is being executed for the technology "Data Analytics Technology 1". In one embodiment, the user may be allowed to make changes to the source code, following which the data pipeline may need to be re-deployed and re-executed.

The tenth user-selectable option 1152 enables the user to view a deployment pipeline (e.g., CI/CD pipeline) that corresponds to a deployment of the technology "Data Analytics Technology 1". In one embodiment, the user may be allowed to make changes to the CI/CD pipeline that corresponds to the deployment of the technology "Data Analytics Technology 1, following which the data pipeline may need to be re-deployed and re-executed. The eleventh user-selectable option 1154 enables the user to view a dashboard of the technology "Data Analytics Technology 1", allowing the user to observe the execution (e.g., input to "Data Analytics Technology 1", output of "Data Analytics Technology 1", operations performed by "Data Analytics Technology 1", or the like) of the technology "Data Analytics Technology 1" in the data pipeline.

The response converter 212 may receive the second and third user action scripts indicative of the second progress data and the third progress data, respectively. Similarly, the response converter 212 may receive fourth through sixth user action scripts. The fourth through sixth user action scripts may be indicative of the third progress data, fourth progress, and fifth progress data, respectively. The fourth progress data and the fifth progress data may be received from the fourth technology 114d (e.g., the first analytics data store technology) and the fifth technology 114e (e.g., the first data visualization technology), respectively. Generation of the fourth through sixth user action scripts may be similar to the generation of the second and third user action scripts.

The response converter 212 may convert the second through sixth user action scripts into first through fifth sets of user action responses. In other words, the response converter 212 may generate the first through fifth sets of user action responses based on the second through sixth user action scripts that are indicative of the first through fifth progress data, respectively. The first through fifth sets of user action responses may be indicative of the first through fifth progress data. The response converter 212 may communicate the first through fifth sets of user action responses to the user action designer 202. Based on the received first through fifth sets of user action responses (e.g., the first through fifth progress data indicated by the first through fifth sets of user action responses), the user action designer 202 may generate and present a set of visual indicators on the UI. In a non-limiting example, the user action designer 202 may present first through fifth sets of visual indicators on the UI.

Each of the first through fifth sets of visual indicators may include one or more visual elements (e.g., alerts, notifications, animations, or the like) indicative of a progress of execution and/or a result of a corresponding set of operations. For example, the first set of visual indicators may include a set of alerts indicative of the progress of the execution of the first set of operations. Similarly, the second set of visual indicators may include one or more notifications indicating that the second set of operations are successfully executed. Similarly, the third set of visual indicators may be indicative of the set of KPIs (e.g., a snapshot of the set of KPIs) derived from the analysis of the data stored in the target storage area. Similarly, the fourth set of visual indicators may include one or more notifications be indicative of successful storage of the set of KPIs at the fourth technology 114*d* (e.g., the first analytics data store technology). The fourth set of visual indicators may further include one or more snapshots of the KPIs stored at the first analytics data store technology. The fifth set of visual indicators may include one or more charts, graphs, or the like, (e.g., the set of dashboards) generated by the fifth technology 114*e* (e.g., the first data visualization technology) for the execution of the fifth set of operations.

It will be apparent to those of skill in the art that visual indicators that may be presented on the UI are not limited to above-mentioned examples. In some implementations, additional or different visual indicators may be presented without deviating from the scope of the disclosure.

In one embodiment, one or more stages of the data pipeline may be modified. For example, one or more technologies may be added, deleted, or replaced from a stage in the data pipeline (e.g., the first through fifth stages). In a non-limiting example, the first data ingestion technology (e.g., "Data Ingestion Technology 1") may be replaced by the second data ingestion technology platform (e.g., "Data ingestion Technology 2") of the second plurality of technology platforms (e.g., by one of the plurality of users). In other words, the selection of the first data ingestion technology for the execution of the first stage of the data pipeline may be changed to the second data ingestion technology. Therefore, a plurality of user actions performed on the UI and recorded by the user action designer 202 may be indicative of a selection of the first set of operations and the selection of the second data ingestion technology for the execution of the first set of operations. Based on a selection by the user (e.g., the plurality of users) of the second data ingestion technology platform to replace the first data ingestion technology platform and execute the first set of operations, user action designer 202 may modify or update the pipeline definition.

In one embodiment, another user action script (e.g., a fifth user action script) may be generated by the user action script compiler 204, based on the selection by the user of the second data ingestion technology. The fifth user action script may differ from the first user action script in that the fifth user script may be indicative of the selection of the second data ingestion technology for the execution of the first set of operations instead of the selection of the first data ingestion technology. Remaining portions/sections of the first user action script and the fifth user action script may be similar or same. In another embodiment, the user action script compiler 204 may, instead of generating the fifth user action script, modify the first user action script to indicate the selection of the second data ingestion technology for the execution of the first set of operations. For the sake of brevity, it is assumed that the first user action script is modified to indicate the selection of the second data ingestion technology.

Based on the modified first user action script and information stored in a look-up table (e.g., the second look-up table 506), the orchestrator 206 may identify a gentech script generator that corresponds to the first set of operations and the second plurality of technologies available for the execution of the first stage of the data pipeline. In a non-limiting example, the orchestrator 206 identifies the first gentech script generator 208*a*. Based on the identification, the orchestrator 206 may determine that the first set of gentech scripts was previously generated by the first gentech script generator 208*a* for the execution of the first set of operations. Based on the determination that the first set of gentech scripts was previously generated by the first gentech script generator 208*a*, the orchestrator 206 may retrieve the previously generated first set of gentech scripts. The orchestrator 206 may identify a technology-specific interpreter (e.g., the second technology-specific interpreter 210*b*) that corresponds to the second data ingestion technology, based on the modified first user action script and information stored in a look-up table (e.g., the second look-up table 506).

Since the first set of gentech scripts is technology agnostic with respect to the second plurality of technologies, the orchestrator 206 communicates the first set of gentech scripts to the second technology-specific interpreter 210*b*. The second technology-specific interpreter 210*b* may generate a new set of technology-specific scripts for the execution of the first set of operations by the second data ingestion technology. The new set of technology-specific scripts may be in a format or language that is specific to the second data ingestion technology. The third set of technology-specific scripts may be communicated by the second technology-specific interpreter 210*b* to the second data ingestion technology (or a technology server of the plurality of technology servers 104 that hosts the second data ingestion technology). Consequently, the second data ingestion technology executes the first set of operations based on the new set of technology-specific scripts. It will be apparent to those of skill in the art that in case of the generation of the second user action script, a process of execution of the first set of operations by the second data ingestion technology platform may be similar to above-mentioned process.

In one embodiment, the data pipeline may be modified. For example, one or more stages may be added, deleted, or replaced from a selected set of stages in the data pipeline (e.g., the first through fifth stages). A new plurality of user actions may be recorded by the user action designer 202 for the modification of the data pipeline. For example, the recorded new plurality of user actions may include selection of a sixth pipeline stage from the plurality of pipeline stages. In a non-limiting example, the sixth pipeline stage may correspond to a data transformation stage. The data transformation stage may be associated with a set of pipeline operations (e.g., a set of data transformation operations). The recorded new plurality of user actions may further include the modification of the data flow logic for the data pipeline. The modified/updated data flow logic may indicate that the sixth pipeline stage is to be executed after the second pipeline stage (e.g., the data storage stage). The user action designer 202 may present a plurality of technologies, of the first plurality of technologies 114*a*, available for the execution of the sixth pipeline stage. The recorded new plurality of user actions may further include selection of a technology of the plurality of technologies available for the execution of the sixth pipeline stage. In a non-limiting example, it is assumed that a first data transformation technology (e.g., the eighth technology 114*h*), of the plurality of technologies available for the execution of the sixth pipeline stage, is selected by the user. The recorded new plurality of user actions may further be indicative of a set of configuration parameters (e.g., data transformations to be executed by the eighth technology 114*h*) for the execution of the set of data transformation operations. Consequently, the user action designer 202 may update the pipeline definition based on the recorded new plurality of user actions. The user action script compiler 204 may update or modify the first user action script based on the recorded new plurality of user actions (e.g., the updated pipeline definition or metadata associated therewith). The updated first user action script may include a section (e.g., a sixth section), in addition to the first through fifth sections. The sixth section may be indicative of the set of data transformation operations to be performed by the first data transformation technology (e.g., the eighth technology 114*h*). The orchestrator 206 may communicate the sixth section of the first user action script to a gentech script generator (e.g., the sixth gentech script generator 208*f*), of the plurality of gentech script generators 208, that corresponds to the data transformation stage or the plurality of data transformation technologies.

The sixth gentech script generator 208*f* may convert the set of sixth section of the first user action script into a set of gentech scripts (e.g., a sixth set of gentech scripts) that is in a format that is technology-agnostic with respect to the plurality of data transformation technologies. The sixth gentech script generator 208*f* may communicate the sixth set of gentech scripts to orchestrator 206. Based on the updated pipeline definition indicated by the updated first user action script, the orchestrator 206 may communicate the sixth set of gentech scripts to a technology-specific interpreter (e.g., the eighth technology-specific interpreter 210*h*), of the plurality of technology-specific interpreters 210, for the eighth technology 114*h*.

The eighth technology-specific interpreter 210*h* may convert the sixth set of gentech scripts into a set of technology-specific scripts (e.g., a sixth set of technology-specific scripts) that is in a format that is compatible with the eighth technology 114*h*. The sixth set of technology-specific scripts may be indicative of the set of configuration parameters and the set of data transformation operations. The eighth technology-specific interpreter 210*h* may communicate the sixth set of technology-specific scripts to the eighth technology 114*h*. The eighth technology 114*h* may initiate the execution of the set of data transformation operations based on the sixth set of technology-specific scripts.

Figure 14:
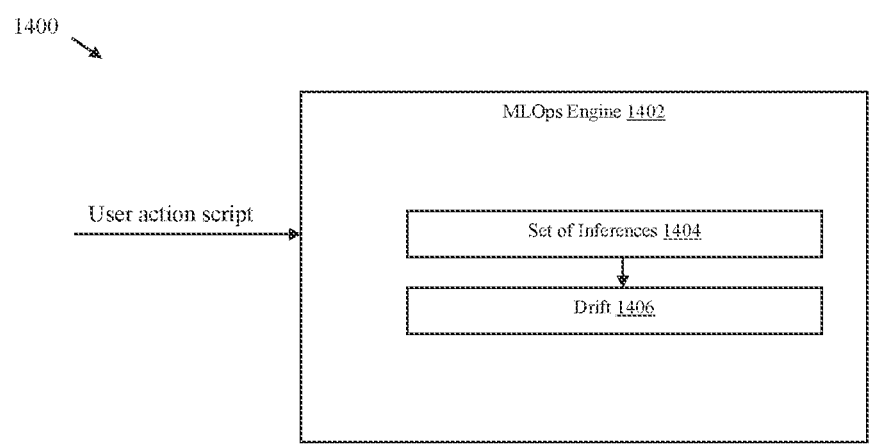
FIG. 14 is a block diagram that illustrates a machine learning operations engine, in accordance with an exemplary embodiment of the present disclosure.

FIG. 14 is a block diagram 1400 that illustrates an MLOps engine 1402, in accordance with an exemplary embodiment of the present disclosure. The MLOps engine 1402 may be included in the architecture 200, and may be communicably coupled to orchestrator 206 and the user action designer 202. In one embodiment, the plurality of pipeline stages available for inclusion in the data pipeline may further include an MLOps stage that enables deployment of an ML model. In such a scenario, the user action designer 202 may present a plurality of technologies (not shown), of the first plurality of technologies 114, available for the execution of the MLOps stage. For the sake of brevity, the plurality of technologies available for the execution of the MLOps stage are designated and referred to as "MLOps technologies". In other words, the first plurality of technologies 114 may include a plurality of MLOps technologies. Examples of the plurality of MLOps technologies may include, but are not limited to, MLFlow, Amazon SageMaker, or the like. In such a scenario, the first plurality of user actions may further include selection of the MLOps stage and selection of one (e.g., a first MLOps technology; MLFlow) of the plurality of MLOps technologies for the execution of the MLOps stage. The first plurality of user actions may further include a selection of a ML model (e.g., a first ML model) from a plurality of ML models and selection of a set of features (e.g., a first set of features) for training the ML model. The MLOps stage may correspond to a set of pipeline operations that may include training, experimentation, and deployment of the selected first ML model.

Examples of the plurality of ML models may include, but are not limited to, a random forest regression model, a k-means clustering model, a neural network model, or the like. The selected set of features may include (e.g., may be indicative of) a set of features that are to be used for training the first ML model. In a non-limiting example, each of the set of features may be a function of one or more attributes included in the data that is stored at the target storage location. Selection or formation of features for training of an ML model is well known to those of skill in the art.

The plurality of gentech script generators 208 may include a gentech script generator for the MLOps stage. For the sake of brevity, the gentech script generator for the MLOps stage (e.g., the plurality of MLOps technologies) is designated and referred to as "MLOps gentech script generator". The MLOps gentech script generator may be configured to generate gentech scripts that are in a format that is technology agnostic with respect to the plurality of MLOps technologies. Further, the plurality of technology-specific interpreters 210 may include a technology-specific interpreter for each of the plurality of MLOps technologies. For the sake of brevity, technology-specific interpreters for MLOps technologies are referred to as "MLOps technology-specific interpreters". The plurality of technology-specific interpreters 210 may include a plurality of MLOps technology-specific interpreters for the plurality of MLOps technologies.

Based on the first user action script that is indicative of the first plurality of user actions, the orchestrator 206 may communicate a section of the first user action script to the MLOps gentech script generator. This section of the first user action script may be indicative of the first ML model the first set of features. The MLOps gentech script generator may convert this section of the first user action script into a set of gentech scripts (hereinafter, referred to as "first set of MLOps gentech scripts") that is in the format that is technology agnostic with respect to the plurality of MLOps technologies. A first MLOps technology-specific interpreter of the plurality of MLOps technology-specific interpreters may convert the first set of MLOps gentech scripts into a set of technology-specific scripts (hereinafter, referred to as "first set of MLOps technology-specific scripts") that is in a format that is compatible with the selected first MLOps technology. The first MLOps technology-specific interpreter may communicate the first set of MLOps technology-specific scripts to the first MLOps technology. The first set of MLOps technology-specific scripts may be indicative of the first ML model, the selected first set of features, and the set of pipeline operations that correspond to the MLOps stage.

The first MLOps technology may initiate execution of the set of pipeline operations (e.g., set of MLOps operations) that correspond to the MLOps stage based on the first set of MLOps technology-specific scripts. In other words, the first MLOps technology may train the first ML model based on the selected first set of features, deploy the first ML model, and experiment with the first ML model based on an experimental dataset that may be indicated by the first set of MLOps technology-specific scripts. The first plurality of user actions may include a selection of the experimental dataset. Progress data (e.g., MLOps progress data) may be communicated by the first MLOps technology to the first MLOps technology-specific interpreter based on the initiation of the execution of the set of MLOps operations. As described in the foregoing, the MLOps progress data may be converted into a set of gentech scripts (e.g., a second set of MLOps gentech scripts) and, then, into a user action script indicative of the MLOps progress data. This user action script may be received by the orchestrator 206 and communicated by the orchestrator 206 to the MLOps engine 1402. The MLOps engine 1402 may determine a set of inferences 1404. The determination of the set of inferences 1404 may be based on a set of outputs of the trained/deployed first machine learning model that is indicated by or included in the MLOps progress data. The MLOps engine 1402 may further determine a level of drift (e.g., drift 1406) in the set of outputs associated with the first machine learning model, based on the set of inferences 1404. The determined drift may be one of a data drift or a concept drift. Data drift and concept drift are well known to those of skill in the art. Based on the determined level of drift (e.g., the drift 1406), the first machine learning model may be re-trained to correct for the determined level drift. Data associated with the determined level of drift may be communicated to the first MLOps technology by way of the MLOps gentech script generator and the first MLOps technology-specific interpreter. Based on the data associated with determined level of drift, the first MLOps technology may re-train the first ML model.

It will be apparent to those of skill in the art that the implementation/execution of the MLOps stage may be similar to the execution of any other stage (e.g., the first through fifth stages) in the data pipeline. For the sake of brevity, it is assumed in a non-limiting example, that the data pipeline does not include the MLOps stage.

Figure 15:
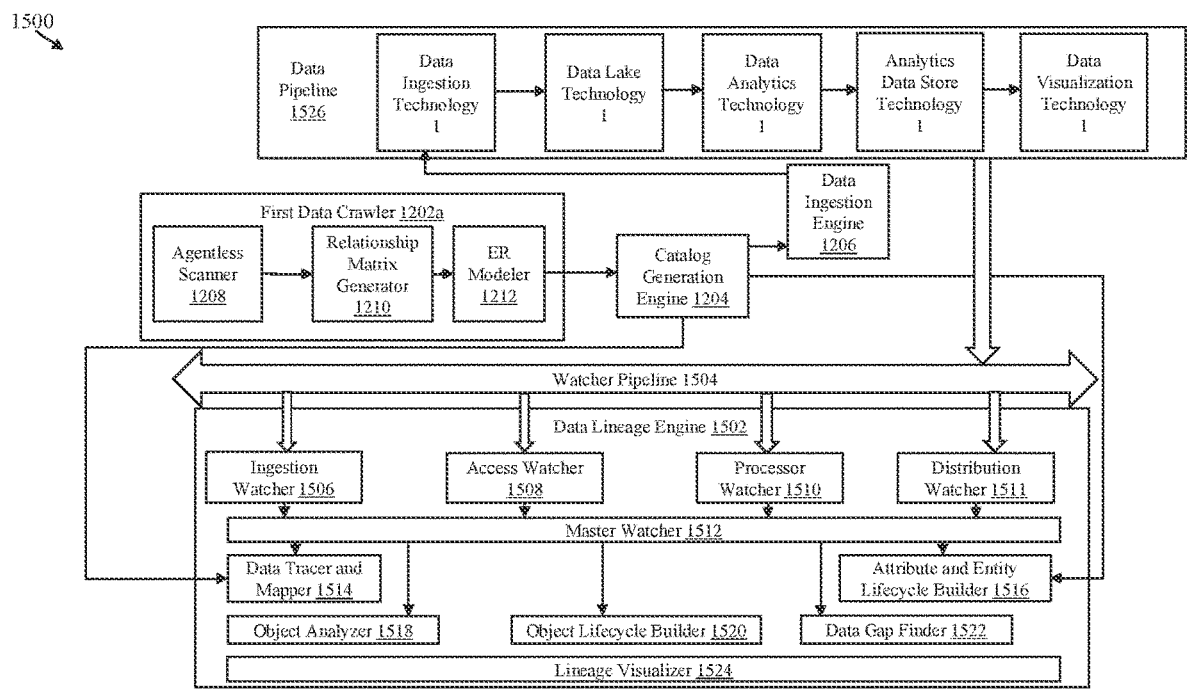
FIG. 15 is a block diagram that illustrates process of generation of a data lineage map for the data pipeline, in accordance with an exemplary embodiment of the present disclosure.

FIG. 15 is a block diagram 1500 that illustrates process of generation of a data lineage map for the data pipeline, in accordance with an exemplary embodiment of the present disclosure. The block diagram 1500 illustrates the first data crawler 1202a, the catalog generation engine 1204, a data lineage engine 1502, and a watcher pipeline 1504. The data lineage engine 1502 includes an ingestion watcher 1506, an access watcher 1508, a processor watcher 1510, and a distribution watcher 1511. The data lineage engine 1502 further includes a master watcher 1512, a data tracer and mapper 1514, an attribute and entity lifecycle builder 1516, an object analyzer 1518, an object lifecycle builder 1520, a data gap finder 1522, and a lineage visualizer 1524.

The watcher pipeline 1504 receives the fifth metadata associated with the first data catalog (e.g., the data provided as input to the first stage in the data pipeline) and metadata associated with progress data (e.g., the first through fifth progress data) of each stage included in the data pipeline. The data pipeline is interchangeably referred to as "the data pipeline 1526". The progress data associated with each stage is indicative of a set of operations (e.g., the first set of operations, the second set of operations, or the like) executed at a corresponding stage by corresponding one or more technologies (e.g., the first technology, the second technology, or the like) selected for execution of the corresponding stage. The progress data associated with each stage is further indicative of an output of the execution (e.g., a result of the execution) of the set of operations at the corresponding stage. The output of each stage of the data pipeline 1526 is input to a subsequent stage in the data pipeline 1526. Therefore, the metadata associated with the progress data of each stage included in the data pipeline 1526 is indicative of input data and output data for each stage (e.g., the first through fifth stages) in the data pipeline 1526. The watcher pipeline 1504 may receive the metadata that is indicative of the data included in the first data catalog from the data ingestion engine 1206. The watcher pipeline 1504 may receive the metadata associated with the progress data of each stage, from the user action script compiler 204, that generates user action scripts indicative of the progress data. For example, the watcher pipeline 1504 may receive metadata that may be associated with first progress data from the second user action script that is indicative of the first progress data.

The ingestion watcher 1506, the access watcher 1508, the processor watcher 1510, and the distribution watcher 1511 are collectively referred to as "plurality of data watchers". Each of the plurality of data watchers may track data received by the watcher pipeline 1504 to acquire or determine data that is relevant for a corresponding watcher. For example, the ingestion watcher 1506 may track the data received by the watcher pipeline 1504 to acquire data provided as input to the data pipeline 1526. Therefore, the ingestion watcher 1506 may acquire the metadata that corresponds to the first data catalog that is provided as input to the data pipeline 1526 (e.g., the first stage in the data pipeline 1526). For the sake of brevity, the metadata/data that is tracked, received, or acquired by the ingestion watcher 1506 is designated and referred to as "ingestion data".

The access watcher 1508 may track the data received by the watcher pipeline 1504 to acquire or determine data associated with access of the data pipeline 1526 by users. For example, the access watcher 1508 may track data accessed at each stage of the data pipeline 1526 (e.g., the first through fifth stages) by the plurality of users. In other words, the access watcher may receive, by way of the watcher pipeline 1504, information associated with access of data in the data pipeline 1526 by the plurality of users using the plurality of user devices 102. The access watcher 1508 may track each instance of data access by each of the plurality of users. For example, the access watcher 1508 may track (e.g., identify) a user device ID of each user device, of the plurality of user devices 102, that is used to gain access to the data flowing through the data pipeline 1526.

The access watcher 1508 may further track (e.g., identify) for each user device, of the plurality of user devices 102, a time-stamp associated with a time of access by a corresponding user device of the data flowing through the data pipeline 1526. Examples of a user device identifier of a user device may include, but is not limited to, an IP address associated with the user device, a media access control address associated with the user device, or the like. The access watcher 1508 may further track (e.g., identify) for each user device, of the plurality of user devices 102, for each instance of access, a corresponding duration of access by the corresponding user device. Further, the access watcher 1508 may track (e.g., identify) any other details that enables identification of users who attempt to access the data flowing through the data pipeline 1526. Examples of other details may include, but are not limited to, usernames of users, geolocations of user devices of the users, network identifiers of a network used by the user devices at a time of access, or the like. For the sake of brevity, the data/metadata that is tracked, received, or acquired by the access watcher 1508 is designated and referred to as "access data".

The processor watcher 1510 may track the data received by the watcher pipeline 1504 to acquire or determine data (e.g., plurality of data entities, plurality of data attributes, or the like) processed at each stage (e.g., the first through fifth stages) of the data pipeline 1526, by way of execution of a set of operations by each technology (e.g., the first through fifth technologies) at each stage (e.g., the first through fifth stages). The processor watcher 1510 may identify, based on the data received from the watcher pipeline 1504 changes in the data flowing through the data pipeline 1526. Examples of the changes in the data may include, but are not limited to, changes in entities, changes in names of the entities, changes in attributes, changes in attributes, or the like. For the sake of brevity, the data/metadata that is tracked, received, or acquired by the processor watcher 1510 is designated and referred to as "processing data".

The distribution watcher 1511 may track data received by the watcher pipeline 1504 to determine distribution of data between technologies (e.g., the first through fifth technologies). In a scenario where a plurality of technologies (e.g., multiple technologies) are selected for executing a single stage, the distribution watcher 1511 may determine distribution of data between the plurality of technologies. For example, if the first data visualization technology and a second data visualization technology, of the sixth plurality of technologies, are selected for execution of the fifth set of operations, data that is outputted by the first data analytics technology after the execution of the fourth set of operations may be distributed between the first data visualization technology and the second data visualization technology. A first portion of the data that is outputted by the first data analytics technology may be inputted to the first data visualization technology and a second portion of the data that is outputted by the first data analytics technology may be inputted to the second data visualization technology. In such a scenario, the distribution watcher 1511 may determine that the first and second portions of the data that is outputted by the first data analytics technology is inputted to the first and second data visualization technologies, respectively. For the sake of brevity, the data/metadata that is tracked, received, or acquired by the processor watcher 1510 is designated and referred to as "distribution data".

The ingestion watcher 1506, the access watcher 1508, the processor watcher 1510, and the distribution watcher may communicate the ingestion data, the access data, the processing data, and the distribution data, respectively, to the master watcher 1512. The ingestion data, the access data, the processing data, and the distribution data may be stored in the memory of the application server 106 by a corresponding watcher of the plurality of data watchers (e.g., the ingestion watcher 1506, the access watcher 1508, the processor watcher 1510, and the distribution watcher 1511) or the master watcher 1512.

The master watcher 1512 may receive the ingestion data, the access data, the processing data, and the distribution data from the ingestion watcher 1506, the access watcher 1508, the processor watcher 1510, and the distribution watcher 1511, respectively. The master watcher 1512 may communicate the received ingestion data, the received access data, the received processing data, and the received distribution data to the data tracer and mapper 1514, the attribute and entity lifecycle builder 1516, the object analyzer 1518, the object lifecycle builder 1520, and the data gap finder 1522.

The data tracer and mapper 1514 may, based on the received ingestion data, the received processing data, the distribution data, and the fifth metadata associated with the first data catalog, track changes in the data flowing through the data pipeline. In other words, the data tracer and mapper 1514 may analyze the received ingestion data, the received processing data, and the fifth metadata associated with the first data catalog, to trace a change in the attributes values for the second plurality of data attributes included in the first data catalog. For example, the data tracer and mapper 1514 may determine (e.g., trace) a change in the attributes values for the second plurality of the attributes based on the set of data transformations performed by the first data ingestion technology on the data included in the first data catalog. Similarly, the data tracer and mapper 1514 may determine a whether there has been a change in the attributes values (e.g., any of the attribute values) for the second plurality of the attributes at any stage in the data pipeline. A change in any attribute value may refer to a modification of a corresponding attribute value, a deletion of the corresponding attribute value, or the like. Modification of an attribute value may occur due to various reasons such as, but not limited to, one or more data transformations (e.g., the set of data transformations) performed on a corresponding data, manual changes performed by users accessing the data flowing through the data pipeline, errors in execution of a set of operations (e.g., the first through fifth sets of operations) by a technology selected for the execution of the set of operations in the data pipeline, or the like.

If the data tracer and mapper 1514 determines that there has been a set of changes in the attributes values at any stage in the data pipeline (e.g., the first through fifth stages), the data tracer and mapper 1514 determines (e.g., identifies) a root cause associated with the set of changes in a corresponding stage. For example, the data tracer and mapper 1514 determines that there is a set of changes in the data values in the data stored at the target storage location (e.g., the second stage of the data pipeline) in comparison to the data stored in the first data catalog. In such a scenario, the data tracer and mapper 1514 may determine that the set of changes in the data values in the data stored at the target storage location is due to the set of data transformations performed by the first data ingestion technology for the execution of the first set of operations at the first stage of the data pipeline. Similarly, in another scenario, the data tracer and mapper 1514 may determine that another set of changes in the data flowing through the data pipeline is due to changes made by the user who accessed the data flowing through the data pipeline. Therefore, the data tracer and mapper 1514 may determine a plurality of changes in attributes and/or attribute values as the data flows through the data pipeline. The data tracer and mapper 1514 may further determine a set of root causes for (e.g., associated with) the plurality of changes. The data tracer and mapper 1514 may communicate, to the lineage visualizer 1524, seventh metadata associated with the determined plurality of changes and the determined set of root causes.

The attribute and entity lifecycle builder 1516 may, based on the received ingestion data, the receiving processing data, the distribution data, and the fifth metadata associated with the first data catalog, determine changes in the second plurality of attributes as result of the execution of the data pipeline (e.g., the execution of the first through fifth stages in the data pipeline). The attribute and entity lifecycle builder 1516 may determine a lifecycle of each entity and each attribute across the selected set of stages included in the data pipeline. The attribute and entity lifecycle builder 1516 may determine how each attribute (e.g., the second plurality of attributes) and entity (e.g., the second plurality of entities)

has changed (e.g., in terms of data values, data format, or the or the like) as the data moves through the data pipeline 1526. The attribute and entity lifecycle builder 1516 may communicate, to the lineage visualizer 1524, eighth metadata associated with determined lifecycle for each entity and each attribute as result of the execution of the data pipeline 1526.

The object analyzer 1518 may, based on the received ingestion data, the receiving processing data, the distribution data, and the fifth metadata associated with the first data catalog, analyze or determine data associated with or included in each data source (e.g., the first data source, the first data catalog) for the data pipeline 1526. The object analyzer 1518 may communicate, to the lineage visualizer 1524, ninth metadata associated with the determination of the data included in each data source (e.g., the first data catalog) for the data pipeline 1526.

The object lifecycle builder 1520 may, based on the received ingestion data, the receiving processing data, the distribution data, and the fifth metadata associated with the first data catalog, determine changes included in each data object. The object lifecycle builder 1520 may determine a lifecycle of each data object (e.g., the first data catalog) for the data pipeline 1526. The object lifecycle builder 1520 may determine how data included in each data object has changed across the set of stages in the data pipeline 1526, based on the execution of the data pipeline 1526. The object lifecycle builder 1520 may communicate, to the lineage visualizer 1524, tenth metadata associated with determined lifecycle for each data object.

The data gap finder 1522 may, based on the received ingestion data, the received processing data, and the fifth metadata, determine gaps or missing data in the input data/output data associated with each of the first through fifth pipeline stages. The data gap finder 1522 may determine any attributes (e.g., of the second plurality of attributes), any attribute values (e.g., of the attribute values of the second plurality of attributes), or any entities (e.g., of the second plurality of entities) that has gone missing due to unintentional or erroneous execution of the data pipeline 1526. The data gap finder 1522 may communicate, to the lineage visualizer 1524, eleventh metadata associated with determined gaps or missing data.

The lineage visualizer 1524 is configured to generate, based on the received seventh through eleventh metadata, a data lineage map (e.g., data lineage graph) that is indicative of a lifecycle (e.g., data lineage) of the data flowing through the data pipeline. In other words, the data lineage map is indicative of the data inputted to and outputted by each technology (e.g., the first through fifth technologies 114*a*-114*e*) at each stage (e.g., the first through fifth stages) of the data pipeline. The data lineage map is further indicative of data accessed by each user device at each stage of the data pipeline. The data lineage map may also indicate the time-instance at which the data was accessed by each user device. The data lineage map is further indicative of changes in attributes (e.g., the second plurality of attributes) and corresponding attribute values at each stage of the data pipeline. The data lineage map may further be indicative of data transformations performed on the data flowing through the data pipeline. For example, the data lineage map may be indicative of the set of data transformations performed on the second plurality of entities and the second plurality of attributes by the first data ingestion technology. In other words, the data lineage map may be a representation of all the data flowing through the data pipeline. The lineage visualizer 1524 may communicate the data lineage map (e.g., or associated metadata) to the user action designer 202. Consequently, the user action designer 202 may present the data lineage map on the UI.

Figure 16:
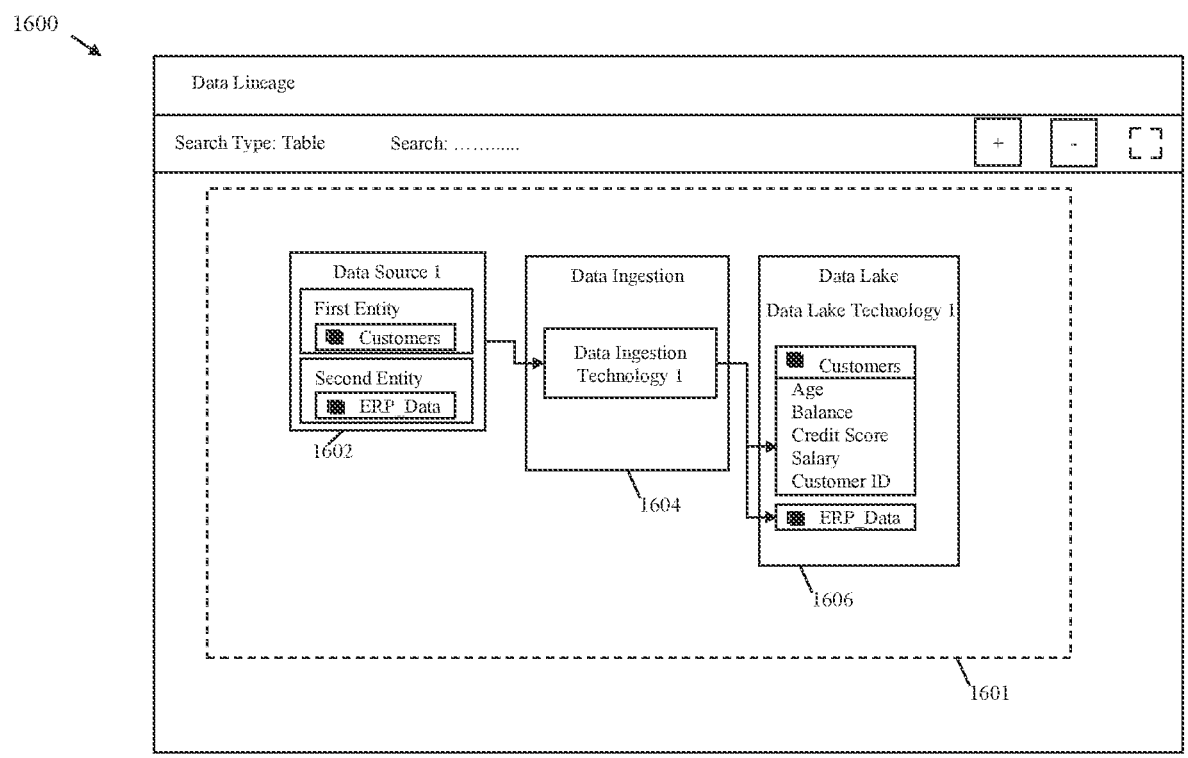
FIG. 16 illustrates a UI screen that presents the data lineage map, in accordance with an exemplary embodiment of the present disclosure.

FIG. 16 illustrates a UI screen 1600 that presents the data lineage map, in accordance with an exemplary embodiment of the present disclosure. The data lineage map is presented on the UI screen 1600.

The data lineage map (e.g., shown in a dotted box 1601) is indicative of the data processed at each stage included in the data pipeline. For the sake of brevity, the presented data lineage map is shown to present only the first data catalog and two stages (e.g., the data ingestion stage and the data storage stage) of the data pipeline The data lineage map (as shown by block 1602) is indicative of the second plurality of entities (e.g., a first entity "Customers" and a second entity "ERP_Data") included in the first data catalog. The data lineage map (as shown by block 1604) may further present data ingested by the first data ingestion technology and outputted by the first data ingestion technology. The data lineage map may further present (not shown) the set of data transformations performed by the first data ingestion technology. The data lineage map may further present (not shown) data outputted by the first data ingestion technology and stored in the target storage location. Similarly, the data lineage map (as shown by block 1606) may be indicative of data that is stored at the target storage location (e.g., at the first data lake technology) by the first data ingestion technology. It will be apparent to those of skill in the art that the data lineage map may be indicative of the data inputted to and outputted from each stage of the data pipeline. The data lineage map may further be indicative of the data accessed by each user device. It will be apparent to those of skill in the art that the data lineage map shown in FIG. 16 is merely exemplary and does not limit the scope of the disclosure. Additional details (e.g., the distribution data, the access data, or the like) may be presented without deviating from the scope of the disclosure.

The service application 112 enables or facilitates automated cloud-agnostic deployment of the software product. In a non-limiting example, it is assumed that a microservice architecture, including a plurality of microservices, is used for developing the software product. The service application 112 enables deployment of the plurality of microservices in a cloud environment (e.g., public cloud and/or private cloud). The plurality of microservices may be associated with a plurality of technologies and/or programming languages such as, but not limited to, Java, React, Python, Angular JS, or the like. Microservice architecture is well known to those of skill in the art, and is, therefore, not explained for the sake of the brevity of the disclosure. For example, the service application 112 may enable automated cloud-agnostic deployment of each of the plurality of microservices that are included in the software product (e.g., the software application).

The service application 112 enables the user to design and configure pipeline templates (e.g., templates for CI/CD pipelines) for the deployment of the plurality of microservices. For the sake of brevity, the term "pipeline template" is interchangeably referred to as "policy template" throughout the disclosure. For each pipeline stage, the service application 112 enables the user to select a technology for execution of a corresponding pipeline stage. The service application 112 offers a plug-and-play architecture that enables the user to modify pipeline stages included in each pipeline template and the technology selected for the execution of each pipeline stage in a corresponding pipeline template. For the sake of brevity, the terms "pipeline stage" and "stage" are used interchangeably throughout the disclosure.

The service application 112 enforces CI and CD for each microservice, for the plurality of microservices, based on a corresponding pipeline template. In other words, the CI/CD pipeline created and executed for each microservice is based on a corresponding pre-defined pipeline template. Further, the service application 112 also enables the user to define a promotion pipeline for the deployment of the software product. The promotion pipeline may include a plurality of deployment stages that enable deployment of the plurality of microservices across a plurality of deployment environments that correspond to the plurality of deployment stages. The deployment of the software product (e.g., the deployment of the plurality of microservices) is explained in conjunction with FIGS. 17, 18, 19A-19H, 20, 21A-21B, 22, 23, and 24A-24B.

Figure 17:
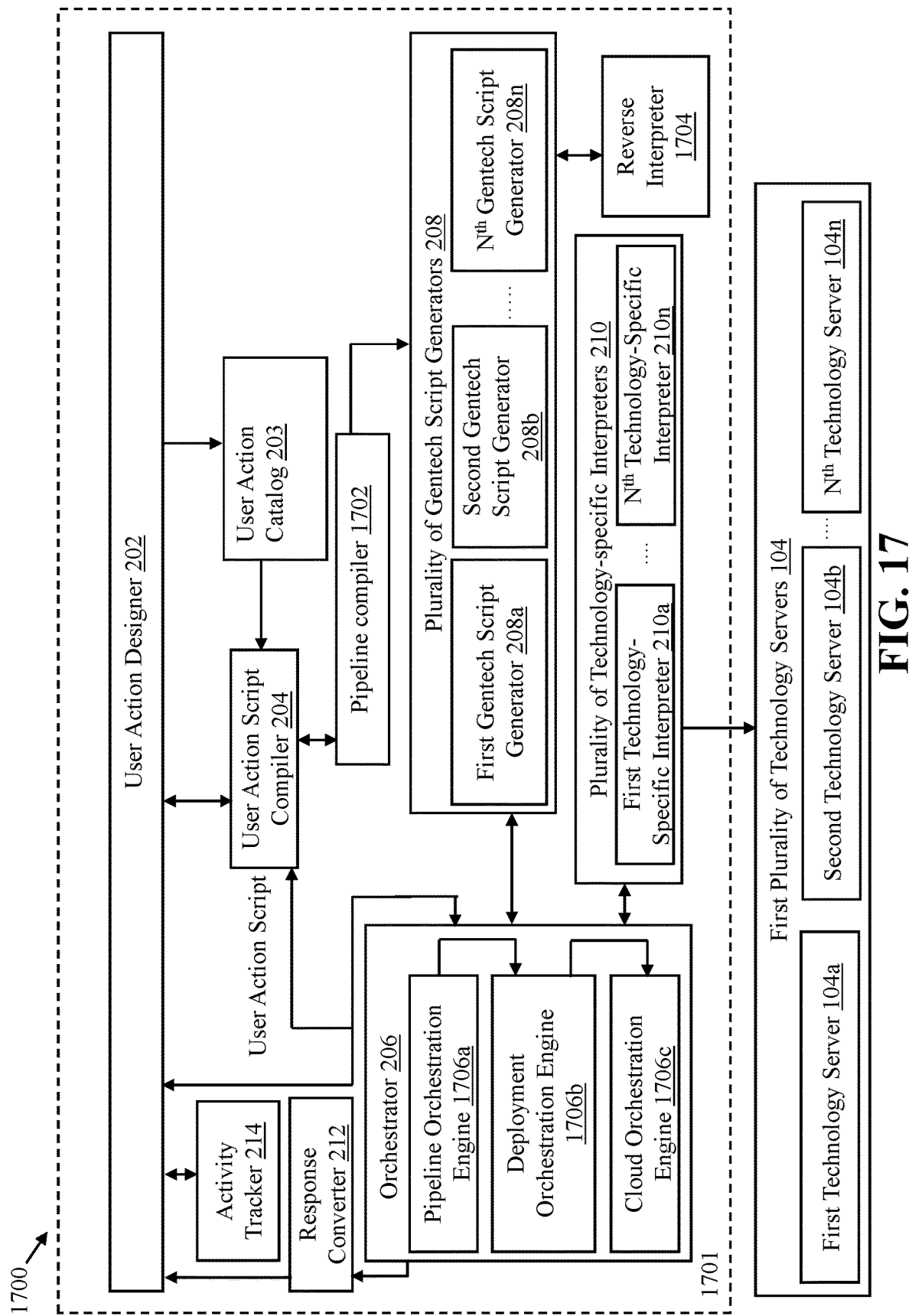
FIG. 17 is a block diagram that illustrates an architecture of the service application, in accordance with another exemplary embodiment of the present disclosure.

FIG. 17 is a block diagram 1700 that illustrates an architecture 1701 of the service application 112, in accordance with another exemplary embodiment of the present disclosure. The architecture 1701 is a modification (e.g., modified version) of the primary architecture of the service application 112 that is shown in FIGS. 2 and 3. The architecture 1701 includes the user action designer 202, the user action catalog 203, the user action script compiler 204, the orchestrator 206, the plurality of gentech script generators 208, the plurality of technology-specific interpreters 210, the response converter 212, and the activity tracker 214. The architecture 1701 further includes a pipeline compiler 1702 and a reverse interpreter 1704. The orchestrator 206 is shown to include a pipeline orchestration engine 1706a, a deployment orchestration engine 1706b, and a cloud orchestration engine 1706c.

The user action designer 202 may render a UI (shown in FIG. 18) that enables the user (e.g., an administrator) to define policies for availability of microservices for the development of the software product. In other words, the UI rendered by the user action designer 202 enables the user to select the plurality of microservices that are to be available for the development of the software product. The selected plurality of microservices may include various technologies/microservices for developing various aspects (e.g., frontend, backend, database, or the like) of the software product. For the sake of brevity, the terms "technology stack" and "microservices" are used interchangeably throughout the disclosure.

Figure 18:
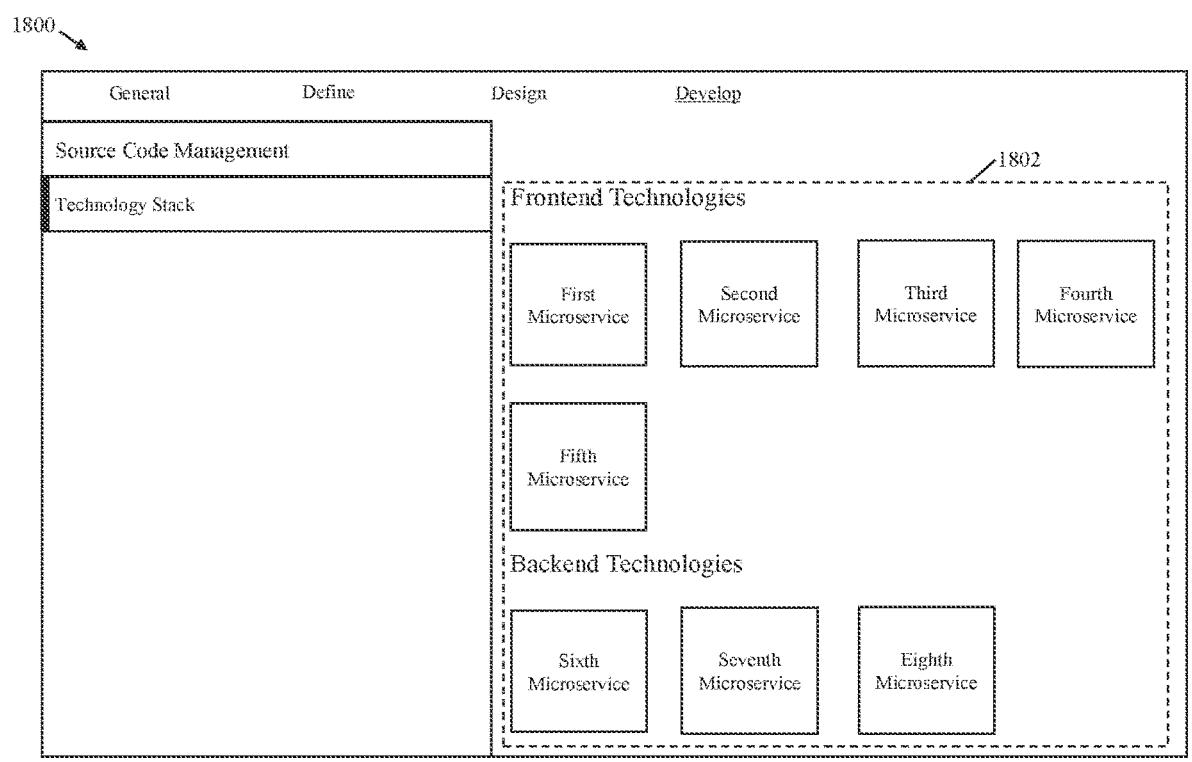
FIG. 18 illustrates a UI screen rendered by the service application on the first user device for selection of a technology stack for the development of the software product, in accordance with an exemplary embodiment of the present disclosure.

FIG. 18 illustrates a UI screen 1800 rendered by the service application 112 on the first user device 102a for selection of a technology stack for the development of the software product, in accordance with an exemplary embodiment of the present disclosure. The UI screen 1800 may be rendered by the user action designer 202 and enables the selection of the plurality of microservices. The selected technology stack may include various microservices for developing various aspects (e.g., frontend, backend, database, or the like) of the product. In a non-limiting example, the UI screen 1800 presents a plurality of user-selectable options (as shown within a dotted box 1802) that enables the user to select microservices that are to be made available to developers (e.g., the user) for the development of the software product.

The presented microservices may include microservices for the development of the frontend of the software product, microservices for the development of the backend of the software product, microservices for implementation of a database for the software product, or the like. In a non-limiting example, the set of user-selectable options is associated with a plurality of microservices for the development of the frontend of the software product (e.g., first through fifth microservices), a plurality of microservices for the development of the backend of the software product (e.g., the sixth through eighth microservices), or the like. In a non-limiting example, user-selectable options corresponding to the first and sixth microservices may be selected, indicating that only the first and sixth microservices are to be made available to the developers for developing the software product.

Examples of microservices for the development of the frontend may include AngularJS, React, Flutter, HTML, or the like. Examples of microservices for the development of the backend of the software product may include Java, Python, or the like. For the sake of brevity, it is assumed that that only two microservices (e.g., the first and sixth microservices) are selected for the development of the software product. In other words, the plurality of microservices selected for the development of the software product may include only the first and sixth microservices. However, in an actual implementation, many other microservices or technologies may be selected for the various aspects (e.g., APIs, metadata management, or the like) of the development of the software product without deviating from the scope of the disclosure.

The UI rendered by the user action designer 202 for the execution or the implementation of the deployment stage 216d (hereinafter, referred to as "deployment stage view") for the software product may enable an administrator (e.g., the user) to configure policies and pipeline templates for the deployment of the software product. The configuration of policies and the pipeline templates are described in conjunction with FIGS. 19A-19H. Pipeline templates (e.g., templates for CI/CD pipelines) or policy templates are standard templates that may be used for enforcement of CI and CD of microservices. Pipeline templates enable the user (e.g., the administrator) to avoid repeated designing of CI/CD pipelines for the deployment of the microservices. Pipeline templates for each microservice may be used (e.g., re-used) for automation of deployment of a corresponding microservice across multiple releases of the software product and across deployment environments (e.g., a development stage or DEV stage, a quality analysis or QA stage, a user-acceptance testing or UAT stage, a pre-production or PRE-PROD stage, a production or PROD stage, or the like).

Configuration of policies may refer to configuration of availability of various tools or technologies, deployment modes, VM configurations, or deployment stages/deployment environments for the deployment of the software product (e.g., the deployment of the microservices selected for the development of the software product).

FIGS. 19A-19H, collectively, illustrate UI screens 1900A-1900H rendered by the service application 112 on the first user device 102a for the configuration of policies and pipeline templates, in accordance with an exemplary embodiment of the present disclosure. The UI screens 1900A-1900H are rendered by the user action designer 202. The UI screens 1900A-1900H enable selection of tools or technologies, from the first plurality of technologies 114, that are to be made available for implementation of CI/CD pipelines (or configuration of pipeline templates) for the deployment of the plurality of microservices. The UI screens 1900A-1900H illustrate the deployment stage view. The UI screens 1900A-1900H may enable the administrator (e.g., the user) to define (e.g., design, create, or configure) pipeline templates that are to be made available to enforce automated deployment (e.g., automated cloud-agnostic deployment) of the plurality of microservices (e.g., the technology stack) selected for the development of the software product.

Figure 19A:
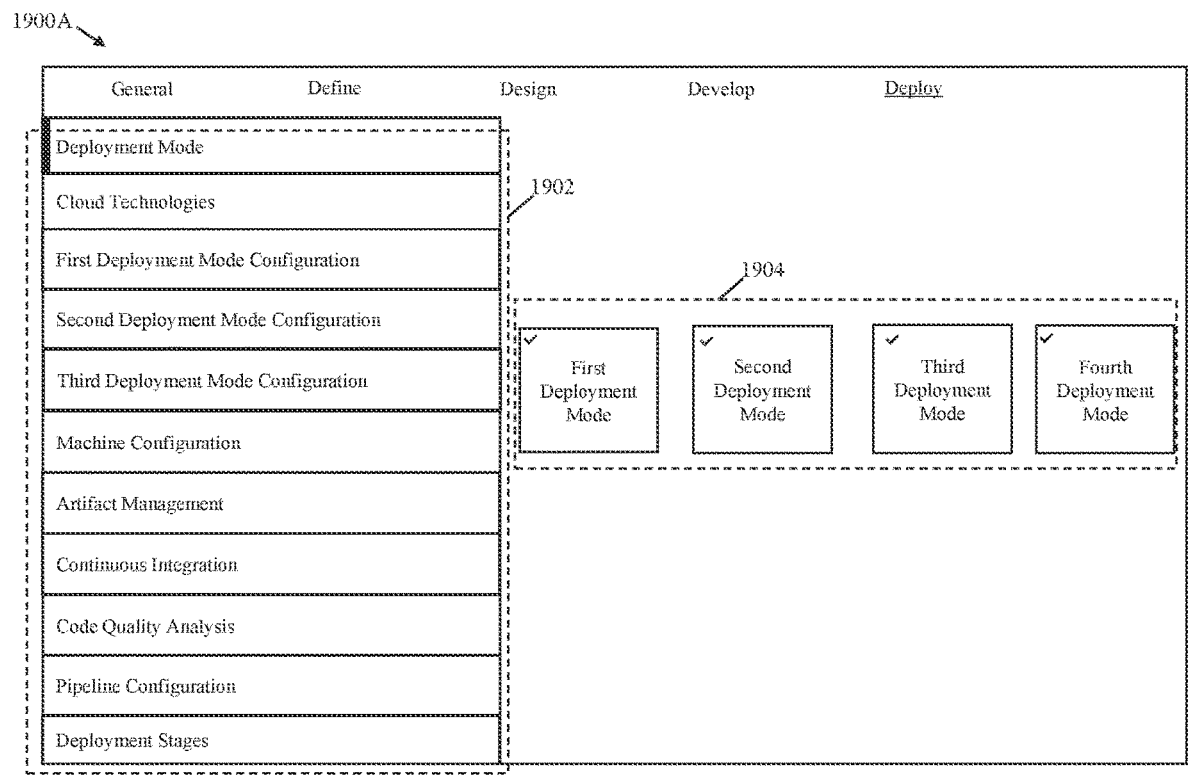

Referring now to FIG. 19A, the UI screen 1900A presents a first plurality of user-selectable options (as shown within a dotted box 1902) that enables users to configure policies associated with the deployment of the software product. In an exemplary embodiment, the first plurality of user-selectable options include a user-selectable option "Deployment Mode", a user-selectable option "Cloud Technologies", a user-selectable option "First Deployment Mode Cluster Configuration", a user-selectable option "Second Deployment Mode Configuration", a user-selectable option "Third Deployment Mode Configuration", a user-selectable option "Machine Configuration", a user-selectable option "Artifact management", a user-selectable option "Continuous Integration", a user-selectable option "Code Quality Analysis", a user-selectable option "Pipeline Configuration", and a user-selectable option "Deployment Stages".

When the user-selectable option "Deployment Mode" is selected, a plurality of user-selectable options (as shown by a dotted box 1904) that correspond to a plurality of deployment modes are presented on the UI (e.g., the UI screen 1900A). In a non-limiting example, the second plurality of user-selectable options include first through fourth user-selectable options that correspond to first through fourth deployment modes, respectively. Examples of the plurality of deployment modes may include, but are not limited to, Kubernetes, Docker, OpenShift, IaC-based deployment modes such as Terraform, or the like. Examples of deployment modes such as Kubernetes, Docker, OpenShift, Terraform are well known to those of skill in the art. Therefore, for the sake of brevity, explanation of the plurality of deployment modes is avoided. One or more user-selectable options, of the first through fourth user-selectable options, may be selected to make corresponding deployment modes (e.g., a set of deployment modes of the plurality of deployment modes) available for selection for deployment of the plurality of microservices.

In a non-limiting example, it is assumed that the first through fourth user-selectable options are selected (e.g., by the user), thereby, making the first through fourth deployment modes available. Therefore, the selected set of deployment modes is same as the plurality of deployment modes. For the sake of brevity, it is assumed that the plurality of deployment modes include the first through fourth deployment modes. However, in an actual implementation, the plurality of deployment modes may include other deployment modes without deviating from the scope of the disclosure.

Figure 19B:
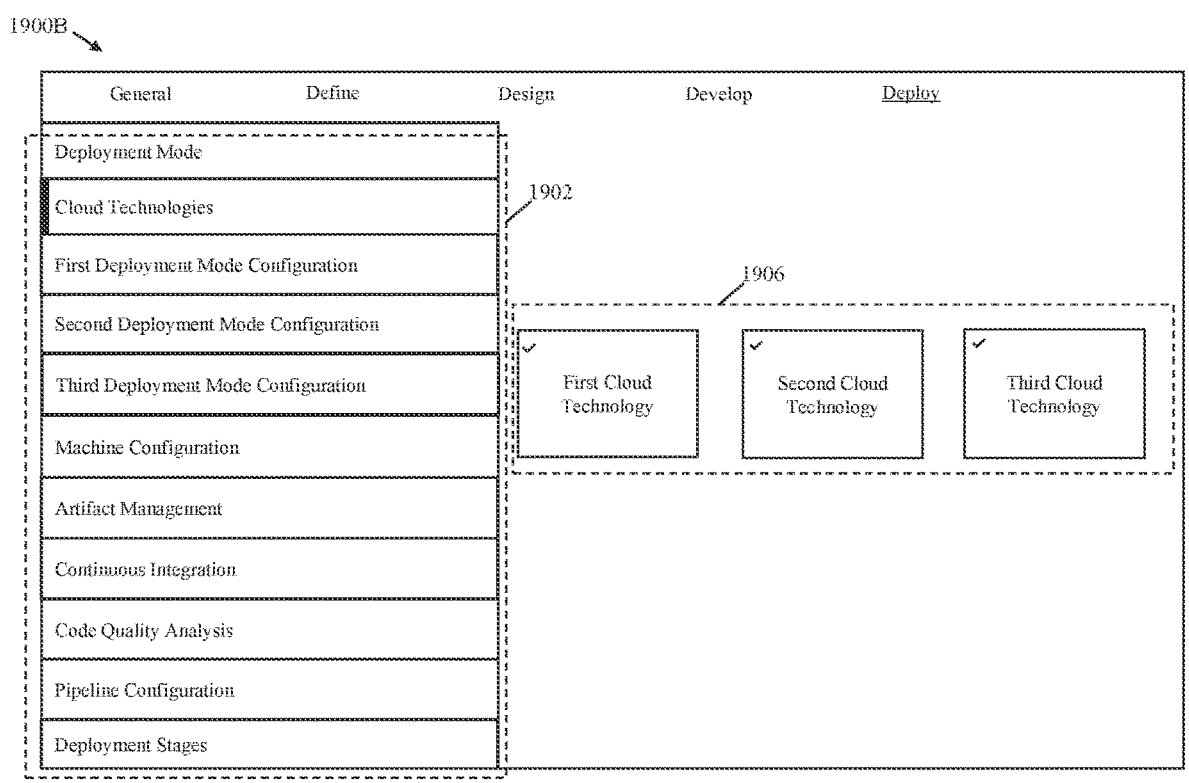

Referring now to FIG. 19B, the UI screen 1900B is rendered by the user action designer 202 when the user-selectable option "Cloud technologies" is selected. The UI screen 1900B presents a plurality of cloud technologies (e.g., cloud tools or cloud platforms). In other words, a plurality of user-selectable options (as shown by a dotted box 1906) that correspond to the plurality of cloud technologies may be presented. In a non-limiting example, the plurality of user-selectable options include first through third user-selectable options that correspond to first through third cloud technologies, respectively. One or more user-selectable options, of the first through third user-selectable options, may be selected to make corresponding cloud technologies (e.g., a set of cloud technologies) available for selection during the deployment of the plurality of microservices. In other words, a set of cloud technologies may be selected, from the plurality of cloud technologies, to make corresponding cloud technologies available for deployment of the plurality of microservices. In a non-limiting example, it is assumed that the first through third user-selectable options are selected (e.g., by the user), thereby, making the first through third cloud technologies available for the deployment of the plurality of microservices. Therefore, the selected set of cloud technologies is same as the plurality of cloud technologies.

For the sake of brevity, it is assumed that the plurality of cloud technologies include the first through third cloud technologies. However, in an actual implementation, the plurality of cloud technologies may include other cloud technologies without deviating from the scope of the disclosure. Examples of the plurality of cloud technologies include, but are not limited to, AWS, Azure, Google cloud platform (GCP), or the like. Cloud technologies or cloud platforms that are available for deployment are well known to those of skill in the art. The first plurality of technologies 114 include the plurality of cloud technologies.

In another embodiment, the UI screen 1900B may further present (not shown) a set of accounts (e.g., cloud accounts) available at each of the presented plurality of cloud technologies. For example, first through third sets of accounts available at the first through third cloud technologies may be presented. In a non-limiting example, the first set of accounts may include one or more accounts at AWS, the second set of accounts may include one or more accounts at Azure, and the third set of accounts may include one or more accounts at GCP. Each of the first through third sets of accounts may be accounts in possession of or associated with the entity that is developing the software product. In such a scenario, one or more accounts of the first through third sets of accounts may be selected to limit or restrict usage of the first through third sets of cloud accounts for the deployment of the microservices (e.g., the deployment of the software product). For example, the entity developing the software product may possess or be associated with tens or hundreds of cloud accounts (e.g., the first through third sets of accounts) at the plurality of cloud technologies. However, the entity (e.g., the user or the administrator) may intend to use (e.g., make available for usage) only five accounts for the deployment of the microservices. Accordingly, one or more accounts (e.g., five accounts) of the first through third sets of accounts may be selected.

Referring now to FIG. 19C, the UI screen 1900C is rendered by the user action designer 202 when the selectable option "Machine configuration" is selected (e.g., by the user). The UI screen 1900C presents a plurality of machine configurations (e.g., available machine configurations for VMs). In other words, a plurality of user-selectable options (as shown by a dotted box 1907) that correspond to the plurality of machine configurations may be presented. A machine configuration may refer to a configuration of a VM for deployment. A configuration of a VM may include or may be indicative of a number of virtual CPUs (vCPUs) of the VM, an amount of RAM of the VM, or the like. In other words, the configuration of the VM may be indicative of a set of technical specifications of the VM.

In a non-limiting example, the plurality of user-selectable options include first through fourth user-selectable options that correspond to first through fourth machine configurations, respectively. The first through fourth machine configurations may correspond to a "2 Gigabyte (GB) RAM; 2vCPU" configuration, a "4 GB RAM; 2vCPU" configuration, an "8 GB RAM; 2vCPU" configuration, and a "16 GB RAM; 4vCPU", respectively. In a non-limiting example, the first through fourth machine configurations are labelled as "small", "medium", "large", and "custom", respectively, indicative of a set of specifications of a VM associated with a corresponding machine configuration.

In a non-limiting example, the plurality of machine configurations are shown to include only the first through fourth machine configurations. However, in an actual implementation, the plurality of machine configurations may include additional machine configurations (e.g., tens or hundreds of machine configurations) without deviating from the scope of the disclosure. One or more user-selectable options, of the first through fourth user-selectable options, may be selected to make corresponding machine configurations available for the deployment of the microservices. In other words, a set of machine configurations may be selected, from the plurality of machine configurations, to make corresponding machine configurations available for the deployment of the plurality of microservices. In a non-limiting example, it is assumed that the first and second user-selectable options are selected (e.g., by the user). Therefore, the selected set of machine configurations may include only the first and second configurations, thereby, making only the first and second machine configurations available for the deployment of the plurality of microservices.

It is known to those of skill in the art that VMs with higher or better machine configurations may be associated with higher costs. For example, a cost for a VM with the second machine configuration at a cloud technology (e.g., the first cloud technology) may be higher than a cost for a VM with the first machine configuration at the cloud technology. Therefore, in another embodiment, only a few machine configurations (e.g., the first and second machine configurations) may be selected from the plurality of machine configurations for the deployment of the micro services.

Figure 19D:
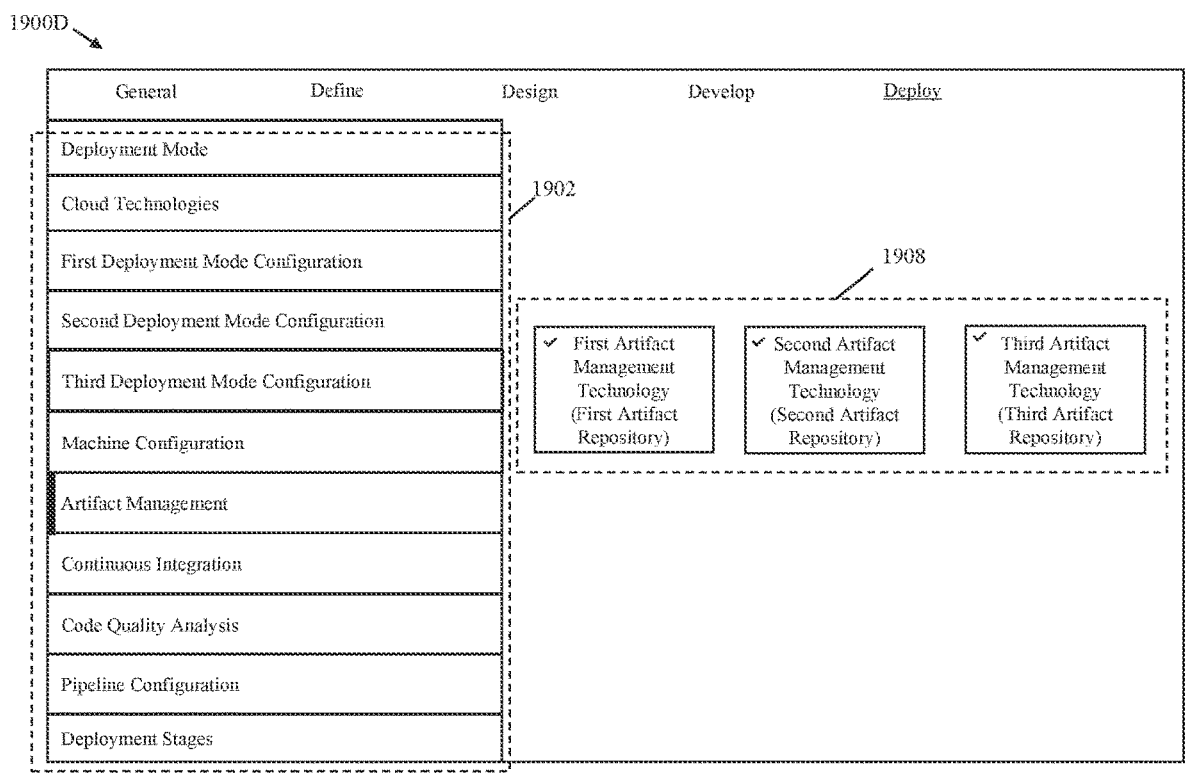

Referring now to FIG. 19D, the UI screen 1900D is rendered by the user action designer 202 when the user-selectable option "Artifact Management" is selected. The UI screen 1900D presents a plurality of artifact management technologies. In other words, a plurality of user-selectable options (as shown by a dotted box 1908) that correspond to the plurality of artifact management technologies may be presented. In a non-limiting example, the plurality of user-selectable options include first through third user-selectable options that correspond to first through third artifact management technologies, respectively.

Artifact management technologies (e.g., the plurality of artifact management technologies) enable storage and management of binaries (e.g., Docker images) or artifacts. Artifact management technologies are well known to those of skill in the art. The first plurality of technologies 114 include the plurality of artifact management technologies. Detailed explanation of functionality of the plurality of artifact management technologies is skipped to avoid obscuring the disclosure.

Each of the plurality of user-selectable options may correspond to a pre-configured instance of a corresponding artifact management technology. For example, a first user-selectable option, of the plurality of user-selectable options, may be indicative of a first artifact repository at the first artifact management technology. For the sake of brevity, it is assumed that the first artifact repository may have been previously configured (e.g., created or generated). Configuration of artifact repositories at artifact management technologies is well known to those of skill in the art. Therefore, description of the configuration of artifact repositories is avoided. Similarly, a second user-selectable option, of the plurality of user-selectable options, may be indicative of a second artifact repository at the second artifact management technology. Similarly, a third user-selectable option, of the plurality of user-selectable options, may be indicative of a third artifact repository at the third artifact management technology.

One or more user-selectable options, of the first through third user-selectable options, may be selected to make corresponding artifact management technologies (e.g., corresponding artifact repositories) available for selection during the configuration of pipeline templates for the plurality of microservices. In a non-limiting example, the plurality of user-selectable options are indicative of a single instance (e.g., a single artifact repository) at each of the plurality of artifact management technologies. However, in another embodiment, the plurality of user-selectable options may be indicative of multiple instances (e.g., multiple artifact repositories) available at each of the plurality of artifact management technologies, without deviating from the scope of the disclosure.

The plurality of user-selectable options are indicative of a plurality of artifact repositories (e.g., the first through third artifact repositories). A set of artifact repositories may be selected from the plurality of artifact repositories. Based on the selection of the set of artifact repositories, the set of artifact repositories may be made available for selection during the design of the pipeline templates. In a non-limiting example, it is assumed that the first through third user-selectable options are selected (e.g., by the user), thereby, making the first through third artifact repositories (e.g., the first through third artifact management technologies) available. Therefore, the selected set of artifact repositories is same as the plurality of artifact repositories.

Examples of the first through third artifact management technologies may include, but are not limited to, Amazon elastic container registry (ECR), JFrog, and Azure container registry (ACR), or the like. ACR is interchangeably referred to as "Azure ACR" throughout the disclosure. For the sake of brevity, the plurality of artifact management technologies are shown to include only the first through third artifact management technologies. However, in an actual implementation, the plurality of artifact management technologies may include other artifact management technologies without deviating from the scope of the disclosure.

Figure 19E:
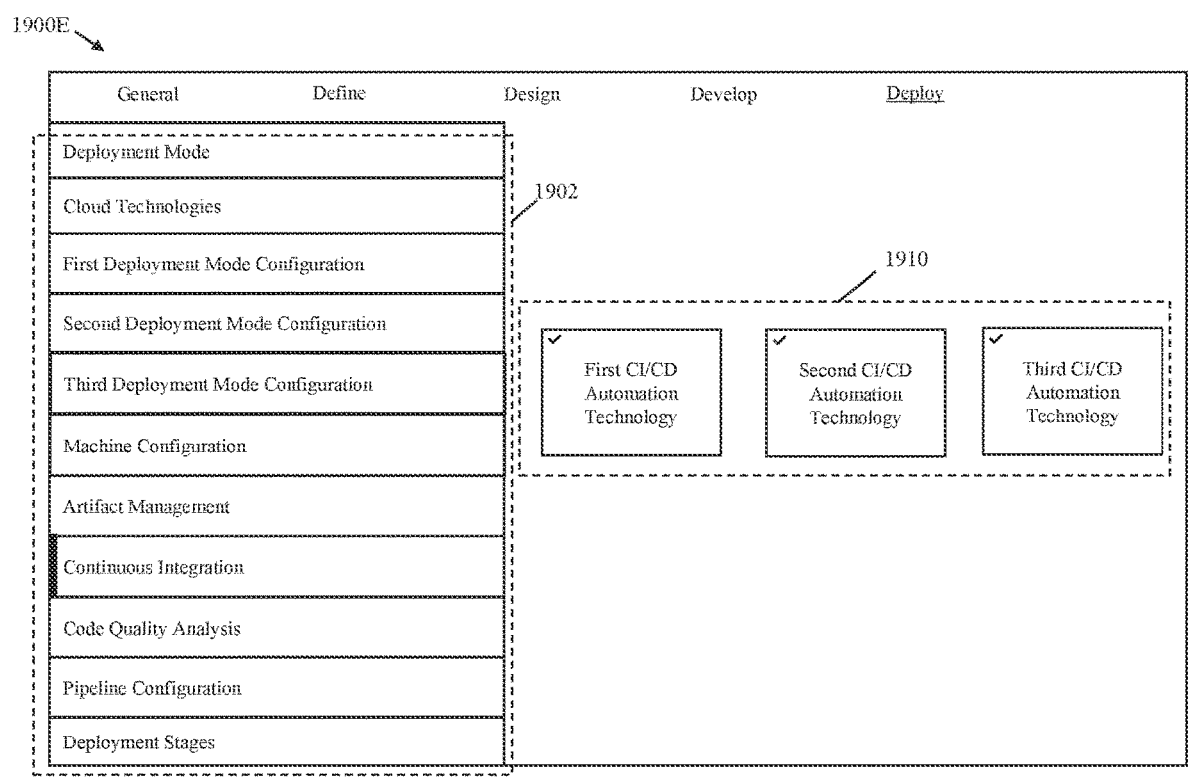

Referring now to FIG. 19E, the UI screen 1900E is rendered by the user action designer 202 when the user-selectable option "Continuous integration" is selected. The UI screen 1900E presents a plurality of CI/CD automation technologies. In other words, a plurality of user-selectable options (as shown by a dotted box 1910) that correspond to the plurality of CI/CD automation technologies may be presented. In a non-limiting example, the plurality of user-selectable options include first through third user-selectable options that correspond to first through third CI/CD automation technologies, respectively.

CI/CD automation technologies (e.g., the plurality of CI/CD automation technologies) enable creation, orchestration, and execution of CI/CD pipelines. CI/CD automation technologies are well known to those of skill in the art. Detailed explanation of functionality of the plurality of CI/CD automation technologies is skipped to avoid obscuring the disclosure.

Each of the plurality of user-selectable options may correspond to a pre-configured instance of a corresponding CI/CD automation technology. For example, a first user-selectable option, of the plurality of user-selectable options, may be indicative of a first CI/CD instance that corresponds to the first CI/CD automation technology. In other words, the first user-selectable option is indicative of the first CI/CD instance of the first CI/CD automation technology. For the sake of brevity, it is assumed that the first CI/CD instance may have been previously configured (e.g., created or generated). Configuration of instances of CI/CD automation technologies is well known to those of skill in the art. Therefore, description of the configuration of CI/CD automation technologies is avoided. Similarly, a second user-selectable option, of the plurality of user-selectable options, may be indicative of a second CI/CD instance that corresponds to the second CI/CD automation technology. Similarly, a third user-selectable option, of the plurality of user-selectable options, may be indicative of a third CI/CD instance that corresponds to the third CI/CD automation technology.

One or more user-selectable options, of the first through third user-selectable options, may be selected to make corresponding CI/CD automation technologies (e.g., corresponding CI/CD instances) available for selection during the configuration of pipeline templates for the plurality of microservices. In a non-limiting example, the plurality of user-selectable options are indicative of a single instance (e.g., a single CI/CD instance) at each of the plurality of CI/CD automation technologies. However, in another embodiment, the plurality of user-selectable options may be indicative of multiple instances (e.g., multiple CI/CD instances) available at each of the plurality of CI/CD automation technologies, without deviating from the scope of the disclosure. For example, the plurality of user-selectable options may be indicative of multiple CI/CD instances that correspond to the first CI/CD automation technology.

The plurality of user-selectable options are indicative of a plurality of CI/CD instances (e.g., the first through third CI/CD instances). A set of CI/CD instances, of the plurality of CI/CD instances, may be selected. Based on the selection of the set of CI/CD instances, the set of CI/CD instances may be made available for selection during the design of the pipeline templates. In a non-limiting example, it is assumed that the first through third user-selectable options are selected (e.g., by the user), thereby, making the first through third CI/CD instances (e.g., the first through third CI/CD automation technologies) available. Therefore, the selected set of CI/CD instances may be same as the plurality of CI/CD instances.

For the sake of brevity, it is assumed that the plurality of CI/CD automation technologies include the first through third CI/CD automation technologies. However, in an actual implementation, the plurality of CI/CD automation technologies may include other CI/CD automation technologies without deviating from the scope of the disclosure. Examples of the plurality of CI/CD automation technologies include, but are not limited to, Jenkins, Bamboo, Circle CI, or the like.

Figure 19F:
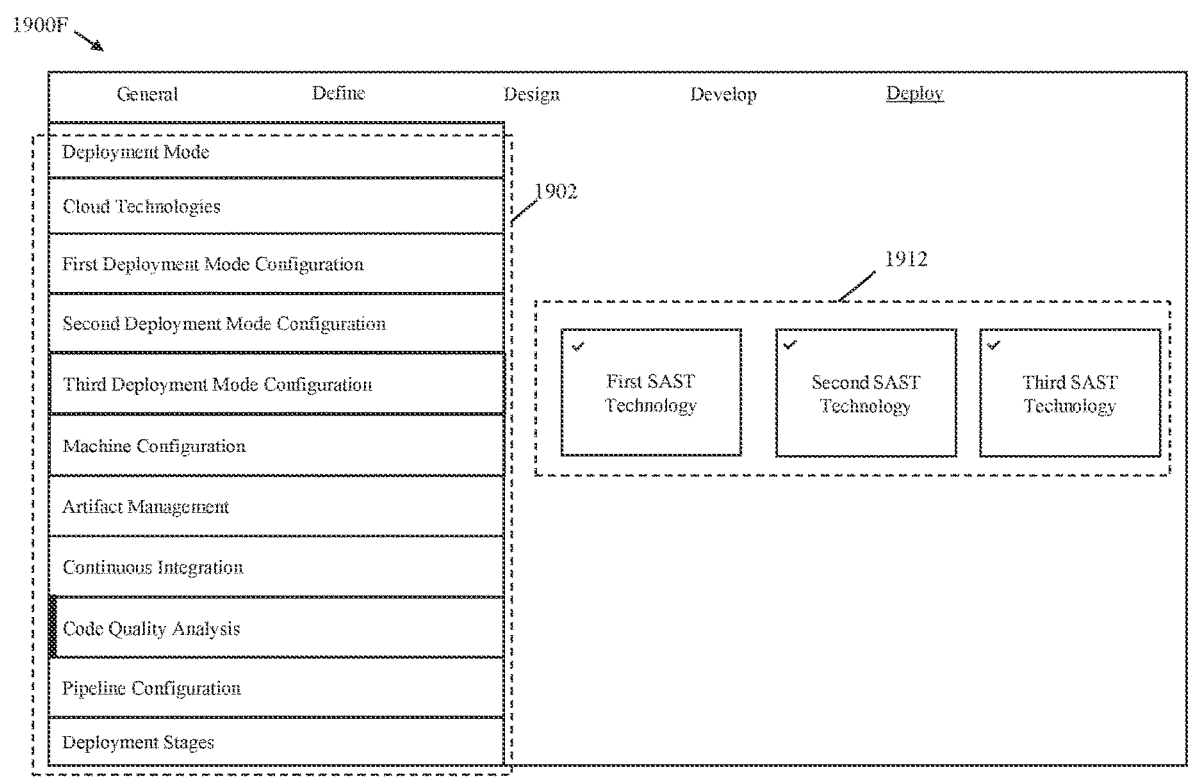

Referring now to FIG. 19F, the UI screen 1900F is rendered by the user action designer 202 when the user-selectable option "Code Quality Analysis" is selected. The UI screen 1900F the presents a plurality of code quality analysis technologies (e.g., SAST technologies). In other words, a plurality of user-selectable options (as shown by a dotted box 1912) that correspond to the plurality of quality analysis technologies may be presented. In a non-limiting example, the plurality of user-selectable options include first through third user-selectable options that correspond to first through third code quality analysis technologies, respectively. One or more user-selectable options, of the first through third user-selectable options, may be selected to make corresponding code quality analysis technologies available for selection during design of policy templates for the plurality of microservices.

Code quality analysis technologies or SAST technologies (e.g., the plurality of code quality analysis technologies) enable automated testing and analysis of code. Code quality analysis technologies that are available for analysis of code quality are well known to those of skill in the art. The first plurality of technologies 114 include the plurality of code quality analysis technologies. For the sake of brevity, the terms "code quality analysis" and "SAST" are used interchangeably throughout the disclosure.

Each of the plurality of user-selectable options may correspond to a pre-configured instance of a corresponding SAST technology. For example, a first user-selectable option, of the plurality of user-selectable options, may be indicative of a first SAST instance that corresponds to the first SAST technology. In other words, the first user-selectable option is indicative of the first SAST instance of the first SAST technology. For the sake of brevity, it is assumed that the first SAST instance may have been previously configured (e.g., created or generated). Configuration of SAST instances at SAST instance technologies is well known to those of skill in the art. Therefore, description of the configuration of SAST instances is avoided. Similarly, a second user-selectable option, of the plurality of user-selectable options, may be indicative of a second SAST instance at the second SAST instance technology. Similarly, a third user-selectable option, of the plurality of user-selectable options, may be indicative of a third SAST instance at the third SAST instance technology.

One or more user-selectable options, of the first through third user-selectable options, may be selected to make corresponding SAST technologies (e.g., corresponding SAST instances) available for selection during the configuration of pipeline templates for the plurality of microservices. In a non-limiting example, the plurality of user-selectable options are indicative of a single instance (e.g., a single SAST instance) at each of the plurality of SAST technologies. However, in another embodiment, the plurality of user-selectable options may be indicative of multiple instances (e.g., multiple SAST instances) available at each of the plurality of SAST technologies, without deviating from the scope of the disclosure. For example, the plurality of user-selectable options may be indicative of multiple SAST instances that correspond to the first SAST technology (e.g., multiple SAST instances that correspond to SonarQube).

The plurality of user-selectable options are indicative of a plurality of SAST instances (e.g., the first through third SAST instances). A set of SAST instances, of the plurality of SAST instances, may be selected. Based on the selection of the set of SAST instances, the set of SAST instances may be made available for selection during the design of the pipeline templates. In a non-limiting example, it is assumed that the first through third user-selectable options are selected (e.g., by the user), thereby, making the first through third SAST instances (e.g., the first through third SAST technologies) available. Therefore, the selected set of SAST instances may be same as the plurality of SAST instances.

For the sake of brevity, it is assumed that the plurality of SAST technologies include the first through third SAST technologies. However, in an actual implementation, the plurality of SAST technologies may include additional SAST technologies without deviating from the scope of the disclosure. Examples of the plurality of code quality analysis technologies include, but are not limited to, SonarQube, Veracode, Mend, AppScan, Apache JMeter, or the like.

In a similar manner, the user action designer 202 may render a UI screen (not shown) that enables the user to presents a plurality of version control technologies. In other words, a plurality of user-selectable options (not shown) that correspond to the plurality of version control technologies may be presented. In a non-limiting example, the plurality of user-selectable options may include first through third user-selectable options that correspond to first through version control technologies, respectively.

Version control technologies (e.g., the plurality of version control technologies) enable creation and management of code repositories. Version control technologies are well known to those of skill in the art. Examples of the plurality of version control technologies include, but are not limited to, GitHub, GitLab, BitBucket, or the like. Detailed explanation of functionality of the plurality of version control technologies is skipped to avoid obscuring the disclosure. The plurality of technologies 114 include the plurality of version control technologies.

Each of the plurality of user-selectable options may correspond to a pre-configured code repository at a corresponding version control technology. For example, a first user-selectable option, of the plurality of user-selectable options, may be indicative of a first code repository that corresponds to the first version control technology. In other words, the first user-selectable option is indicative of the first code repository at the first version control technology. For the sake of brevity, it is assumed that the first code repository may have been previously configured (e.g., created or generated). Configuration of code repositories at version control technologies is well known to those of skill in the art. Therefore, description of the configuration of version control technologies is avoided. Similarly, a second user-selectable option, of the plurality of user-selectable options, may be indicative of a second code repository that corresponds to the second version control technology. Similarly, a third user-selectable option, of the plurality of user-selectable options, may be indicative of a third code repository that corresponds to the third version control technology.

One or more user-selectable options, of the first through third user-selectable options, may be selected to make corresponding version control technologies (e.g., corresponding code repositories) available for selection during the configuration of the pipeline templates for the plurality of microservices. In a non-limiting example, the plurality of user-selectable options are indicative of a single code repository at each of the plurality of version control technologies. However, in another embodiment, the plurality of user-selectable options may be indicative of multiple code repositories available at each of the plurality of version control technologies, without deviating from the scope of the disclosure. For example, the plurality of user-selectable options may be indicative of multiple code repositories at the first version control technology.

The plurality of user-selectable options are indicative of a plurality of code repositories (e.g., the first through third code repositories). A set of code repositories, of the plurality of code repositories, may be selected. Based on the selection of the set of code repositories, the set of code repositories may be made available for selection during the design of the pipeline templates. In a non-limiting example, it is assumed that the first through third user-selectable options are selected (e.g., by the user), thereby, making the first through third code repositories (e.g., the first through third version control technologies) available. Therefore, the selected set of code repositories may be same as the plurality of code repositories.

Selection of tools or technologies (e.g., the set of SAST technologies, the set of version control technologies, or the like) constitutes configuration of policies for the availability of technologies for the deployment of the plurality of microservices. It will be apparent to those of skill in the art that the configuration of policies is not limited to the selection of technologies for aforementioned operations (e.g., version control, code quality analysis, CI/CD automation, or the like). It will be apparent to those of skill in the art that configuration of policies may further include selection of technologies for other operations such as, but not limited to, DAST, unit testing, integration testing, or the like.

Figure 19G:
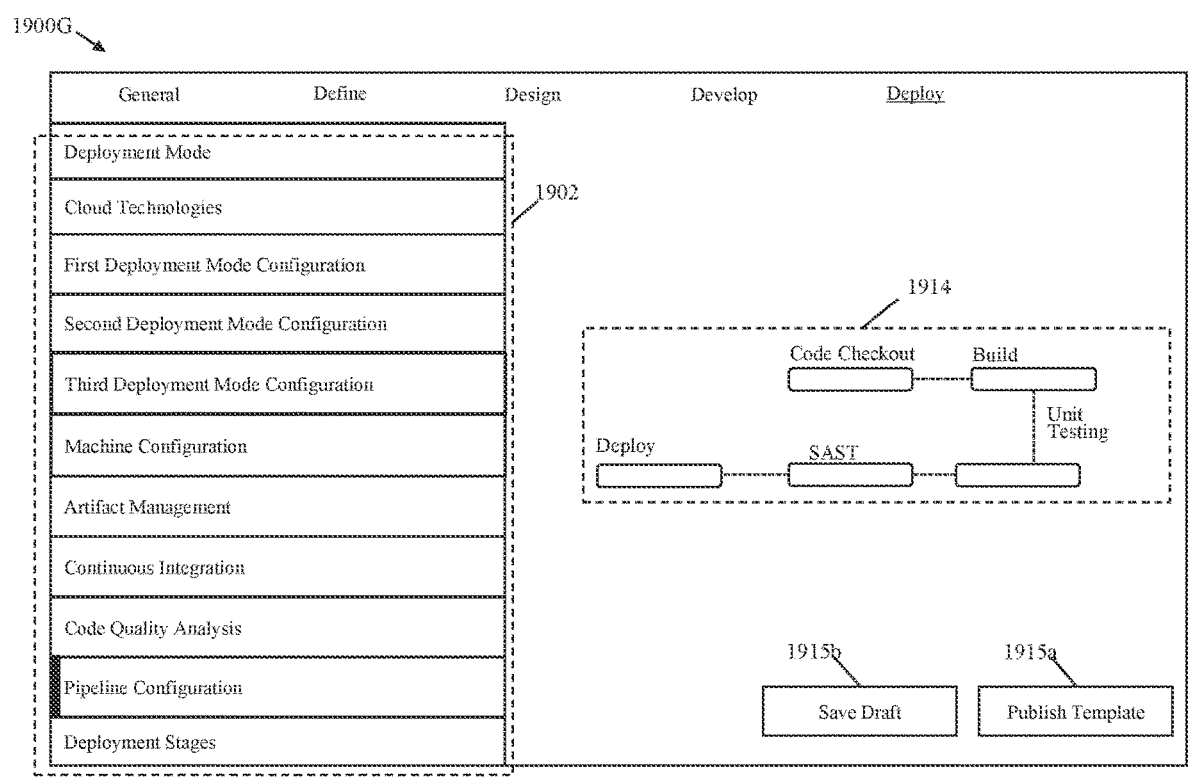

Referring now to FIG. 19G, the UI screen 1900G is rendered by the user action designer 202 when the user-selectable option "Pipeline configuration" is selected. The UI screen 1900G enables the user to configure (e.g., define, design, or create) one or more pipeline templates for each of the plurality of microservices (e.g., the first and sixth microservices). For example, the UI screen 1900G may enable the user to configure a first pipeline template for the first microservice (e.g., React v17.0), a second pipeline template for the sixth microservice (e.g., Java), or the like.

A first plurality of pipeline stages may be available for inclusion in a pipeline template (e.g., the first pipeline template, the second pipeline template, or the like). For configuring the first pipeline template, a second plurality of stages may be selected by the user from the first plurality of stages. In one embodiment, the UI rendered by the user action designer 202 may present (not shown) the first plurality of pipeline stages. The first plurality of pipeline stages may include, but are not limited to, a code checkout stage, a build stage, a unit testing stage, an integration testing stage, a DAST stage, a deploy stage, or the like. Various actions (e.g., drag and drop actions) may be performed by the user to select the second plurality of pipeline stages from first plurality of pipeline stages. In other words, the various actions (e.g., user actions) performed by the user for the selection of the second plurality of pipeline stages indicate that the first pipeline template (e.g., a CI/CD pipeline generated based on the first pipeline template) is to include the second plurality of pipeline stages. The second plurality of pipeline stages may be selected for the creation (e.g., configuration) of the first pipeline template.

Each of the first plurality of pipeline stages may be associated with a corresponding set of operations that are to be executed for execution of a corresponding stage. For example, the set of operations for the code checkout stage may include, but is not limited to, copying or downloading code from a code repository. Similarly, the set of operations for the build stage may include compilation of a project. Similarly, the set of operations for the SAST stage (e.g., the code quality analysis stage) may include analysis of code to determine vulnerabilities associated with or included in the code. Operations that may be performed at each stage of the first plurality of stages are well known to those of skill in the art.

Further, a plurality of technologies of the first plurality of technologies 114 may be available (e.g., capable) for the execution/implementation/facilitation of each pipeline stage of the first plurality of pipeline stages. In other words, each pipeline stage may be associated with an underlying technology, of the first plurality of technologies 114, that facilitates execution of a corresponding pipeline stage. For example, a plurality of technologies (e.g., a plurality of tools) of the first plurality of technologies 114 may be available for the execution of the code checkout stage. Examples of the plurality of technologies available for the implementation of the code checkout stage may include various version control technologies such as, but not limited to, GitHub, BitBucket, GitLab, or the like. Similarly, a plurality of technologies of the first plurality of technologies 114 may be available for the execution of the build stage. Examples of the plurality of technologies available for the execution of the build stage may include, but are not limited to, Gradle, Maven, Simple build tool (SBT), or the like. Similarly, a plurality of technologies of the first plurality of technologies 114 may be available for the execution of the deploy stage. Examples of the plurality of technologies available for the execution of the deploy stage may include, but are not limited to, AWS, Azure, GCP, or the like.

Each pipeline template may include at least three pipeline stages—a code checkout stage, a build stage, and a deployment stage. However, in actual implementation, each policy template may include additional stages (e.g., the SAST stage, the unit testing stage, the integration testing stage, the DAST stage, or the like) without deviating from the scope of the disclosure. In some embodiments, a pipeline template may further include one or more approval workflows. Each approval workflow may include one or more manual steps that are required to be performed prior to execution of a stage (e.g., the deploy stage). For example, the first pipeline template may be indicative of a set of manual steps (e.g., steps of code review and approval) that is to be performed prior to the deployment of the first microservice. However, in a non-limiting example, it is assumed that the first pipeline template does not include any manual approval workflows.

In a non-limiting example, the UI screen 1900G presents the first pipeline template (as shown by a dotted box 1914) for automated CI/CD (e.g., cloud deployment) of the first microservice. The first pipeline template is shown to include first through fifth pipeline stages. The first through fifth stages correspond to a code checkout stage, a build stage, a unit testing stage, an SAST stage, and a deploy stage. Each of the first through sixth stages may be associated with a corresponding set of operations. A plurality of technologies (e.g., tools), of the first plurality of technologies 114, may be available for the execution of each of the second plurality of stages included in the first pipeline template.

For example, a plurality of version control technologies, of the first plurality of technologies 114, may be available for the execution/facilitation of the code checkout stage included in the first pipeline template. Similarly, a plurality of build technologies, of the first plurality of technologies 114, may be available for the execution of the build stage included in the first pipeline template. Similarly, a plurality of unit testing technologies, of the first plurality of technologies 114, may be available for the execution of the unit testing stage included in the first pipeline template. Similarly, a plurality of code quality analysis technologies, of the first plurality of technologies 114, may be available for the execution of the SAST pipeline stage included in the first pipeline template. Similarly, a plurality of cloud technologies, of the first plurality of technologies 114, may be available for the execution of the deploy stage included in the first pipeline template.

For each stage included in the first pipeline template, one or more technologies (e.g., instances of a corresponding technology) may be selected from the plurality of technologies available for the execution of a corresponding stage. For example, the first code repository that corresponds to the first version control technology (e.g., GitHub) may be selected from the plurality of code repositories for the first stage of the first pipeline template. Similarly, a first build technology (e.g., an instance of the first build technology) may be selected from the plurality of build technologies (e.g., a plurality of build instances that correspond to the plurality of build technologies) for the execution of the second set of operations that correspond to the second stage of the first pipeline template. Similarly, a first unit testing instance that corresponds to a first unit testing technology (e.g., Karma) may be selected from the plurality of unit testing technologies for the execution of the third set of operations that correspond to the third stage of the first process template. Similarly, a first code quality analysis technology (e.g., SonarQube) may be selected from the plurality of code quality analysis for the execution of the fourth set of operations that corresponds to the fourth stage of the first process template. Similarly, a first cloud technology (e.g., AWS) may be selected from the plurality of cloud technologies for the execution of the fifth set of operations (e.g., the cloud deployment) that corresponds to the fifth stage of the first process template. However, in a non-limiting example, it is assumed that technologies for executing the fifth stage (e.g., the deploy stage) are not selected during the configuration of the first pipeline template. In other words, technologies for execution of a first set of pipeline stages (e.g., the first through fourth pipeline stages) of the second plurality of pipeline stages may be selected.

Further, a CI/CD automation technology (e.g., the first CI/CD automation technology; the first CI/CD instance) may be selected from the selected set of CI/CD automation technologies (e.g., the plurality of CI/D automation technologies) for orchestration (e.g., automation) of a first CI/CD pipeline that is to be created based on the first pipeline template. In a non-limiting example, it is assumed that first CI/CD automation technology selected for the orchestration of the first CI/CD pipeline that is to be created and/or executed based on the first pipeline template is Jenkins. Further, an artifact management technology, of the plurality of artifact management technologies, may be selected for management (e.g., storing) of artifacts (e.g., Docker images) generated by execution of CI/CD pipelines (e.g., the first CI/CD pipeline) for artifact management for the first CI/CD pipeline that is to be created based on the first pipeline template.

In a non-limiting example, it is assumed that the selected first artifact management technology is AWS ECR (e.g., the first artifact repository that corresponds to AWS ECR). For the sake of brevity, it is further assumed that first CI/CD automation technology is selected for automation of all CI/CD pipelines (e.g., the first CI/CD pipeline, a second CI/CD pipeline that is be created and/or orchestrated based on the second pipeline template, or the like) that are to be created and/or orchestrated for CI and CD of the second plurality of microservices. However, it will be apparent to those of skill in the art that multiple CI/CD automation technologies (e.g., Jenkins, Circle CI, Bamboo, or the like) may be used for automation of different CI/CD pipelines without deviating from the scope of the disclosure. Further, it is assumed in a non-limiting example, that a single artifact management technology (e.g., the first artifact management technology) is used for management and storing of artifacts generated based on all the CI/CD pipelines that are to be executed for the deployment of the software product. However, in another embodiment, multiple artifact management technologies may be used without deviating from the scope of the disclosure.

The first pipeline template may be indicative of the second plurality of pipeline stages included therein and the set of operations (e.g., the first through fifth sets of operations) associated with each stage of the second plurality of stages. The first pipeline template may be further indicative of the technology (e.g., the first repository management technology, the first build technology, the first unit testing technology, or the like) selected for the execution of each of the first set of stages of the second plurality of stages. The first pipeline template may be further indicative of the technology (e.g., the first CI/CD automation technology; Jenkins) selected for the automation of the first CI/CD pipeline. In some embodiments, the first pipeline template may be further indicative of the technology (e.g., the first artifact management technology) selected for the artifact management for the first CI/CD pipeline. The first pipeline template may be further indicative of an artifact repository (e.g., the first artifact repository at the first artifact management technology) selected for storing binaries that may be generated during execution of the first CI/CD pipeline. The first pipeline template may be further indicative of the one or more manual workflows or manual steps included in the first pipeline template.

The UI screen 1900G presents a first user-selectable option 1915a for publishing the first pipeline template. Based on the selection of the first user-selectable option 1915a, the user action designer 202 may record a first plurality of user actions performed (e.g., by the user) on the UI (e.g., the deployment stage view) rendered by the user action designer. In a non-limiting example, the recorded plurality of user actions may include, but are not limited to, actions performed by the user to configure a pipeline template (e.g., the first and second pipeline templates). The recorded plurality of user actions may include the selection of the second plurality of stages included in the first pipeline template and the selection of the technology (e.g., selected instance of a corresponding technology) for each of the second plurality of stages.

Referring back to FIG. 17, the user action designer 202 may store, in the user action catalog 203, first metadata associated with the first plurality of user actions. The first metadata may be indicative of the second plurality of pipeline stages included in the first pipeline template, the set of operations to be performed at each of the second plurality of stages, and the technology selected for each of the first set of pipeline stages.

The user action script compiler 204 may generate a first user action script based on the first metadata. The first user action script may include or may be indicative of the first metadata. The pipeline compiler 1702 may be configured to compile the first user action script into a first pipeline template script that is indicative of the first pipeline template that is to be generated. In other words, the pipeline compiler 1702 compiles the first plurality of user actions into a detailed script that is indicative of a list of steps (e.g., the set of operations associated with each pipeline stage of the second plurality of pipeline stages) that are to be orchestrated for the execution of the first CI/CD pipeline. The first pipeline template script is a compiled version of the first user action script and is indicative of the list of steps. The first pipeline template script may be further indicative of the technology (e.g., technology instance) selected for each of the first set of pipeline stages of the second plurality of pipeline stages. The first pipeline template script may be in or may correspond to the format that is compatible with the service application 112. In other words, the first pipeline template script is indicative of the second plurality of stages, the set of operations associated with each of the second plurality of pipeline stages (e.g., the first set of pipeline stages), and the technology selected for each of the first set of pipeline stages. The first pipeline template script may be further indicative of the first CI/CD instance selected for the creation, orchestration, and execution of the first CI/CD pipeline. The first pipeline template script may be further indicative of the first artifact repository for storing the binaries generated during the execution of the first CI/CD pipeline.

The pipeline compiler 1702 may communicate the first pipeline template script to the pipeline orchestration engine 1706a. The pipeline orchestration engine 1706a may communicate the first pipeline template script to a gentech script generator, of the plurality of gentech script generators 208, that corresponds to the plurality of CI/CD automation technologies. The gentech script generator that corresponds to the plurality of CI/CD automation technologies is designated and referred to as "CI/CD automation gentech script generator".

Each gentech script generator is configured to generate gentech scripts that are in a format that is technology agnostic with respect to a corresponding plurality of technologies. For example, the CI/CD automation gentech script generator is configured to generate gentech scripts that are in a format that is technology agnostic with respect to the plurality of CI/CD automation technologies.

The CI/CD automation gentech script generator may, based on the received first pipeline template script generate a set of gentech scripts (e.g., a first set of CI/CD automation gentech scripts). The first set of CI/CD automation gentech scripts may be indicative of the second plurality of pipeline stages and the technology selected for the each of the first set stages of the second plurality of stages, and may be in the format that is technology agnostic with respect to the plurality of CI/CD automation technologies. The CI/CD automation gentech script generator may communicate the first set of CI/CD automation gentech scripts to the pipeline orchestration engine 1706a.

The pipeline orchestration engine 1706a may identify (e.g., determine) a technology-specific interpreter, of the plurality of technology-specific interpreters 210, for the first CI/CD automation technology. The identification or the determination of the technology-specific interpreter for the first CI/CD automation technology may be based on the information stored in the second look-up table 506. The technology-specific interpreter that corresponds to the first CI/CD automation technology is designated and referred to as "first CI/CD automation technology-specific interpreter".

The pipeline orchestration engine 1706a may be configured to communicate the first set of CI/CD automation gentech scripts to the first CI/CD automation technology-specific interpreter. The first CI/CD automation technology-specific interpreter may convert the first set of CI/CD automation gentech scripts into a set of technology-specific scripts that is in a format that is compatible with or corresponds to the first CI/CD automation technology. In other words, the CI/CD automation technology-specific interpreter may generate, based on the first set of CI/CD automation gentech scripts, the set of technology-specific scripts (e.g., Jenkins-specific scripts) that is indicative of the first pipeline template and in the format that is compatible with the first CI/CD automation technology. For the sake of brevity, the set of technology-specific scripts generated by the first CI/CD automation technology-specific interpreter is hereinafter, designated and referred to as "first set of CI/CD automation technology-specific scripts".

The first CI/CD automation technology-specific interpreter may, for validation of the first pipeline template, communicate the first set of CI/CD automation technology-specific scripts to the first CI/CD instance that corresponds to the first CI/CD automation technology. The first set of CI/CD automation technology-specific scripts may constitute or correspond to a query to the first CI/CD automation technology for the validation of the first pipeline template. In other words, the first set of CI/CD automation technology-specific scripts may constitute a query to the first CI/CD automation technology to determine whether it is possible or feasible for the first CI/CD instance (e.g., the first CI/CD automation technology) to create a CI/CD pipeline (e.g., the first CI/CD pipeline) that includes the second plurality of stages and the selected technology for each of first set of stages from the second plurality of stages (e.g., the first set of stages).

Based on the first set of CI/CD automation technology-specific scripts, the first CI/CD instance may execute a set of validation operations for validation of the first pipeline template. For example, the first CI/CD instance may determine, based on configuration of the first CI/CD instance (e.g., based on a configuration of a Jenkins server associated with the entity) whether the first CI/CD instance is able to create a CI/CD pipeline that corresponds to the first pipeline template. For example, if the first pipeline template indicated by (e.g., included in) the first set of CI/CD automation technology-specific scripts includes the SAST stage, the first CI/CD automation technology may determine whether the first CI/CD automation technology is integrated with or is configured to integrate with a corresponding SAST technology (e.g., SonarQube) selected for the SAST stage. If the first CI/CD automation technology determines that it is integrated with the selected first SAST technology (e.g., SonarQube), the first CI/CD automation instance may determine that the inclusion of a corresponding stage (e.g., the SAST stage) is valid. Alternatively, if the first CI/CD instance determines that it is not integrated with the selected first SAST technology (e.g., SonarQube), the first CI/CD automation technology may determine that the inclusion of the a corresponding stage (e.g., the SAST stage) is invalid (e.g., not valid).

Similarly, based on the indication by the first pipeline template that the first code repository that corresponds to the first version control technology is selected for the first pipeline stage of the first set of pipeline stages, the first CI/CD instance may determine whether the first CI/CD instance is integrated with the first version control technology. If the first CI/CD instance determines that it is integrated with the selected first version control technology (e.g., GitHub), the first CI/CD instance may determine that the inclusion of a corresponding stage (e.g., the first stage; code checkout stage) is valid. Alternatively, if the first CI/CD instance determines that it is not integrated with the selected first version control technology, the first CI/CD instance may determine that the inclusion of the corresponding stage (e.g., the code checkout stage) is invalid (e.g., not valid). In a similar manner, the first CI/CD instance may validate an inclusion of each of the first set of stages in the first pipeline template.

Consequently, the first CI/CD instance may communicate a response (e.g., a validation response; progress data) to the first CI/CD automation technology-specific interpreter. The received response may be in the format that is specific to (e.g., compatible with) the first CI/CD automation technology. The received response may indicate whether the first pipeline template is valid or invalid (e.g., a result of execution of the first set of validation operations). In other words, the received response may indicate whether the first pipeline template is successfully validated by the first CI/CD instance (e.g., the first CI/CD automation technology). In a non-limiting example, it is assumed that the received response indicates that the first pipeline template is valid. The first CI/CD automation technology-specific interpreter may convert the received response into a second set of CI/CD automation gentech scripts that is in the format that is technology-agnostic with respect to the plurality of CI/CD automation technologies. In other words, the first CI/CD automation technology-specific interpreter generates the second set of CI/CD automation gentech scripts based on the response received from the first CI/CD automation technology for the first set of CI/CD automation technology-specific scripts. The first CI/CD automation technology-specific interpreter may communicate the second set of CI/CD automation gentech scripts to the pipeline orchestration engine 1706a.

The pipeline orchestration engine 1706a may communicate the second set of CI/CD automation gentech scripts to the CI/CD automation gentech script generator, which may convert the second set of CI/CD automation gentech scripts to a second user action script that is in the format that is compatible with the service application 112. In other words, the CI/CD automation gentech script generator may generate the second user action script based on the second set of CI/CD automation gentech scripts. The second user action script may be indicative of the response received from the first CI/CD instance. In other words, the second user action script may be indicative of the result of the execution of the set of validation operations. Consequently, the CI/CD automation gentech script generator may communicate the second user action script to the pipeline orchestration engine 1706a. The pipeline orchestration engine 1706a may communicate the second user action script to the response converter 212. The response converter 212 may generate a first set of user action responses based on the second user action script. The first set of user action responses may be indicative of the validation of the first pipeline template by the selected first CI/CD automation technology. Based on the first set of user action responses, the user action designer 202 may generate and present a first set of visual indicators (not shown) on the rendered UI. For example, the user action designer 202 may display alerts or notifications indicating that first pipeline template is successfully validated by the first CI/CD automation technology. Further, the pipeline orchestration engine 1706a may, based on the second user action script, which is indicative of the validation of the first pipeline template, store the first pipeline template in a template store (e.g., pipeline template store; not labelled) that is included in the memory associated with the application server 106. In other words, the first pipeline template may be published or stored in the memory associated with the application server 106. The terms "template store" and "pipeline template store" are used interchangeably throughout the disclosure.

In another embodiment, if the response from the first CI/CD instance indicates that the first pipeline template is not successfully validated (e.g., validation failure; first pipeline template is invalidated), the response may indicate a reason for the validation failure. For example, the response from the first CI/CD instance may indicate that the first SAST technology (e.g., SonarQube) selected for the SAST stage is not integrated with the first CI/CD instance. In such a scenario, the second set of CI/CD automation gentech scripts, the second user action script, and the first set of user action responses may be indicative of the reason (e.g., cause) for the validation failure. Consequently, the first set of visual indicators may indicate the reason for the validation failure and may present a prompt (e.g., present a notification or alert), requesting the user to modify the first pipeline template to remove the SAST stage from the second plurality of stages or select a different technology for the execution of the SAST stage. In such a scenario, the pipeline orchestration engine 1706a may not save the first pipeline template in the memory (e.g., the template store).

The UI screen 1900G further presents a second user-selectable option 1915b to save a draft of the first pipeline template when the design of the first pipeline template is under progress. The saved draft of the first pipeline template may later be accessed by the user and modified prior to the generation of the first user action script.

For the sake of brevity, it is assumed that the pipeline template (e.g., the first pipeline template) for each of the plurality of microservices is defined or designed by the user. However, in another embodiment, the service application 112 may present a plurality of pre-defined pipeline templates for the plurality of microservices. In such a scenario, each of the plurality of pre-defined pipeline templates may be used directly (e.g., without modification) to enforce creation and execution of a corresponding first CI/CD pipeline for deployment of a corresponding microservice. Alternatively, one or more pipeline templates of the plurality of pre-defined pipeline templates may be modified (e.g., modification of included stages, modification of technology selected for each stage, or the like) by the user prior to usage for creation and execution of corresponding CI/CD pipelines for corresponding microservices.

Figure 19H:
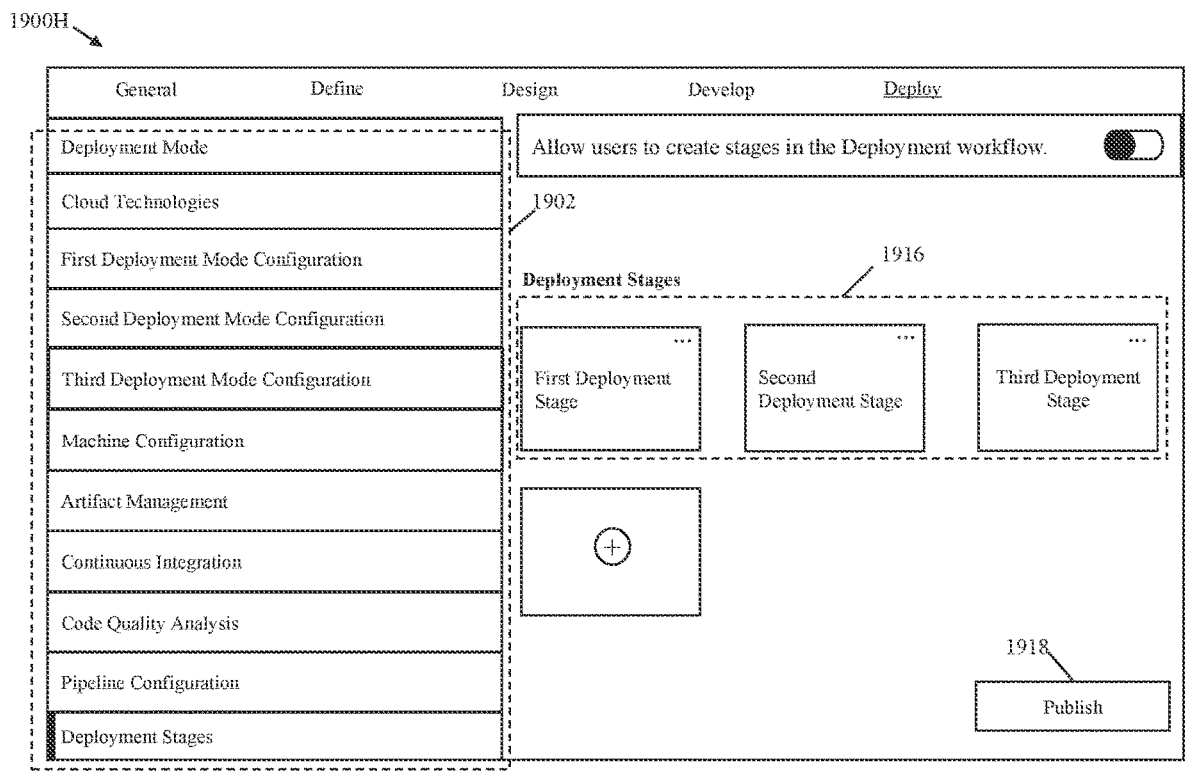

Referring now to FIG. 19H, the UI screen 1900H is rendered by the user action designer 202 when the user-selectable option "Deployment Stages" is selected by the user. The UI screen 1900H presents a plurality of deployment stages. In other words, the UI screen presents a plurality of user-selectable options (as shown by a dotted box 1916) that correspond to the plurality of deployment stages.

The UI screen 1900H enables selection of one or more deployment stages of the plurality of deployment stages that are to be made available for the deployment of the software product (e.g., the deployment of the plurality of microservices). In a non-limiting example, it is assumed that the defined plurality of deployment stages includes first through third deployment stages. Examples of the plurality of deployment stages may include the DEV stage, the QA stage, the PRE-PROD stage, the PROD stage, or the like. In a non-limiting example, it is assumed that only three deployment stages (e.g., the first through third deployment stages) are defined by the user. However, in an actual implementation, the plurality of deployment stages defined by the user may include additional deployment stages without deviating from the scope of the disclosure. For the sake of brevity, it is assumed the defined first through third deployment stages may correspond to the DEV stage, the QA stage, and the PRE-PROD stage, respectively.

A set of deployment stages, of the plurality of deployment stages, that is to be made available for the deployment for the plurality of microservices may be selected by the administrator (e.g., the user). In a non-limiting example, it is assumed that the selected set of deployment stages includes the plurality of deployment stages. Therefore, the set of deployment stages that is to be made available the deployment for the plurality of microservices is same as the plurality of deployment stages. The UI screen 1900H provides a user-selectable option 1918 for publishing the deployment stages. Upon publication of the plurality of deployment stages may be used for the deployment of the software product.

For a given microservice (e.g., the first microservice) of the plurality of microservices, different pipeline templates may be configured (e.g., defined, designed, or created) for deployment of the microservice in different deployment stages. For example, the first pipeline template may be configured for the deployment of the first microservice in a first deployment environment that corresponds to the first deployment stage. The second pipeline template may be configured for the deployment of the sixth microservice in the first deployment environment. Similarly, a third pipeline template (not shown) may be configured for the deployment of the first microservice in a second deployment environment that is different from the first deployment environment and corresponds to the second deployment stage. Similarly, a fourth pipeline template (not shown) may be configured for the deployment of the sixth microservice in the second deployment environment. A fifth pipeline template (not shown) may be configured for the deployment of the first microservice in a third deployment environment that is different from the first and second deployment environments and corresponds to the third deployment stage.

A sixth pipeline template (not shown) may be configured for the deployment of the sixth microservice in the third deployment environment. For a given microservice (e.g., the first microservice), a pipeline template defined for the deployment of the microservice in a deployment environment (e.g., the first deployment environment) may be different from a pipeline template defined for the deployment of the microservice in another deployment environment (e.g., the second deployment environment).

For example, a plurality of pipeline stages (e.g., the second plurality of pipeline stages) included in the first pipeline template may be different from a plurality of stages included in the third pipeline template. The plurality of stages, included in the first pipeline template, may include additional pipeline stages or fewer pipeline stages with respect to the second plurality of pipeline stages. Further, technologies (or instance of technologies) selected for the execution of stages (e.g., one or more pipeline stages) in the second pipeline template may be different from technologies selected for the execution of equivalent stages in the first pipeline template. For example, the second code repository (e.g., the second version control technology) that is different from the first code repository (e.g., the first version control technology) may be selected for a code checkout stage in the third CI/CD pipeline that is to be created (e.g., generated and/or orchestrated) based on the third pipeline template.

The pipeline template store that stores the plurality of pipeline templates, including the first pipeline template, may be indicative of (e.g., include) a mapping between the plurality of microservices, the plurality of pipeline templates, and the plurality of deployment stages. In a non-limiting example, the pipeline template store may include a look-up table (e.g., a third look-up table) that stores the mapping between the plurality of microservices, the plurality of pipeline templates, and the plurality of deployment stages. For example, the look-up table may indicate that the first pipeline template is mapped to the first microservice and the first deployment stage. Similarly, the third look-up table may indicate that the second pipeline template is mapped to the sixth microservices and the first deployment stage. The third look-up table in the template store may further indicate that the third and fourth pipeline templates are mapped to the first and sixth microservice, respectively, and the second deployment stage. The third look-up table in the template store may further indicate that the third and fourth pipeline templates are mapped to the first and sixth microservices, respectively, and the third deployment stage.

It will be apparent to a person skilled in the art that the UIs shown in FIGS. 18 and 19A-19H are exemplary and do not limit the scope of the disclosure.

Figure 20:
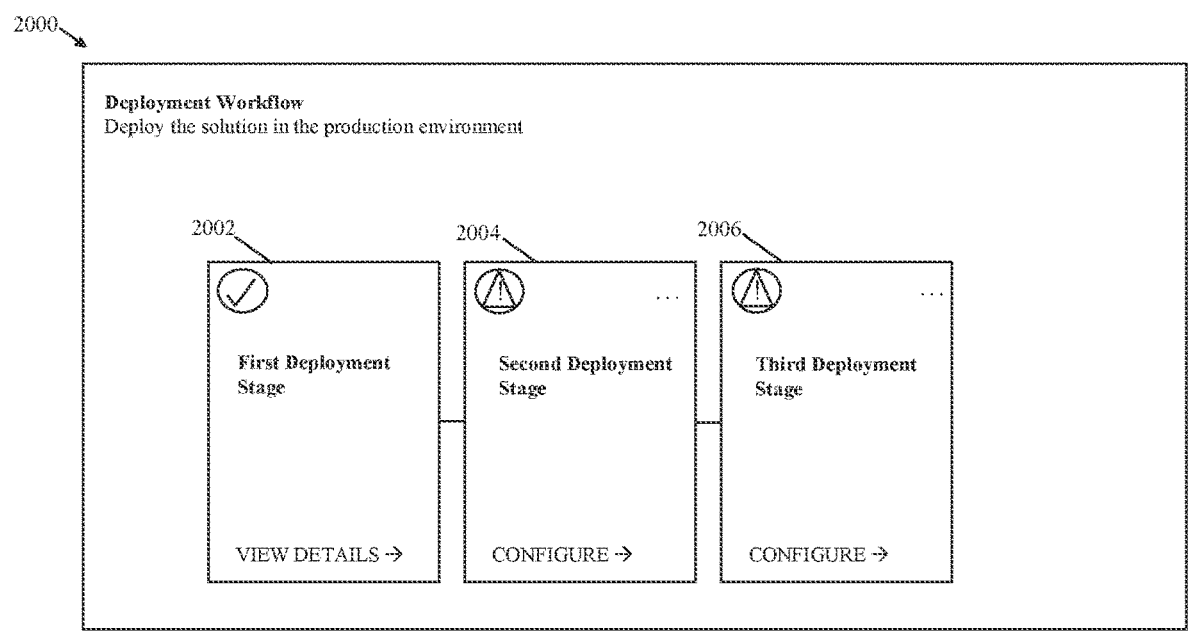
FIG. 20 illustrates a UI screen rendered by the service application on the first user device for creation of a deployment workflow for deployment of a plurality of microservices, in accordance with an exemplary embodiment of the present disclosure.

FIG. 20 illustrates a UI screen 2000 rendered by the service application 112 on the first user device 102*a* for creation of a deployment workflow for the deployment of the plurality of microservices, in accordance with an exemplary embodiment of the present disclosure. In other words, FIG. 20 illustrates (e.g., The UI screen 2000 may be rendered by the user action designer 202 on a display screen of the first user device 102*a*. The UI screen 2000 enables the user to configure (e.g., create, generate, define, or design) a promotion pipeline (e.g., the deployment workflow) for the deployment of the software product (e.g., the deployment of the plurality of microservices). The promotion pipeline enables the user to create or provision a plurality of deployment environments (e.g., the first through third deployment environments) for the deployment of the software product.

Each deployment environment may enable the user (e.g., the plurality of users) to build and test the software product (e.g., the plurality of microservices) in isolated environments. This allows the user to check whether the software product, when deployed, is working as expected. The promotion pipeline is indicative of a sequence in which the software product is to be deployed in the plurality of deployment environments. In a non-limiting example, it is assumed that the user performs various actions (e.g., user actions), on the UI (e.g., the UI screen 2000) rendered by the user action designer 202, for the configuration of a promotion pipeline for the deployment of the plurality of microservices. The promotion pipeline, shown in FIG. 20, indicates that the software product (e.g., the plurality of microservices) is to be deployed first in the first deployment stage 2002, then in a second deployment stage 2004, and then in a third deployment stage 2006. For the sake of brevity, the "first through third deployment stages 2002-2006" are interchangeably referred to as the "first through third deployment stages".

Each deployment stage may correspond to a unique deployment environment for the plurality of microservices. In one embodiment, the user may only be able to include, in the promotion pipeline, deployment stages selected (e.g., the selected set of deployment stages that includes the first through third deployment stages) by the administrator as allowable (e.g., as shown in FIG. 19H) for the deployment of the software product. However, in another embodiment, the user may be allowed or permitted to add new or more deployment stages to the promotion pipeline. The promotion pipeline that includes the first through third deployment stages 2002-2006 included in the promotion pipeline. The promotion pipeline corresponds to a deployment workflow of the software product.

In a non-limiting example, the promotion pipeline is shown to include three deployment stages (e.g., the first through third deployment stages 2002-2006). However, in an actual implementation, the promotion pipeline may include addition of deployment stages or fewer deployment stages without deviating from the scope of the disclosure. It will be apparent to those of skill in the art that the promotion pipeline may include at least two or more deployment stages.

Further, at each deployment stage of the first through third deployment stages 2002-2006, the plurality of microservices associated with or included in the software product (e.g., each microservice included in the software product) may be deployed by way of corresponding CI/CD pipelines (e.g., the first through sixth CI/CD pipelines).

The UI screen 2000 may enable the user to configure each deployment stage in the promotion pipeline. For example, the UI screen 2000 may present a plurality of user-selectable options (not shown) that enable the user to select, for each deployment stage in the promotion pipeline, a deployment mode that is to be used for the deployment of each of the plurality of microservices in a corresponding deployment environment. The set of deployment modes may be selected by the user from the plurality of deployment modes selected by the user in the FIGS. 19A-19H. In a non-limiting example, it is assumed that first through fourth deployment modes (e.g., the plurality of deployment modes) are to be available at each stage in the promotion pipeline. However, it will be apparent to those of skill in the art that one or more deployment modes may be restricted at any stage in the promotion pipeline. For example, the fourth deployment mode (e.g., IaC scripts; Terraform scripts) may not be available as a valid deployment mode in the third deployment stage in the promotion pipeline.

In some embodiments, a set of specifications for a set for VMs that are to be available for the deployment of the software product in each deployment stage may be specified (e.g., configured, defined, selected, or inputted) by the user. In a non-limiting example, user actions performed by the user may indicate the selection of small-sized and medium-sized containers or VMs for each deployment stage in the promotion pipeline. Similarly, user actions performed by the user may indicate the selection or input of a set of specifications for clusters (e.g., Kubernetes clusters) that may be used for the deployment of the software product in each deployment stage.

Figure 21A:
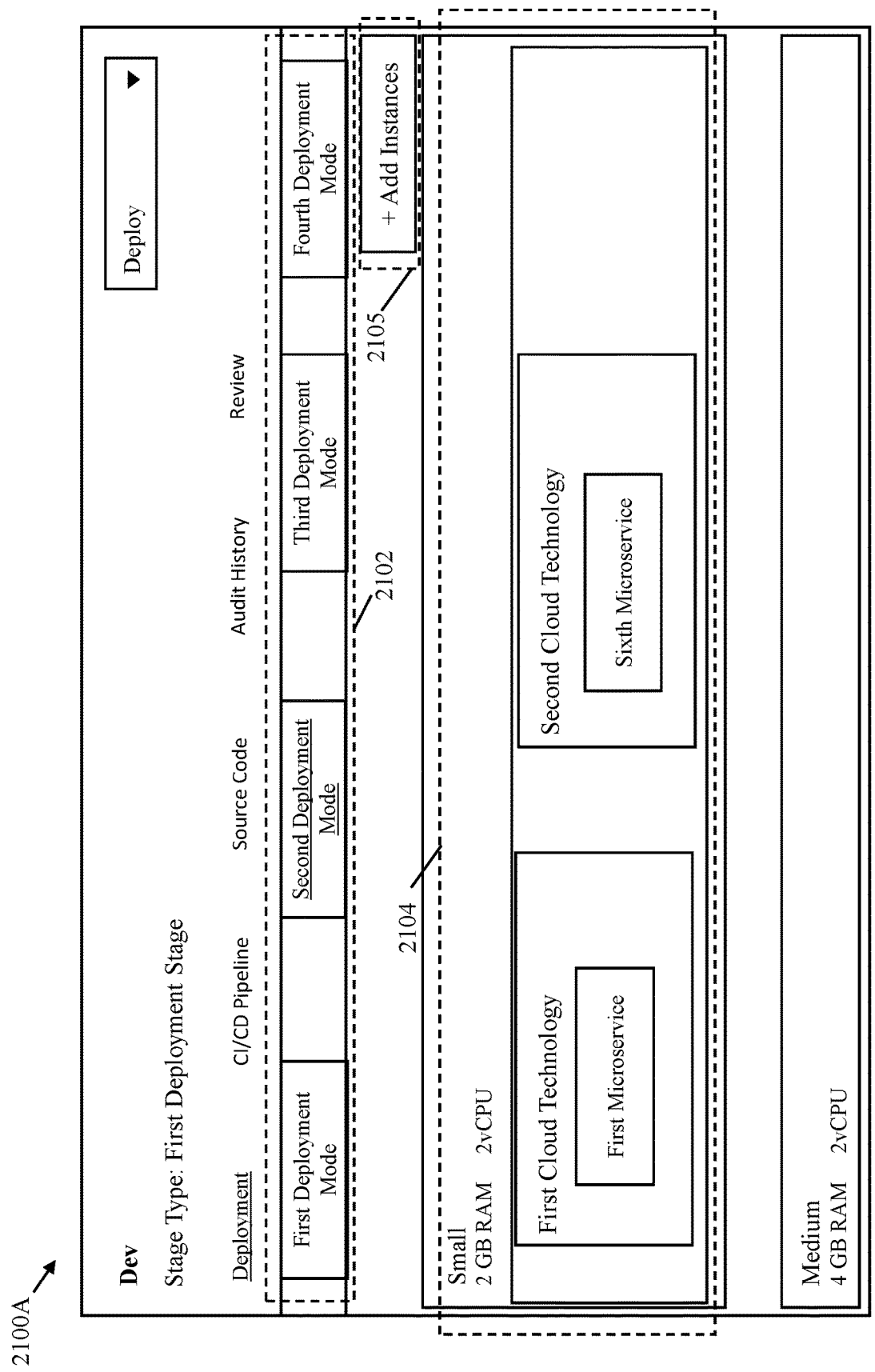
FIGS. 21A and 21B, collectively, illustrate UI screens rendered by the service application on the first user device for configuration of first and second cloud instances for the deployment of the plurality of microservices, in accordance with an exemplary embodiment of the present disclosure.
Figure 21B:
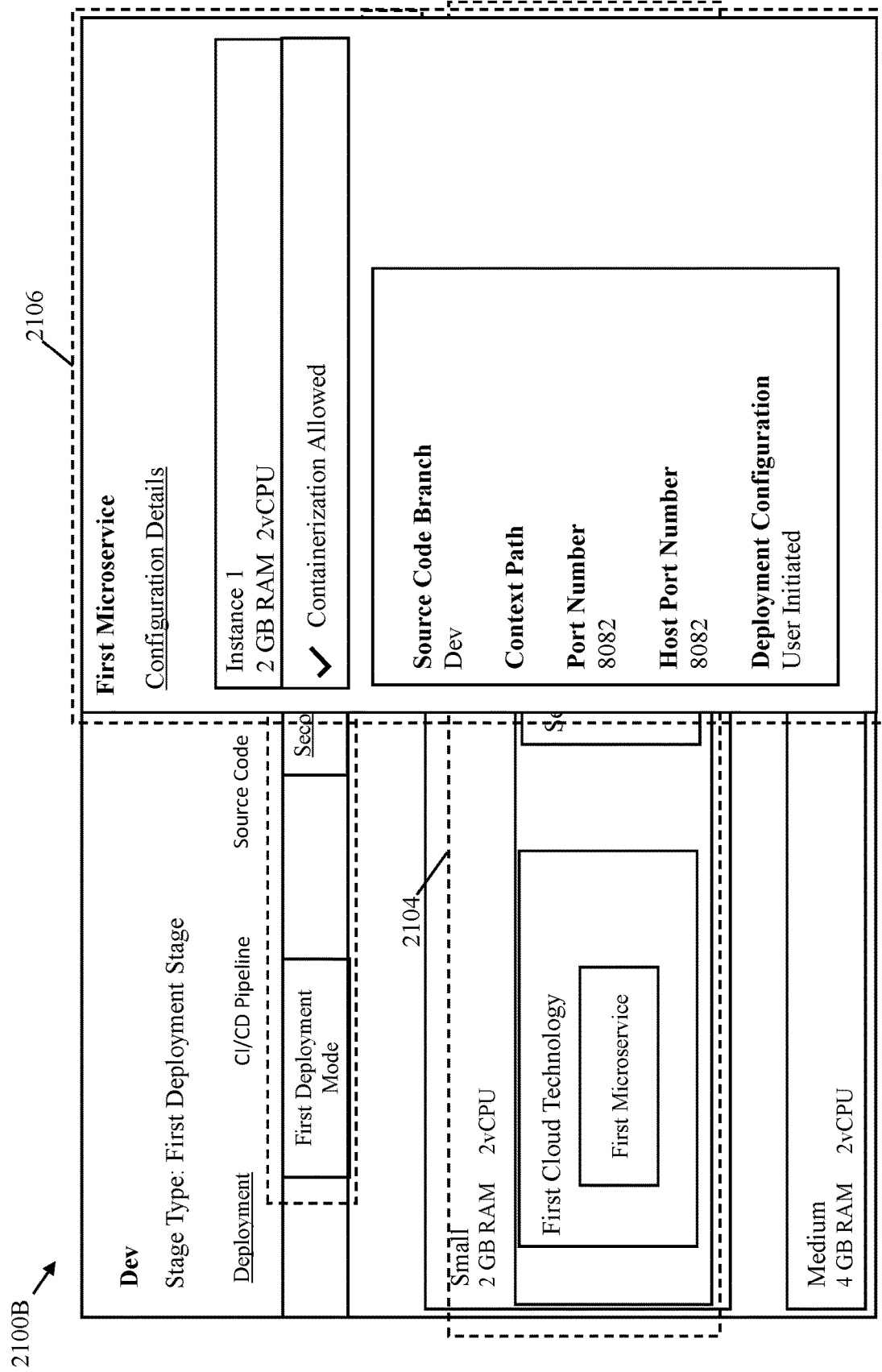

FIGS. 21A and 21B, collectively, illustrate UI screens 2100A and 2100B rendered by the service application 112 on the first user device 102*a* for the configuration of the first and second cloud instances for the deployment of the plurality of microservices, in accordance with an exemplary embodiment of the present disclosure. A cloud instance may refer to a virtual server instance that may be provisioned in a cloud technology. In other words, cloud instances may refer to infrastructure that may be provisioned at any cloud technology for hosting an application or a microservice. The UI screens 2100A and 2100B correspond to the deployment stage view rendered by the user action designer 202. The UI screens 2100A and 2100B enable the user to configure (e.g., define, design, select, or input) infrastructure that is to be provided at each cloud technology (e.g., the plurality of cloud technologies) selected for the deployment of the plurality of microservices.

Referring now to FIG. 21A, the UI screen 2100A presents the selected set of deployment modes (e.g., first through fourth deployment modes; the plurality of deployment modes) and the selected set of machine configurations (e.g., the first and second machine configurations) available for the deployment of the plurality of microservices. In a non-limiting example, the selected set of deployment modes is same as the plurality of deployment modes. Therefore, the terms "selected set of deployment modes" and "plurality of deployment modes" are used interchangeably. Similarly, the UI screen enables the user to select one or more deployment modes, from the selected set of deployment modes (as shown by dotted box 2102), and one or more cloud technologies, from the plurality of cloud technologies (e.g., the selected set of cloud technologies), for the deployment of the plurality of microservices in the first deployment stage 2002.

The UI presented by the UI screen 2100A further enables the user to select, from the selected set of machine configurations (as shown by dotted box 2104), one or more machine configurations of VMs to be used for the deployment of the plurality of microservices. In a non-limiting example, the first through fourth deployment modes (e.g., the selected set of deployment modes) may correspond to container-based deployment (e.g., Docker Container), first cluster-based deployment (e.g., Kubernetes), second cluster-based deployment (e.g., OpenShift), and IaC script-based deployment (e.g., Terraform).

In a non-limiting example, it is assumed that a single deployment mode (e.g., the second deployment mode; Kubernetes) is selected by the user for the deployment of the plurality of microservices. In other words, the second deployment mode may be selected by the user for the deployment of both the first microservice and the sixth microservice. However, in another embodiment, different deployment modes (e.g., the first through third deployment modes) may be selected by the first user for the deployment of different microservices of the plurality of microservices, without deviating from the scope of the disclosure.

The UI screen 2100A further presents a second user-selectable option (as shown by a dotted box 2105) that enables the user to select (e.g., input or define) configuration details for cloud instances that are to be created for the deployment of the plurality of microservices. For the sake of brevity, it is assumed that that the second user-selectable option is selected by the user for selection of configuration details of a first set of cloud instances (e.g., first and second cloud instances) for the deployment of the first and sixth microservices in the first deployment environment (e.g., the DEV stage of the promotion pipeline). Various user actions may be performed for selection of a deployment mode, a cloud technology, and a machine configuration for provisioning of each cloud instance of the first set of cloud instances. Each cloud instance (e.g., of the first set of cloud instances) may host one or microservices. In other words, one or more microservices, of the plurality of microservices, may be deployed in a single provisioned cloud instance. However, in a non-limiting example, it is assumed that each of the plurality of microservices (e.g., the first and sixth microservices) is deployed in a separate cloud instance.

In a non-limiting example, it is assumed that different cloud technologies, of the plurality of cloud technologies, are selected by the user for the deployment of the plurality of microservices in the first deployment stage of the promotion pipeline. For example, the first cloud technology may be selected for the deployment of the first microservice. Similarly, the second cloud technology may be selected for the deployment of the sixth microservice. In other words, a hybrid cloud deployment architecture (e.g., deployment across multiple cloud technologies) may be selected by the user for the deployment of the first and sixth microservices. For the sake of brevity, it is assumed that the specifications of VMs to be provisioned for the deployment of the first and sixth microservices is same. In a non-limiting example, it is assumed that the first machine configuration (e.g., 2 GB RAM and 2vCPU) is selected for the deployment of both the first and sixth microservices. However, in another embodiment, VMs of different sizes or specifications may be selected for deployment of different microservices. In other words, different machine configurations may be selected for the deployment of different microservices, without deviating from the scope of the disclosure. For example, in another embodiment, the first machine configuration may be selected for the deployment of the first microservice and the second machine configuration may be selected for the deployment of the sixth microservice.

Referring now to FIG. 21B, the UI screen 2100B may enable the user to select (e.g., configure, input, or specify), for each cloud instance of the first set of cloud instances, a port number and a host port number to be used by a corresponding cloud instance for communication. For the sake of brevity, the UI screen 2100B presents a first port number (e.g., 8082) and a first host port number to be used by the first cloud instance, which is to host the first microservice, for communication (as shown by a dotted box 2106. In a non-limiting example, it is assumed that the first port number and the first host port number are selected (e.g., inputted or defined) by the user. It will be apparent to those of skill in the art that a second port number and a second host port number for the second cloud instance may also be selected (e.g., by the user) in a similar manner.

In some embodiments, the user action designer 202 may render a UI (not shown) that enables the user to select (e.g., define, design, configure, input, or specify) a deployment topology for each cloud instance of the first set of cloud instances. Since the first and sixth microservices are to be deployed in separate cloud instances (e.g., the first and second cloud instances), a deployment topology may be selected for each of the first and second cloud instances that are to be provisioned. In a non-limiting example, first and second deployment topologies may be configured (e.g., by the user) for the first and second cloud instances, respectively. A deployment topology for each cloud instance may include or may be indicative of a set of network security groups to be provisioned in a corresponding cloud instance, a set of virtual private clouds (VPCs), and a set of subnets to be provisioned in the corresponding cloud instance, a set of load balancers to be provisioned in the corresponding cloud instance, or the like.

A second plurality of user actions may be performed by the user on the UI for the deployment of the plurality of microservices. The second plurality of user actions may include the definition (e.g., configuration) of the promotion pipeline (e.g., the deployment workflow for the deployment of the software product). The definition of the promotion pipeline may include the selection of the first through third deployment stages to be included in the promotion pipeline. The second plurality of user actions may further include various actions performed by the user for configuration of each of the first set of cloud instances (e.g., the first and second cloud instances). In other words, the second plurality of user actions may include input of a first set of configuration details for the first cloud instance that is to be provisioned for the deployment of the first microservice in the first deployment stage. Similarly, the second plurality of user actions may include input of a second set of configuration details for the second cloud instance that is to be provisioned for the deployment of the sixth microservice in the first deployment stage. The first set of configuration details is indicative of the first cloud technology, the second deployment mode, the first topology, the first machine configuration, the first port number, the first host port number, or the like. Similarly, the second set of configuration details is indicative of the second cloud technology, the second deployment mode, the second topology, the first machine configuration, the second port number, the second host port number, or the like In other words, the recorded second plurality of user actions include the selection of the first and second cloud technologies, the selection of the second deployment mode, and the selection of the first machine configuration for the deployment of the first and sixth microservices. The second plurality of user actions may further include the selection of a set of port numbers (e.g., the first and second port numbers) and a set of host port numbers (e.g., the first and second host port numbers) to be used by the first and second cloud instances for communication. The second plurality of user actions may further include the selection (e.g., the definition or configuration) of the first and second topologies for the first and second cloud instances.

For the sake of brevity, description of the second plurality of user actions is limited to actions performed by the user for configuration of the first deployment environment that corresponds to the first deployment stage. It will be apparent to those of skill in the art that the second plurality of user actions may further include actions (e.g., input of configuration details) performed by the user for configuration of the second and third deployment environments that correspond to the second and third deployment stages, respectively.

The second plurality of user actions is not limited to abovementioned actions. The second plurality of user actions may include any action performed on the UI for the configuration of the promotion pipeline. The user action designer 202 may record the second plurality of user actions performed on the UI. The user action designer 202 may store second metadata, associated with the second plurality of user actions, in the user action catalog 203. The second metadata is indicative of the second plurality of user actions.

The user action script compiler 204 may generate a user action script (e.g., a third user action script) based on the second metadata stored in the user action catalog 203. The user action script compiler 204 may communicate the third user action script to the pipeline orchestration engine 1706*a*. Based on the second metadata that is indicated by (e.g., included in) the third user action script, the pipeline orchestration engine 1706*a* may determine that the third user action script pertains to or corresponds to the deployment of the plurality of microservices. For example, the pipeline orchestration engine 1706*a* may determine that the third user action script pertains to or corresponds to the provisioning of the first and second cloud instances.

Consequently, the pipeline orchestration engine 1706*a* may invoke the deployment orchestration engine 1706*b*. The deployment orchestration engine 1706*b* may invoke the cloud orchestration engine 1706*c*. The cloud orchestration engine 1706*c* may identify a gentech script generator, of the plurality of gentech script generators 208, that corresponds to the plurality of cloud technologies. The identification of the gentech script generator that corresponds to the plurality of cloud technologies may be based on the information stored in the second look-up table 506. For the sake of brevity, the gentech script generator that corresponds to the plurality of cloud technologies is designated and referred to as "cloud gentech script generator".

The cloud orchestration engine 1706*c* may communicate a first section of the third user action script to the cloud gentech script generator. The first section of the third user action script may be indicative of the first set of configuration details for the first cloud instance that is to be provisioned. In other words, the first section of the third user action script may be indicative of first infrastructure that is to be provisioned for the deployment of the first microservice as part of the first deployment stage. The first section of the third user action script may be indicative of the first topology, the first machine configuration, the second deployment mode, the first port number, and the first host port number.

Further, the cloud orchestration engine 1706*c* may communicate a second section of the third user action script to the cloud gentech script generator. The second section of the third user action script may be indicative of the second set of configuration details for the second cloud instance that is to be provisioned. In other words, the second section of the third user action script may be indicative of second infrastructure that is to be provisioned for the deployment of the sixth microservice as part of the second deployment stage. The second section of the third user action script may be indicative of the second topology, the first machine configuration, the second deployment mode, the second port number, and the second host port number.

The first section of the third user action script may or may not be indicative of the first cloud technology selected for the provisioning of the first cloud instance. In a non-limiting example, it is assumed that the first section of the third user action script is devoid of the indication of the selection of the first cloud technology. Similarly, the second section of the third user action script may or may not be indicative of the second cloud technology selected for the provisioning of the second cloud instance. In a non-limiting example, it is assumed that the second section of the third user action script is devoid of the indication of the selection of the second cloud technology.

The cloud gentech script generator may convert the first section of the third user action script into a first set of cloud gentech scripts and the second section of the third user action script into a second set of cloud gentech scripts. In other words, the cloud gentech script generator generates the first set of cloud gentech scripts based on the first section of the third user action script, and the second set of cloud gentech scripts based on the second section of the third user action script. The first and second sets of cloud gentech scripts may be indicative of (e.g., may include) the first and second sets of configuration details, respectively. Each of the first and second sets of cloud gentech scripts may be in a format that is technology agnostic with respect to the plurality of cloud technologies.

The cloud gentech script generator may communicate the first and second sets of cloud gentech scripts to the cloud orchestration engine 1706*c*. The cloud orchestration engine 1706*c* may determine, based on the third user action script, that the first and second cloud instances are to be provisioned (e.g., created) in the first and second cloud technologies, respectively. In other words, the cloud orchestration engine 1706*c* may determine that the first cloud instance is to be provisioned in the first cloud technology. Similarly, the cloud orchestration engine 1706*c* may determine that the second cloud instance is to be provisioned in the second cloud technology. In other words, the cloud orchestration engine 1706*c* may determine that the first and sixth microservices are to be deployed in the first and second cloud technologies, respectively, for the execution of the first deployment stage.

Based on the determination that the first and second cloud instances are to be provisioned in the first and second cloud technologies, respectively, for the execution of the first deployment stage, the cloud orchestration engine 1706*c* may identify (e.g., determine) a technology-specific interpreter, of the plurality of technology-specific interpreters 210, for each of the first and second cloud technologies. For example, if the first cloud technology is AWS, the cloud orchestration engine 1706*c* may identify an AWS-specific interpreter from the plurality of technology-specific interpreters 210. Similarly, if the second cloud technology is Azure, the cloud orchestration engine 1706c may identify an Azure-specific interpreter from the plurality of technology-specific interpreters 210. The identification of the technology-specific interpreter for each of the first and second cloud technologies may be based on the information stored in the second look-up table 506.

For the sake of brevity, the technology-specific interpreter for the first cloud technology is designated and referred to as "first cloud technology-specific interpreter". Similarly, the technology-specific interpreter for the second cloud technology is designated and referred to as "second cloud technology-specific interpreter". The cloud orchestration engine 1706c may communicate the first and second sets of cloud gentech scripts to the first and second cloud technology-specific interpreters, respectively. The first cloud technology-specific interpreter may convert the first set of cloud gentech scripts to a set of technology-specific scripts that is in a format that is specific to (e.g., compatible with) the first cloud technology. In other words, the first cloud technology-specific interpreter may generate the set of technology-specific scripts based on the first set of cloud gentech scripts. For the sake of brevity, the set of technology-specific scripts generated by the first cloud technology-specific interpreter based on the first set of cloud gentech scripts is designated and referred to as "first set of cloud technology-specific scripts". Similarly, the second cloud technology-specific interpreter may convert the second set of cloud gentech scripts into a set of technology-specific scripts. For the sake of brevity, the set of technology-specific scripts generated by the second cloud technology based on the second set of cloud gentech scripts is designated and referred to as "second set of cloud technology-specific scripts". The first and second sets of cloud technology-specific scripts may be indicative of the first and second sets of configuration details, respectively.

Based on the first set of configuration details indicated by the first set of cloud technology-specific scripts, the first cloud technology may initiate execution of a first set of infrastructure provisioning operations to provision the first cloud instance therein. In other words, a technology server (e.g., a first cloud technology server) that hosts the first cloud technology may initiate the first set of infrastructure provisioning operations to provision the first cloud instance therein. For example, the first cloud technology (e.g., AWS) may generate a first set of clusters (e.g., Elastic Kubernetes clusters or EKS clusters) that corresponds to the first machine configuration and the first topology, based on the first set of cloud technology-specific scripts. Therefore, the first infrastructure for the deployment of the first microservice may be provisioned at the first cloud technology (e.g., the first cloud technology server).

Similarly, the second set of cloud technology-specific scripts may be indicative of the details of the second cloud instance. Based on the second set of cloud technology-specific scripts, the second cloud technology may initiate execution of a second set of infrastructure provisioning operations to create the second cloud instance therein. In other words, a technology server (e.g., a second cloud technology server) that hosts the second cloud technology may initiate the second set of infrastructure provisioning operations to provision the second cloud instance therein. For example, the second cloud technology (e.g., Azure) may generate a second set of clusters (e.g., Kubernetes clusters) that corresponds to the first machine configuration and the second topology based on the second set of cloud technology-specific scripts. Therefore, the second infrastructure for the deployment of the sixth microservice may be provisioned at the second cloud technology (e.g., the second cloud technology server). Therefore, the first and second cloud instances may be provisioned based according to the first and second sets of configuration details, respectively.

The first cloud technology-specific interpreter may receive progress data from the first cloud technology based on the execution of the first set of infrastructure provisioning operations for the provisioning of the first infrastructure. For the sake of brevity, the progress data received from the first cloud technology is designated and referred to as "first infrastructure provisioning data". The first infrastructure provisioning data may include, but is not limited to, data indicative of a level of completion of the first set of infrastructure provisioning operations for the provisioning of the first infrastructure and/or one or more outputs or results of the execution of the first set of infrastructure provisioning operations. In other words, the first infrastructure provisioning data may be indicative of a result of the execution of the first set of infrastructure provisioning operations. The first infrastructure provisioning data may include a set of logs generated by the first cloud technology, a set of alerts generated by the first cloud technology, and/or a set of errors generated by the first cloud technology during the provisioning of the first infrastructure. In a non-limiting example, it is assumed that the first infrastructure provisioning progress data indicates that the first infrastructure is successfully provisioned at the first cloud technology.

Similarly, the second cloud technology-specific interpreter may receive progress data from the second cloud technology based on the execution of the second set of infrastructure provisioning operations for the provisioning of the second infrastructure. For the sake of brevity, the progress data received from the second cloud technology is designated and referred to as "second infrastructure provisioning data". It will be apparent to those of skill in the art that the second infrastructure provisioning data may be similar to the first infrastructure provisioning data. In a non-limiting example, it is assumed that the second infrastructure provisioning progress data indicates that the second infrastructure is successfully provisioned at the second cloud technology.

The first cloud technology-specific interpreter may generate a third set of cloud gentech scripts based on the first infrastructure provisioning data. In other words, the first cloud technology-specific interpreter may convert the received first infrastructure provisioning data into the third set of cloud gentech scripts. Similarly, the second cloud technology-specific interpreter may convert the second infrastructure provisioning data into a fourth set of cloud gentech scripts. Consequently, the first cloud technology-specific interpreter and the second cloud technology-specific interpreter may communicate the third set of cloud gentech scripts and the fourth set of cloud gentech scripts, respectively, to the cloud orchestration engine 1706c. Consequently, the cloud orchestration engine 1706c may communicate the third and fourth sets of cloud gentech scripts to the cloud gentech script generator. The cloud gentech script generator may, based on the received third and fourth sets of cloud gentech scripts, may generate fourth and fifth user action scripts, respectively. In other words, the cloud gentech script generator may convert the third and fourth sets of cloud gentech scripts into the fourth and fifth user action scripts, respectively. The third set of cloud gentech scripts and the fourth user action script may include or may be indicative of the first infrastructure provisioning data. Similarly, the fourth set of cloud gentech scripts and the fifth user action script may include or may be indicative of the second infrastructure provisioning data.

In a non-limiting example, it is assumed that individual user action scripts (e.g., the fourth and fifth user action scripts) may be generated based on each set of cloud gentech scripts received by the cloud gentech script generator. However, in another embodiment, a single user action script may be generated by the cloud gentech script generator. In such a scenario, the generated single user action script may be indicative of both the first and second infrastructure provisioning data. The cloud gentech script generator may communicate both the fourth and fifth user action scripts to the cloud orchestration engine 1706c. The cloud orchestration engine 1706c may communicate the fourth and fifth user action scripts to the deployment orchestration engine 1706b. The deployment orchestration engine 1706b may communicate the fourth and fifth user action scripts to the pipeline orchestration engine 1706a.

The pipeline orchestration engine 1706a may, based on the first and second infrastructure provisioning data indicated by the fourth and fifth user action scripts, determine that the first infrastructure is successfully provisioned at the first cloud technology and that the second infrastructure is successfully provisioned at the second cloud technology. It is assumed that the first and second infrastructure provisioning data further include a first cluster ID of the first set of clusters and a second cluster ID of the second set of clusters, respectively. The fourth and fifth user action scripts may include the first and second cluster IDs, respectively. The pipeline orchestration engine 1706a may store the first and second cluster IDs in the memory associated with the application server 106.

The response converter 212 may receive the fourth and fifth user action scripts from the pipeline orchestration engine 1706a. Based on the fourth and fifth user action scripts, the response converter 212 may generate second and third sets of user action responses, respectively. The second set of user action responses may be indicative of (e.g., may include) the first infrastructure provisioning data. Similarly, the third set of user action responses may be indicative of the second infrastructure provisioning data.

Based on the second and third sets of user action responses, the user action designer 202 may generate second and third sets of visual indicators, respectively, and communicate the second and third sets of visual indicators to the user action designer 202. The user action designer 202 may present (not shown) the first and second sets of visual indicators on the UI rendered on the first user device 102a. The second and third sets of visual indicators may include, but are not limited to, text, numbers, or diagrams (e.g., diagrammatic elements) indicative of the first infrastructure provisioning data and the second infrastructure provisioning data, respectively.

Therefore, the orchestrator 206 (e.g., the pipeline orchestration engine 1706a, the deployment orchestration engine 1706b, and the cloud orchestration engine 1706c) facilitates provisioning of the first and second cloud instances at the first cloud technology and the second cloud technology, respectively. It will be apparent to those of skill in the art that, in a similar manner, the orchestrator 206 may facilitate provisioning of a set of cloud instances for each remaining deployment stage included in the promotion pipeline (e.g., the second and third deployment stages). For example, the orchestrator 206 may facilitate provisioning of third and fourth cloud instances for the deployment of the first and sixth microservices, respectively, in the second deployment stage. Similarly, the orchestrator 206 may facilitate provisioning of fifth and sixth cloud instances for the deployment of the first and sixth microservices, respectively, in the third deployment stage. Provisioning of each cloud instance (e.g., the third through sixth cloud instances) may be based on a corresponding set of configuration details included in the recorded second plurality of user actions. Configuration details for the deployment of each cloud instance that is to be provisioned at each deployment stage may vary. For example, a third set of configuration details inputted by the user on the UI for the provisioning of the third cloud instance may be indicative of the second machine configuration (e.g., 4 GB RAM, 2vCPU), the second cloud technology, a third deployment topology, or the like.

Figure 22:
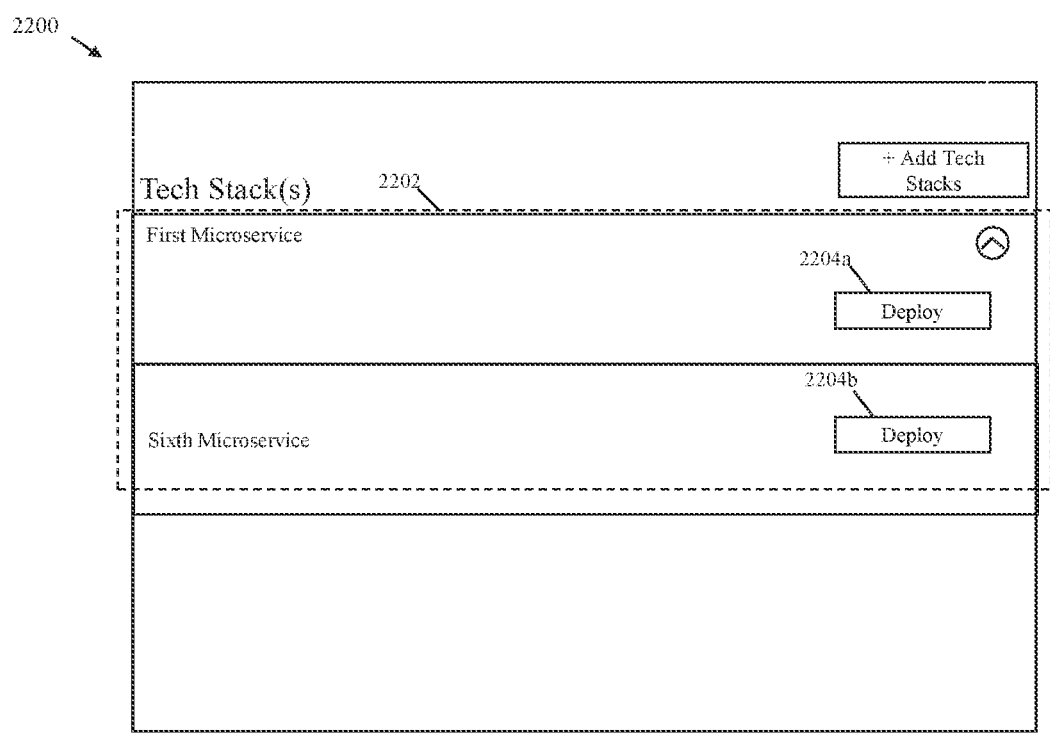
FIG. 22 illustrates a UI screen rendered by the service application on the first user device for the deployment of the plurality of microservices, in accordance with an exemplary embodiment of the present disclosure.

FIG. 22 illustrates a UI screen 2200 rendered by the service application 112 on the first user device 102a for the deployment of the plurality of microservices, in accordance with an exemplary embodiment of the present disclosure.

The UI screen 2200 presents the selected plurality of microservices (e.g., the first and sixth microservices; shown within a dotted box 2202). In other words, the UI screen 2200 may present the technology stack selected for the development of the software product. The UI screen 2200 may further present first and second user-selectable options 2204a and 2204b ("Deploy") that enable the user to trigger the deployment of the first and sixth microservices, respectively. In a non-limiting example, it is assumed that both the first and second user-selectable options 2204a and 2204b are selected by the user, triggering the deployment of the first and sixth microservices. In a non-limiting example, it is assumed that the deployment of the first and sixth microservices is manually triggered. In other words, the deployment of the first and sixth microservices is triggered by way of the selection of the first and second user-selectable options 2204a and 2204b, respectively. However, in another embodiment, deployment of the first and sixth microservices may be automatically triggered when code is committed to corresponding code repositories (e.g., the first code repository). For the sake of brevity, the deployment of the first and sixth microservices is explained with respect to the deployment in the first deployment environment (e.g., the first infrastructure and the second infrastructure) that corresponds to the first deployment stage in the promotion pipeline. It will be apparent to those of skill in the art that the deployment of the first and sixth microservices in the other deployment stages (e.g., the second and third deployment stages) may be similar.

The user action designer 202 may record a third plurality of user actions performed on the UI (e.g., the UI screen 2200). The third plurality of user actions may include, but are not limited to, the selection of the first and second user-selectable options 2204a and 2204b for the deployment of the first and sixth microservices. The user action designer 202 may store metadata (e.g., third metadata) associated with (e.g., indicative of) the third plurality of user actions. Consequently, the user action script compiler 204 may, based on the third metadata stored in the user action catalog 203 and associated with the third plurality of user actions, generate a user action script (e.g., a sixth user action script). The sixth user action script may include or may be indicative of the third metadata associated with the third plurality of user actions. The user action script compiler 204 may communicate that the sixth user action script to the pipeline orchestration engine 1706a. Based on the ninth user action script, the pipeline orchestration engine 1706a may determine that the first and sixth microservices are to be deployed. In other words, the pipeline orchestration engine 1706a may analyze the third metadata to determine that the first and sixth microservices are to be deployed.

Consequently, the pipeline orchestration engine 1706a may retrieve, from the pipeline template store, for each of the plurality of microservices, a pipeline template for the deployment of a corresponding microservice. The retrieval of each pipeline template may be based on a set of rules. For example, based on a first rule of the set of rules, the pipeline orchestration engine 1706a may determine or identify deployment stages included in the promotion pipeline. Consequently, the pipeline orchestration engine 1706a may determine that the first and sixth microservices are to be deployed in the first deployment environment that corresponds to the first deployment stages. Based on the determination that the first and sixth microservices are to be deployed in the first deployment environment, the pipeline orchestration engine 1706a may, based on the first rule, determine a set of pipeline templates that are to be retrieved for the deployment of the first and sixth microservices in the first deployment environment. The determination of the set of pipeline templates may be based on the information (e.g., the mapping) included in the third look-up table. Consequently, the pipeline orchestration engine 1706a may retrieve the first pipeline template and the second pipeline template. The first pipeline template is indicative of the first CI/CD pipeline that is to be created and executed for the deployment of the first microservice. The second pipeline template is indicative of the second CI/CD pipeline that is to be created and executed the deployment of the sixth microservice. The first pipeline template is indicative of the second plurality of pipeline stages included therein. The second template may be indicative of a third plurality of pipeline stages. The third plurality of pipeline stages may be selected from the first plurality of pipeline stages. In a non-limiting example, for the sake of brevity, it is assumed that the third plurality of pipeline stages include only three stages (e.g., the code checkout stage, the build stage, and the deploy stage; shown in FIG. 23).

Based on the retrieval of the set of pipeline templates, the pipeline orchestration engine 1706a may communicate the first pipeline template and the second pipeline template to the CI/CD automation gentech script generator. The pipeline orchestration engine 1706a may further communicate deployment details of infrastructure provisioned (e.g., the first and second cloud instances) for each of the plurality of microservices for the first deployment stage. In a non-limiting example, the pipeline orchestration engine 1706a may communicate the first cluster ID (e.g., a first set of deployment details) of the first set of clusters and the second cluster ID (e.g., a second set of deployment details) of the second set of clusters to the CI/CD automation gentech script generator.

The CI/CD automation gentech script generator may, based on the received first pipeline template, generate a set of gentech scripts (e.g., a third set of CI/CD automation gentech scripts) that includes or is indicative of the first pipeline template. In other words, the CI/CD automation gentech script generator may convert the first pipeline template into the third set of CI/CD automation gentech scripts. The third set of CI/CD automation gentech scripts may further include or may be indicative of the first cluster ID of the first set of clusters (e.g., the first infrastructure).

Similarly, the CI/CD automation gentech script generator may, based on the retrieved fourth pipeline template, generate a set of gentech scripts (e.g., a fourth set of CI/CD automation gentech scripts) that includes the fourth pipeline template. The fourth set of CI/CD automation gentech scripts may further include or may be indicative of the second cluster ID of the second set of clusters (e.g., the second infrastructure). Each of the third and fourth sets of CI/CD automation gentech scripts may be in the format that is technology agnostic with respect to the plurality of CI/CD automation technologies.

The CI/CD automation gentech script generator may communicate the third and fourth sets of CI/CD automation gentech scripts to the pipeline orchestration engine 1706a. The pipeline orchestration engine 1706a may, based on the selection of the first CI/CD automation technology for the orchestration of the first CI/CD pipeline, identify the first CI/CD automation technology-specific interpreter for the first CI/CD automation technology. Consequently, the pipeline orchestration engine 1706a may communicate the third and fourth sets of CI/CD automation gentech scripts to the first CI/CD automation technology-specific interpreter. The first CI/CD automation technology-specific interpreter may convert the third set of automation gentech scripts into a set of CI/CD automation technology-specific scripts (e.g., a third set of CI/CD automation technology-specific scripts) that is in the format that is specific to or compatible with the first CI/CD automation technology. Similarly, the CI/CD automation technology-specific interpreter may generate convert the fourth set of automation gentech scripts into a set of CI/CD automation technology-specific scripts (e.g., a fourth set of CI/CD automation technology-specific scripts) that is in the format that is compatible with the first CI/CD automation technology. The third set of CI/CD automation technology-specific scripts may include the first pipeline template and the first cluster ID. Similarly, the fourth set of CI/CD automation technology-specific scripts may include the fourth pipeline template and the second cluster ID.

The first CI/CD automation technology-specific interpreter may communicate the third and fourth sets of CI/CD automation technology-specific scripts to the first CI/CD automation technology. Based on the third set of CI/CD automation technology-specific scripts, the first CI/CD automation technology (e.g., the technology server that hosts the first CI/CD automation technology) may create the first CI/CD pipeline that conforms to the first pipeline template. In other words, the first CI/CD automation technology may initiate generation and execution of the first CI/CD pipeline that includes the second plurality of pipeline stages. Further, the first CI/CD automation technology may execute each pipeline stage (e.g., the first through fifth pipeline stages) included in the second plurality of pipeline stages. Therefore, the first CI/CD automation technology may generate the first CI/CD pipeline and execute/orchestrate the first CI/CD pipeline based on the first pipeline template. In a similar manner, the first CI/CD automation technology may create and orchestrate/execute the second CI/CD pipeline that conforms to the fourth pipeline template. In other words, the first CI/CD automation technology may execute first and second sets of CI/CD operations based on the third and fourth sets of CI/CD automation technology-specific scripts, respectively. The execution of the first set of CI/CD operations may include creation of the first CI/CD pipeline, orchestration of the first CI/CD pipeline, and execution of the set of operations associated with each of the second plurality of pipeline stages. The set of operations associated with each of the second plurality of pipeline stages may include a set of code checkout operations associated with the first stage, a set of build operations, and a set of unit testing operations associated with the third stage of the second plurality of pipeline stages. The set of operations associated with each of the second plurality of pipeline stages may further include a set of SAST operations associated with the fourth stage and the set of operations associated with the fifth stage of the second plurality of pipeline stages.

Similarly, the execution of the second set of CI/CD operations may include creation of the second CI/CD pipeline, orchestration of the first CI/CD pipeline, and execution of a set of operations associated with each of the third plurality of pipeline stages.

Based on the first pipeline template indicated by the first set of CI/CD operations, the first CI/CD automation technology may store a first set of binaries (e.g., a first set of Docker images) generated during the execution of the first CI/CD pipeline in the first artifact repository in the first artifact management technology. Similarly, the first CI/CD automation technology may store a second set of binaries (e.g., a second set of Docker images) generated during the execution of the second CI/CD pipeline in a corresponding artifact repository (e.g., the second artifact repository in the first artifact management technology) indicated by the second pipeline template. Each of the first and second sets of binaries may be time-stamped (e.g., with first and second time-stamps, respectively) with a time-stamp that is indicative of a time-instance at which a corresponding CI/CD pipeline is executed. Further, based on the first and second cluster IDs included in the first and second sets of CI/CD automation technology-specific scripts, the first CI/CD automation technology may deploy (e.g., push) the first and second sets of binaries to the first infrastructure and the second infrastructure, respectively. The first set of CI/CD operations may further include the deployment of the first set of binaries in the first cloud instance (e.g., the first set of clusters), thereby, deploying the first microservice in the first deployment environment that corresponds to the first deployment stage. Similarly, the first CI/CD automation technology may deploy the second set of binaries in the second set of clusters, thereby, deploying the sixth microservice in the first deployment environment. The second set of CI/CD operations may further include the deployment of the second set of binaries in the second cloud instance. Therefore, the plurality of microservices are successfully deployed in the first deployment environment (e.g., the first and second provisioned infrastructures).

Based on the execution of the first and second CI/CD pipelines, the first CI/CD automation technology may communicate progress data to the first CI/CD automation technology-specific interpreter. For the sake of brevity, the progress data communicated by the first CI/CD automation technology based on the initiation of the execution of the first CI/CD pipeline is designated and referred to as "first CI/CD pipeline execution data". Similarly, the progress data communicated by the first CI/CD automation technology based on the initiation of the execution of the second CI/CD pipeline is designated and referred to as "second CI/CD pipeline execution data". The first CI/CD pipeline execution data and the second CI/CD pipeline execution data may be received by the first CI/CD automation technology-specific interpreter. In a non-limiting example, the first and second CI/CD pipeline execution data may indicate that the first and sixth microservices are successfully deployed in the first deployment environment (e.g., the first and second infrastructure).

For the sake of brevity, explanation of generation of gentech scripts (e.g., fifth and sixth sets of CI/CD automation gentech scripts) based on the first and second CI/CD pipeline execution data, generation of user action scripts (e.g., sixth and seventh user action scripts) based on the gentech scripts, and user action responses (e.g., fourth and fifth sets of user action responses) based on the user action scripts is avoided. Sets of visual indicators (e.g., fourth and fifth sets of visual indicators) may be generated and presented by the user action designer 202 based on the sixth and seventh user action scripts, indicating that the first and sixth microservices are successfully deployed in the first deployment environment.

Based on the sixth and seventh user action scripts, the pipeline orchestration engine 1706a may determine that the first and sixth microservices are successfully deployed in the first deployment environment, the pipeline orchestration engine 1706a may trigger generation and execution of a set of CI/CD pipelines for the deployment of the plurality of microservices in the second deployment environment (e.g., third and fourth cloud instances) that corresponds to the second deployment stage. The pipeline orchestration engine 1706a may retrieve, from the pipeline template store, the third pipeline template for the deployment of the first microservice in the second deployment environment. Similarly, the pipeline orchestration engine 1706a may retrieve, from the pipeline template store, the fourth pipeline template for the deployment of the sixth microservice in the second deployment environment. Process for deployment of the first and sixth microservices in the second deployment environment may be similar to the deployment of the first and sixth microservices in the first deployment environment. Therefore, the first and second sets of binaries may be promoted to the second deployment stage for the deployment of the first and sixth microservices in the second deployment environment.

Based on execution of third and fourth CI/CD pipelines, which are generated based on the third and fourth pipeline templates, respectively, third and fourth sets of binaries may be generated. The third and fourth sets of binaries may be stored (e.g., by the first CI/CD automation technology) in the first artifact management technology and deployed in the second deployment environment (e.g., the third and fourth cloud instances). Based on successful deployment of the plurality of microservices (e.g., the first and sixth microservices; the third and fourth sets of binaries), the pipeline orchestration engine 1706a may trigger generation and execution of a set of CI/CD pipelines for the deployment of the plurality of microservices in the third deployment environment that corresponds to the third deployment stage. The pipeline orchestration engine 1706a may retrieve, from the pipeline template store, the fifth pipeline template for the deployment of the first microservice in the third deployment environment. Similarly, the pipeline orchestration engine 1706a may retrieve, from the pipeline template store, the sixth pipeline template for the deployment of the sixth microservice in the third deployment environment. Process for deployment of the first and sixth microservices in the third deployment environment may be similar to the deployment of the first and sixth microservices in the first deployment environment. Therefore, the third and fourth sets of binaries may be promoted to the third deployment stage for the deployment of the first and sixth microservices in the third deployment environment.

In another embodiment, the fourth deployment mode (e.g., IaC deployment mode or IaC-based deployment) may be selected by the user for the deployment of one or more microservices of the plurality of microservices. In a non-limiting example, it is assumed that the fourth deployment mode is selected for both the first and sixth microservices. In such a scenario, when the first and second user-selectable options 2204a and 2204b are selected by the user, the user action designer 202 may, by way of the rendered UI, prompt the user to provide (e.g., input or select) an IaC script to provision infrastructure for one or more deployment stages. In other words, the user may be prompted to provide an IaC (e.g., a Terraform script, or the like) for configuration of the first deployment. It will be apparent to those of skill in the art that in a scenario in which the fourth deployment mode is selected, the first deployment environment may not be configured by the user. In other words, the first and second sets of configuration details may not be inputted by the user. In such a scenario, an IaC script (e.g., a first IaC script) may be provided by way of the UI rendered by the user action designer 202. In a non-limiting example, the first IaC script may be indicative of the first cloud technology for the deployment of the first microservice, the second cloud technology for the deployment of the sixth microservice, the first and second topologies, the first machine configuration, the first port number, the first host port number, the second port number, and the second host port number. In such a scenario, the sixth user action script may include or may be indicative of the first IaC script. Further, in such a scenario, the first and second sections of the sixth user action script may not be indicative of the first and second infrastructure. The IaC script included in the first user action script may be indicative of the first infrastructure and the second infrastructure that are to be provisioned at the first cloud technology and the second cloud technology, respectively.

The deployment orchestration engine 1706b may identify (e.g., determine), from the plurality of gentech script generators 208, a gentech script generator that corresponds to the plurality of IaC technologies. The deployment orchestration engine 1706b may communicate a section, of the sixth user action script, that includes the first IaC script to the gentech script generator that corresponds to the plurality of IaC technologies. For the sake of brevity, the gentech script generator that corresponds to a plurality of IaC technologies is designated and referred to as "IaC gentech script generator". Based on the identification of the IaC gentech script generator, the deployment orchestration engine 1706b may communicate the section (e.g., a third section), of the sixth user action script, that includes the first IaC script to the IaC gentech script generator. In other words, the deployment orchestration engine 1706b may communicate the first IaC script to the IaC gentech script generator. Based on the reception of the first IaC script, the IaC gentech script generator may determine that the first IaC script does not conform to or correspond to the format of user action scripts (e.g., the format that is compatible with the service application). Consequently, the IaC gentech script generator may communicate the first IaC script to the reverse interpreter 1704 for validation of the first IaC script. In other words, the IaC gentech script generator may communicate a validation request, which includes the first IaC script, for the validation of the first IaC script.

The reverse interpreter 1704 may analyze the first IaC script to validate or certify the received first IaC script as a valid IaC script. In a non-limiting example, it is assumed that the first IaC script is successfully validated (e.g., as a valid IaC script). Consequently, the reverse interpreter 1704 may communicate a validation response to the IaC gentech script generator. The validation response may indicate that the first IaC script is successfully validated/certified as a valid IaC script. The reverse interpreter 1704 may further determine (e.g., identifies) IaC technology, of the plurality of IaC technologies, associated with the first IaC script. In a non-limiting example, it is assumed that the reverse interpreter 1704 determines that a first IaC technology (e.g., Terraform), of the plurality of IaC technologies, is associated with or corresponds to the first IaC script. In other words, the reverse interpreter 1704 may determine that the first IaC script (e.g., Terraform script) is in a format that is specific to or compatible with the first IaC technology. In such a scenario, the validation response may further indicate that the first IaC technology is associated with the first IaC script.

The IaC gentech script generator may communicate the validation response to the deployment orchestration engine 1706b. Based on the validation response, the deployment orchestration engine 1706b may identify (e.g., determine) a technology-specific interpreter, of the plurality of technology-specific interpreters, for the first IaC technology. For the sake of brevity, the technology-specific interpreter for the first IaC technology is designated and referred to as "first IaC technology-specific interpreter". The identification of the first IaC technology-specific interpreter may be based on the information stored in the second look-up table 506. Based on the identification of the first IaC technology-specific interpreter, the deployment orchestration engine 1706b may communicate the first IaC script to the first IaC technology-specific interpreter. The first IaC technology-specific interpreter may communicate or forward the first IaC script to the first IaC technology (e.g., a technology server, of the plurality of technology servers 104, that hosts the first IaC technology). Based on the first IaC script, the first IaC technology may provision infrastructure at one or more cloud technologies. In a non-limiting example, it is assumed that the first IaC technology provisions the first deployment environment (e.g., the first cloud instance at the first cloud technology and the second cloud instance at the second technology). In such a scenario, infrastructure provisioning data (e.g., the first and second infrastructure provisioning data) may be received from the first IaC technology-specific interpreter. Therefore, the first deployment environment may be successfully provisioned by way of the fourth deployment mode (e.g., IaC-based deployment). It will be apparent to those of skill in the art the second deployment environment and the third deployment environment may be provisioned in a similar manner. Remaining process for the deployment of the first and sixth microservices, execution of the first and second CI/CD pipelines, and promotion of binaries (e.g., the first and second sets of binaries, the third and fourth sets of binaries, or the like) from one deployment environment to another (e.g., from the first deployment environment to the second deployment environment) may be similar to the process described in the foregoing.

Figure 23:
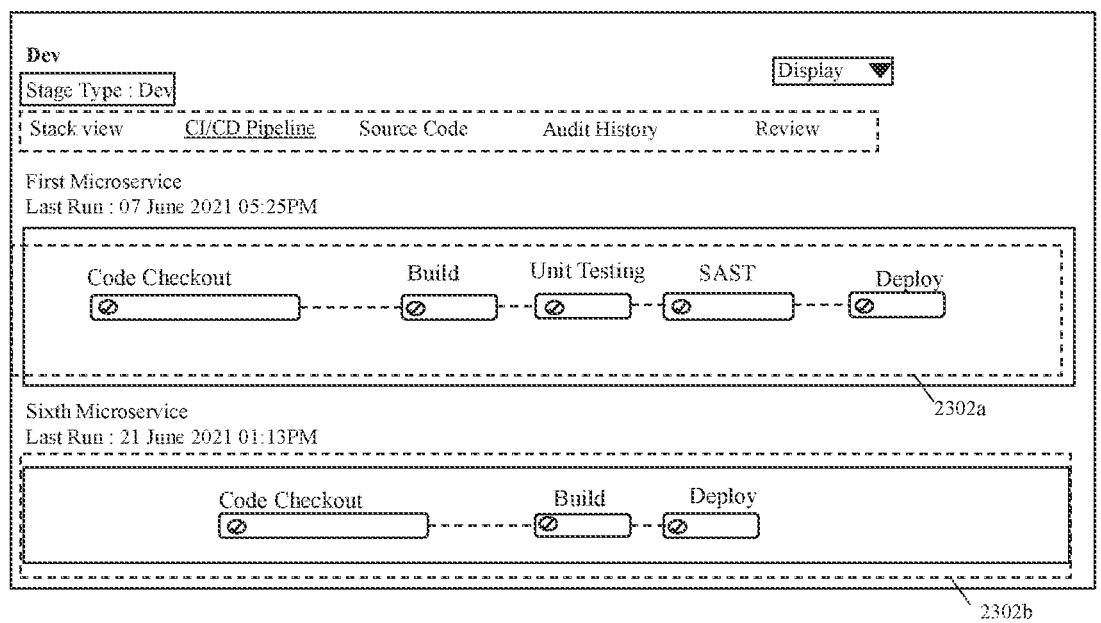
FIG. 23 illustrates a UI screen rendered by the service application on the first user device for presentation of visual indicators, in accordance with an exemplary embodiment of the present disclosure.

FIG. 23 illustrates a UI screen 2300 rendered by the service application 112 on the first user device 102a for presentation of visual indicators, in accordance with an exemplary embodiment of the present disclosure. The fourth and fifth sets of visual indicators, generated and presented by the user action designer 202, are indicative of the first and second CI/CD pipeline execution data, respectively. The presented fourth set of visual indicators (shown by a dotted box 2302a) is shown to include the second plurality of pipeline stages. The fourth set of visual indicators further includes a visual element (e.g., a check mark; not labelled) for or against each of the second plurality of pipeline stages, indicating a status of the execution of a corresponding pipeline stage. In a non-limiting example, the visual element against each of the second plurality of pipeline stages indicates that the corresponding that the corresponding pipeline stage is successfully executed, thereby, indicating that the first microservice is successfully deployed in the provisioned first cloud instance. Similarly, the presented fifth set of visual indicators (shown by a dotted box 2302b)

is shown to include the third plurality of pipeline stages. The fifth set of visual indicators further includes a visual element (e.g., a check mark; not labelled) against each of the third plurality of pipeline stages, indicating that the corresponding that the corresponding pipeline stage is successfully executed. The presented fifth set of visual indicators indicate that the sixth microservice is successfully deployed in the provisioned second cloud instance. It will be apparent to those of skill in the art that the fourth and fifth sets of visual indicators shown in FIG. 23 are merely exemplary. The fourth and fifth sets of visual indicators may include additional/different information or different visual elements, therein, without deviating from the scope of the disclosure.

FIGS. 24A and 24B, collectively, illustrate UI screens 2400A and 2400B rendered by the service application 112 on the first user device 102a for configuration of a tagging policy for provisioned infrastructure, in accordance with an exemplary embodiment of the present disclosure. The service application 112 enables the administrator (e.g., the user) to configure policies for tagging of cloud instances that are provisioned.

Referring now to FIG. 24A, the user action designer 202 presents the UI screen 2400A that enables the administrator to define (e.g., configure) a new tagging policy. In other words, the UI screen 2400A enables the administrator to select tags that are to be applied to cloud instances (e.g., the first cloud infrastructure) provisioned by way of the service application 112 at various cloud technologies (e.g., the plurality of cloud technologies). The user action designer 202 presents (as shown by a dotted box 2402) a first plurality of user-selectable options (e.g., toggle buttons; not labelled) that enable the administrator to configure (e.g., select or define) types of tags that are to be associated with each cloud instance that is provisioned. The first plurality of user-selectable options correspond to a pre-defined plurality of tags that may be selected. For example, selection of a first user-selectable option ("Portfolio"), of the first plurality of user-selectable options, enables tagging of any provisioned cloud instance with an ID (e.g., a name) of a product portfolio associated with a corresponding cloud instance. Similarly, selection of a second user-selectable option ("Project"), of the first plurality of user-selectable options, enables tagging of any provisioned cloud instance with an ID (e.g., a name) of a project associated with a corresponding cloud instance.

Similarly, selection of a third user-selectable option ("Release"), of the first plurality of user-selectable options, enables tagging of any provisioned cloud instance with an ID (e.g., a release ID) of a release associated with a corresponding cloud instance. Selection of a fourth user-selectable option ("Workstream"), of the first plurality of user-selectable options, enables tagging of any provisioned cloud instance with an ID (e.g., a workstream ID) of a workstream associated with a corresponding cloud instance. Selection of a fifth user-selectable option ("Environment"), of the first plurality of user-selectable options, enables tagging of any provisioned cloud instance with an ID (e.g., a name) of a deployment environment (e.g., DEV environment, UAT environment, or the like) associated with a corresponding cloud instance. Selection of a sixth user-selectable option ("Technology"), of the first plurality of user-selectable options, enables tagging of any provisioned cloud instance with an ID (e.g., a name) of a microservice (e.g., Java, React, or the like) associated with a corresponding cloud instance. In a non-limiting example, it is assumed that each of the of the first plurality of user-selectable options is selected, indicating that each cloud instance (e.g., infrastructure) is to be tagged with an ID associated with a corresponding user-selectable option of the first plurality of user-selectable options. For example, if the second user-selectable option ("Project") is selected, the first cloud instance will be tagged with an ID of a project for which the first microservice is being developed or deployed.

The user action designer 202 presents (as shown by a dotted box 2404), on the UI screen 2400A, a second plurality of user-selectable options (e.g., "Name", "Value"; not labelled) that enable the user to define custom tags that are to be applied to each provisioned cloud instance. The user action designer 202 further presents a seventh user-selectable option 2406 that enables the user to add a tagging policy. The user action designer 202 may record various actions performed by the user (e.g., the administrator) on the UI screen 2400A for definition of the tagging policy.

In one embodiment, the recorded first plurality of user actions may further include any action performed by the user on the UI screen 2400A. For example, the recorded first plurality of user actions may include the selection of the first through sixth user-selectable options. Similarly, the recorded first plurality of user actions may include the definition of one or more custom tags. The first metadata associated with the recorded first plurality of user actions may further be indicative of the defined tagging policy. In such a scenario, the first set of configuration details and the second set of configuration details may further include the defined tagging policy. The first set of configuration details may include or may be indicative of a first set of tags to be associated with the first cloud instance. The first set of tags may include, but is not limited to, a first portfolio ID of a portfolio associated with the software product, a first project ID of a project for which the first and sixth microservices are being developed, a first release ID of a release of the software product, and a first workstream ID of a workstream associated with the software product. The first set of tags may further include a first environment ID of a deployment environment associated with the first deployment stage and a first technology stack ID associated with the first microservice. In a non-limiting example, the first portfolio ID may be a name of the portfolio, and the first project ID may be a numeric or an alphanumeric ID of the project. The first release ID may be numeric or an alphanumeric ID of the release. Similarly, the first workstream ID may be numeric or an alphanumeric ID of the workstream. The first technology stack ID may be a name, a numeric ID, or an alphanumeric ID of the first microservice.

Referring now to FIG. 24B, the UI screen 2400B presents the first set of tags that are to be applied to the first cloud instance when provisioned. In a non-limiting example, the UI screen 2400B may be rendered by the user action designer 202 when the seventh user-selectable option 2406 is selected. The presented first set of tags include the first portfolio ID (e.g., "Innovation Portfolio"), the first project ID (e.g., "Project 2.5"), the first release ID (e.g., Maintenance Release 1.1"), the first workstream ID (e.g., "Maintenance"), the first environment ID (e.g., "DEV"), and the first technology stack ID (e.g., "React 17.0"). The first set of tags may further include any custom tags defined by the user. For the sake of brevity, it is assumed that the no custom tags are defined by the user. It will be apparent to those of skill in the art that the first set of tags is not limited to aforementioned tags (e.g., first project ID, first release ID, or the like). The first set of tags may include additional or different tags without deviating from the scope of the disclosure.

The second set of configuration details may include or may be indicative of a second set of tags to be associated with the first cloud instance. The second set of tags may include, but is not limited to, the first portfolio ID, the first project ID of the project, the first release ID, and the first workstream ID. The second set of tags may further include the first environment ID and a second technology stack ID associated with the sixth microservice, or the like.

The first and second sets of cloud technology-specific scripts may be indicative of the defined tagging policy. In other words, the first and second sets of cloud technology-specific scripts may be indicative of the first and second sets of tagging details, respectively. In such a scenario, the first cloud technology, based on the first set of cloud technology-specific scripts, may tag the provisioned first cloud technology with the first set of tags. Similarly, the second cloud technology may tag the second cloud technology with the second set of tags based on the second set of cloud technology-specific scripts. Further, in such a scenario, the first and second infrastructure provisioning data may indicate that the first and second cloud instances are tagged with the first and second sets of tags, respectively. Tagging of a cloud instance (e.g., the first cloud instance) enables tracking of a lifecycle of the cloud instance. For example, the service application 112 may track a time of creation or provisioning of the cloud instance, a time period for which the cloud instance is active, a time period for which the cloud instance is shutdown, a time of release of the cloud instance, or the like. Tracking of the lifecycle of the cloud instance enables tracking of a cost associated with an operation of the cloud instance.

Figure 25:
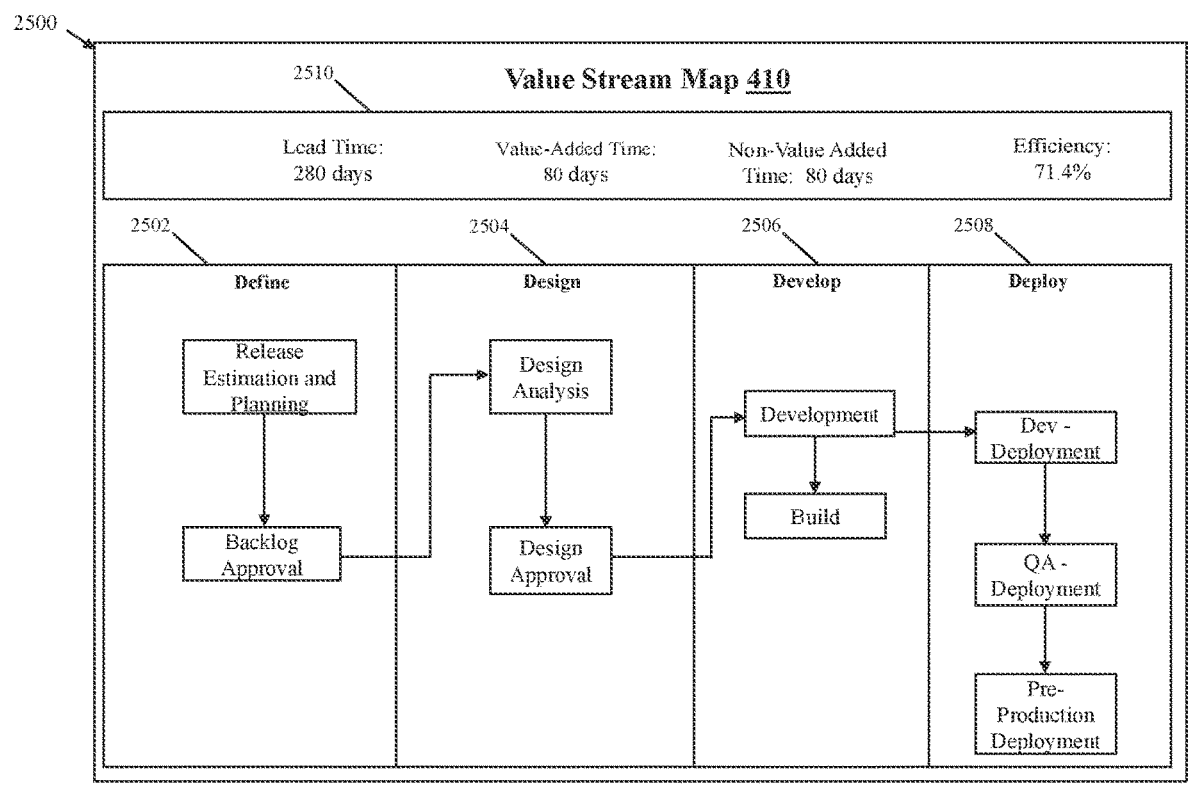
FIG. 25 is a diagram that illustrates a value stream map, in accordance with an exemplary embodiment of the present disclosure.

FIG. 25 is a diagram 2500 that illustrates the value stream map 410, in accordance with an exemplary embodiment of the present disclosure. FIG. 25 is explained in conjunction with FIGS. 2, 3, and 4. As described in the foregoing description of FIG. 4, the activity watcher 404 monitors the plurality of stages 216. In other words, the activity watcher 404 may track and/or monitor actions (e.g., the first plurality of actions) performed at each of the plurality of stages 216. For example, the activity watcher 404 may track the first plurality of actions performed by the user in the define stage 216a for the definition of the new business requirement (as described in the foregoing descriptions of FIG. 8A). Similarly, the activity watcher 404 may track the first plurality of actions performed by the user to create the designs and/or the design mockups in the design stage 216b (as described in the foregoing descriptions of FIGS. 9A-9C). Similarly, the activity watcher 404 may track the first plurality of actions performed by the user to create the data pipeline in the development stage 216c (as described in the foregoing descriptions of FIGS. 11A-11J). Similarly, the activity watcher 404 may track the first plurality of actions performed by the user to for the deployment of the plurality of microservices in the deployment stage 216d (as described in the foregoing descriptions of FIGS. 17, 18, 19A-19H, 20, 21A-21B, and 22-24).

Further, the activity watcher 404 may record progress data (e.g., the first progress data received from the first technology 114a) from a selected technology or technologies (e.g., the first documentation technology, the first design technology, the first data ingestion technology, or the like) in each of the plurality of stages 216. The activity watcher 404 may further record an output (e.g., the output of the first technology 114a based on the execution of the first set of operations) from the selected technology or technologies in each of the plurality of stages 216. The activity filter 406 classifies each of the tracked plurality of user actions (in each of the plurality of stages 216) as one of the value-added activity and a non-value added activity, based on a corresponding recorded progress data and a corresponding recorded output. Consequently, the value stream engine 408 determines, based on the classification of each of the tracked plurality of user actions (in each of the plurality of stages 216), the corresponding recorded progress data, and the corresponding recorded output generates the value stream map 410. The value stream map 410 may include an efficiency score indicative of efficiency of the plurality of users at the plurality of stages 216. The value stream map 410 may also include or be indicative of time leakages at each of the plurality of stages 216. The value stream map 410 may further be indicative of an efficiency of an execution of each of the plurality of stages 216 for the software product.

As shown in FIG. 25, the value stream map 410 includes first through fourth sections 2502-2508 that correspond to the define stage 216a, the design stage 216b, the development stage 216c, and the deployment stage 216d, respectively. Each of the first through fourth sections 2502-2508 is indicative of activities (e.g., user actions) performed or executed in a corresponding stage (of the plurality of stages 216). For example, the first section 2502 indicates that "Release estimation and planning" and "Backlog approval" were activities performed and tracked in the define stage 216a. Similarly, the second section 2504 indicates that "Design Analysis" and "Design Approval" were activities performed and tracked in the design stage 216b. Similarly, the third section 2506 indicates that "Development" and "Build" were activities performed and tracked in the development stage 216c. Similarly, the fourth section 2508 indicates that "DEV-Deployment" (e.g., the first deployment stage), "QA-Deployment" (e.g., the second deployment stage), and "Pre-Production Deployment" (e.g., the third deployment stage) were activities performed and tracked in the deployment stage 216d.

The value stream map 410 further includes a fifth section 2510 that is indicative of a determined lead time (e.g., "280" days), a determined value-added time (e.g., "200" days), a determined non-value added time ("80 days"), and an efficiency score (e.g., "71.4%") determined by the value stream engine 408 across the plurality of stages 216 of the SDLC of the software product.

Figure 26:
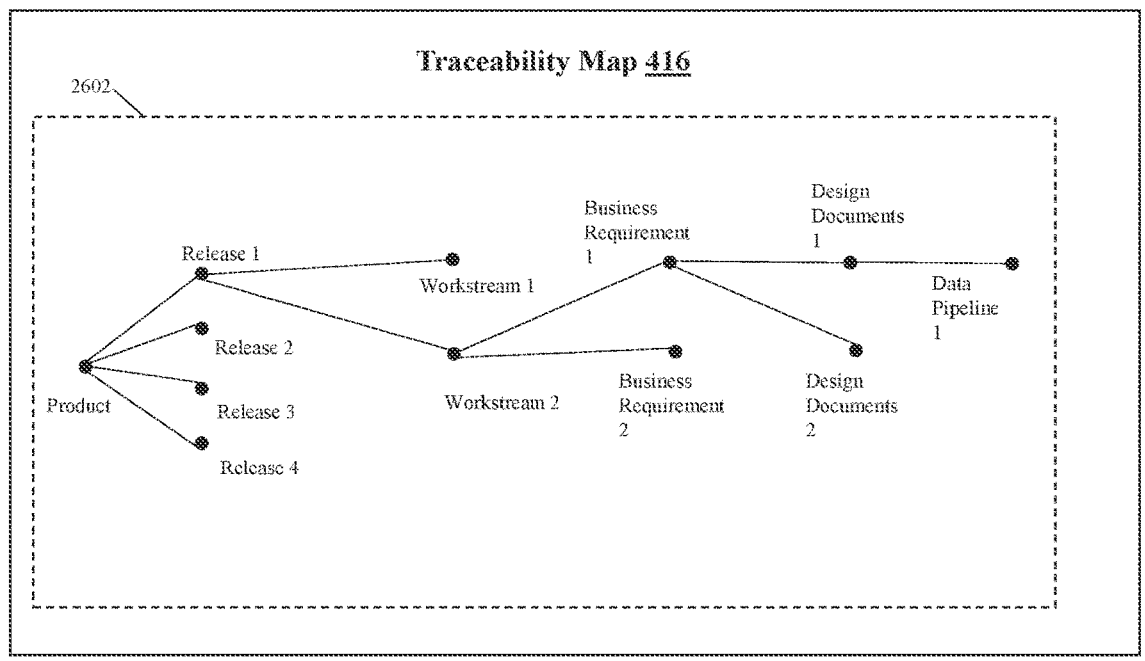
FIG. 26 is a diagram that illustrates a traceability map, in accordance with an exemplary embodiment of the present disclosure.

FIG. 26 is a diagram 2600 that illustrates the traceability map 416, in accordance with an exemplary embodiment of the present disclosure. FIG. 26 is explained in conjunction with FIGS. 2, 3, and 4. As described in the foregoing description of FIG. 4, the activity mapper 412 maps each monitored/tracked activity (e.g., the first plurality of user actions) performed in each of the plurality of stages 216. The activity mapper 412, at each of the plurality of stages 216, determines a relationship between each activity and a workstream, release, or business requirement associated with a corresponding activity. The relationship matrix generator 414 generates the traceability map 416 based on each monitored/tracked activity (e.g., the first plurality of user actions) in each of the plurality of stages 216 and the recorded progress data of a corresponding technology/corresponding technologies (e.g., the first technology 114a) in each of the plurality of stages 216. The generation of the traceability map 416 is further based on a recorded output of an execution by the corresponding technology/corresponding technologies of a corresponding set of operations (e.g., the first set of operations) in each of the plurality of stages 216.

The traceability map 416 is illustrated in a section 2602. The traceability map 416 is shown to include a first node that corresponds a product (e.g., a product for investment banking) in a product portfolio. The traceability map 416 is further shown to include second through fifth nodes that correspond to first through fourth releases (e.g., "Release 1", "Release 2", "Release 3", and "Release 4"). The first through fourth releases may correspond to the product. In a non-limiting example, the first through fourth releases may correspond to an alpha release, a sample release, a beta release, and an general availability (GA) release. The traceability map 416 is further shown to include sixth and seventh nodes that correspond to first and second workstreams (e.g., "Workstream 1" and "Workstream 2"), respectively. The traceability map 416 is further shown to include eighth and ninth nodes that correspond to first and second business requirements (e.g., "Business Requirement 1" and "Business Requirement 2"; the define stage 216a). The first and second business requirements are shown to correspond to the second workstream. The traceability map 416 is further shown to include tenth and eleventh nodes that correspond to first and second sets of design documents (e.g., "Design Documents 1" and "Design Documents 2"; the design stage 216b). The first and second sets of design documents are shown to correspond to the first business requirement. The traceability map 416 is further shown to include a twelfth node (e.g., "Data Pipeline 1") that correspond to first data pipeline. The first data pipeline is shown to correspond to or is based on the first set of design documents.

It will be apparent to those of skill in the art that traceability map 416 shown in FIG. 14B is merely exemplary. More stages and nodes have not been shown to avoid obscuring the drawings and the disclosure. However, in an actual implementation, the traceability map 416 may be indicative of a causal relationship between activities performed at each of the plurality of stages 216.

Figure 27:
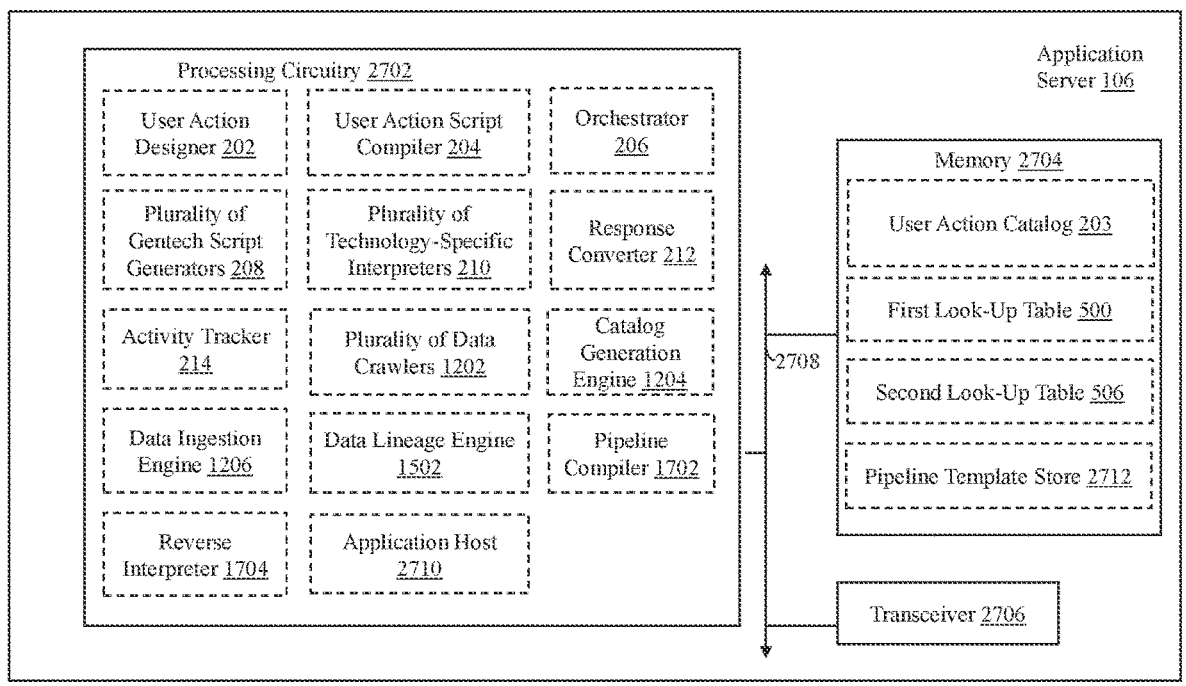
FIG. 27 is a block diagram that illustrates an application server of FIG. 1, in accordance with an exemplary embodiment of the present disclosure.

FIG. 27 is a block diagram that illustrates the application server 106, in accordance with an exemplary embodiment of the present disclosure.

The application server 106 may include processing circuitry 2702, the memory (hereinafter, designated and referred to as "the memory 2704"), and a transceiver 2706. The processing circuitry 2702, the memory 2704, and the transceiver 2706 may communicate with each other by way of a communication bus 2708. The processing circuitry 2702 may include the user action designer 202, the user action script compiler 204, the orchestrator 206, the plurality of gentech script generators 208, the plurality of technology-specific interpreters 210, the response converter 212, and the activity tracker 214. The processing circuitry 2702 may further include the plurality of data crawlers 1202, the catalog generation engine 1204, the data ingestion engine 1206, the data lineage engine 1502, the pipeline compiler 1702, the reverse interpreter 1704a, and an application host 2710. It will be apparent to those of skill in the processing circuitry 2702 is not limited to aforementioned components. The processing circuitry 2702 may include any component (e.g., the watcher pipeline 1504 or any other component) that is necessary for a functioning of the service application 112.

The processing circuitry 2702 includes suitable logic, circuitry, interfaces, and/or code, executed by the circuitry, for management of technologies (e.g., the first plurality of technologies 114) to facilitate the definition, the design, the development, or the deployment (e.g., the plurality of stages 216) of the software product.

Examples of the processing circuitry 2702 may include, but are not limited to, an application-specific integrated circuit ASIC processor, a RISC processor, a complex instruction set computer (CISC) processor, an FPGA, and the like. The processing circuitry 2702 may execute various operations for the management of technologies (e.g., the first plurality of technologies 114) to facilitate the definition, the design, the development, or the deployment (e.g., the plurality of stages 216) of the software product. These operations may be executed by way of components (e.g., modules; the user action designer 202, the orchestrator 206, or the like) included in the processing circuitry 2702.

The application host 2710 is configured to host the service application 112 that is executed on the plurality of user devices 102. Functions of other components included in the processing circuitry 2702 have already been covered in the description of earlier figures and are not repeated for the sake of brevity.

The memory 2704 may include suitable logic, circuitry, interfaces, and/or code, executable by the circuitry, to store data retrieved by the processing circuitry 2702 from the plurality of user devices 102, the plurality of technology servers 104, and/or the database server 108. For example, the memory 2704 stores, therein, gentech scripts generated by the plurality of gentech script generators 208, technology-specific scripts generated by the plurality of technology-specific interpreters 210, the value stream map 410, the traceability map 416, or the like. The memory 2704 further stores, therein, for each plurality of user actions performed on the UI rendered by the user action designer 202, a mapping between a corresponding plurality of users actions, gentech scripts generated based on the corresponding plurality of users actions, and/or technology-specific scripts generated based on the corresponding plurality of users actions. The memory 2704 further stores, therein, the user action catalog 203, the first look-up table 500, the second look-up table 506, and the pipeline template store. Hereinafter, the pipeline template store is designated and referred to as "pipeline template store 2712"

Examples of the memory 2704 may include a random-access memory (RAM), a read-only memory (ROM), a removable storage drive, a hard disk drive (HDD), a flash memory, a solid-state memory, and the like. It will be apparent to a person skilled in the art that the scope of the disclosure is not limited to realizing the memory 2704 in the application server 106, as described herein. In another embodiment, the memory 2704 may be realized in form of a database server or a cloud storage working in conjunction with the application server 106, without departing from the scope of the disclosure.

The transceiver 2706 may include suitable logic, circuitry, interfaces, and/or code, executable by the circuitry, to transmit and receive data over the communication network 110 using one or more communication network protocols. The transceiver 2706 may transmit and receive requests, messages, information, data to and/or from the plurality of user devices 102, the plurality of technology servers 104, and/or the database server 108. Examples of the transceiver 2706 may include, but are not limited to, an antenna, a radio frequency transceiver, a wireless transceiver, a Bluetooth transceiver, an ethernet port, a universal serial bus (USB) port, or any other device configured to transmit and receive data.

Figure 28:
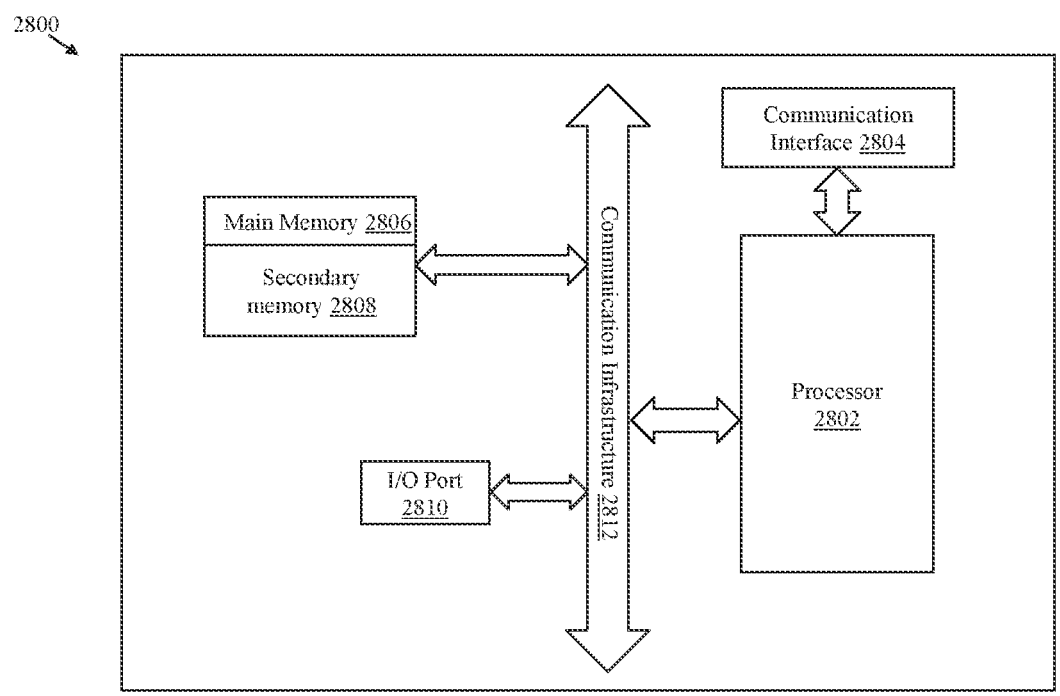
FIG. 28 is a block diagram that illustrates a system architecture of a computer system that implements the service application hosted by the application server, in accordance with an exemplary embodiment of the present disclosure.

FIG. 28 is a block diagram that illustrates a system architecture of a computer system 2800 that implements the service application 112 hosted by the application server 106, in accordance with an exemplary embodiment of the present disclosure. An embodiment of the disclosure, or portions thereof, may be implemented as computer readable code on the computer system 2800. In one example, the plurality of user devices 102, the first plurality of technology servers 104, the application server 106, and the database server 108 and the may be implemented in the computer system 2800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 17A and 17B.

The computer system 2800 may include a processor 2802 that may be a special purpose or a general-purpose processing device. The processor 2802 may be a single processor or multiple processors. The processor 2802 may have one or more processor "cores." Further, the processor 2802 may be coupled to a communication interface 2804, such as a bus, a bridge, a message queue, the communication network 110, multi-core message-passing scheme, or the like. The computer system 2800 may further include a main memory 2806 and a secondary memory 2808. Examples of the main memory 2806 may include RAM, ROM, and the like. The secondary memory 2808 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer readable recording media.

The computer system 2800 may further include an input/output (I/O) port 2810 and a communication infrastructure 2812. The I/O port 2810 may include various input and output devices that are configured to communicate with the processor 2802. Examples of the input devices may include a keyboard, a mouse, a joystick, a touchscreen, a microphone, and the like. Examples of the output devices may include a display screen, a speaker, headphones, and the like. The communication infrastructure 2812 may be configured to allow data to be transferred between the computer system 2800 and various devices that are communicatively coupled to the computer system 2800. Examples of the communication infrastructure 2812 may include a modem, a network interface, i.e., an Ethernet card, a communication port, and the like. Data transferred via the communication infrastructure 2812 may be signals, such as electronic, electromagnetic, optical, or other signals as will be apparent to a person skilled in the art. The signals may travel via a communications channel, such as the communication network 110, which may be configured to transmit the signals to the various devices that are communicatively coupled to the computer system 2800. Examples of the communication channel may include a wired, wireless, and/or optical medium such as cable, fiber optics, a phone line, a cellular phone link, a radio frequency link, and the like. The main memory 2806 and the secondary memory 2808 may refer to non-transitory computer readable mediums that may provide data that enables the computer system 2800 to implement the methods illustrated in FIGS. 17A and 17B.

Figure 29A:
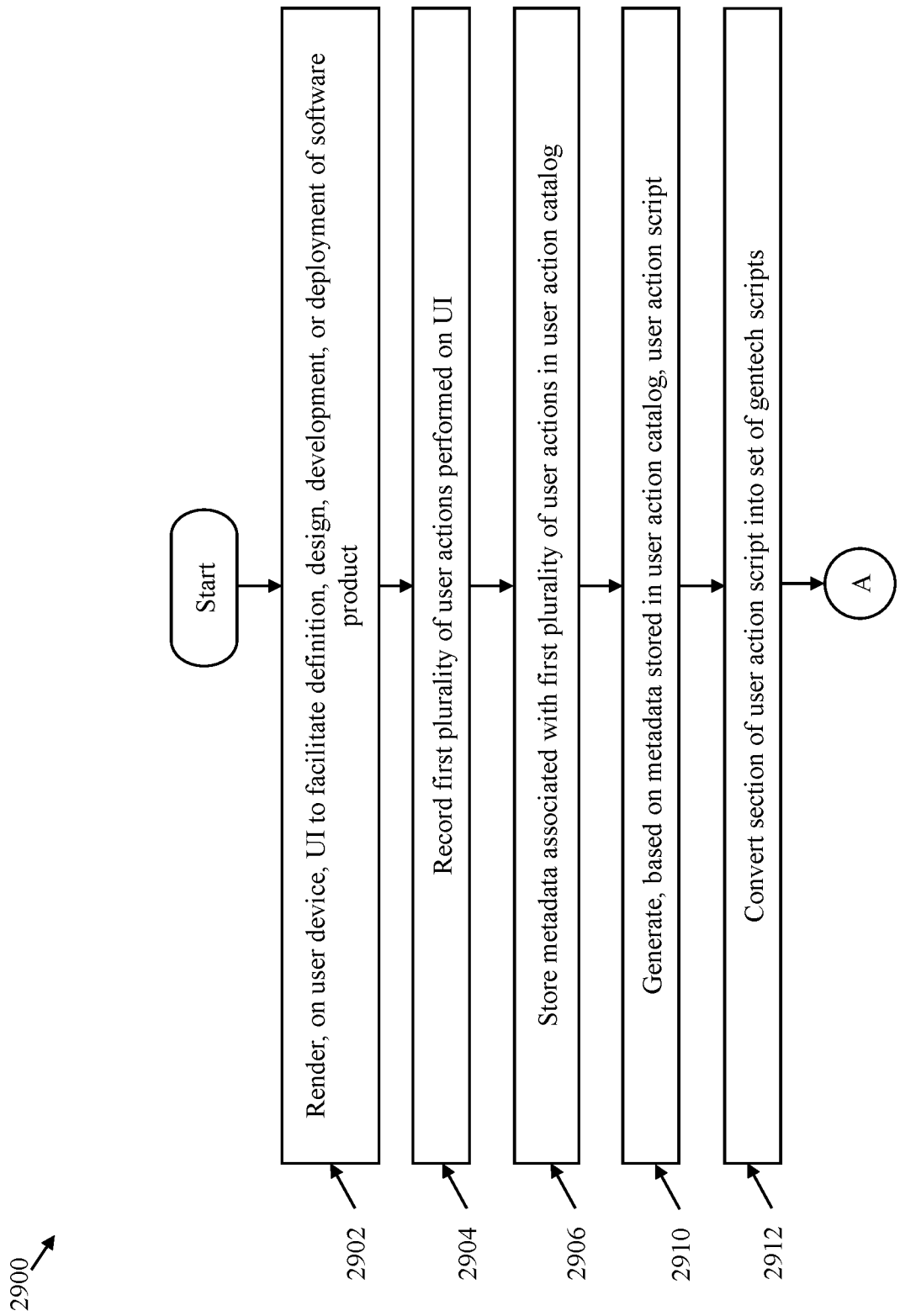
FIGS. 29A and 29B, collectively, represents a flow chart that illustrates a method for managing technologies to facilitate definition, design, development, or deployment of the software product, in accordance with an exemplary embodiment of the present disclosure.
Figure 29B:
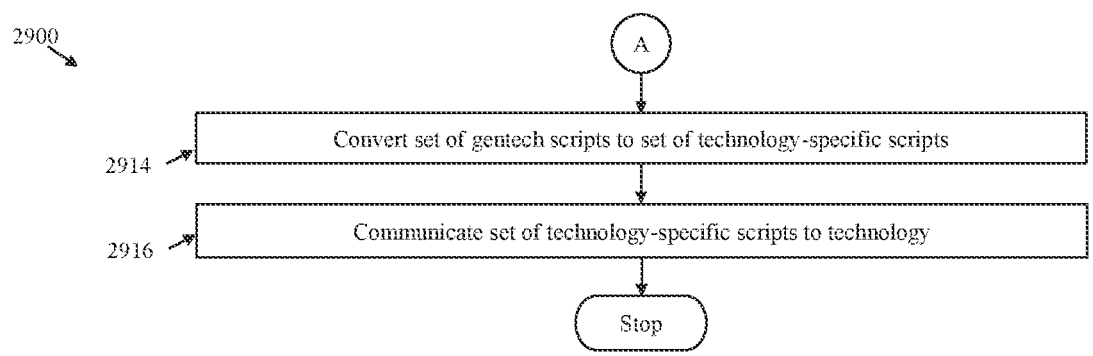

FIGS. 29A and 29B, collectively, represent a flow chart 2900 that illustrates a method for managing technologies to facilitate definition, design, development, or deployment of the software product, in accordance with an exemplary embodiment of the present disclosure. For the sake of brevity, FIGS. 29A and 29B are explained in conjunction with FIG. 8A.

Referring to FIG. 29A, at 2902, UI to facilitate definition, design, development, and deployment of a software product is rendered. For example, the user action designer 202 renders the UI on the display screen of the first user device 102. The UI may present the first plurality of technologies 114 and the first plurality of operations available for facilitating the definition, the design, the development, or the deployment of the software product. At 2904, a plurality of user actions performed on the UI are recorded. For example, the user action designer 202 may record the first plurality of user actions that include the selection of the first set of operations (e.g., definition of new business requirement from the first plurality of operations. The user action designer 202 may present the first through fifth documentation technologies on the rendered UI based on the selection of the first set of operations. The first through fifth documentation technologies may be available for the execution of the first set of operations. The first plurality of user actions may further include the selection of the first documentation technology (e.g., the first technology 114a) for the execution of the first set of operations.

At 2906, metadata associated with the plurality of user actions is stored in a user action catalog. For example, the metadata associated with the first plurality of user actions is stored in the user action catalog 203. At 2910, a user action script is generated based on the stored metadata. For example, the user action script compiler 204 generates the first user action script based on the metadata stored in the user action catalog 203. At 2912, a section of the user action script is converted to a set of gentech scripts generator. For example, the first gentech script generator 208a converts the first section of the first user action script to the first set of gentech scripts. The first set of gentech scripts is in the format that is technology agnostic with respect to the first through fifth documentation technologies. The first gentech script generator 208a may communicate the first set of gentech scripts is communicated to the orchestrator 206. The orchestrator 206 communicates the first set of gentech scripts to the first technology-specific interpreter 210a based on the analysis of the first user action script and information stored in the second look-up table 506. In other words, the orchestrator 206 identifies the first technology-specific interpreter 210a that corresponds to the first documentation technology (e.g., the first technology 114a) for the communication of the first set of gentech scripts, based on the first user action script and the information stored in the second look-up table 506.

Referring to FIG. 29B, at 2914, the set of gentech scripts is converted to a set of technology-specific scripts. For example, the first technology-specific interpreter 210a converts the first set of the gentech scripts into the first set of technology-specific scripts that is compatible with first documentation technology (e.g., the first technology 114a). At 2916, the set of technology-specific scripts is communicated to a technology. For example, the first technology-specific interpreter communicates the first set of technology-specific scripts to the first documentation technology. In other words, the application server 106 (e.g., the first technology-specific interpreter 210a) communicates the first set of technology-specific scripts to the first documentation technology (e.g., the first technology server 104a that hosts the first documentation technology/the first technology 114a) for execution of the first set of operations. The first documentation technology (e.g., the first technology server 104) initiates the execution of the first set of operations based on the first set of technology-specific scripts.

Figure 30:
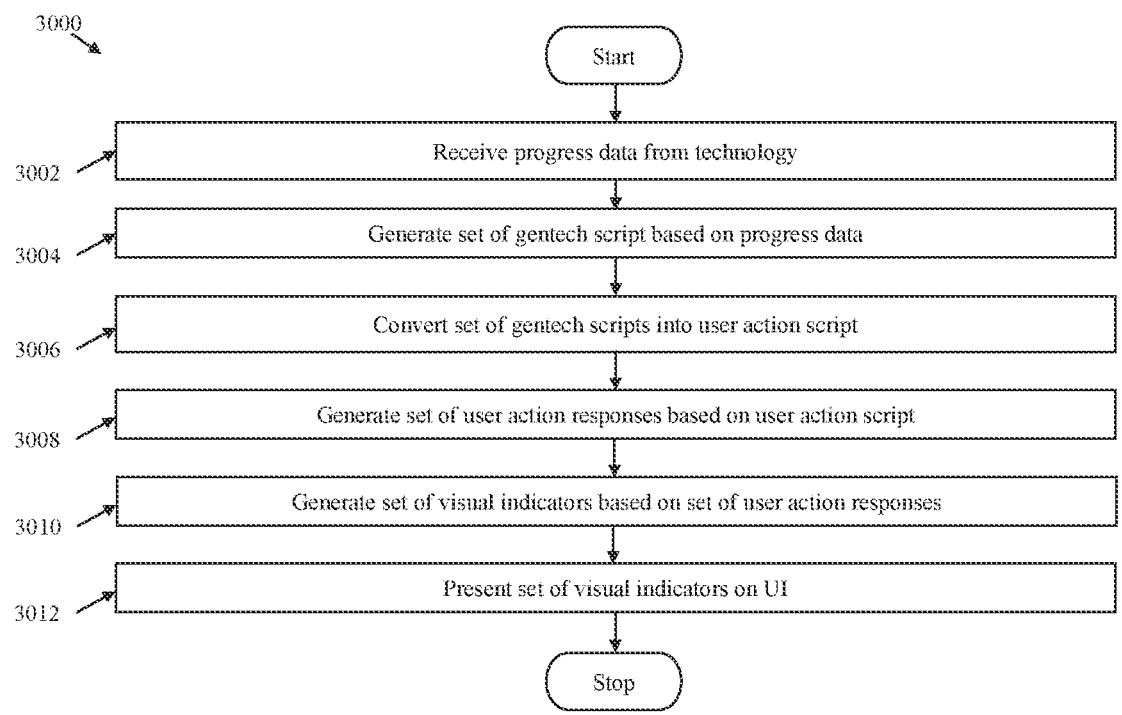
FIG. 30 represents a flow chart that illustrates a method for presenting visual indicators based on an execution of a first set of operations, in accordance with an exemplary embodiment of the present disclosure.

FIG. 30 represents a flow chart 3000 that illustrates a method for presenting visual indicators based on the execution of the first set of operations, in accordance with an exemplary embodiment of the present disclosure. For the sake of brevity, FIG. 30 is explained in conjunction with FIG. 8A.

At 3002, progress data is received from a technology. For example, the first technology 114*a* (e.g., the first technology server 104*a*) may, based on the initiation of the execution of the first set of operations/the initiation of the execution of the first set of operations, communicate the first progress data to the first technology-specific interpreter 210*a*. The first progress data may include, but is not limited to, an indication of a progress of the execution of the first set of operations. The first technology-specific interpreter 210*a* may receive the first progress data from the first technology 114*a* (e.g., the first documentation technology).

At 3004, a set of gentech scripts is generated based on the progress data. For example, the first technology-specific interpreter 210*a* may generate the second set of gentech scripts that is indicative of the first progress data. In other words, the first technology-specific interpreter 210*a* may convert the first progress data into the second set of gentech scripts that is indicative of the first progress data. The second set of gentech scripts is in the format that is technology-agnostic with respect to the second plurality of technologies (e.g., the plurality of documentation technologies) available for the execution of the first set of operations. At 3006, the set of gentech scripts is converted into a user action script. For example, the first gentech script generator 208*a* may convert the second set of gentech scripts into the second user action script that is indicative of the first progress data and is in the format or language that is compatible with the service application 112. The first gentech script generator 208*a* may communicate the second user action script to the orchestrator 206. The orchestrator 206 may communicate the second user action script to the response converter 212.

At 3008, a set of user action responses is generated based on the user action script. For example, the response converter 212 may convert the second user action script into the first set of user action responses that is indicative of the first progress data. The response converter 212 may communicate the first set of user action responses to the user action designer 202. At 3010, a set of visual indicators may be generated based on the set of user action responses For example, the user action designer 202 may, based on the first set of user action responses, generate the first set of visual indicators that is indicative of the first progress data. At 3012, the set of visual indicators are presented on the UI. For example, the user action designer 202 may present the first set of visual indicators on the UI.

For the sake of brevity, the FIG. 30 was described with respect to the generation of the first set of documents (as described in the foregoing description of FIG. 8A). It will be apparent to those of skill in the art that visual indicators for progress data received from other technologies (e.g., the data ingestion technology, the cloud technology, or the like) may be generated and presented in a similar manner.

The disclosed embodiments encompass numerous advantages. Exemplary advantages of the disclosed embodiments include, but are not limited to, providing an open pro-code platform (e.g., the service application 112) for execution of various stages (e.g., the define stage 216*a*, the design stage 216*b*, the development stage 216*c*, and the deployment stage 216*d*) of the SDLC of the software product. The service application 112 disclosed herein enables the plurality of users to execute the various stages of the SDLC of the software product, using a single platform (i.e., the service application 112). The service application 112 supports a plurality of technologies (e.g., the first plurality of technologies 114) that facilitate various operations associated with execution of the various stages of the SDLC of the software product. The service application 112 disclosed herein enables the plurality of users to select one or more technologies of their choice for developing the software product. The service application 112 abstracts, from the plurality of users, complexity of integrating selected technologies (e.g., the first plurality of technologies 114), eliminating a need of the organization to re-hire or re-train the plurality of users for using the selected point technologies and/or technology platforms.

In some scenarios, the organization (e.g., the plurality of scenarios) may select technologies that are already in use or licensed by the organization, facilitating seamless migration to the service application 112 for product development. The service application 112 provides collaboration tools that facilitate collaboration of the plurality of users, various stakeholders of the software product, or the like at every stage of software product development. Therefore, the service application 112 enables the plurality of users and the stakeholders to access a common platform (e.g., the service application 112) and contribute to the development of the software product at each stage of the SDLC.

The service application 112 provides an architecture (e.g., the architecture 200) that abstracts interaction of the plurality of users with each selected point technology or technology platform. The service application 112 enables the plurality of users to access services and features associated with each selected technologies without having to learn nuances of a corresponding technology. Therefore, the service application 112 significantly eliminates a requirement for being aware of technical environment, an underlying technology, or a UI of a selected point technology and/or technology platform for accessing or using a corresponding technology or technology platform. Hence, the service application 112 creates a uniform and consistent experience for the plurality of users for software development irrespective of the technology stack.

The disclosed service application 112 facilitates monitoring of each activity being performed by way of the UI of the service application 112. Based on such monitoring, the service application 112 facilitates generation of value stream maps (e.g., the value stream map 410) that allows for tracking of the SDLC/DALC of the software product and activities performed by the plurality of users on the service application 112. This enables determination of a value (e.g., productivity value) derived from each activity of each user of the plurality of users. Thus, the value stream map 410 enables tracking of productive work and waste of time caused by the plurality of users while using the service application 112. Further, the value stream map 410 provides insights into time leakages at each stage of the SDLC of the software product.

Further, the service application 112 facilitates generation of the traceability map 416 based on tracking/monitoring of various events (such as, code, commit, build, execution, deployment, or any other operation executed by way of the service application 112) associated with the SDLC of the software product. The traceability map 416 enables the plurality of users to trace late-stage events or issues and find corresponding causal factors and events. Therefore, the traceability map 416 provides transparency at each stage of the SDLC of the software product.

The service application 112 enables implementation of various techniques (such as, PaC, IaC, SaC, agile planning, DevOps, DataOps, or the like) by the plurality of users for developing and/or deploying the software product. The service application 112 enables setting of governance policies and/or policies of role-based access for enforcing quality standards, best practices, and architectural patterns. For example, the set of pipeline templates enable deployment of CI/CD or DevOps pipelines that are consistent for technologies or technology platforms across various deployment environments. Therefore, the service application 112 provides for a simplified and seamless technological experience for executing the various stages of the SDLC of the software product.

The service application 112 enables creation of data pipelines. The service application 112 facilitates creation and management of data pipelines end-to-end, allowing the user to select stages (e.g., the data ingestion stage, the data storage stage, or the like) that are to be included in the data pipeline. A technology that is to be used to implement each stage of the data pipeline may be selected by the user. The service application 112, by way of the architecture 200 abstracts, from the user, a complexity of each technology selected for the implementation of each stage of the data pipeline. For any stage in the data pipeline, the service application 112 enables users to replace change the selection of technology for the implementation of a corresponding stage. For example, the technology selected for the data ingestion stage may be changed from the first data ingestion technology to the second data ingestion technology without any hassle, since the complexity of each technology is abstracted from the user. This enables the entity developing the software product to migrate between technologies with ease. The service application 112 facilitates automated creation of the data lineage map for the data pipeline, that enables the plurality of users to view a result of the execution of the data pipeline and track changes in the data flowing through the data pipeline. Therefore, the service application 112 creates and orchestrates data pipelines that include various stages and various technologies for the execution of each of these pipeline stages.

The service application 112 facilitates swift and easy deployment of the software product (e.g., the plurality of microservices). The service application 112 provides a plug-and-play architecture (e.g., the architecture 1701) that enables configuration and designing of pipeline templates (e.g., the first and second pipeline templates). The pipeline templates may be customized (e.g., modified) as per project requirements. The service application 112 enables the user to select the technology/tool (e.g., the first version control technology) that is to be associated with each stage in a pipeline template. Feasibility of each pipeline template is validated by a CI/CD automation technology (e.g., the first CI/CD instance) that is selected for execution of a corresponding template.

The service application 112 facilities definition of a promotion pipeline that includes various deployment stages (e.g., the first through third deployment stages). The service application 112 facilitates the provisioning of infrastructure (e.g., the first and second cloud instances) at each deployment stage based on required infrastructure configurations (e.g., the first and second sets of configuration details). The service application 112 enables hybrid cloud-agnostic deployment of the plurality of microservices. Therefore, infrastructure may be provisioned across multiple cloud technologies (e.g., the first through third cloud technologies) for deployment of the plurality of microservices. Complexity of configuring cloud technologies (e.g., the plurality of cloud technologies) for the provisioning of infrastructure is abstracted from the user, thereby, allowing the user to select any cloud technology and any deployment mode (e.g., Docker containers, Kubernetes clusters, OpenShift clusters, IaC script-based deployment, or the like) for the deployment of the plurality of microservices. The service application 112 presents visual indicators on the UI to enable the user to view a status (e.g., successfully provisioned) of the provisioned infrastructure (e.g., the first and second cloud instances). Further, the deployment of each microservice (e.g., the first and second pipeline templates) of the plurality of microservices may be automatically triggered when a trigger event is detected (e.g., code commit to the first code repository). The service application 112 further enables automatic promotion of binaries (e.g., the first and second sets of binaries) from one deployment environment to another deployment environment, based on the defined promotion pipeline.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the disclosure provide, among other features, an architecture for creation and management of data pipelines. While various exemplary embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

The invention claimed is:

1. A non-transitory computer-readable medium having stored therein, computer executable instructions, which when executed by a computer, cause the computer to implement an architecture for facilitating definition, design, development, or deployment of an application, the architecture comprising:

a user action designer configured to:
render, on a user device, a user interface (UI) that presents a first plurality of technologies and a plurality of operations available to facilitate the definition, the design, the development, or the deployment of the application;
present, on the UI, based on a selection of a first set of operations of the plurality of operations, a second plurality of technologies available for execution of the first set of operations, wherein the first plurality of technologies include the second plurality of technologies; and record a first plurality of user actions performed on the UI, wherein the first plurality of user actions are associated with the definition, the design, the development, or the deployment of the application, and wherein the first plurality of user actions include the selection of the first set of operations and a selection of a first technology from the second plurality of technologies for the execution of the first set of operations;

a user action script compiler configured to generate, based on the first plurality of user actions, a first user action script, wherein the first user action script is indicative of the selection of the first technology and the first set of operations to be executed by the first technology;

a plurality of script generators, each script generator of the plurality of script generators being configured to generate gentech scripts for a set of technologies of the first plurality of technologies, wherein the gentech scripts generated by each script generator are technology agnostic with respect to a corresponding set of technologies, and wherein a first script generator of the plurality of script generators is configured to generate gentech scripts for the second plurality of technologies; and a plurality of technology-specific interpreters for the first plurality of technologies,
wherein the plurality of technology-specific interpreters include a first technology-specific interpreter for the first technology,
wherein the first script generator is configured to convert a first section of the first user action script to a first set of gentech scripts that is in a format that is technology agnostic with respect to the corresponding set of technologies that includes the first technology,
wherein the first technology-specific interpreter is configured to convert the first set of gentech scripts to a first set of technology-specific scripts compatible with the first technology, and communicate the first set of technology-specific scripts to the first technology, and
wherein the first technology initiates the execution of the first set of operations based on the first set of technology-specific scripts.

2. The non-transitory computer-readable medium of claim 1,
wherein the first technology-specific interpreter is further configured to:
receive, from the first technology, based on the initiation of the execution of the first set of operations, first progress data that is indicative of a progress of the execution of the first set of operations by the first technology; and
generate, based on the received first progress data, a second set of gentech scripts that is indicative of the first progress data and in a format that is technology agnostic with respect to the first technology; and
wherein the first script generator is further configured to convert the second set of gentech scripts into a second user action script, wherein the second user action script is indicative of the first progress data.

3. The non-transitory computer-readable medium of claim 2, wherein the architecture further comprises a response converter configured to generate, based on the second user action script, a first set of user action responses that is indicative of the first progress data received from the first technology, wherein the user action designer is further configured to:
generate, based on the first set of user action responses, a first set of visual indicators indicative of the progress of the execution of the first set of operations; and
present the generated first set of visual indicators on the UI.

4. The non-transitory computer-readable medium of claim 3,
wherein the user action designer is further configured to present, on the UI, based on a selection of a second set of operations of the plurality of operations, a third plurality of technologies available for execution of the second set of operations,
wherein the first plurality of technologies include the third plurality of technologies,
wherein the first plurality of user actions further include the selection of the second set of operations and a selection of a second technology from the third plurality of technologies for the execution of the second set of operations,
wherein a second script generator of the plurality of script generators is configured to convert a second section of the first user action script to a third set of gentech scripts that is in a format that is technology agnostic with respect to the corresponding set of technologies that includes the second technology,
wherein a second technology-specific interpreter, of the plurality of technology-specific interpreters, is configured to convert the third set of gentech scripts to a third set of technology-specific scripts compatible with the second technology, and communicate the third set of technology-specific scripts to the second technology, and
wherein the second technology initiates execution of the second set of operations based on the third set of technology-specific scripts.

5. The non-transitory computer-readable medium of claim 4,
wherein the second technology-specific interpreter is further configured to:
receive, from the second technology, based on the initiation of the execution of the second set of operations, second progress data that is indicative of a progress of execution of the second set of operations by the second technology; and
generate, based on the received second progress data, a fourth set of gentech scripts that is in a format that is technology agnostic with respect to the second technology, and
wherein the second script generator is further configured to convert the fourth set of gentech scripts into a third user action script indicative of the second progress data.

6. The non-transitory computer-readable medium of claim 5,
wherein the response converter is further configured to generate a second set of user action responses based on the third user action script indicative of the second progress data received from the second technology, and
wherein the user action designer is further configured to:
generate, based on the second set of user action responses, a second set of visual indicators indicative of the progress of the execution of the second set of operations; and
present the generated second set of visual indicators on the UI.

7. The non-transitory computer-readable medium of claim 3,
wherein the user action designer is further configured to:
record a second plurality of user actions performed on the UI, wherein the second plurality of user actions are associated with the definition, the design, the development, or the deployment of the application, and wherein the second plurality of user actions include the selection of the first set of operations and change of the selection of the first technology to a second technology from the second plurality of technologies for the execution of the first set of operations, wherein the user action script compiler is further configured to generate a third user action script that is indicative of the selection of the second technology for the execution of the first set of operations,
wherein a second technology-specific interpreter, of the plurality of technology-specific interpreters, is configured to:
convert the first set of gentech scripts to a third set of technology-specific scripts compatible with the second technology; and
communicate the third set of technology-specific scripts to the second technology, and
wherein the second technology initiates execution of the first set of operations based on the third set of technology-specific scripts.

8. The non-transitory computer-readable medium of claim 7,
wherein the second technology-specific interpreter is further configured to:
receive, from the second technology, based on the initiation of the execution of the first set of operations, second progress data that is indicative of a progress of execution of the first set of operations by the second technology; and
generate, based on the received second progress data, a third set of gentech scripts that is indicative of the second progress data and in a format that is technology agnostic with respect to the second technology, and
wherein a second script generator of the plurality of script generators is further configured to convert the third set of gentech scripts into a fourth user action script indicative of the second progress data.

9. The non-transitory computer-readable medium of claim 8,
wherein the response converter is further configured to generate, based on the fourth user action script, a second set of user action responses that is indicative of the second progress data, and
wherein the user action designer is further configured to:
generate, based on the second set of user action responses, a second set of visual indicators indicative of the progress of the execution of the first set of operations; and
present the generated second set of visual indicators on the UI.

10. The non-transitory computer-readable medium of claim 3,
wherein the first plurality of user actions further include a selection of a second technology from the second plurality of technologies for the execution of the first set of operations,
wherein the first user action script is further indicative of the selection of the second technology and the first set of operations to be executed by the second technology,
wherein the plurality of technology-specific interpreters further include a second technology-specific interpreter for the second technology,
wherein the first set of gentech scripts is in the format that is technology agnostic further with respect to the second technology,
wherein the second technology-specific interpreter is configured to:
convert the first set of gentech scripts to a third set of technology-specific scripts compatible with the second technology; and
communicate the third set of technology-specific scripts to the second technology, and
wherein the second technology initiates the execution of the first set of operations based on the third set of technology-specific scripts.

11. The non-transitory computer-readable medium of claim 10,
wherein the second technology-specific interpreter is further configured to:
receive, from the second technology, based on the initiation of the execution of the first set of operations, second progress data that is indicative of a progress of execution of the first set of operations by the second technology; and
generate, based on the received second progress data, a third set of gentech scripts that is indicative of the second progress data and in a format that is technology agnostic with respect to the second technology; and
wherein a second script generator of the plurality of script generators is further configured to convert the third set of gentech scripts into a third user action script indicative of the second progress data.

12. The non-transitory computer-readable medium of claim 11,
wherein the response converter is further configured to generate, based on the third user action script, a second set of user action responses that is indicative of the second progress data, and
wherein the user action designer is further configured to:
generate, based on the second set of user action responses, a second set of visual indicators indicative of the progress of the execution of the first set of operations; and
present the generated second set of visual indicators on the UI.

13. The non-transitory computer-readable medium of claim 3, wherein the architecture further comprises:
an activity watcher configured to:
track the first plurality of user actions performed on the UI; and
record, based on the second user action script, the first progress data received from the first technology and an output of the first set of operations.

14. The non-transitory computer-readable medium of claim 13, wherein the architecture further comprises:
an activity filter configured to classify each of the tracked first plurality of user actions as one of a value-added activity and a non-value added activity, based on the first progress data and the output of the first set of operations; and
a value stream engine configured to determine a value stream map based on the tracked first plurality of user actions, the recorded first progress data, and the classification of the first plurality of user actions, wherein the value stream map is indicative of an efficiency score and a leakage time period for the definition, the design, the development, or the deployment of the application.

15. The non-transitory computer-readable medium of claim 14, further comprising a relationship matrix engine configured to generate a traceability map based on the tracked first plurality of user actions, the recorded first progress data, and the recorded output of the first set of operations, wherein the traceability map is indicative of a causal relationship among the first plurality of user actions, the recorded first progress data, and the output of the first set of operations.

16. The non-transitory computer-readable medium of claim 1, wherein the architecture further comprises an orchestrator configured to:
communicate the first section of the first user action script to the first script generator; and
communicate the first set of gentech scripts to the first technology-specific interpreter, based on the first user action script.

17. The non-transitory computer-readable medium of claim 16, wherein the orchestrator is further configured to:
store a look-up table indicative of a mapping between the first plurality of technologies, the plurality of script generators, and the plurality of technology-specific interpreters, wherein the look-up table indicates that the first script generator is mapped to the second plurality of technologies, and wherein the look-up table further indicates that the first technology-specific interpreter is mapped to the first technology; and
identify, based on the first user action script and the look-up table, the first script generator, wherein the orchestrator is configured to communicate the first section of the first user action script to the first script generator based on the identification of the first script generator.

18. The non-transitory computer-readable medium of claim 17, wherein the look-up table is further indicative of a mapping between a plurality of programming languages and a set of script generators, and wherein the plurality of script generators include the set of script generators.

19. The non-transitory computer-readable medium of claim 18, wherein:
the first set of gentech scripts is presented on the UI for modification by a user,
one or more gentech scripts of the first set of gentech scripts are modified by the user, and
the conversion of the first set of gentech scripts includes the conversion of the one or more modified gentech scripts.

* * * * *